United States Patent
Kabir et al.

(10) Patent No.: US 12,485,131 B2
(45) Date of Patent: Dec. 2, 2025

(54) FORMULATIONS OF BRINCIDOFOVIR

(71) Applicant: EMERGENT BIODEFENSE OPERATIONS LANSING LLC, Lansing, MI (US)

(72) Inventors: Mohammed Kabir, Cary, NC (US); Odin Johann Naderer, Chapel Hill, NC (US); Irma Marisa Grossi, Durham, NC (US)

(73) Assignee: EMERGENT BIODEFENSE OPERATIONS LANSING LLC, Lansing, MI (US)

( * ) Notice: Subject to any disclaimer, the term of this patent is extended or adjusted under 35 U.S.C. 154(b) by 0 days.

(21) Appl. No.: 17/872,921

(22) Filed: Jul. 25, 2022

(65) Prior Publication Data
US 2023/0210873 A1     Jul. 6, 2023

Related U.S. Application Data

(60) Continuation of application No. 16/722,699, filed on Dec. 20, 2019, now abandoned, which is a division of application No. 15/636,393, filed on Jun. 28, 2017, now abandoned.

(60) Provisional application No. 62/512,825, filed on May 31, 2017, provisional application No. 62/507,397, filed on May 17, 2017, provisional application No. 62/465,053, filed on Feb. 28, 2017, provisional application No. 62/446,213, filed on Jan. 13, 2017, provisional application No. 62/394,665, filed on Sep. 14, 2016, provisional application No. 62/355,844, filed on Jun. 28, 2016.

(51) Int. Cl.
| | | |
|---|---|---|
| *A61K 31/675* | (2006.01) | |
| *A61K 9/00* | (2006.01) | |
| *A61K 9/08* | (2006.01) | |
| *A61K 9/19* | (2006.01) | |
| *A61K 47/18* | (2017.01) | |
| *A61K 47/26* | (2006.01) | |

(52) U.S. Cl.
CPC .......... *A61K 31/675* (2013.01); *A61K 9/0019* (2013.01); *A61K 9/08* (2013.01); *A61K 9/19* (2013.01); *A61K 47/18* (2013.01); *A61K 47/183* (2013.01); *A61K 47/26* (2013.01); Y02A 50/30 (2018.01)

(58) Field of Classification Search
CPC .... A61K 31/675; A61K 47/26; A61K 47/183; A61K 9/08
See application file for complete search history.

(56) References Cited

U.S. PATENT DOCUMENTS

| | | |
|---|---|---|
| 6,716,825 B2 | 4/2004 | Hostetler et al. |
| 8,569,321 B2 | 10/2013 | Ware et al. |
| 8,614,200 B2 | 12/2013 | Painter et al. |
| 8,642,577 B2 | 2/2014 | Almond et al. |
| 8,962,829 B1 * | 2/2015 | Ware, Jr. ............... A61K 31/513 544/243 |
| 10,022,365 B2 | 7/2018 | Tong et al. |
| 2007/0003608 A1 | 1/2007 | Almond et al. |
| 2011/0263536 A1 | 10/2011 | Lanier et al. |
| 2012/0010170 A1 | 1/2012 | Painter |
| 2012/0164104 A1 | 6/2012 | Lanier et al. |
| 2013/0072458 A1 | 3/2013 | Painter et al. |
| 2014/0296191 A1 | 10/2014 | Patel et al. |
| 2014/0303092 A1 * | 10/2014 | Painter ................. A61K 31/675 514/86 |
| 2015/0087619 A1 | 3/2015 | Painter et al. |

FOREIGN PATENT DOCUMENTS

| | | |
|---|---|---|
| JP | 2002128675 A | 5/2002 |
| JP | 2010525063 A | 7/2010 |
| JP | 2011116658 A | 6/2011 |
| JP | 2013512262 A | 4/2013 |
| JP | 2016515609 A | 5/2016 |
| WO | WO-2008133966 A1 | 11/2008 |
| WO | WO-2009113665 A1 | 9/2009 |

OTHER PUBLICATIONS

SciFinder n; "Predicted Chemical properties" of cidofovir and brincidofovir; accessed Oct. 30, 2023 (Year: 2014).*
Baheti; "Excipients used in lyophilization of small molecules"; 2000; J. Excipients and Food Chem. 1 (1) 41-54 (Year: 2000).*
Beringer et al., Ed.; "Remington: The Science and Practice of Pharmacy, 21st Ed." 2005; Philadelphia College of Pharmacy and Science; pp. 250-265, 802-836, 1678 (Year: 2005).*
Cold Spring Harbor Protocols; "Recipe: L-arginine buffer"; 2007; doi:10.1101/pdb.rec10853 (Year: 2007).*
SciFinder n; Predicted Chemical properties of cidofovir and brincidofovir; accessed Oct. 30, 2023 (Year: 2023).*
Baheti, A., et al., "Excipients used in lyophilization of small molecules," J Excipients and Food Chem 1(1):41-54, IPEC-Americas, United States (Jun. 2010).
Beringer, et al., Ed.; "Remington: The Science and Practice of Pharmacy, 21st Ed." 2005; Philadelphia College of Pharmacy and Science; pp. 250-265, 802-836, 1678.
Ciesla, S.L., et al., "Esterification of cidofovir with alkozyalkanols increases oral bioavailability and diminishes drug accumulation in the kidney," Antiviral Res 59(3):163-171, Elsevier, Netherlands (Aug. 2003).

(Continued)

*Primary Examiner* — Timothy P Thomas
(74) *Attorney, Agent, or Firm* — Sterne, Kessler, Goldstein & Fox P.L.L.C.

(57) ABSTRACT

Disclosed are formulations comprising brincidofovir. The formulations can be intravenous formulations. The formulations can be used in cases where a subject experiences gastrointestinal issues in response to oral administration of brincidofovir. The formulations can also be used in cases where oral administration of drug is not possible due to underlying conditions or concern around inadequate oral absorption.

11 Claims, 10 Drawing Sheets

(10 of 10 Drawing Sheet(s) Filed in Color)

(56) References Cited

OTHER PUBLICATIONS

Feiyan, et al., "Micelle formulation of hexadecyloxypropyl-cidofovir (HDP-CDV) as an intravitreal long-lasting delivery system," Eur J Pharm Biopharm 89:271-279, Elsevier, Netherlands (Jan. 2015).
Gilead Sciences; "Vistide® (cidofovir injection)" 2001; Physicians's Desk Reference, 55th Ed.; Medical Economics Co., Inc, Montvale, NJ; pp. 1332-1334.
Introduction to Modern Pharmaceutics, Nankodo Co., Ltd., 1987, Revised 3rd Edition, pp. 326-335.
Cold Spring Harbor Protocols; "Recipe: L-arginine buffer"; http://cshprotocols.cshlp.org/content/2007/1/pdb.rec10852.full?text_only=true; 2007; doi:10.1101/pdb.rec10853 (2007).
Akers, M., "Parenteral Preparations," REMINGTON: The Science and Practice of Pharmacy, 21st Edition, Philadelphia College of Pharmacy and Science, 2006, chapter 41, part 5, p. 802-836.
Poon, C., "Tonicity, Osmoticity, Osmolality, and Osmolarity," REMINGTON: The Science and Practice of Pharmacy, 21st Edition, Philadelphia College of Pharmacy and Science, 2006, chapter 18, part 2, p. 250-265.
Tang, G., Modern Pharmacology, China Medical Science and Technology Press, Edition 1, 1997, p. 986.

\* cited by examiner

FORMULATIONS OF BRINCIDOFOVIR

CROSS-REFERENCE TO RELATED APPLICATIONS

This application is a continuation of U.S. patent application Ser. No. 16/722,699, filed Dec. 20, 2019, which is a division of U.S. patent application Ser. No. 15/636,393, filed Jun. 28, 2017, which claims priority to, and benefit of: U.S. Provisional Patent Application No. 62/355,844, filed Jun. 28, 2016; U.S. Provisional Patent Application No. 62/394,665, filed Sep. 14, 2016; U.S. Provisional Patent Application No. 62/446,213, filed Jan. 13, 2017; U.S. Provisional Patent Application No. 62/465,053, filed Feb. 28, 2017; U.S. Provisional Patent Application No. 62/507,397, filed May 17, 2017; and U.S. Provisional Patent Application No. 62/512,825, filed May 31, 2017, the contents of each of which are incorporated by reference in their entireties.

FIELD

The present disclosure relates to pharmaceutical compositions (e.g., lyophilized and/or aqueous compositions) comprising brincidofovir and methods of use thereof.

BACKGROUND

Brincidofovir (BCV, CMX001) is an orally bioavailable, lipid acyclic nucleoside phosphonate that is converted intracellularly into the active antiviral cidofovir diphosphate (CDV-PP). Brincidofovir has broad spectrum antiviral activity against double-stranded DNA viruses. The structure of brincidofovir is shown below:

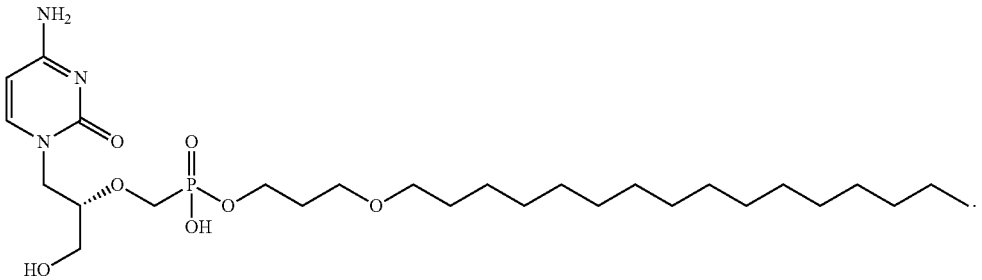 [SMILES: CCCCCCCCCCCCCCCCOCCCOP(=O)(O)CO[C@H](CO)Cn1ccc(N)nc1=O]

SUMMARY

The present disclosure presents compositions comprising brincidofovir and methods of using the same. The compositions can be lyophilized (e.g., as a powder) for long-term storage. The lyophilized formulations can be reconstituted (e.g., in an aqueous sugar solution) as biocompatible formulations for intravenous (IV) administration (e.g., to a subject in need thereof).

In one aspect, the present disclosure provides a pharmaceutical composition, comprising: brincidofovir; a bulking agent; a buffer; and water; wherein the pH of the composition is about 8.0.

In some embodiments, the bulking agent is mannitol or sucrose. In some embodiments, the bulking agent is mannitol. In some embodiments, the buffer is sodium phosphate, L-arginine, or tromethamine. In some embodiments, the buffer is L-arginine. In some embodiments, the brincidofovir is present at a concentration of about 10.0 mg/mL. In some embodiments, the bulking agent is present at a concentration of about 2.5-9% (w/v). In some embodiments, the bulking agent is present at a concentration of about 2.5% (w/v). In some embodiments, the bulking agent is present at a concentration of about 5% (w/v). In some embodiments, the buffer is present at a concentration of about 100-200 mM. In some embodiments, the buffer is present at a concentration of about 100 mM. In some embodiments, the pH is adjusted using HCl and/or NaOH.

In some embodiments, the pharmaceutical composition comprises: brincidofovir at a concentration of about 10.0 mg/mL; mannitol at a concentration of about 25-50 mg/mL; L-arginine at a concentration of about 17.4 mg/mL; and water; wherein the pH of the composition is about 8.0.

In some embodiments, the pharmaceutical composition comprises: brincidofovir at a concentration of about 17.8 mM; mannitol at a concentration of about 137.5-275 mM; L-arginine at a concentration of about 100 mM; and water; wherein the pH of the composition is about 8.0.

In some embodiments, the liquid pharmaceutical composition is lyophilized, e.g., to remove water, forming a lyophilized powder.

In another aspect, the present disclosure provides a lyophilized powder comprising: about 13-23% by weight brincidofovir; about 48%-65% by weight mannitol; and about 22-40% by weight arginine.

In another aspect, the present disclosure provides a lyophilized powder comprising: about 13-19% by weight brincidofovir; about 48%-65% by weight mannitol; and about 22-33% by weight arginine.

In some embodiments, the lyophilized powder contains about 19% by weight brincidofovir, about 48% by weight mannitol, and about 33% by weight arginine. In some embodiments, the lyophilized powder contains about 13% by weight brincidofovir, about 65% by weight mannitol, and about 22% by weight arginine.

In some embodiments, the pH of the lyophilized powder is about 8.0.

In another aspect, the present disclosure provides an aqueous pharmaceutical composition, comprising: brincidofovir; a bulking agent; a buffer; and a sugar alcohol solution, an aqueous sugar solution, Ringer's solution or an aqueous salt (e.g., sodium chloride) solution.

In some embodiments, the aqueous pharmaceutical composition comprises: brincidofovir; mannitol; L-arginine; and dextrose.

In some embodiments, the aqueous pharmaceutical composition comprises: brincidofovir; mannitol; L-arginine; and dextrose; wherein the pH of the composition is about 8.0.

In some embodiments, the aqueous sugar solution is a solution comprising about 5% dextrose by weight. In some embodiments, the aqueous salt solution is an aqueous sodium chloride solution. In some embodiments, the concentration of the sodium chloride solution is 0.9% by weight. In some embodiments, the aqueous pharmaceutical composition further comprises additional water.

In some embodiments, the additional water is added (e.g. to adjust tonicity, concentration, or pH of the formulation).

In some embodiments, the aqueous pharmaceutical composition comprises: brincidofovir at a concentration of about 1.0 mg/mL; mannitol at a concentration of about 2.5-5 mg/mL; and L-arginine at a concentration of about 1.74 mg/mL; and dextrose at a concentration of about 50 mg/mL. In some embodiments, the pH of the composition is about 8.0, about 7.5, about 7.0, about 6.5, about 6.0, or below about 6.0.

In some embodiments, the aqueous pharmaceutical composition comprises: brincidofovir at a concentration of about 1.78 mM; mannitol at a concentration of about 13.75-27.5 mM; L-arginine at a concentration of about 10 mM; and dextrose at a concentration of about 287 mM. In some embodiments, the pH of the composition is about 8.0, about 7.5, about 7.0, about 6.5, about 6.0, or below about 6.0.

In some embodiments, the aqueous pharmaceutical composition comprises: brincidofovir at a concentration of about 0.5 mg/mL; mannitol at a concentration of about 1.25-2.5 mg/mL; and L-arginine at a concentration of about 0.87 mg/mL; and dextrose at a concentration of about 50 mg/mL. In some embodiments, the pH of the composition is about 8.0, about 7.5, about 7.0, about 6.5, about 6.0, or below about 6.0.

In some embodiments, the aqueous pharmaceutical composition comprises: brincidofovir at a concentration of about 0.89 mM; mannitol at a concentration of about 6.85-13.7 mM; L-arginine at a concentration of about 5 mM; and dextrose at a concentration of about 287 mM. In some embodiments, the pH of the composition is about 8.0, about 7.5, about 7.0, about 6.5, about 6.0, or below about 6.0.

In some embodiments, the aqueous pharmaceutical composition comprises: brincidofovir at a concentration of about 1.0 mg/mL; mannitol at a concentration of about 2.5-5 mg/mL; and L-arginine at a concentration of about 1.74 mg/mL; and dextrose at a concentration of about 50 mg/mL; wherein the pH of the composition is about 8.0.

In some embodiments, the aqueous pharmaceutical composition comprises: brincidofovir at a concentration of about 1.78 mM; mannitol at a concentration of about 13.75-27.5 mM; L-arginine at a concentration of about 10 mM; and dextrose at a concentration of about 287 mM; wherein the pH of the composition is about 8.0.

In some embodiments, the aqueous pharmaceutical composition comprises: brincidofovir at a concentration of about 0.5 mg/mL; mannitol at a concentration of about 1.25-2.5 mg/mL; and L-arginine at a concentration of about 0.87 mg/mL; and dextrose at a concentration of about 50 mg/mL; wherein the pH of the composition is about 8.0.

In some embodiments, the aqueous pharmaceutical composition comprises: brincidofovir at a concentration of about 0.89 mM; mannitol at a concentration of about 6.85-13.7 mM; L-arginine at a concentration of about 5 mM; and dextrose at a concentration of about 287 mM; wherein the pH of the composition is about 8.0.

In some embodiments, the volume of the aqueous sugar solution, aqueous sugar alcohol solution, Ringer's solution, or aqueous salt solution used to dissolve a lyophilized formulation of brincidofovir is about 100 or 200 mL. In other words, in some embodiments, a lyophilized powder comprising brincidofovir is dissolved in about 100 mL or about 200 mL of aqueous sugar solution, aqueous sugar alcohol solution, Ringer's solution, aqueous salt solution, or water. In some embodiments, the lyophilized powder is dissolved in about 100 mL, about 110 mL, about 120 mL, about 130 mL, about 140 mL, about 150 mL, about 160 mL, about 170 mL, about 180 mL, about 190 mL, or about 200 mL. For example, in some embodiments, a lyophilized powder of the disclosure can be dissolved in about 100 mL of a 5% dextrose solution in water. In some embodiments, a lyophilized powder of the disclosure can be dissolved in about 200 mL of a 5% dextrose solution in water.

In some embodiments, the aqueous pharmaceutical composition comprises: about 100 mg brincidofovir; about 250-500 mg mannitol; about 174 mg arginine; about 5 g dextrose; and about 100 mL water. In some embodiments, the pH of the composition is about 8.0, about 7.5, about 7.0, about 6.5, about 6.0, or below about 6.0.

In some embodiments, the aqueous pharmaceutical composition comprises: about 200 mg brincidofovir; about 500-1000 mg mannitol; about 348 mg arginine; about 10 g dextrose; and about 200 mL water. In some embodiments, the pH of the composition is about 8.0, about 7.5, about 7.0, about 6.5, about 6.0, or below about 6.0.

In some embodiments, the aqueous pharmaceutical composition comprises: about 50 mg brincidofovir; about 125-250 mg mannitol; about 87 mg arginine; about 5 g dextrose; and about 100 mL water. In some embodiments, the pH of the composition is about 8.0, about 7.5, about 7.0, about 6.5, about 6.0, or below about 6.0.

In some embodiments, the aqueous pharmaceutical composition comprises: about 100 mg brincidofovir; about 250-500 mg mannitol; about 174 mg arginine; about 10 g dextrose; and about 200 mL water. In some embodiments, the pH of the composition is about 8.0, about 7.5, about 7.0, about 6.5, about 6.0, or below about 6.0.

In some embodiments, the aqueous pharmaceutical composition comprises: about 100 mg brincidofovir; about 250-500 mg mannitol; about 174 mg arginine; about 5 g dextrose; and about 100 mL water; wherein the pH of the composition is about 8.0.

In some embodiments, the aqueous pharmaceutical composition comprises: about 200 mg brincidofovir; about 500-1000 mg mannitol; about 348 mg arginine; about 10 g dextrose; and about 200 mL water; wherein the pH of the composition is about 8.0.

In some embodiments, the aqueous pharmaceutical composition comprises: about 50 mg brincidofovir; about 125-250 mg mannitol; about 87 mg arginine; about 5 g dextrose; and about 100 mL water; wherein the pH of the composition is about 8.0.

In some embodiments, the aqueous pharmaceutical composition comprises: about 100 mg brincidofovir; about 250-500 mg mannitol; about 174 mg arginine; about 10 g dextrose; and about 200 mL water; wherein the pH of the composition is about 8.0.

In some embodiments, one or more of the brincidofovir, the bulking agent, and the buffer have been lyophilized before incorporation into the aqueous pharmaceutical composition described herein.

In some embodiments, the aqueous pharmaceutical composition is suitable for intravenous administration. In some embodiments, the aqueous pharmaceutical composition is sterile.

In another aspect, the present disclosure provides a sterile, aqueous pharmaceutical composition for intravenous administration, comprising: brincidofovir; a bulking agent; a buffer; and dextrose.

In another aspect, the present disclosure provides a sterile, aqueous pharmaceutical composition for intravenous administration, comprising: brincidofovir; a bulking agent; a buffer; and dextrose; wherein the pH of the composition is about 8.0.

In another aspect, the present disclosure provides an aqueous pharmaceutical composition for intravenous administration, comprising: brincidofovir at a concentration of between about 0.5 mg/mL and about 1.0 mg/mL; a bulking agent at a concentration of between about 2.5 mg/mL and about 5 mg/mL; a buffer at a concentration of between about 0.87 mg/mL and about 1.74 mg/mL; and dextrose at a concentration of about 50 mg/mL. In some embodiments, the pH of the composition is about 8.0, about 7.5, about 7.0, about 6.5, about 6.0, or below about 6.0.

In another aspect, the present disclosure provides an aqueous pharmaceutical composition for intravenous administration, comprising: brincidofovir at a concentration of between about 0.5 mg/mL and about 1.0 mg/mL; a bulking agent at a concentration of between about 2.5 mg/mL and about 5 mg/mL; a buffer at a concentration of between about 0.87 mg/mL and about 1.74 mg/mL; and dextrose at a concentration of about 50 mg/mL; wherein the pH of the composition is about 8.0.

In another aspect, the present disclosure provides a method of treating a subject with a viral infection, the method comprising: administering to the subject a pharmaceutical composition or pharmaceutical formulation as set forth herein.

In another aspect, the present disclosure provides a method of treating a subject with a viral infection, the method comprising: administering to the subject an intravenous pharmaceutical composition comprising brincidofovir; a bulking agent; a buffer; and dextrose In another aspect, the present disclosure provides a method of treating a subject with a viral infection, the method comprising: administering to the subject an intravenous pharmaceutical composition comprising brincidofovir; a bulking agent; a buffer; and dextrose; wherein the pH of the composition is about 8.0.

In another aspect, the present disclosure provides a method of treating a subject with a viral infection, the method comprising: administering to the subject an intravenous pharmaceutical composition comprising brincidofovir at a concentration of between about 0.5 mg/mL and about 1.0 mg/mL; a bulking agent at a concentration of between about 2.5 mg/mL and about 5 mg/mL; a buffer at a concentration of between about 0.87 mg/mL and about 1.74 mg/mL; and dextrose at a concentration of about 50 mg/mL %. In some embodiments, the pH of the composition is about 8.0, about 7.5, about 7.0, about 6.5, about 6.0, or below about 6.0.

In another aspect, the present disclosure provides a method of treating a subject with a viral infection, the method comprising: administering to the subject an intravenous pharmaceutical composition comprising brincidofovir at a concentration of between about 0.5 mg/mL and about 1.0 mg/mL; a bulking agent at a concentration of between about 2.5 mg/mL and about 5 mg/mL; a buffer at a concentration of between about 0.87 mg/mL and about 1.74 mg/mL; and dextrose at a concentration of about 50 mg/mL %; wherein the pH of the composition is about 8.0.

In another aspect, the present disclosure provides an aqueous pharmaceutical formulation or composition for treatment of a viral infection, prepared by a process comprising the steps of: dissolving, in any order, an amount of brincidofovir, a bulking agent, and a buffer in water to form a first solution; lyophilizing the first solution to form a lyophilized powder; and dissolving the lyophilized powder in an aqueous sugar alcohol solution, an aqueous sugar solution, Ringer's solution or a sodium chloride solution to form the aqueous pharmaceutical formulation or composition.

In another aspect, the present disclosure provides the use of an aqueous pharmaceutical composition, comprising: brincidofovir; a bulking agent; a buffer; and an aqueous sugar alcohol solution, an aqueous sugar solution, Ringer's solution or a sodium chloride solution in the manufacture of a medicament for the treatment of a viral infection.

In another aspect, the present disclosure provides the use of an aqueous pharmaceutical composition, comprising: brincidofovir; a bulking agent; a buffer; and an aqueous sugar alcohol solution, an aqueous sugar solution, Ringer's solution or a sodium chloride solution in the treatment of a viral infection.

In some embodiments of any of the above-aspects, the viral infection to be treated is, polyomavirus, papillomavirus, herpes virus, adenovirus, Epstein-Barr virus, cytomegalovirus, Hepatitis B virus, Hepatitis C virus, varicella zoster virus, adenovirus, poxvirus, or a combination thereof.

In some embodiments, administration to the subject of the pharmaceutical compositions set forth herein does not result in hemolysis. In some embodiments, administration to the subject of the pharmaceutical compositions set forth herein does not result in gastrointestinal toxicity.

In some embodiments, the pH of any of the aqueous formulations or compositions for intravenous administration can have a pH below about 8.0 (e.g., about 8.0, about 7.5, about 7.0, about 6.5, about 6.0, about 5.5, about 5.0, about 4.5, about 4.0, or below about 4.0). In some embodiments, the pH can be higher than 8.0 (e.g., about 8.5, about 9.0, about 9.5, about 10.0, or above about 10.0).

Without wishing to be bound by theory, administration of oral brincidofovir can result in significantly higher exposure in the intestine compared with other organs; this higher exposure can lead to GI toxicity after oral administration of brincidofovir. As set forth herein, IV administration of brincidofovir can prevent over-exposure of the gut (e.g., intestine) to brincidofovir (e.g., in comparison to oral administration of BCV), with improvement in gastrointestinal (GI) tolerability and reduction in GI toxicity. In some embodiments, IV administration of brincidofovir can deliver comparable (e.g., compared with oral administration) drug exposure to blood plasma and organs such as the liver, kidney, and small intestine, even at lower doses than necessary using oral administration.

In some embodiments, IV brincidofovir can deliver the drug to organs (e.g., the brain) that can be difficult to reach by other administrative routes (e.g., oral dosage). In some embodiments, higher CNS exposure with IV brincidofovir can treat viral infections in the brain (e.g., herpes encephalitis in newborns and adults; HHV-6 encephalitis; JC virus/PML in transplant recipients or patients with multiple sclerosis).

Intravenous brincidofovir can avoid GI side effects that can be observed with oral administration of BCV and provide opportunities for treatment of DNA viruses (e.g., in patients who experience GI-side effects associated with oral administration of BCV). For example, like oral administration of brincidofovir, IV administration of brincidofovir can be used as a broad spectrum antiviral agent with limited toxicity (e.g., substantially no heme toxicity, and no kidney toxicity), and can be effective at treating, e.g., adenovirus and smallpox. Additionally, IV administration of brincidofovir can be used to treat and prevent, for example, cytomegalovirus, adenovirus, and BK or JC virus. These diseases can be treated, for instance, in hematopoietic cell transplant patients.

Additional features and advantages will be apparent to one of skill in the art and are set forth in the Detailed Description of the Invention, below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The above and further features will be more clearly appreciated from the following detailed description when taken in conjunction with the accompanying drawings.

Figure 1:
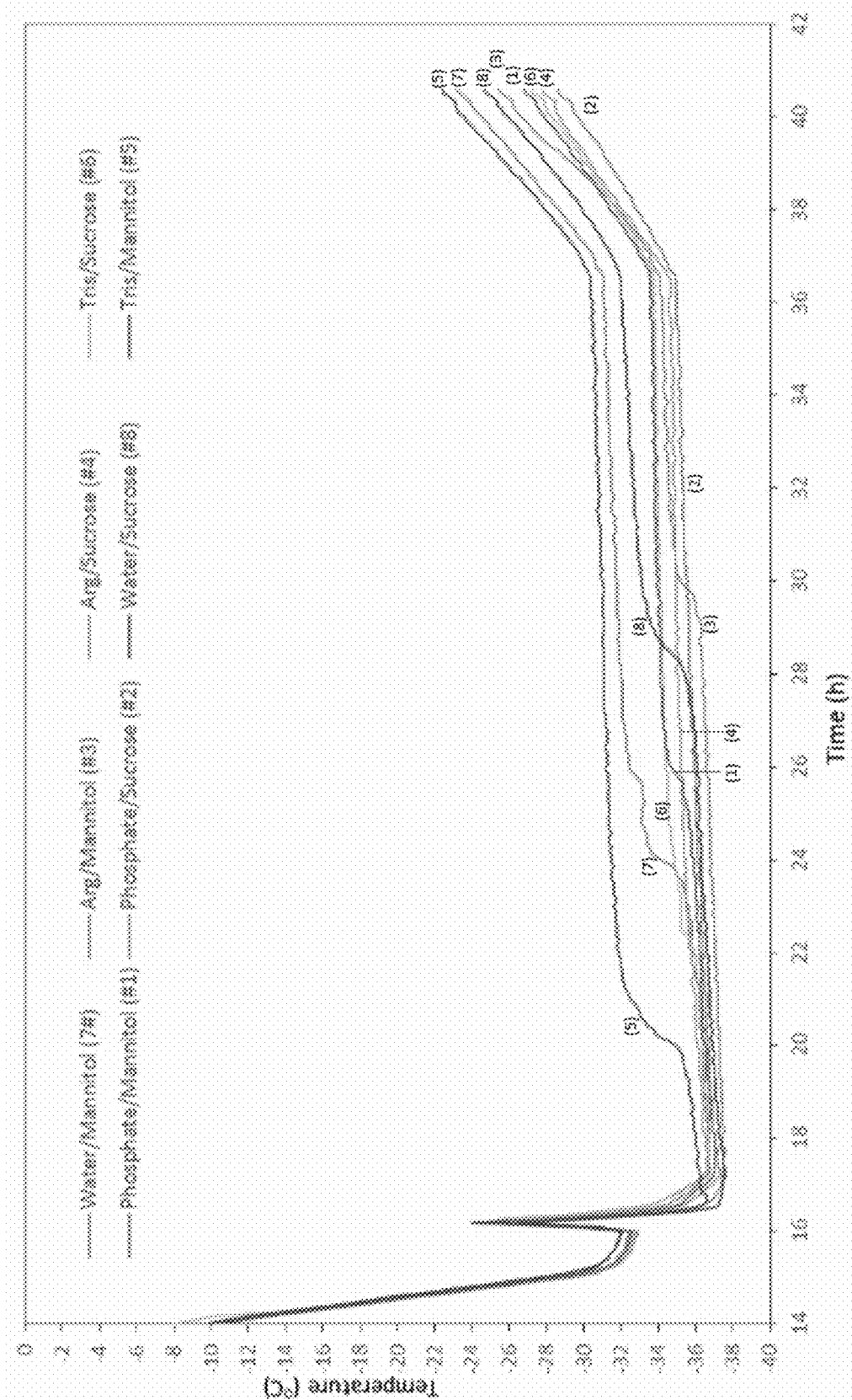

FIG. 1 is a graph showing shows product temperature profiles as recorded by product probes as set forth in Example 4.

Figure 2:
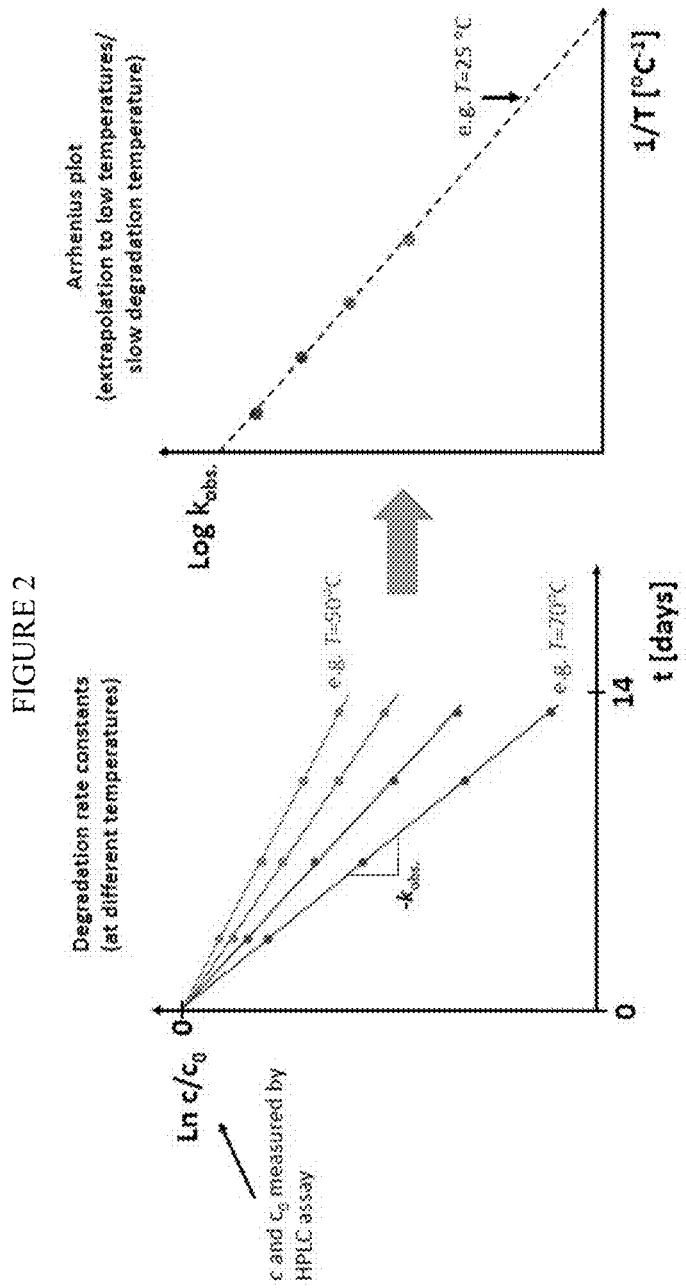

FIG. 2 is a pair of graphs illustrating the evaluation of shelf life in an accelerated stability study.

Figure 3:
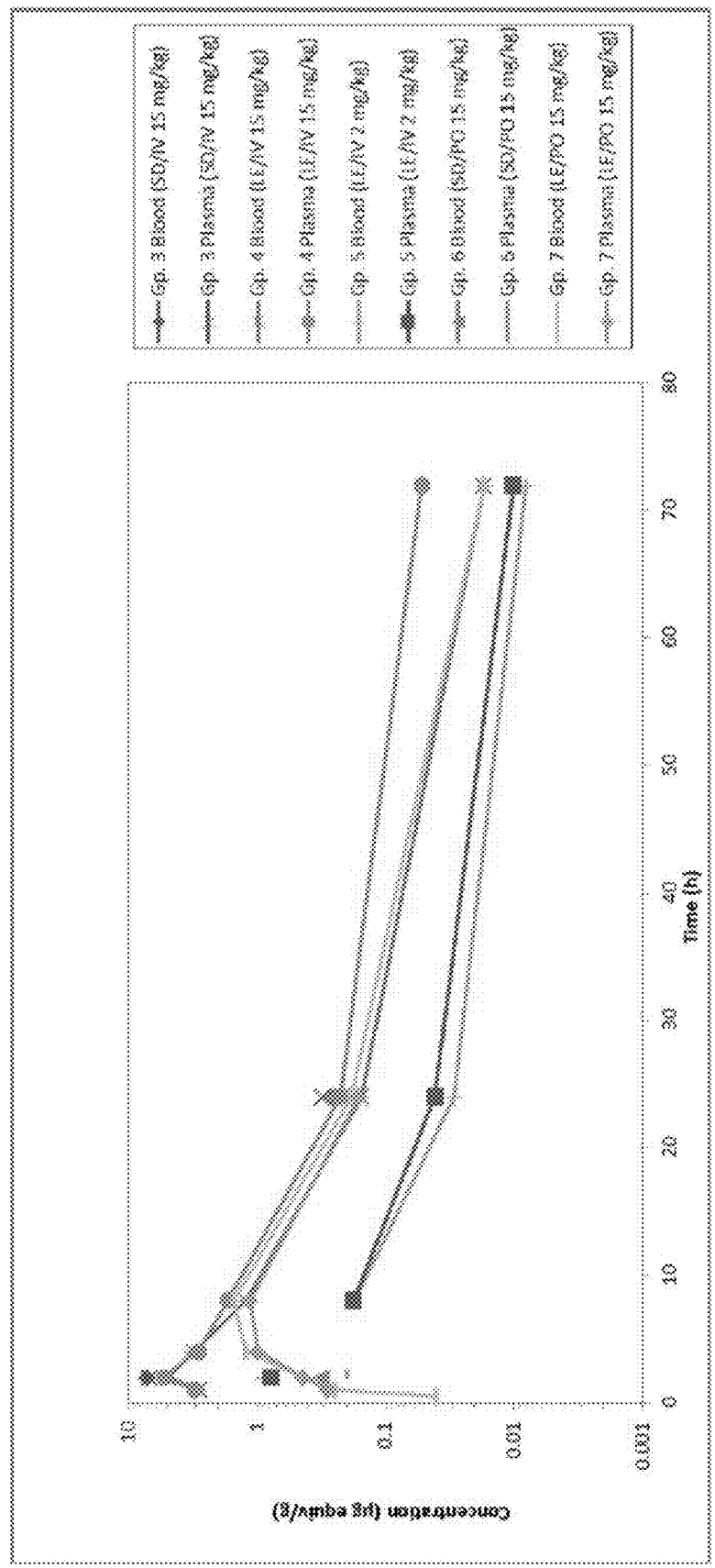

FIG. 3 is a graph showing the time course of blood and plasma concentrations of radioactivity for male Sprague Dawley (SD) and Long-Evans (LE) rats following a single 2-h intravenous infusion (IV) of [$^{14}$C]brincidofovir at a target dose of 15 mg/kg or 2 mg/kg and after a single oral (PO) dose at 15 mg/kg as set forth in Example 9.

Figure 4:
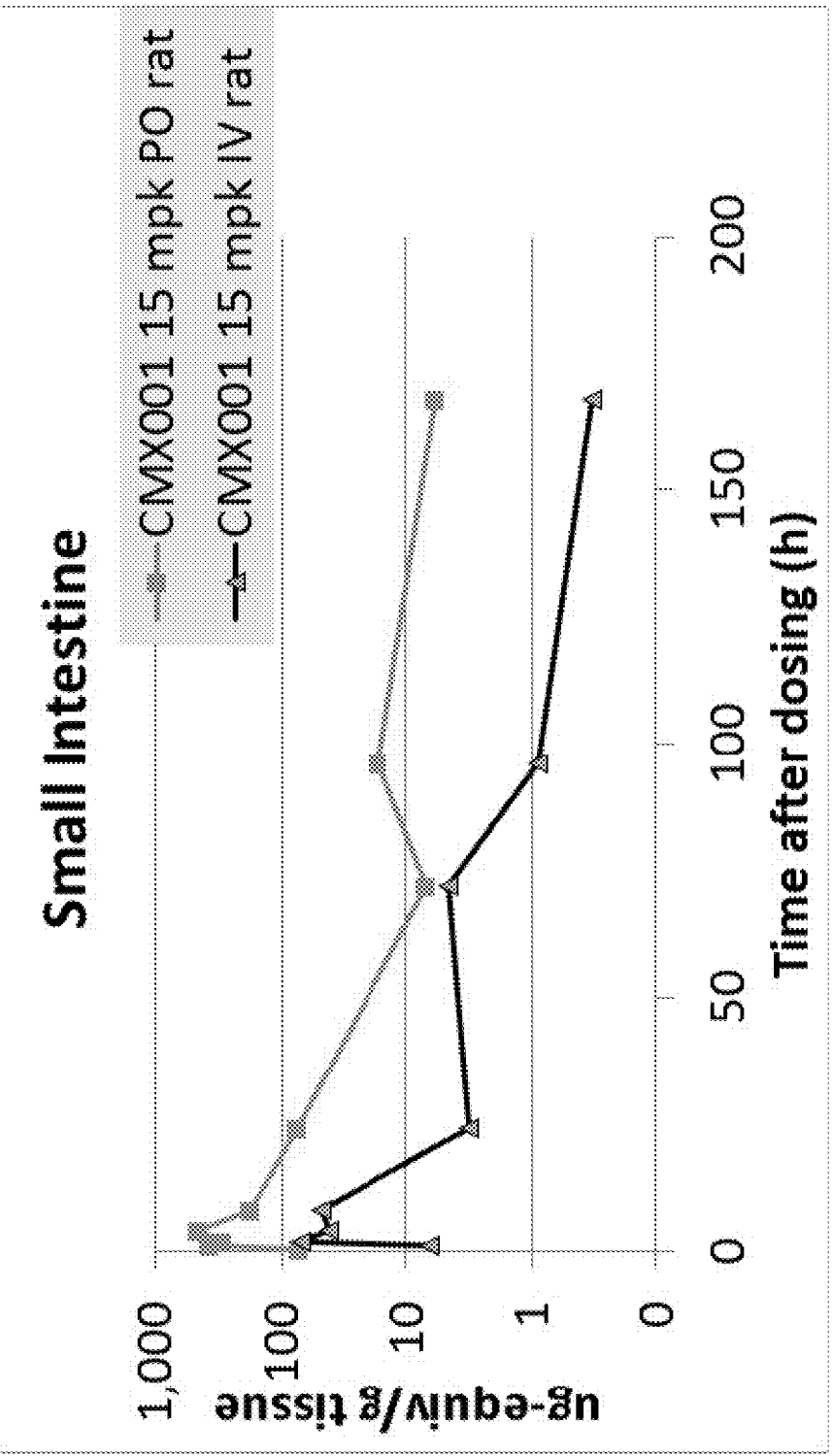

FIG. 4 is a plot of tissue concentration versus time for the small intestine for [$^{14}$C]brincidofovir dosed intravenously and orally as set forth in Example 9.

Figure 5:
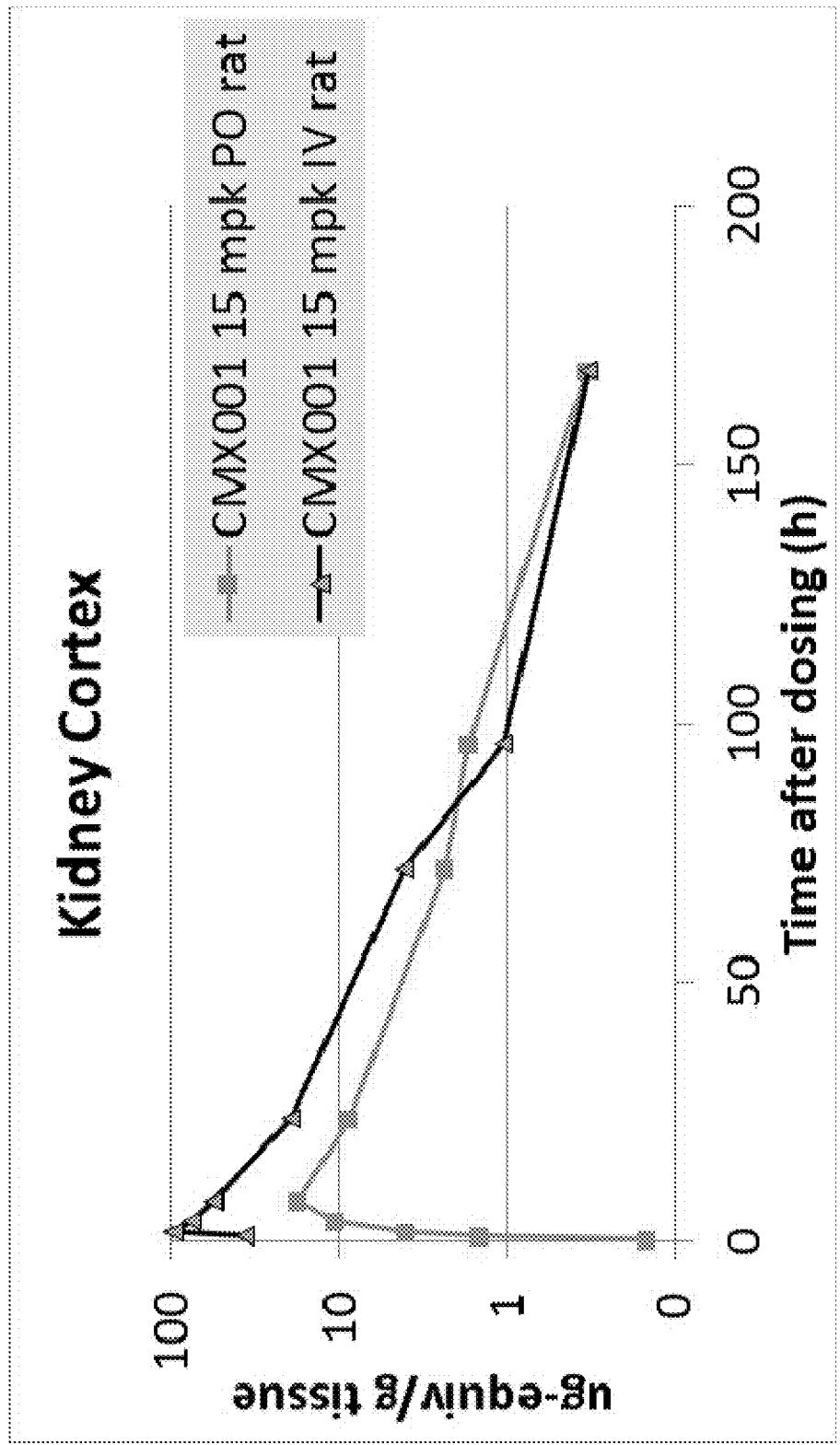

FIG. 5 is a plot of tissue concentration versus time for the kidney cortex for [$^{14}$C]brincidofovir dosed intravenously and orally as set forth in Example 9.

Figure 6:
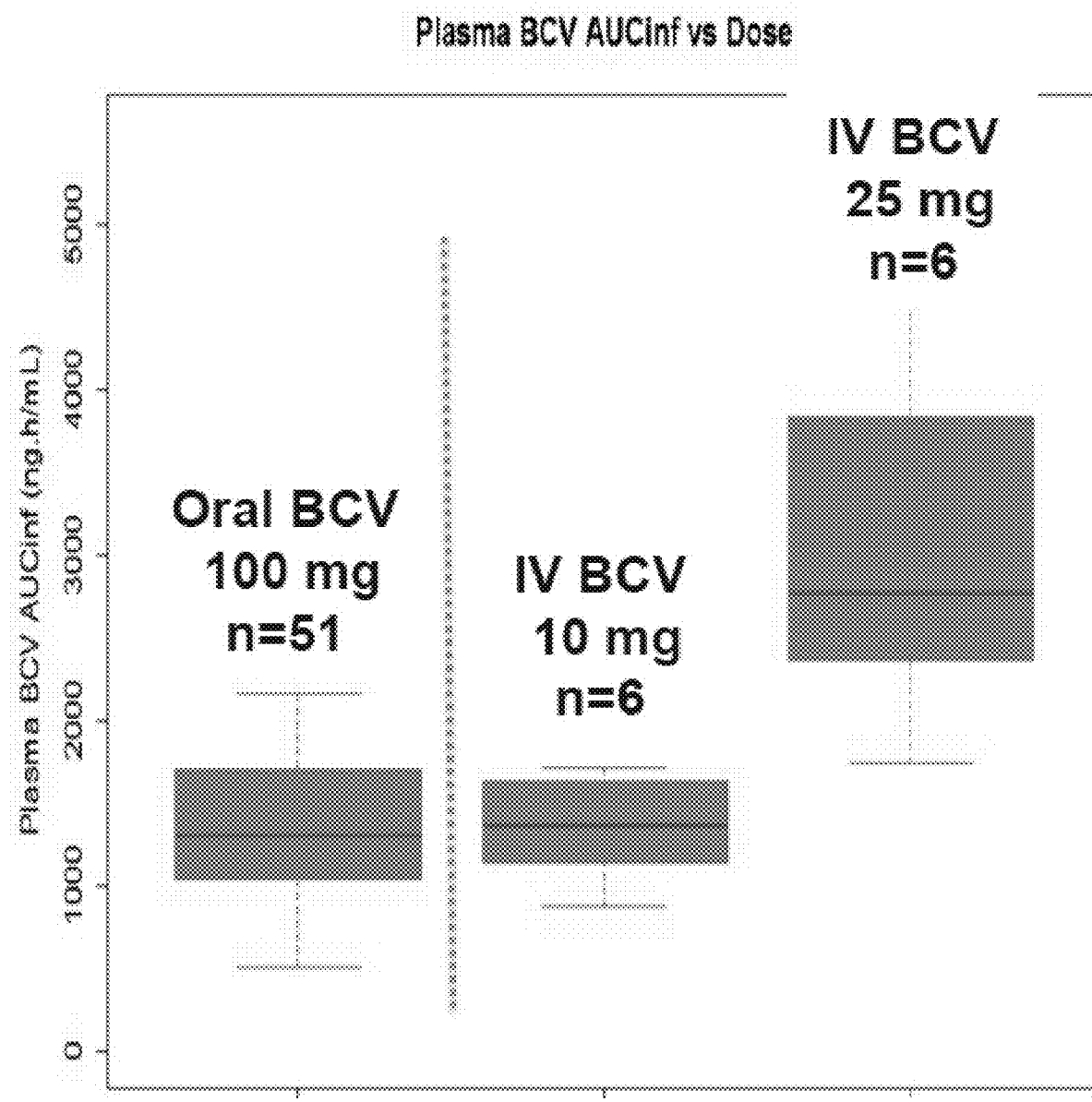

FIG. 6 is a plot of the plasma concentration of brincidofovir after doses of 100 mg orally, 10 mg IV, and 25 mg IV.

Figure 7A:
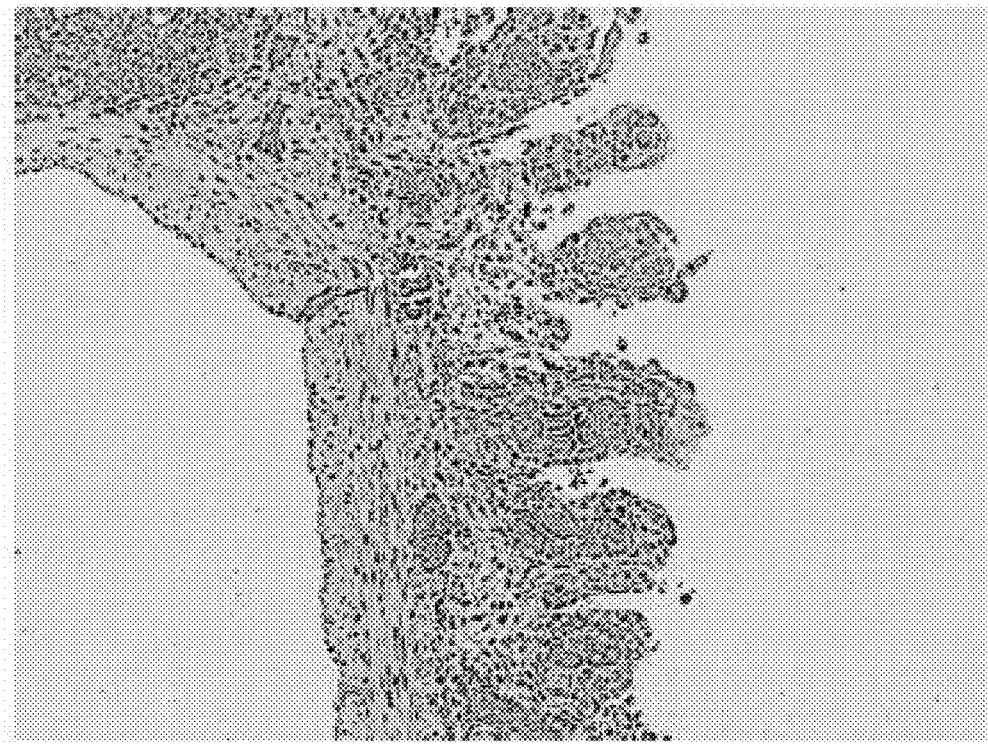

FIG. 7A is a histogram of rat intestine after oral administration of brincidofovir as set forth in Example 10.

Figure 7B:
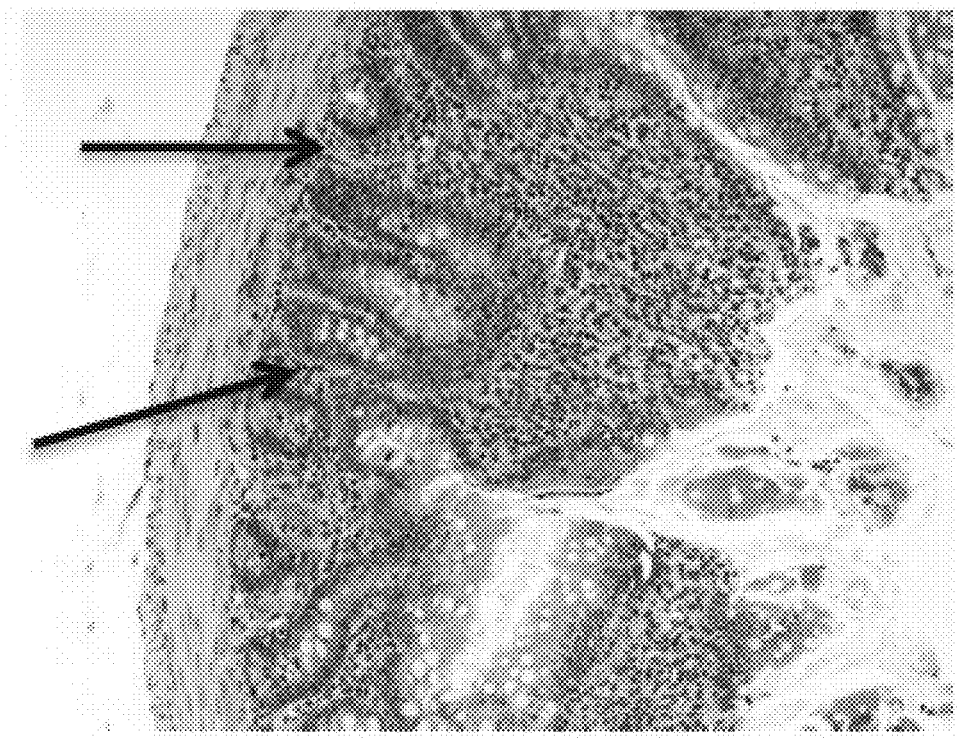

FIG. 7B is a histogram of rat intestine after IV administration of brincidofovir as set forth in Example 10.

Figure 8:
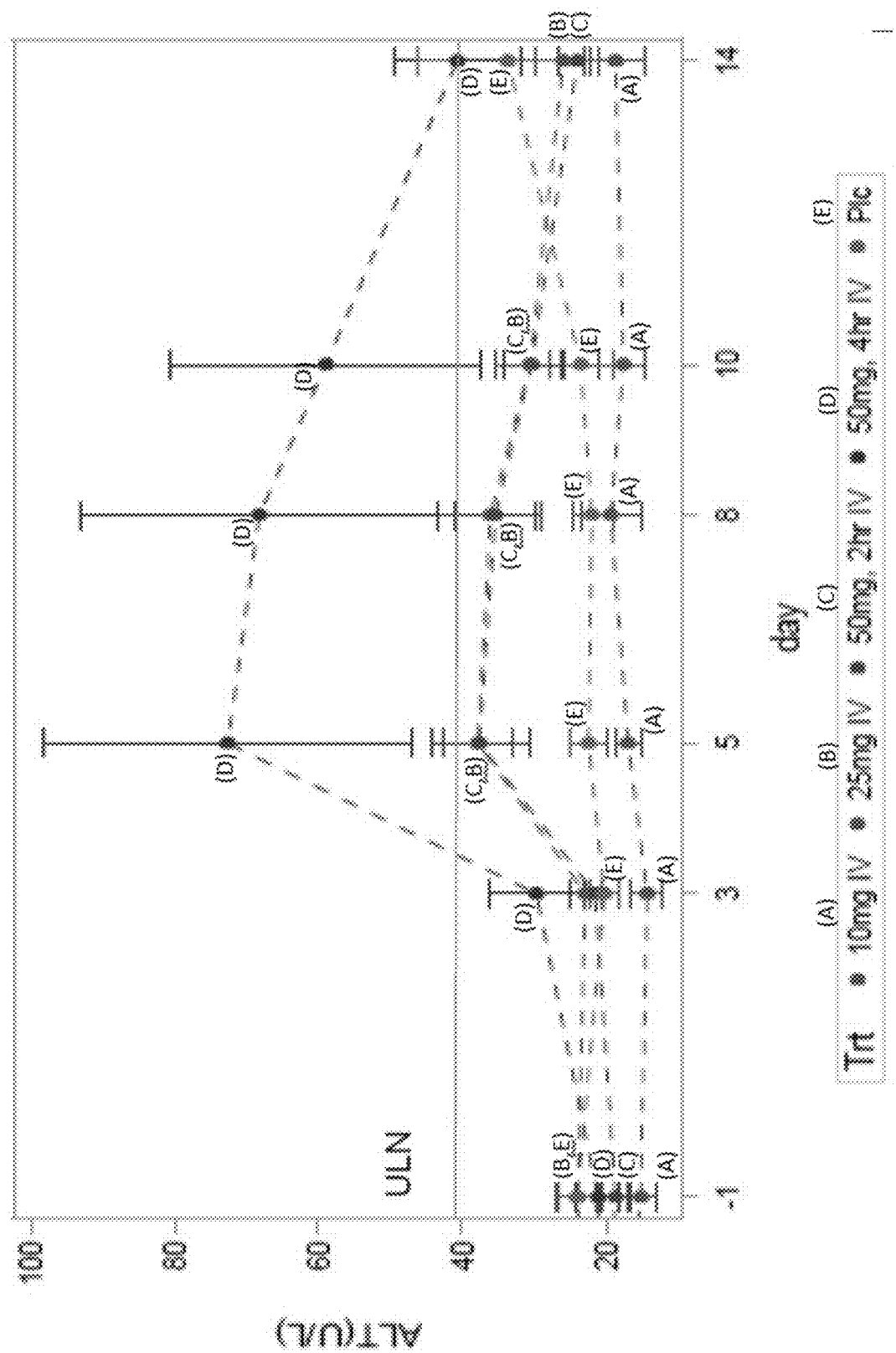

FIG. 8 is a graph showing the mean (+/−SE) alanine aminotransferase (ALT) levels observed in a IV BCV single ascending dose (SAD) trial.

Figure 9:
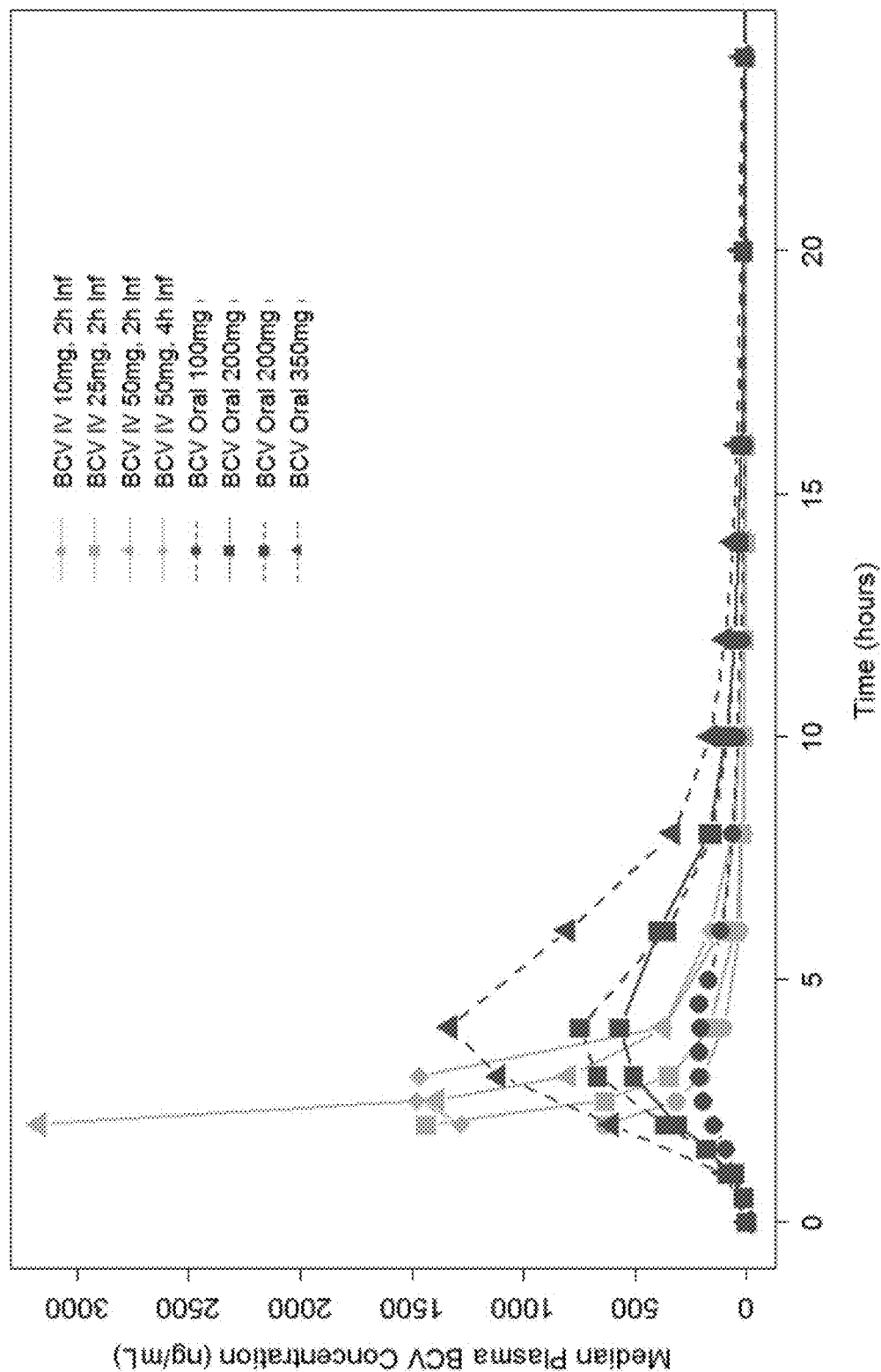

FIG. 9 is a graph illustrating mean plasma brincidofovir concentration as a function of time for subjects in cohorts 1-4, and mean plasma BCV concentration as a function of time for subjects administered BCV orally.

Figure 10:
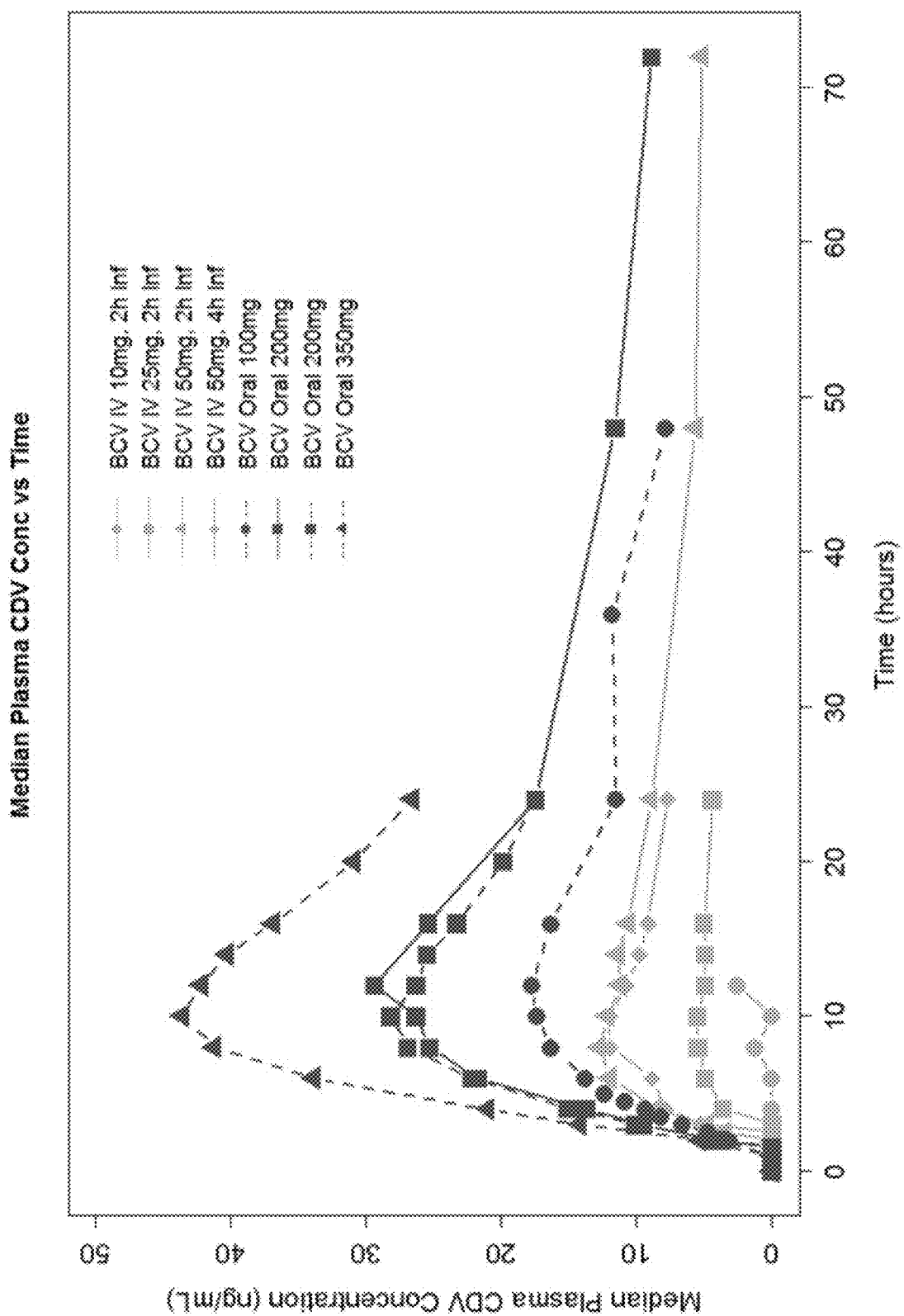

FIG. 10 is a graph illustrating median plasma cidofovir concentration as a function of time following IV and Oral BCV Doses.

DETAILED DESCRIPTION OF THE DISCLOSURE

The present disclosure is related to pharmaceutical compositions (e.g., lyophilized or aqueous compositions) comprising brincidofovir and methods of use thereof. The disclosure also relates to pharmaceutical formulations comprising a reconstituted lyophilized pharmaceutical composition described herein. The compositions and formulations can be for intravenous administration. In some embodiments, IV administration of the compositions or formulations of the present disclosure do not result in hemolysis. The formulations can also be used in cases where oral administration of drug is not possible or substantially impossible, for example due to underlying conditions or because of inadequate oral absorption.

The present disclosure relates to at least three types of compositions of brincidofovir. First, the present disclosure relates to bulk formulations of brincidofovir (e.g., liquid formulations of the disclosure or pre-lyophilization formulations of the disclosure) that can be lyophilized prior to storage. The lyophilized formulations (e.g., powders) can be stored for extended periods of time. Additionally, the lyophilized formulations can be reconstituted (e.g. by dissolution in a sugar solution) prior to (e.g., immediately prior to) administration to a patient, e.g., a patient in need of treatment. Accordingly, the present disclosure teaches pre-lyophilization formulations of brincidofovir, lyophilized powders, and re-constituted formulations (e.g., pharmaceutical formulations) for administration.

Formulations of the Disclosure

Pre-Lyophilization Formulations

In some embodiments, brincidofovir is dissolved in water prior to lyophilization (e.g., freeze-drying). The brincidofovir can be co-dissolved with, for instance, a bulking agent and a buffer. The dissolution of the components may occur separately or concurrently, and may occur in any order.

In some embodiments, pre-lyophilization compositions of the disclosure comprise a buffer. In some embodiments, pre-lyophilization compositions of the disclosure comprise a bulking agent. In some embodiments, pre-lyophilization formulations of the disclosure comprise a buffer and a bulking agent. In some embodiments, the concentration of brincidofovir is 10 mg/mL. In some embodiments, the pH of the solution is adjusted with HCl and/or NaOH.

In some embodiments, the buffer is selected from sodium phosphate, arginine, tromethamine and pH-adjusted water. In some embodiments, the buffer is sodium phosphate, L-arginine, or tromethamine. In some embodiments, the buffer is Na-phosphate. In some embodiments, the buffer is arginine. In some embodiments, the buffer is L-arginine. In some embodiments, the buffer is tromethamine. In some embodiments, the buffer is pH-adjusted water. In some embodiments, the buffer is present at a concentration of about 100 mM to about 200 mM. In some embodiments, the buffer is present in an amount of about 25 mM, about 50 mM, about 75 mM, about 100 mM, about 125 mM, about 150 mM, about 175 mM, or about 200 mM.

In some embodiments, the bulking agent is mannitol or sucrose. In some embodiments, the buffer is sodium phosphate, arginine, or tromethamine. In some embodiments, the bulking agent is present at a concentration of about 5-9% (w/v). In some embodiments, the bulking agent is present at a concentration of about 2.5-9% (w/v). In some embodiments, the bulking agent is present at a concentration of about 2.5% (w/v), about 5% (w/v), or about 9% (w/v).

In some embodiments, the compositions of the disclosure comprise brincidofovir at a concentration of about 10.0 mg/mL, about 6.4 mg/mL, or about 3.2 mg/mL.

In some embodiments, the compositions of the disclosure comprise brincidofovir at a concentration of about 10.0 mg/mL, mannitol at a concentration of about 25-50 mg/mL, L-arginine at a concentration of about 17.4 mg/mL and water, and have pH=8.0.

In some embodiments, the compositions of the disclosure comprise brincidofovir at a concentration of about 17.8 mM, mannitol at a concentration of about 137.5-275 mM, L-arginine at a concentration of about 100 mM and water, and have pH=8.0.

In some embodiments, any of the pre-lyophilization formulations described herein can be lyophilized to remove water (e.g., for storage).

In some embodiments, pre-lyophilization formulations can be used directly as pharmaceutical formulations (i.e., can be given directly to a patient). However, in some embodiments, these formulations are lyophilized for storage and are later reconstituted (e.g., in 5% dextrose in water) for administration to a patient.

In some embodiments liquid formulations of brincidofovir are for intravenous administration after dilution into infusion vehicles (e.g., 5% dextrose).

In some embodiments, the liquid formulations of the disclosure (i.e., pre-lyophilization formulations of the disclosure) are compatible with infusion vehicles and materials (e.g., containers) used in a clinical setting. For example, the liquid formulations of the disclosure display no significant changes in appearance, pH or recovery of brincidofovir, or introduction of impurities, upon contact with materials such as sterile filters, vials, stoppers, infusion bags, or IV systems. In some embodiments, liquid formulations of the disclosure experience no significant change in pH, loss of brincidofovir, or introduction of impurities upon filtration through a syringe filter.

Lyophilized Formulations

The pre-lyophilization formulations can be lyophilized to produce lyophilized formulations (e.g., powders) of BCV, bulking agent, and buffer. The lyophilized formulations can be stable for extended periods of time and can be reconstituted prior to administration to a patient. In some embodiments, the lyophilized formulations are sterile.

In some embodiments, lyophilization comprises freezing, annealing, and drying of the lyophilized composition. In some embodiments, drying comprises a primary drying and a secondary drying. In some embodiments, freezing and annealing comprises exposing the formulation to temperatures between about 5° C. and −50° C. In some embodiments primary drying is conducted at a temperature of about 35° C. In some embodiments secondary drying is conducted at a temperature of about 20° C.

In some embodiments, freezing and/or annealing lasts for about 16 h. In some embodiments, the primary drying phase lasts for about 20 h. In further embodiments, the secondary drying takes about 22 h (e.g., 21.7 h) or about 28 h (e.g., 27.7 h).

In some embodiments, liquid formulations of the disclosure (e.g., liquid formulations comprising brincidofovir, arginine and mannitol) do not foam during the lyophilization process, in contrast to other formulations which suffered from foaming during lyophilization.

Reconstituted Pharmaceutical Compositions for IV Administration

Prior to IV administration to a patient, the lyophilized powders discussed above can be reconstituted, for example by dissolution in an aqueous solvent such as water. In some embodiments, the aqueous solvent is water containing a sugar alcohol or sugar (e.g., dextrose). In some embodiments, the aqueous solvent is 5% dextrose in water. The aqueous solvent can likewise be sterile (e.g., like the sterile lyophilized formulation) and can be suitable for administration to a patient in need thereof. In some embodiments, reconstitution of the lyophilized powders of the disclosures yields aqueous compositions of the disclosure.

As set forth below, the pharmaceutical compositions for IV administration described herein can provide therapeutically relevant blood plasma concentrations of brincidofovir using lower doses of brincidofovir than those necessary when orally administering brincidofovir. For example, IV administration of brincidofovir using formulations of the present disclosure provided blood plasma concentrations of brincidofovir in humans that had previously demonstrated anti-viral potency in cytomegalovirus prevention and adenovirus treatment. The amount of BCV used in the IV formulations (e.g., about 10 mg or about 25 mg) was about one tenth of the amount of BCV required to achieve similar blood-plasma concentrations using oral dosing.

Accordingly, in some embodiments, the present disclosure teaches the treatment of a viral infection comprising administering a subject in need thereof an IV formulation of brincidofovir as set forth herein. In some embodiments, the IV dose is less than the orally administered dose of brincidofovir (e.g., about 50% of an oral dose, about 40% of an oral dose, about 30% of an oral dose, about 20% of an oral dose, or about 10% of an oral dose) necessary to achieve a similar result (e.g., blood plasma concentration, anti-viral activity, etc.). Thus, in some embodiments, it is possible to use a smaller quantity of IV brincidofovir than used for oral administration to achieve a similar (e.g., substantially the same) clinical outcome. Additionally, because IV administration results in lower quantities of brincidofovir in the intestine, in some embodiments the present disclosure also provides for the treatment of viral infections without resulting in gastrointestinal toxicity. The present disclosure teaches the treatment of patients who cannot be administered drugs orally (e.g., patients with sensitive intestinal tracts or those unable to swallow oral medications).

In some embodiments, the compositions of the disclosure comprise brincidofovir at a concentration of about 1.0 mg/mL, mannitol at a concentration of about 2.5-5 mg/mL, L-arginine at a concentration of about 1.74 mg/mL and dextrose at a concentration of about 50 mg/mL, and have pH=8.0.

In some embodiments, the compositions of the disclosure comprise brincidofovir at a concentration of about 17.8 mM, mannitol at a concentration of about 13.75-27.5 mM, L-arginine at a concentration of about 10 mM and dextrose at a concentration of about 287 mM, and have pH=8.0.

In some embodiments, the compositions of the disclosure comprise brincidofovir at a concentration of about 0.5 mg/mL, mannitol at a concentration of about 1.25-2.5 mg/mL, L-arginine at a concentration of about 0.87 mg/mL and dextrose at a concentration of about 50 mg/mL, and have pH=8.0.

In some embodiments, the compositions of the disclosure comprise brincidofovir at a concentration of about 0.89 mM, mannitol at a concentration of about 6.85-13.7 mM, L-arginine at a concentration of about 5 mM and dextrose at a concentration of about 287 mM, and have pH=8.0.

In some embodiments, the pharmaceutical compositions of the disclosure further comprises a sugar. In some embodiments, the sugar is in an aqueous sugar solution. In some embodiments, the aqueous sugar solution is a 5% dextrose solution. In some embodiments, the volume of the aqueous sugar solution is about 100 or 200 mL.

In some embodiments, the compositions of the disclosure comprise brincidofovir in an amount of about 100 mg, mannitol in an amount between about 250 mg and about 500 mg, arginine in an amount of about 174 mg, dextrose in an amount of about 5 g, and water in an amount of about 100 mL, and have pH=8.0.

In some embodiments, the compositions of the disclosure comprise brincidofovir in an amount of about 200 mg, mannitol in an amount between about 500 mg and about 1000 mg, arginine in an amount of about 348 mg, dextrose in an amount of about 10 g, and water in an amount of about 100 mL, and have pH=8.0.

In some embodiments, the compositions of the disclosure comprise brincidofovir in an amount of about 50 mg, mannitol in an amount between about 125 mg and about 250 mg, arginine in an amount of about 87 mg, dextrose in an amount of about 5 g, and water in an amount of about 100 mL, and have pH=8.0.

In some embodiments, the compositions of the disclosure comprise brincidofovir in an amount of about 100 mg, mannitol in an amount between about 250 mg and about 500 mg, arginine in an amount of about 174 mg, dextrose in an amount of about 10 g, and water in an amount of about 200 mL, and have pH=8.0.

In some embodiments, compositions of the disclosure comprise brincidofovir at a concentration of about 0.1-1.0 mg/mL within 100-200 mL of a 5% dextrose solution. In some embodiments, the compositions comprise: 10 mg brincidofovir, 100 mM arginine, and 5% mannitol (w/v), and have pH=8.0.

In some embodiments, lyophilized compositions of the disclosure are for IV administration by infusion after dilution.

In some embodiments, the buffer is present at about 200 mM. In some embodiments, the brincidofovir has been previously lyophilized. In some embodiments, the compositions of the disclosure are lyophilized to remove the water. In some embodiments, the brincidofovir, the bulking agent, and the buffer have previously been lyophilized.

In some embodiments, the present disclosure provides an aqueous pharmaceutical composition for intravenous administration comprising brincidofovir, mannitol, and arginine. In some embodiments, the pH of the formulation is about 8.0. In some embodiments, the pH of the composition is adjusted using HCl and/or NaOH.

In some embodiments, compositions of the disclosure are suitable for reconstitution with deionized water. In some embodiments, compositions of the disclosure do not foam upon reconstitution. In some embodiments, compositions of the disclosure foam upon reconstitution and foam dissipates in less than 20 minutes, less than 10 minutes, less than 5 minutes, or less than 1 minute. In some embodiments, compositions comprising 100 mM or more of arginine display faster dissipation of foam or bubbles upon reconstitution than compositions comprising 50 mM or less of arginine.

In some embodiments, lyophilized compositions of the disclosure do not experience changes in appearance, pH or brincidofovir recovery upon dilution with an infusion vehicle (e.g., 5% dextrose), e.g., prior to IV administration.

In some embodiments, reconstitution of lyophilized compositions of the disclosure does not result in a loss of brincidofovir. In some embodiments, lyophilized formulations of the disclosure are clear and colorless after reconstitution.

Excipients and Pharmaceutically Acceptable Carriers

In addition to brincidofovir, a buffer and a bulking agent, the pharmaceutical compositions of the disclosure can contain additional pharmaceutically acceptable carriers. Such pharmaceutically acceptable carriers may include any and all solvents, diluents, or other liquid vehicle, dispersion or suspension aids, surface active agents, isotonic agents, thickening or emulsifying agents, preservatives, solid binders, lubricants and the like, as suited to the particular dosage form desired. Remington's Pharmaceutical Sciences, Sixteenth Edition, E. W. Martin (Mack Publishing Co., Easton, Pa., 1980) discloses various carriers used in formulating pharmaceutical compositions and known techniques for the preparation thereof. Except insofar as any conventional carrier medium is incompatible with the active compound (i.e., brincidofovir) such as by producing any undesirable biological effect or otherwise interacting in a deleterious manner with any other component(s) of the pharmaceutical composition, its use is contemplated to be within the scope of this disclosure. Some examples of materials which can serve as pharmaceutically acceptable carriers include, but are not limited to, sugars such as lactose, glucose and sucrose; starches such as corn starch and potato starch; cellulose and its derivatives such as sodium carboxymethyl cellulose, ethyl cellulose and cellulose acetate; powdered tragacanth; malt; gelatine; talc; excipients such as cocoa butter and suppository waxes; oils such as peanut oil, cottonseed oil; safflower oil, sesame oil; olive oil; corn oil and soybean oil; glycols; such as propylene glycol; esters such as ethyl oleate and ethyl laurate; agar; buffering agents such as magnesium hydroxide and aluminum hydroxide; alginic acid; pyrogen free water; isotonic saline; Ringer's solution; ethyl alcohol, and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants can also be present in the composition, according to the judgment of the formulator.

Methods of Use

In some embodiments, the present disclosure provides methods of treating a subject with a viral infection, comprising administering to the subject a composition of the disclosure. In some embodiments, a composition of the disclosure is administered intravenously to the subject.

In some embodiments, formulations of the present disclosure can comprise a volume of concentrated sterile liquid solution (e.g., for dilution) and/or lyophilized powder (e.g., for reconstitution). In some embodiments, the formulations can be stored for at least 12 months (e.g., at about 25° C.). In some embodiments, the formulations can be stored upside down (e.g., for about 24 months, or for about 36 months). In some embodiments, the formulations can be stored in a refrigerator (e.g., for about 12 months). In some embodiments, the lyophilized powder is readily dissolvable (e.g., for reconstitution) in a liquid. In some embodiments, the liquid volume can be small (e.g., for parenteral administration). In some embodiments, the formulations demonstrate acceptable filter and tubing compatibility. In some embodiments, the formulations are compatible with normal resuscitation fluids including but not limited to D5W, NS, and D5½ NS.

Patient Population

In some embodiments, administration of a composition of the disclosure does not result in hemolysis. In some embodiments, administration of a composition of the disclosure does not result in gastrointestinal toxicity.

Accordingly, in some embodiments, the present disclosure provides for the dosing of patients with brincidofovir who may experience unwanted side effects associated with oral administration of brincidofovir (e.g., gastro-intestinal side effects such as diarrhea, pain, constipation and the like). For instance, in some embodiments, IV formulations can be used for patients with symptoms such as anemia, irritable bowel syndrome, constipation, diarrhea, bowel pain, and the like. Additionally, in some embodiments the present disclosure provides for sustained and/or repeated dosing of brincidofovir to subjects in need thereof. For instance, a patient who has undergone a stem cell transplant can be administered IV formulations of the present disclosure to prevent gastro-intestinal side effects associated with oral administration (e.g., repeated oral administration) of brincidofovir.

Viral Indications

In some embodiments, the viral infection to be treated is selected from polyomavirus (including BK, John Cunningham virus (JCV), Merkel cell virus (MCV), KI polyomavirus (KIV), WU polyomavirus (WUV), Simian virus 40 (SV 40)), papillomavirus (including human papillomavirus, cottontail rabbit papillomavirus, equine papillomavirus and bovine papillomavirus), herpes virus (e.g., herpes simplex virus), adenovirus, Epstein-Barr virus (EBV), human cytomegalovirus (HCMV), Hepatitis B virus, Hepatitis C virus, varicella zoster virus (VZV) or a combination thereof.

In some embodiments, the IV formulations can be used to prevent clinically significant cytomegalovirus infection in at-risk (e.g., CMV seropositive) adult and pediatric allogenic hematopoietic stem cell transplant recipients. In some embodiments, the present formulations can be used for treatment of adenovirus infection in adult and pediatric immunocompromised hosts. In some embodiments, the formulations can be used for hematopoietic stem cell transplant or solid organ transplant patients.

Dosage Regimens

In some embodiments, the formulations (e.g., IV formulations) of the present disclosure are administered at a dose of between about 1 mg and 1000 mg BCV. For example, the formulations can be administered at a dose of between about 10 mg and 200 mg BCV. In some embodiments, the IV formulations can be administered at about 5 mg; about 10 mg; about 15 mg; about 20 mg; about 25 mg; about 30 mg; about 35 mg; about 40 mg; about 45 mg; about 50 mg; about 55 mg; about 60 mg; about 65 mg; about 70 mg; about 75 mg; about 80 mg; about 85 mg; about 90 mg; about 95 mg; about 100 about 105 mg; about 110 mg; about 115 mg; about 120 mg; about 125 mg; about 130 mg; about 135 mg; about 140 mg; about 145 mg; about 150 mg; about 155 mg; about 160 mg; about 165 mg; about 170 mg; about 175 mg; about 180 mg; about 185 mg; about 190 mg; about 195 mg; or about 200 mg BCV.

In some embodiments, IV formulations of the present disclosure can be administered to deliver between about 5 and about 50 mg; about 10 and about 50 mg; about 10 and about 40 mg; about 10 and about 30 mg; about 5 and about 25 mg; about 10 and about 25 mg; and about 15 and about 25 mg of BCV. The formulations can be administered to a human (e.g., an adult human).

In some embodiments, the formulations are safe and well-tolerated when administered intravenously at doses of between about 10 mg and 100 mg (e.g., at about 10 mg or at about 25 mg). For example, 10 mg and 25 mg doses of brincidofovir formulations of the present disclosure can give favorable tolerability profiles without adverse events. In some embodiments, doses of about 10 mg and 25 mg of the formulations described herein do not produce gastrointestinal side effects.

In some embodiments, IV formulations taught herein can be administered multiple times per day, or can be administered as single-doses. For instance, IV formulations can be administered once a day or can be administered twice a day. In some embodiments, formulations of the disclosure are administered once a week, or twice a week. In some embodiments, formulations of the disclosure are administered every other day. In some embodiments, formulations of the disclosure are administered every other week. In some embodiments, formulations of the disclosure are administered once a month, or twice a month. One of skill in the art will be able to determine an appropriate dosage regimen for a patient.

The duration of administration (i.e., for each dose) of IV brincidofovir can vary according to the needs of an individual subject or patient in need thereof and it is within the expertise of one skilled in the art (e.g., a clinician such as a nurse or doctor) to determine the appropriate amount of time that a subject is administered brincidofovir. For instance, IV administration of brincidofovir can last about 15 minutes, about 30 minutes, about 45 minutes, about 60 minutes, about 75 minutes, about 90 minutes, about 105 minutes, or about 120 minutes.

In some embodiments, the formulations of the disclosure can be administered in combination with other therapeutic agents or treatments. For example, other therapeutic agents can be cisplatin, doxorubicin, etoposide, irinotecan, topotecan, paclitaxel, docetaxel, the epothilones, tamoxifen, 5-fluorouracil, methotrexate, temozolomide, cyclophosphamide, lonafarib, tipifarnib, 4-((5-((4-(3-chlorophenyl)-3-oxopiperazin-1-yl)methyl)-1H-imidazol-1-yl)methyl)benzonitrile hydrochloride, (R)-1-((1H-imidazol-5-yl)methyl)-3-benzyl-4-(thiophen ylsulfonyl)-2,3,4,5-tetrahydro-1H-benzo diazepine-7-carbonitrile, cetuximab, imatinib, interferon alfa-2b, pegylated interferon alfa-2b, aromatase combinations, gemcitabine, uracil mustard, chlormethine, ifosfamide, melphalan, chlorambucil, pipobroman, triethylenemelamine, triethylenethiophosphoramine, busulfan, carmustine, lomustine, streptozocin, dacarbazine, floxuridine, cytarabine, 6-mercaptopurine, 6-thioguanine, fludarabine phosphate, leucovorin, oxaliplatin, pentostatine, vinblastine, vincristine, vindesine, bleomycin, dactinomycin, daunorubicin, epirubicin, idarubicin, mithramycin, deoxycoformycin, mitomycin-C, L-asparaginase, teniposide 17α-ethinyl estradiol, diethylstilbestrol, testosterone, prednisone, fluoxymesterone, dromostanolone propionate, testolactone, megestrol acetate, methylprednisolone, methyltestosterone, prednisolone, triamcinolone, chlorotrianisene, 17α-hydroxyprogesterone, aminoglutethimide, estramustine, medroxyprogesterone acetate, leuprolide acetate, flutamide, toremifene citrate, goserelin acetate, carboplatin, hydroxyurea, amsacrine, procarbazine, mitotane, mitoxantrone, levamisole, vinorelbine, anastrazole, letrozole, capecitabine, raloxifene, droloxafine, hexamethylmelamine, bevacizumab, trastuzumab, tositumomab, bortezomib, ibritumomab tiuxetan, arsenic trioxide, porfimer sodium, cetuximab, thioTEPA, altretamine, fulvestrant, exemestane, rituximab, alemtuzumab, dexamethasone, bicalutamide, chlorambucil, or valrubicin. The agents can be administered as part of a treatment regime and are not necessarily administered concurrently or on the same schedule.

Definitions

For the purposes of promoting an understanding of the embodiments described herein, reference made to preferred embodiments and specific language are used to describe the same. The terminology used herein is for the purpose of describing particular embodiments only, and is not intended to limit the scope of the present invention. As used throughout this disclosure, the singular forms "a," "an," and "the"

include plural reference unless the context clearly dictates otherwise. Thus, for example, a reference to "a composition" includes a plurality of such compositions, as well as a single composition, and a reference to "a therapeutic agent" or "an active compound" is a reference to one or more therapeutic and/or pharmaceutical agents (e.g., brincidofovir) and equivalents thereof known to those skilled in the art. All percentages and ratios used herein, unless otherwise indicated, are by weight.

The term "about" is used herein to mean approximately, in the region of, roughly or around. When the term "about" is used in conjunction with a numerical range, it modifies that range by extending the boundaries above and below the numerical values set forth. In general, the term "about" is used herein to modify a numerical value above and below the stated value by a variance of 20%.

As used in the present disclosure, whether in a transitional phrase or in the body of a claim, the terms "comprise(s)" and "comprising" are to be interpreted as having an open-ended meaning. That is, the terms are to be interpreted synonymously with the phrases "having at least" or "including at least." When used in the context of a process the term "comprising" means that the process includes at least the recited steps, but may include additional steps. When used in the context of a molecule, compound, or composition, the term "comprising" means that the compound or composition includes at least the recited features or components, but may also include additional features or components.

A "pharmaceutical composition" is a formulation containing a compound of the present disclosure (e.g., brincidofovir) in a form suitable for administration to a subject. The term "pharmaceutical composition" includes preparations suitable for administration to mammals, e.g., humans. A pharmaceutical composition can be, e.g., an intravenous (IV) formulation, or an oral formulation.

The term "monotherapy" is understood to mean the use of a single drug to treat a particular disorder or disease. Monotherapy is different from combination therapy in that combination therapy includes the use of at least two drugs in combination to treat a particular disorder or disease.

As used herein, "treating," "treatment" or "treat" describes the management and care of a patient for the purpose of combating a disease, condition, or disorder and includes the administration of active compound of the present disclosure (i.e., brincidofovir), to alleviate the symptoms or complications of a disease, condition or disorder, or to eliminate the disease, condition or disorder. The term "treat" can also include treatment of a cell in vitro or an animal model.

As used herein, "compounds of the disclosure" refers to both active compounds (e.g., brincidofovir) as well as non-active compounds (e.g., bulking agents, buffers, sweeteners, and the like).

The active compound of the present disclosure (i.e., brincidofovir) may also be used to prevent a relevant disease, condition or disorder, or used to identify suitable candidates for such purposes. As used herein, "preventing," "prevent," or "protecting against" describes reducing, ameliorating or eliminating the onset of the symptoms or complications of such disease, condition or disorder.

Brincidofovir can also be used in the prophylaxis of a disease such as a viral infection. Prophylaxis is understood to mean action taken to prevent a disease. In the context of the current disclosure, prophylaxis can mean treatment with, e.g., brincidofovir.

As used herein, "therapeutically effective amount" means that amount necessary to make a clinically observed improvement in the patient. In some embodiments, the compounds of the disclosure are formulated such that they comprise an amount that would not cause one or more unwanted side effects. For instance, the term "therapeutically effective amount," can refer to an amount of any pharmaceutical agent or agents (e.g., brincidofovir) to treat, ameliorate, or prevent an identified disease or condition (e.g., a viral infection), or to exhibit a detectable therapeutic or inhibitory effect. The effect can be detected by any assay method known in the art. The precise effective amount for a subject will depend upon the subject's body weight, size, and health; the nature and extent of the condition; and the dosing schedule of therapeutics selected for administration.

Therapeutically effective amounts for a given situation can be determined by routine experimentation that is within the skill and judgment of the clinician. In a preferred aspect, the disease or condition to be treated is viral infection. Furthermore, an effective amount of a pharmaceutical agent is that which provides an objectively identifiable improvement as noted by the clinician or other qualified observer.

As used herein, the phrase "pharmaceutically acceptable" refers to those compounds, materials, compositions, carriers, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

"Pharmaceutically acceptable excipient or carrier" means an excipient or carrier that is useful in preparing a pharmaceutical composition that is generally safe, non-toxic and neither biologically nor otherwise undesirable, and includes excipient that is acceptable for veterinary use as well as human pharmaceutical use. A "pharmaceutically acceptable excipient" as used in the specification and claims includes both one and more than one such excipient. Pharmaceutically acceptable excipients and carriers are listed above.

As used herein, a "subject" is interchangeable with a "subject in need thereof", both of which refer to a subject (e.g., a patient) having a disorder in which viral infection plays a part, or a subject having an increased risk of developing viral infection associated disease or disorder relative to the population at large. A "subject" includes a mammal. The mammal can be e.g., a human or appropriate non-human mammal, such as primate, mouse, rat, dog, cat, cow, horse, goat, camel, sheep or a pig. The subject can also be a bird or fowl. In one embodiment, the mammal is a human.

Representative "pharmaceutically acceptable salts" of brincidofovir include, e.g., water-soluble and water-insoluble salts, such as the acetate, amsonate (4,4-diaminostilbene-2,2-disulfonate), benzenesulfonate, benzonate, bicarbonate, bisulfate, bitartrate, borate, bromide, butyrate, calcium, calcium edetate, camsylate, carbonate, chloride, citrate, clavulariate, dihydrochloride, edetate, edisylate, estolate, esylate, fiunarate, gluceptate, gluconate, glutamate, glycollylarsanilate, hexafluorophosphate, hexylresorcinate, hydrabamine, hydrobromide, hydrochloride, hydroxynaphthoate, iodide, sethionate, lactate, lactobionate, laurate, magnesium, malate, maleate, mandelate, mesylate, methylbromide, methylnitrate, methylsulfate, mucate, napsylate, nitrate, N-methylglucamine ammonium salt, 3-hydroxy-2-naphthoate, oleate, oxalate, palmitate, pamoate (1,1-methene-bis-2-hydroxy-3-naphthoate, einbonate), pantothenate, phosphate/diphosphate, picrate, polygalacturonate, propionate, p-toluenesulfonate, salicylate, stearate, subacetate, succinate, sulfate, sulfosalicylate, suramate, tannate, tartrate, teoclate, tosylate, triethiodide, and valerate salts. In some embodiments, a pharmaceutically acceptable salt is a sodium salt, a potassium salt, or a calcium salt.

Brincidofovir

Brincidofovir (CMX001, BCV), a lipid conjugate of cidofovir (CDV), can be used for the prevention and treatment of infection and disease caused by double stranded DNA viruses with high unmet medical need. The present disclosure teaches IV formulations of brincidofovir not only as a way to deliver BCV to patients unable to take oral medications, but also as a way to potentially reduce or avoid adverse GI events observed with oral dosing.

As used herein, the term "brincidofovir" is understood to encompass the neutral compound below:

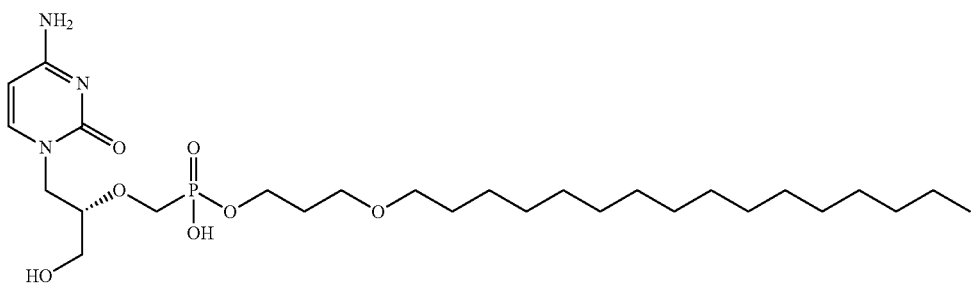 [SMILES: CCCCCCCCCCCCCCCCOCCCOP(=O)(O)CO[C@H](CO)Cn1ccc(N)nc1=O]

as well as any pharmaceutically acceptable salts thereof. In some of the examples below, brincidofovir is referred to as the "test item."

Cidofovir

Cidofovir, also known as CDV, has the structure below:

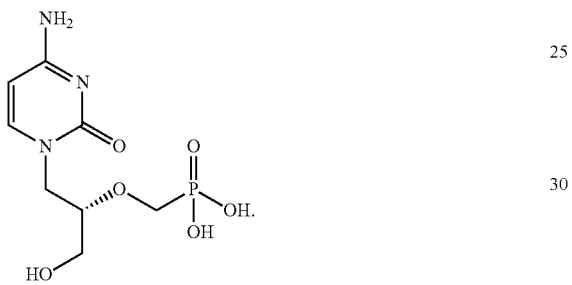

Brincidofovir Deamination Product

In some embodiments, brincidofovir can be deaminated under aqueous conditions (e.g., at acidic pH) to produce the corresponding uracil-derivative. The deaminated product is shown below:

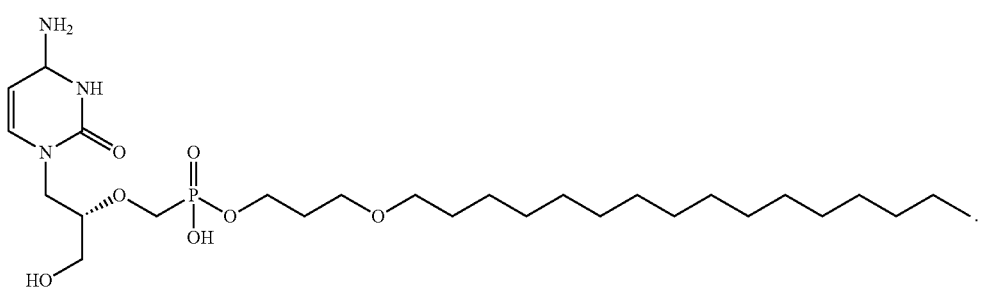 [SMILES: CCCCCCCCCCCCCCCCOCCCOP(=O)(O)CO[C@H](CO)CN1C=CC(N)NC1=O]

The present disclosure relates to aqueous and lyophilized formulations comprising brincidofovir and methods of using the same. As used herein, a "lyophilized formulation" means a formulation comprising an amount of solid lyophilized brincidofovir that is dissolved in a solvent (e.g., water, or a sugar solution). A "lyophilized formulation" can be a pharmaceutical composition of the present disclosure.

Characteristics of Pre-Lyophilized Formulations

As set forth in is set forth in Example 4, pre-lyophilization formulations comprising arginine as buffer and mannitol as bulking agent yield a white uniform solid with only minor melt-back upon lyophilization. Further, the lyophilized product obtained from a pre-lyophilization formulation comprising arginine as buffer and mannitol as bulking agent showed only minor foaming upon reconstitution, in contrast to other formulations tested. For example, formulations comprising sodium phosphate or pH-adjusted water as a buffer showed foaming upon reconstitution and generally required several minutes (e.g., more than 30 minutes) before the foam dissipated. Likewise, formulations comprising sucrose as a bulking agent also were found to exhibit foaming upon reconstitution and generally required several minutes (e.g., more than 30 minutes) before the foam dissipated.

Furthermore, as shown below in Example 4, mannitol-based aqueous formulations of the disclosure were also found to yield a more compact, uniform lyophilization cake upon lyophilization compared with other formulations. For example, sucrose based formulations exhibited at least partial cake collapses (and in some cases significant cake collapse) as well as an increased melt-back (e.g., extensive melt-back) upon lyophilization. However, mannitol-based aqueous formulations were found to exhibit less cake collapse and less melt-back.

Additionally, in some embodiments, phosphate-based buffers showed pH shifts on freezing during the lyophilization process, in contrast to formulations using arginine as a buffer. Accordingly, the compositions set forth herein were found to have desirable properties (e.g., greater stability and greater ease of use) compared with other formulations tested.

Stability and Material Compatibility of Liquid Formulations

As set forth in Example 1, when brincidofovir sample stock solutions (50 µg/mL) in a 50 mM phosphate buffer at pH 6.0-8.0 containing 20% methanol were stored at 2-8° C., precipitation was observed for of pH 7.0 and below. However, samples prepared at a higher pH (e.g., pH=7.5 and pH=8.0) revealed no observable change in appearance throughout the time course of the experiment (e.g., precipitation was not observed). For samples stored at 40° C., no physical change in appearance was observed for samples at any pH and minimal variation in brincidofovir concentration was observed for all of the studied pH conditions at 40° C.

In the study presented in Example 1, vehicles for brincidofovir formulations were prepared from 5× sodium phosphate buffer stocks (e.g., at pH 6.0, 6.5, 7.0, 7.5, or 8.0), various tonicifiers (e.g., 66.5 mM NaCl, 68.8 mM dextrose, 49.8 mM $MgCl_2$, or 35.7 mM Ca D-gluconate) and various excipients (e.g., Cremophor®, edetate disodium (EDTA), hydroxypropyl beta-cyclodextrin (HPbCD), polyethyleneglycol (PEG) 300, ethanol, glycerin, propylene glycol (PG), N,N-dimethylacetamide (DMA), N-methyl-2-pyrrolidone (NMP), polysorbate 80, albumin, or benzyl alcohol, or mixtures thereof), with a brincidofovir concentration of 6.4 mg/mL. Without wishing to be bound by theory, tested formulations comprising dextrose or NaCl as a tonicifier and Cremophor® and DMA as excipients, did not precipitate over the course of 12 days at a pH of 6.5, and tested formulations comprising dextrose, but no excipient, did not precipitate over the course of 12 days at a pH of 8.0, but did precipitate at lower pH values. Similarly, and also without wishing to be bound by theory, formulations comprising NaCl, PEG300, and polysorbate 80, and formulations comprising NaCl, Cremophor® and ethanol, did not precipitate at a pH of 7, but did precipitate at lower pH values of 12 days. Formulations comprising NaCl, and Cremophor® did not precipitate at a pH of 7. Without wishing to be bound by theory, the HPLC recovery data set forth in Example 1, suggests that under storage condition (2-8° C.) and at c(BCV)=6.4 mg/mL, some formulations are not suited to continuously solubilize brincidofovir in a stable fashion.

As shown in Example 2, the equilibrium solubility of brincidofovir in aqueous infusion vehicles comprising 100 mM phosphate, and 69 mM dextrose was found to increase at higher pH. For example, the equilibrium solubility of brincidofovir in aqueous infusion vehicles comprising 100 mM phosphate, and 69 mM dextrose was determined as about 25 mg/mL at pH=6.9 and about >270 mg/mL at pH=8.0.

As set forth in Example 5, solubility of a liquid formulation of the disclosure in a 5% dextrose solution to yield a liquid formulation comprising 10 mg/mL brincidofovir, 100 mM arginine and 5% (w/v) mannitol, was 100% for at least 24 h after dilution of the liquid formulation. Furthermore, the resulting solution stayed clear and colorless, and no significant shifts in pH were observed.

As set forth in Example 5 and Example 3, liquid formulations of brincidofovir (e.g., formulations comprising 10 mg/mL brincidofovir, 100 mM arginine and 5% (w/v) mannitol; formulations comprising 10 mg/mL or 15 mg/mL brincidofovir and 200 nM sodium phosphate; or formulations comprising 2 mg/mL brincidofovir, and 4 mM sodium phosphate) were tested for compatibility with infusion vehicles as well as a series of materials from the manufacturing and clinical stage (e.g., sterilization filters, vials and stoppers in upright ant inverted conditions, infusion bags, and infusion systems). In some instances, the formulations were diluted with 5% dextrose prior to testing. Without wishing to be bound by theory, no precipitation, pH shift or significant loss in recovery of brincidofovir were observed for any of the formulations at the end of the studies.

Hemolytic Potential of Brincidofovir

In some embodiments, it is advantageous for drugs (e.g., intravenous drugs) to not cause hemolysis (i.e., not to destroy red blood cells).

Example 7 describes the hemolytic potential of brincidofovir using immediately collected (within 4 hrs) whole human or whole rat blood using a cyanmethemoglobin method to evaluate hemolysis. The study measured hemoglobin released from red blood cells in the presence of brincidofovir to determine the extent to which brincidofovir lysed red blood cells.

Without wishing to be bound by theory, lysis of red blood cells can cause local reactions such as cellulitis, phlebitis and can impact organ function. The results presented herein demonstrate that the IV formulations of brincidofovir do not cause a hemolytic reaction when administered intravenously.

Rat and human whole blood (stabilized with $K_2EDTA$) were obtained from 4 rats and 1 human donor. Each concentration (0.2, 0.5 and 1.6 mg/mL) of brincidofovir for the rat was mixed separately in a 1:4 ratio with rat whole blood while each concentration (0.2, 0.5 and 1.6 mg/mL) of brincidofovir for the human was mixed separately in a 1:4 ratio with human whole blood. All samples were then incubated for 20 minutes at 37±1° C. Following incubation, the blood samples containing the BCV, along with similarly prepared isotonic saline (negative control), 1% Saponin (positive control), 5% Dextrose (vehicle control), and untreated whole blood control samples, were then centrifuged and analyzed for hemolysis (supernatant hemoglobin concentration) using a cyanmethemoglobin method. Representative BCV samples in isotonic saline were analyzed to ensure that the BCV did not interfere with the analysis of supernatant hemoglobin concentration.

Without wishing to be bound by theory, brincidofovir demonstrated a hemolytic potential effect in rat whole blood that appeared to be concentration dependent with evidence of hemolysis observed at 1.6 mg/mL. However, brincidofovir was found to have no hemolytic potential in human whole blood up to the highest concentration tested corresponding to a final concentration of 0.2, 0.5 and 1.6 mg/mL.

Accordingly, in some embodiments, brincidofovir is safe for administration to patients, including patients with hematological diseases (e.g., anemia).

Maximum Tolerated Dose and 7-Day Dose Range-Finding (DRF) Study in Rats

Example 8 presents a maximum-tolerated Dose and 7-day dose range finding study (DRF) for BCV in rats. The results presented detail an acute range finding study in the rat. In some embodiments, this data can be used to generate information to allow one to rationally set the doses to be administered in further toxicology studies.

Phase 1

Phase 1 was designed to determine the Maximum Tolerated Dose (MTD) of brincidofovir following intravenous infusion (2-hour) to rats. Phase 1 encompassed a single escalating dose arm to assess any acute toxicity (e.g., 'toxic syndrome') that can present in general clinical signs generally within a 48+/- hour period of exposure to BCV. Without wishing to be bound by theory, the escalating dose arm can identify any overt signs or symptoms of over-dosage.

In Phase 1 of the study, all doses were well tolerated when administered via a single 2-hour IV infusion. Therefore, the maximally tolerated dose of brincidofovir was not determined. However, 15 mg/kg delivered via 2-hour IV infusion of a 0.75 mg/mL solution of brincidofovir represented the maximum feasible dose based on in vitro evidence of hemolysis at brincidofovir concentrations above 0.75 mg/mL. In other words, even at the maximum feasible dose tested, no consequential effects (e.g., on mean body weight or weight gain) were observed in rats. Further, there were no effects in ophthalmology, hematology, clinical chemistry, or urinalysis parameters. Even at higher dosage levels than can be achieved with oral administration, the rats were found not to present with overt toxicity or death.

Phase 2

Phase 2, the repeat-dose range-finding (DRF) phase (Phase II), was designed to assess the toxicity of brincidofovir and the plasma toxicokinetic profiles of brincidofovir and one of its metabolites, cidofovir. Cidofovir is known to cause nephrotoxicity when administered intravenously to animals and humans. Toxicokinetic parameters were evaluated following the first and last dose administration of two dose levels of brincidofovir (1 mg/kg and 15 mg/kg) administered via intravenous (2-hour) infusion on Days 1, 3, and 7.

In Phase 2 of the present study the animals received a short term treatment of the high (15 mg/kg) or low (1 mg/kg) BCV IV infusion dose (3 doses over the course of 9 days). Without wishing to be bound by theory, this second phase of the study was used to determine if any potential cumulative toxicity can occur with repeat dosing. Without wishing to be bound by theory, the second phase also included a toxicokinetic arm to determine the establish IV toxicokinetics following single (the first dose administered) and repeat (the last dose administered) BCV IV infusion dosing.

In Phase 2 of the study, peak concentrations for brincidofovir were generally observed at the end of the 2-hour IV infusion, and decreased rapidly. In general, mean brincidofovir $C_{max}$ and AUC increased approximately proportional to the increase in dose from 1 to 15 mg/kg, though AUC was determined on few concentration values after 1 mg/kg dosing. The brincidofovir $C_{max}$ and $AUC_{last}$ values on Day 7 showed a trend toward lower values on Day 7 compared to Day 1 (Day 7/Day 1 accumulation ratios (AR) of 0.44 to 0.54). Further, no sex differences in brincidofovir TK parameters were observed. Without wishing to be bound by theory, exposure to metabolite cidofovir increased less than proportional to the increase in brincidofovir dose, there were no apparent sex differences in TK parameters, and no change in TK parameters after repeat administration. Under the conditions of the study, single dose administration of 1 or 15 mg/kg brincidofovir via 2-hour IV infusion on Days 1, 4 and 7 were well tolerated.

Brincidofovir: A 28-Day Intravenous Infusion Toxicity Study in Rats with a 14-Day Recovery Period Example 10 details a repeat-dose, subchronic study with IV BCV in rats. Without wishing to be bound by theory, this study explores the cumulative biological effects (e.g., clinical, macro and micro) of brincidofovir administered over a range of doses. The effects can be qualitative, such as target organs, nature of effect or quantitative, such as plasma or tissue levels at which effects are observed. Without wishing to be bound by theory, the study can define the toxicity and the potential for recovery or progression.

As set forth in Example 10, and without wishing to be bound by theory, none of the animals in the present study experienced diarrhea. All of the animals gained their expected weight during the study. There were no GI findings in intestines at terminal necropsy. There were no in-life clinical findings at the highest administered dose of IV brincidofovir (15 mg/kg). No transaminase elevations were observed.

Without wishing to be bound by theory, it was observed after oral administration of brincidofovir, there was a significant loss of epithelium in intestinal villi. In contrast, after IV administration of brincidofovir, there were minimal single-cell effects noted. For example, FIG. 7A shows a histogram of histogram of rat intestine after oral administration of brincidofovir, and FIG. 7B shows a histogram of rat intestine after IV administration of brincidofovir. As shown in the figures, IV administration of brincidofovir is more well-tolerated in the intestine.

As set forth in Example 10, brincidofovir was administered twice weekly for 28 days via 2-hour intravenous infusion to Sprague-Dawley CD® rats (15/sex/group) at 0 (2× Sodium Phosphate Buffer Solution), 1, 4 or 15 mg/kg/dose. Up to 5 animals/sex/group were held for a 14-day post-dosing recovery.

Administration of brincidofovir resulted in intermittent (generally following infusion) clinical signs in some animals (primarily abnormal breathing and hunched posture) in both sexes at ≥4 mg/kg/dose and minimally decreased food consumption in males and females at ≥1 mg/kg/dose and 15 mg/kg/dose, respectively.

Brincidofovir-related findings were present in the male reproductive tract (testicular germ cell depletion, luminal cell debris in the epididymides and increased epithelial apoptosis in the seminal vesicles) and intestinal tract (single cell necrosis) at ≥4 mg/kg/dose and sebaceous glands (atrophy) at 15 mg/kg/dose. All brincidofovir-related findings completely recovered with the exception of testicular changes in males at ≥4 mg/kg/dose, which without wishing to be bound by theory would not be expected to fully recover in a 2 week period. In addition, a few animals administered 15 mg/kg/dose had decreased bone marrow cellularity and unilaterally or bilaterally soft and/or small testes and epididymides at the end of recovery.

Under the conditions of the study, based on the testicular germ cell depletion in males at ≥4 mg/kg/dose and moderate intestinal single cell necrosis in 1 female at 15 mg/kg/dose, the no-observed-adverse-effect level (NOAEL) for brincidofovir was considered to be 1 mg/kg/dose in males and 4 mg/kg/dose for in females.

Thus, in some embodiments, the study can provide support for the initiation or continued conduct of clinical studies in humans. In some embodiments, the study can also be used to establish doses for longer term studies. Without wishing to be bound by theory, this study can also guide parameters such as the number of animals to assess when conducting longer-term studies. This study also contained a toxicokinetic arm following the first and last administered dose.

Mass Balance, Pharmacokinetics and Tissue Distribution by Quantitative Whole-Body Autoradiography in Rats Following a Single Oral or Intravenous Dose of [$^{14}$C]Brincidofovir Studies were performed to characterize the tissue distribution of total radioactivity in male Sprague Dawley (SD) and Long-Evans (LE) rats following administration of a single intravenous (IV, 2 h infusion) or oral (PO, gavage) dose of [$^{14}$C]brincidofovir. In addition, the rate and extent of excretion (mass balance) and pharmacokinetics (PK) of total radioactivity in male Sprague Dawley rats following a single intravenous (IV, 2 h infusion) dose of [$^{14}$C]brincidofovir were examined.

[$^{14}$C]Brincidofovir was administered to pigmented and non-pigmented rats by 2-hour IV infusion or by oral gavage at a dose of 15 mg/kg. Tissue distribution was determined by quantitative whole body autoradiography at time points up to 35-days post-dose.

Radioactivity was well distributed with qualitative distribution patterns of the radioactivity similar after IV or oral administration. Quantitatively, tissue radioactive concentrations in small intestinal tissue after IV administration were approximately 1/10 the concentrations in small intestinal tissue after oral administration. For most other tissues, tissue radioactive exposure was generally higher after IV administration than after oral gavage administration. Peak concentrations of radioactivity in most tissues occurred at 4 to 8 h after oral administration, or at the end of the 2-h IV infusion. Tissues with highest concentrations of radioactivity were associated with organs of clearance or elimination, e.g., liver, kidney and small intestine, regardless of route of administration. The tissue to plasma ratios (T/P) in these organs were high (>30) and for kidney cortex and liver were similar between the IV and oral routes of administration. Tissues with lowest concentrations of radioactivity were brain, spinal cord, skeletal muscle, white adipose tissue and bone. Association of radioactivity in the brain and spinal cord was higher after IV administration (~20% of plasma concentration compared to ~5% after oral administration). At 35 days post-dose, radioactivity was below the limit of quantification in all tissues except for bone marrow, lymph node, spleen and adrenal gland after IV administration; which were different from those tissues with residual concentrations after oral administration (kidney cortex, liver and small intestine). No evidence of specific association with melanin containing tissues (eye, uvea) was detected.

Compared to the oral route, IV administration of [$^{14}$C] brincidofovir results in lower small intestinal concentrations of BCV-related radioactivity, which is consistent with lower incidence and severity of GI findings in toxicology studies after repeat IV BCV administration to rats.

In some embodiments, single cell necrosis in the small and large intestine were occasionally noted following IV BCV infusion. These minor and reversible GI findings are explained by the lower concentrations of radioactivity seen in intestinal tissue following IV infusion of [$^{14}$C]brincidofovir. Further, the GI findings did not result in any dose-limiting GI toxicities (i.e., gastropathy, enteropathy or enteritis). Accordingly, the present disclosure provides IV formulations of BCV and methods of IV BCV administration that can be used to mitigate BCV-associated GI disturbances.

Distribution of radioactivity after IV [$^{14}$C]brincidofovir infusion was higher in all tissues compared to oral BCV, except in the small intestine, where concentrations were approximately 1/10th of oral administration.

Excretion and Distribution Summary
Excretion after IV Administration

The primary route of elimination of radioactivity after a 2-h IV infusion of [$^{14}$C]brincidofovir at 15 mg/kg in male SD rats was in urine, which accounted for an average of 51.2% of the administered dose over the 168 h collection period. An average of 42.2% of the administered dose was recovered in feces. The total recovery of radioactivity in urine and feces combined in Group 1 male rats averaged 93.5% of the dose over the 168 h collection period. Most (~86%) of the urinary and fecal excretion of radioactivity occurred in the first 24 h after dosing.

Distribution after IV Administration

The $C_{max}$ of [$^{14}$C]brincidofovir total radioactivity in plasma after a 2-h IV infusion administration to male SD rats at 15 mg/kg (Group 2) was 10.3 µg equiv/mL, which occurred at a $T_{max}$ of 2 h (i.e., end of infusion), and the concentration decreased to 0.045 µg equiv/mL at 72 h post-dose. The $AUC_{last}$ of [$^{14}$C]brincidofovir total radioactivity was 64.4 µg equiv·h/mL, and the $t_{1/2}$ was 13.0 h.

[$^{14}$C]Brincidofovir-derived radioactivity was well distributed into most tissues of albino and pigmented male rats after a 2-h IV infusion at 15 mg/kg, and most tissues had concentrations that were slightly higher than plasma, in particular, excretory and alimentary canal tissues, which were much higher than plasma (tissue $AUC_{all}$:plasma ratio>1.9). The $C_{max}$ of [$^{14}$C]brincidofovir-derived radioactivity in most tissues were found at 2 h post-dose (i.e., end of infusion) when most of the tissues had concentrations that were between 1.0 and 6.0 µg equiv/g.

Blood to plasma ratios generally showed that [$^{14}$C]brincidofovir-derived radioactivity was similarly distributed after IV infusion to rats, ranging from 0.89-1.46 over the period from 1 to 24 hours after the start of infusion. At 72 hours, blood to plasma ratios of 1.42 and 3.06 were observed after administration of 2 mg/kg and 15 mg/kg, respectively.

The tissues of albino and pigmented male rats with the highest concentrations (>20.0 µg equiv/g) at the respective $T_{max}$ after a 2-h IV infusion at 15 mg/kg were observed in liver, kidney cortex, small intestine, kidney medulla, and urinary bladder. The tissues with the lowest concentrations (<1.0 µg equiv/g) at their respective $T_{max}$ were: brain, spinal cord, white adipose, bone, skeletal muscle, and eye lens.

The highest overall concentrations (>400 µg equiv/g) after a 2-h IV infusion at 15 mg/kg determined by QWBA were observed in the urinary bladder contents, bile, and contents of the alimentary canal, which reflected the routes of elimination for the [$^{14}$C]brincidofovir-drug-derived radioactivity after IV administration.

Tissue concentrations in most tissues decreased steadily, but at 168 h post-dose, elimination of drug related material was not complete in most tissues; however all tissues containing radioactivity had concentrations that were <1.0 µg equiv/g. At 840 h post-dose (last sampled time point), radioactivity was still present in bone marrow, lymph node, spleen, and adrenal gland, but they were approaching the LLOQ in these tissues, except spleen. The $t_{1/2}$ for all tissues (with sufficient data points, and acceptable $r^2$) ranged from 14.2 h for blood (cardiac) to 378 h for spleen. The tissues with the longest $t_{1/2}$ were spleen (378 h), lymph node (345 h), skin non-pigmented (310 h), and bone marrow (276 h). The $t_{1/2}$ for tissues with quantifiable concentrations at 840 h ranged from 254 h (adrenal gland) to 378 h (spleen).

A similar pattern of tissue distribution was observed in rats given a 2-h IV infusion at the lower dose of 2 mg/kg. Most tissue concentrations after the 2 mg/kg IV dose compared to 15 mg/kg dose, increased approximately proportional to dose (i.e., with increase in dose of 7.5, a change in concentration of 4 to 15 fold). However, in small intestine, a greater than proportional increase in small intestine concentrations was seen with an increase in dose from 2 to 15 mg/kg.

Distribution after Oral Administration

The $C_{max}$ of [$^{14}$C]brincidofovir total radioactivity in plasma after PO administration to male LE rats at 15 mg/kg was 1.5 μg equiv/mL at a $T_{max}$ of 8 h, and the concentration decreased to 0.180 μg equiv/mL at 24 h post-dose. The $AUC_{last}$ of [$^{14}$C]brincidofovir total radioactivity was 21.0 μg equiv·h/mL, and the $t_{1/2}$ was not able to be determined due to insufficient data points.

Blood to plasma ratios showed that [$^{14}$C]brincidofovir-derived radioactivity was similarly distributed from 1 h to 24 h (ranged between 0.76-1.13) after administration of a PO dose of [$^{14}$C]brincidofovir to male LE rats.

[$^{14}$C]brincidofovir-derived radioactivity was well distributed into most tissues of pigmented and non-pigmented male rats after a PO administration at 15 mg/kg, and most tissues had concentrations that were slightly higher plasma, especially for excretory and alimentary canal tissues, which were much higher (tissue $AUC_{all}$:plasma ratio>4.1). The $C_{max}$ of [$^{14}$C]brincidofovir-derived radioactivity in most tissues were found at 8 h post-dose (22 of 38 tissues) when most of the tissues had concentrations that were between 0.7 and 17.8 μg equiv/g.

The tissues of pigmented male rats with the highest concentrations (>3.3 μg equiv/g) at the respective $T_{max}$ after a PO dose at 15 mg/kg were observed in: small intestine, liver kidney cortex, stomach (gastric mucosa), kidney medulla, cecum, esophagus, large intestine. The tissues with the lowest concentrations (<1.0 μg equiv/g) at their respective $T_{max}$ were: spinal cord, brain, bone, white adipose, and eye lens.

The highest overall concentrations (>36.0 μg equiv/g) after a PO dose at 15 mg/kg determined by QWBA were observed in the urinary bladder contents, bile, and contents of the alimentary canal, which reflected the routes of elimination for the [$^{14}$C]brincidofovir-drug-derived radioactivity after PO administration.

Tissue concentrations in most tissues of pigmented male rats decreased steadily, but at 168 h post-dose, elimination of drug related material was not complete in most tissues; however all tissues had concentrations that were <0.4 μg equiv/g, with the exception of small intestine (5.9 μg equiv/g). At 840 h post-dose (last sampled time point) radioactivity was still present in kidney cortex, liver, and small intestine, but was approaching the LLOQ. The $t_{1/2}$ for plasma was approximately 5 h. The $t_{1/2}$ for all tissues (with sufficient data points, and acceptable $r^2$) ranged from 37.2 h for esophagus to 234 h for adipose (brown). The tissues with the longest $t_{1/2}$ were adipose brown (234 h), spleen (115 h), pituitary gland (106 h), and lung (93 h). The only tissue with a reliable $t_{1/2}$ and quantifiable concentrations at 840 h was small intestine at 98.1 h.

Comparison of Distribution to Tissues after a PO Dose and a 2-h IV Infusion

Following a 2-hour intravenous infusion or oral gavage of [$^{14}$C]brincidofovir to Long-Evans and Sprague-Dawley rats, the $AUC_{all}$ blood to plasma ratio ranged between 1.1 and 1.4. For individual points, the blood to plasma ratio ranged from 0.64 to 1.5 with a median value of 1.00. Without wishing to be bound by theory, the similar distribution of radioactivity between blood and plasma after both routes of administration indicated minimal restriction of [$^{14}$C] brincidofovir distribution from plasma into blood cells.

Most tissues of rats given a single oral dose of [$^{14}$C] brincidofovir at 15 mg/kg attained maximal observed concentrations at either 4 or 8 h, and peak concentrations were generally about 10-25% of peak tissue concentrations observed in rats given a 2-h IV infusion. In small intestine, however, a 6-fold higher $C_{max}$ was observed after oral administration compared to IV. The oral bioavailability of radioactivity ($AUC_{all}$ PO/$AUC_{all}$ IV) was 48% (blood) to 61% (plasma). Lower tissue AUC ratios ($AUC_{PO}$/$AUC_{IV}$<25%) were observed in approximately ⅓ of the tissues after oral administration compared to IV, notably in central nervous system, skin, skeletal muscle and some endocrine and reproductive tissues. By both routes, tissues with highest concentrations of radioactivity were associated with excretory organs (i.e., liver, kidney, and intestine). The tissue to plasma ratios were high (>30) for each of these tissues, and in kidney cortex and liver the tissue/plasma ratios were similar between the IV and oral routes of administration. Small intestinal tissue to plasma ratio was highest after oral administration (T/P=428) as expected based on the route of administration, however, notable radioactivity was associated with small intestine (tissue to plasma ratio 32) after IV infusion. Elimination from tissues was incomplete at 840 h post oral-dose with radioactivity present in kidney cortex, liver, and small intestines after PO administration, which were different from those observed after a 2-h IV infusion at the same time point. In small intestine, the residual concentration at 168 h was considerably higher for orally dosed rats (5.9 μg equiv/g) than that for rats administered [$^{14}$C]brincidofovir by IV infusion (tissue concentrations BQL). At 840 h, residual concentrations were much higher in vascular/lymphatic tissue systems after a 2-h IV infusion compared to the concentrations observed after a PO administration (BQL).

Distribution in Pigmented Tissues

A comparison of tissue distribution of radioactivity between non-pigmented and pigmented tissues showed that concentrations in the pigmented tissues (i.e., eye uveal tract and pigmented skin) were similar to those concentrations observed in the non-pigmented tissues, which suggested that there was no specific association of [$^{14}$C]brincidofovir-drug-derived radioactivity with melanin.

Without wishing to be bound by theory, in most tissues, higher concentrations of radioactivity were observed after IV administration, which can be reflective of higher blood concentrations. One exception was the gastro-intestinal tissue. Tissues with the highest concentrations, ranked from highest to lowest, were liver, kidney cortex, small intestine, and kidney medulla for IV administration, and small intestine, liver, kidney cortex, kidney medulla, and cecum for oral administration. The tissues with residual drug after 840 hours were the adrenal glands, spleen, lymph nodes and bone marrow for IV administration, and small intestine, liver, and kidney cortex for oral administration.

Thus, in some embodiments, lower dose of BCV administered intravenously can provide similar plasma concentrations similar to those observed using oral administration at higher doses. Accordingly, the present disclosure provides treatment of a viral infection in a subject in need thereof using a lower dose of BCV than necessary with oral administration.

Pharmacokinetics of Brincidofovir IV Administration

As set forth in Example 11 below, brincidofovir was administered to healthy subjects both orally and intravenously. It was found that IV brincidofovir administration at 10 mg provided similar exposure as orally administered brincidofovir at 100 mg. Accordingly, the present disclosure teaches administration of brincidofovir intravenously. In some embodiments, no drug-related adverse events (e.g., no gastrointestinal events) are observed upon IV administration of brincidofovir. In some embodiments, no graded lab abnormalities (e.g., no hemolytic toxicity and no kidney toxicity) are observed.

EXAMPLES

The disclosure is further illustrated by the following examples which are not to be construed as limiting this disclosure in scope or spirit to the specific procedures herein described. It is to be understood that the examples are provided to illustrate certain embodiments and that no limitation to the scope of the disclosure is intended thereby. It is to be further understood that resort may be had to various other embodiments, modifications, and equivalents thereof which may suggest themselves to those skilled in the art without departing from the spirit of the present disclosure and/or scope of the appended claims.

This section provides abbreviations and definitions of terms and concepts that may be commonly used throughout.

AUC Area Under the Time-Concentration Curve
$AUC_{all}$ Area Under the Time-Concentration Curve Including all Time Points
$AUC_{inf\_obs}$ Area Under the Time-Concentration Curve Extrapolated to Infinity Observed
$AUC_{last}$ Area Under the Time-Concentration Curve Including the last time point with data above the lower limit of quantitation
BQL Below Quantification Limit
° C. Degrees Centigrade
c(BCV) Concentration of brincidofovir in a liquid or aqueous formulation
c(bulking agent) Concentration of bulking agent in liquid or aqueous formulation
ca Circa (approximately)
$C_{max}$ Maximum observed concentration
cpm Counts Per Minute
% CV Percent Coefficient of Variance
DMA N,N-dimethylacetamide
dpm Disintegrations Per Minute
EDTA edetate disodium
FVC Femoral Vein Cannulated
g Gram
h Hour
HPLC High Performance Liquid Chromatography
HPbCD hydroxypropyl beta-cyclodextrin
IV Intravenous
kg Kilogram
L Liter
LE Long-Evans
LLOQ Lower Limit of Quantification
LSC Liquid Scintillation Counting
MB Mass Balance
MBq Megabecquerel
mCi/mmol Millicurie Per Millimole
MCD Microcomputer Image Device
MDC Molecular Dynamics Counts
mg Milligram
mSv milliSievert(s)
μg equiv/g Microgram Equivalents per Gram of Tissue
min Minutes
mL Milliliter
mm Millimeter
n Number of Observations
NA Not Applicable
NI Not Identified
NC Not Calculated
NS Not Sampled
NMP N-methyl-2-pyrrolidone
PEG polyethyleneglycol
PG propylene glycol
PK Pharmacokinetic
PO per os (oral dose)
ROA Route of Administration
SD Sprague Dawley or Standard Deviation
$t_{1/2}$ Terminal Elimination Half-Life
$T_{max}$ Time of $C_{max}$
ULOQ Upper Limit of Quantification
QWBA Quantitative Whole-Body Autoradiography Example 1—Liquid Formulation Development Various plain liquid formulations (i.e., pre-lyophilization formulations, or bulk formulations) were prepared and tested for the purpose of developing intravenous formulations of brincidofovir.

pH Stability of brincidofovir: Brincidofovir sample stock solutions (50 μg/mL) were prepared in 50 mM phosphate buffer at pH 6.0-8.0 containing 20% methanol. The samples were aliquoted and stored at two temperatures (T=2-8° C. and T=40° C.), and monitored for pH and recovery of brincidofovir at multiple time points over the course of two weeks. Under both conditions, the samples maintained the pH level throughout the time course of the experiment.

Storage at 2-8° C.: For samples stored at 2-8° C., precipitation was observed for pH 6.0 and 6.5 at t=2 days. For pH 7.0, precipitation was observed at t=4 days. Samples prepared at a higher target pH (pH=7.5 and pH=8.0) revealed no observable change in appearance throughout the time course of the experiment, whereas the samples prepared at pH 6.0, 6.5, and 7.0 showed a significant decrease in brincidofovir concentration with respect to the initial time point. The decrease may be related to the observed precipitation. Variation for pH 7.0 is observed for t>8 days. One impurity (RT=4.7 min) was detected that exceeded the set total peak area threshold that was applied for peak integration. The percent of the total peak area was below 0.4% for samples at pH 6 and 6.5, and below 0.1% for samples at higher pH.

Storage at 40° C.: For samples stored at 40° C., no physical change in appearance was observed for samples at any pH. Minimal variation in brincidofovir concentration was observed for all of the studied pH conditions at 40° C. While concentration of brincidofovir showed some fluctuation, no significant trends can be observed. A synoptic display of the HPLC chromatograms revealed differences in impurity formation across the varying pH-conditions over the course of the experiment. For the samples at lower pH, a peak associated with the deamination product of brincidofovir, was observed, encompassing an area % of 1.91 at pH 6.0, and 0.58 at pH 6.5. The degradants peak is not observed at neutral pH and above.

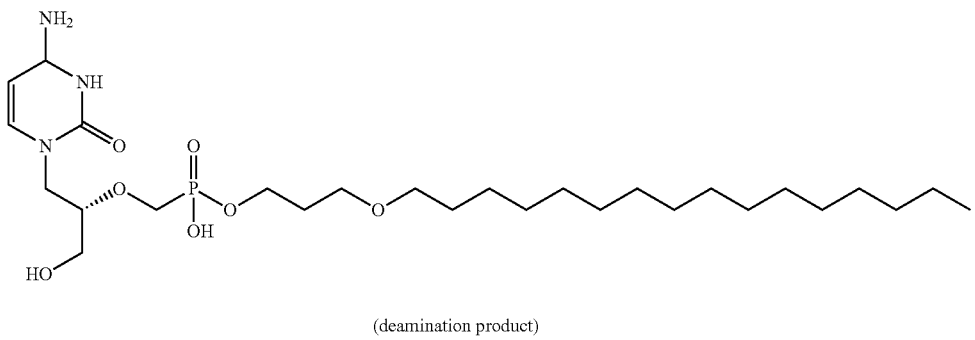 [SMILES: CCCCCCCCCCCCCCCCOCCCOP(=O)(O)CO[C@H](CO)CN1C=CC(N)NC1=O]

(deamination product)

Preparation and Characterization of Brincidofovir Formulations

Preparation of vehicles and formulations: Vehicles for brincidofovir formulations were prepared from organic excipients, 5× sodium phosphate buffer stocks (pH 6.0, 6.5, 7.0, 7.5, and 8.0), and the stock solutions of tonicifiers and EDTA. Solid brincidofovir was dissolved in the vehicle yielding a concentration of c(BCV)=6.4 mg/mL. The appearance (including precipitation upon storage at 2-8° C.) was evaluated, and the pH was measured. The results of the study are summarized in Table 1.

TABLE 1

Precipitation status and pH of vehicles and formulations. All formulations except formulations # 30-32 were prepared with a Na phosphate buffer (100 nM).

| # | Tonicifier | Excipient #1 | Excipient #2 | Target pH | Vehicle pH | Form. pH | init. | Day 1 | Day 2 | Day 7 | Day 12 |
|---|---|---|---|---|---|---|---|---|---|---|---|
| 1 | NaCl, 66.5 mM | Cremophor®, 40% | DMA, 10% | 6.00 | 6.05 | 6.03 | N | N | N | N | Y |
| 2 | NaCl, 66.5 mM | Cremophor®, 40% | DMA, 10% | 6.50 | 6.18 | 6.68 | N | N | N | N | N |
| 3 | NaCl, 66.5 mM | — | — | 7.00 | 6.87 | 6.83 | Y | Y | Y | Y | Y |
| 4 | NaCl, 66.5 mM | — | — | 7.50 | 7.33 | 7.23 | N | N | N | Y | Y |
| 5 | NaCl, 66.5 mM | — | — | 8.00 | 7.80 | 7.39 | N | N | N | Y | Y |
| 6 | Dextrose, 68.8 nM | Cremophor®, 40% | DMA, 10% | 6.00 | 6.38 | 6.07 | N | N | N | N | Y |
| 7 | Dextrose, 68.8 mM | Cremophor®, 40% | DMA, 10% | 6.50 | 7.22 | 6.78 | N | N | N | N | N |
| 8 | Dextrose, 68.8 mM | — | — | 7.00 | 6.88 | 6.83 | N | N | N | Y | Y |
| 9 | Dextrose, 68.8 mM | — | — | 7.50 | 7.35 | 7.21 | N | N | N | Y | Y |
| 10 | Dextrose, 68.8 mM | — | — | 8.00 | 7.89 | 7.45 | N | N | N | N | N |
| 11 | MgCl2, 49.8 mM | — | — | 7.00 | 6.22 | 6.42 | Y | Y | Y | Y | Y |
| 12 | Ca D-gluconate, 35.7 mM | — | — | 7.00 | 6.49 | 6.63 | Y | Y | Y | Y | Y |
| 13 | NaCl, 66.5 mM | EDTA, 50 µM | — | 7.00 | 6.82 | 6.95 | Y | Y | Y | Y | Y |
| 14 | NaCl, 66.5 mM | HPbCD, 1.8% | — | 7.00 | 6.86 | 6.93 | N | N | N | Y | Y |
| 15 | NaCl, 66.5 mM | HPbCD, 6.4% | — | 7.00 | 6.92 | 6.85 | N | N | N | Y | Y |
| 16 | NaCl, 66.5 mM | PEG 300, 10% | — | 7.00 | 7.29 | 6.99 | Y | Y | Y | Y | Y |
| 17 | NaCl, 66.5 mM | polysorbate 80, 2% | — | 7.00 | 6.82 | 6.87 | N | N | N | N | Y |
| 18 | NaCl, 66.5 mM | PEG 300, 10% | polysorbate 80, 2% | 6.00 | 6.28 | 6.20 | Y | Y | Y | Y | Y |
| 19 | NaCl, 66.5 mM | PEG 300, 10% | polysorbate 80, 2% | 7.00 | 7.31 | 6.98 | N | N | N | N | N |
| 20 | NaCl, 66.5 mM | Ethanol, 10% | — | 7.00 | 7.35 | 7.02 | N | N | N | Y | Y |
| 21 | NaCl, 66.5 mM | Cremophor®, 10% | — | 7.00 | 6.93 | 6.87 | N | N | N | N | N |
| 22 | NaCl, 66.5 mM | Cremophor®, 10% | Ethanol, 10% | 6.00 | 6.19 | 6.03 | N | N | N | Y | Y |
| 23 | NaCl, 66.5 mM | Cremophor®, 4% | Ethanol, 10% | 7.00 | 7.30 | 7.00 | N | N | N | N | N |
| 24 | NaCl, 66.5 mM | Cremophor®, 10% | Ethanol, 10% | 7.00 | 7.51 | 7.13 | N | N | N | N | N |
| 25 | NaCl, 66.5 mM | Glycerin, 10% | — | 7.00 | 7.02 | 7.06 | N | N | N | Y | Y |
| 26 | NaCl, 66.5 mM | PG, 10% | — | 7.00 | 7.36 | 7.08 | Y | Y | Y | Y | Y |
| 27 | NaCl, 66.5 mM | DMA, 10% | — | 7.00 | 7.63 | 7.20 | Y | Y | Y | Y | Y |
| 28 | NaCl, 66.5 mM | NMP, 1% | — | 7.00 | 7.13 | 7.07 | N | N | N | N | N |
| 29 | NaCl, 66.5 mM | Albumin, 5% | — | 7.00 | 7.24 | 6.95 | N | N | N | Y | Y |

TABLE 1-continued

Precipitation status and pH of vehicles and formulations. All formulations except formulations # 30-32 were prepared with a Na phosphate buffer (100 nM).

| | | Formulation composition | | Target pH | Vehicle pH | Form. pH | Precipitation status[1] | | | | |
|---|---|---|---|---|---|---|---|---|---|---|---|
| # | Tonicifier | Excipient #1 | Excipient #2 | | | | init. | Day 1 | Day 2 | Day 7 | Day 12 |
| 30 | — | Cremophor®, 50% | Ethanol, 50% | N/A | N/A | N/A | Y | Y | Y | Y | Y |
| 31 | — | Cremophor®, 50% | Ethanol, 44%; DMA | N/A | N/A | N/A | Y | Y | Y | Y | Y |
| 32 | — | Cremophor®, 50% | Ethanol, 30%; polysorbate 80, 8%; Benzyl alcohol, 2% | N/A | N/A | N/A | Y | Y | Y | Y | Y |

[1] Formulations were prepared at ambient temperature and kept at ambient conditions until day 1 time point. On day 1, the hemolysis assay was carried out after which the samples were stored at 2-8° C.
[2] N: No precipitation observed.
[3] Y: Precipitation observed.
[4] N/A: Not applicable or not measured.

The vehicles were clear, colorless solutions. Precipitation was observed for vehicles #11 and #12, and vehicle #29 was a clear light yellow solution. Formulations #11 and #12 inherited precipitation from their vehicles. Formulations #18, #30, #31, and #32 were observed with precipitation on day 1 after preparation. Formulations were stored at 2-8° C. from day 2 onwards, and the appearance was monitored over 12 days.

Brincidofovir recovery: The brincidofovir formulations of Table 1 were analyzed with respect to c(BCV) on day 2 and day 7 after preparation. Formulations that showed initial precipitation were not tested on day 2. Formulations that showed precipitation up to day 7 were subjected to centrifugation and HPLC recovery analysis. The results are summarized in Table 2.

TABLE 2

HPLC recovery of brincidofovir formulations

| | | Formulation analysis (day 2) | | Supernatant analysis (day 7) | |
|---|---|---|---|---|---|
| Form. # | Target c(BCV) (mg/mL) | Observed c(BCV) (mg/mL) | Recovery (%) | Observed c(BCV) (mg/mL) | Recovery (%) |
| 1 | 6.4 | 8.01 | 125 | — | — |
| 2 | 6.4 | 8.06 | 126 | — | — |
| 3 | 6.4 | — | — | 1.15 | 18 |
| 4 | 6.4 | 7.20 | 112. | 1.17 | 18 |
| 5 | 6.4 | 7.41 | 116 | 7.18 | 112 |
| 6 | 6.4 | 11.25 | 176 | — | — |
| 7 | 6.4 | 8.70 | 136 | — | — |
| 8 | 6.4 | 8.15 | 127 | 0.94 | 15 |
| 9 | 6.4 | 8.43 | 132 | 6.89 | 108 |
| 10 | 6.4 | 7.96 | 124 | — | — |
| 11 | 6.4 | — | — | 0.52 | 8 |
| 12 | 6.4 | — | — | 8.30 | 130 |
| 13 | 6.4 | — | — | 0.88 | 14 |
| 14 | 6.4 | 9.78 | 153 | 1.41 | 22 |
| 15 | 6.4 | 10.12 | 158 | 4.58 | 72 |
| 16 | 6.4 | — | — | 0.52 | 8 |
| 17 | 6.4 | 8.53 | 133 | — | — |
| 18 | 6.4 | — | — | 2.22 | 35 |
| 19 | 6.4 | 9.11 | 142 | — | — |
| 20 | 6.4 | 7.66 | 120 | 1.85 | 29 |
| 21 | 6.4 | 7.79 | 122 | — | — |
| 22 | 6.4 | 8.11 | 127 | 3.74 | 58 |
| 23 | 6.4 | 8.33 | 130 | — | — |
| 24 | 6.4 | 8.15 | 127 | — | — |
| 25 | 6.4 | 8.67 | 136 | 0.57 | 9 |
| 26 | 6.4 | — | — | 1.14 | 18 |
| 27 | 6.4 | — | — | 0.60 | 9 |
| 28 | 6.4 | 7.93 | 124 | 0.73 | 11 |
| 29 | 6.4 | 9.56 | 149 | 3.44 | 54 |
| 30 | 6.4 | — | — | 0.70 | 11 |
| 31 | 6.4 | — | — | 0.72 | 11 |
| 32 | 6.4 | — | — | 1.12 | 18 |

Vehicle #11 and #12 were found to form precipitate upon preparation of the formulation (i.e. addition of brincidofovir). Formulations with a low pH formed precipitate in the presence of solubilizing excipients such as Cremophor®, PEG 300, polysorbate 80, and ethanol (formulation #1, #6, #18, and #22), while formulations with the same composition, but higher pH (formulation #2, #7, #19, and #24) maintained the ability to solubilize brincidofovir (Table 1). Purely organic formulations (formulation #30, #31, and #32) showed limited solubilizing ability toward brincidofovir.

The HPLC recovery data demonstrate that under storage condition (2-8° C.) and at c(BCV)=6.4 mg/mL, some formulations are not suited to continuously solubilize brincidofovir. Moreover, the data demonstrate that formulations with pH greater than or equal to about 8.0 can solubilize brincidofovir.

Further formulations (formulations #33-40 and #49-56) were prepared and tested for brincidofovir equilibrium solubility and filterability.

Formulation vehicles #33-40 and #49-56 were saturated with brincidofovir and rotated at ambient conditions. The recovery of brincidofovir in the sample supernatant was determined at different time points to establish when the solubility equilibrium was reached.

The saturated supernatants of the equilibrium solubility study were subjected to filterability assessment. For this, approximately 900 µL of the saturated solutions were filtered through a syringe filter (25 mm, 0.2 µm PES membrane). The ease of the filtration was recorded, the pH in the filtrate was measured, and the brincidofovir recovery was determined by HPLC analysis. In order to assess if sterile filtering introduces impurities, the HPLC chromatograms of the saturated formulation vehicles were qualitatively compared at the pre- and post-filtration stage and are shown. The composition of each of formulations #33-40 and #49-56, as well as their pH, c(BCV) at solubility equilibrium and ease of filtration are summarized in Table 3.

after 24 h. For the sample at pH=8 the observed brincidofovir concentration was 348 mg/mL after 24 h, and the equilibrium solubility was not reached with c(BCV)>270 mg/mL.

TABLE 3

Summary of brincidofovir solubility and filterability assessment. The buffer in all formulations was 100 mM Na phosphate.

| Form. # | Composition | | | Measured pH | | Volume filtered | Ease of filtration | Observed c(BCV) (mg/mL) | |
|---|---|---|---|---|---|---|---|---|---|
| | Tonicifier | Excipient | Target pH | Vehicle | BCV-saturated filtrate | (µL) | | At solubility equilibrium | Post-filtration |
| 33 | Dextrose, 68.8 mM | — | 8.0 | 8.1 | 6.9 | 900 | Easy | 27 | 27 |
| 34 | NaCl, 66.5 mM | Cremophor ®, 10% | 7.5 | 7.6 | 6.5 | 900 | Easy | 30 | 31 |
| 35 | NaCl, 66.5 mM | Cremophor ®, 5% | 7.5 | 7.6 | 6.6 | 900 | Easy | 27 | 29 |
| 36 | Dextrose, 68.8 mM | Cremophor ®, 5% | 7.5 | 7.6 | 6.7 | 900 | Easy | 26 | 26 |
| 37 | NaCl, 66.5 mM | Cremophor ®, 2% | 7.5 | 7.6 | 6.7 | 900 | Easy | 25 | 26 |
| 38 | NaCl, 66.5 mM | HPbCD, 4% | 7.5 | 7.6 | 6.8 | 600 | Easy | 19 | 16 |
| 39 | NaCl, 66.5 mM | SBEbCD, 7.5% | 7.5 | 7.6 | 6.3 | 200 | Easy | 4 | 4 |
| 40 | NaCl, 66.5 mM | — | 7.5 | 7.6 | 6.8 | 900 | Easy | 22 | 22 |
| 49 | Dextrose, 68.8 mM | — | 7.5 | 7.6 | 6.9 | 1000 | Easy | 25 | 24 |
| 50 | Dextrose, 68.8 mM | — | 7.5 | 7.6 | 6.9 | 1000 | Easy | 24 | 25 |
| 51 | Dextrose, 68.8 mM | — | 7.5 | 7.6 | 6.9 | 1000 | Easy | 27 | 25 |
| 52 | NaCl, 66.5 mM | — | 7.5 | 7.6 | 6.8 | 1000 | Easy | 29 | 27 |
| 53 | NaCl, 66.5 mM | — | 7.5 | 7.6 | 6.8 | 1000 | Easy | 27 | 27 |
| 54 | NaCl, 66.5 mM | — | 7.5 | 7.6 | 6.8 | 1000 | Easy | 24 | 29 |
| 55 | Dextrose, 68.8 mM | — | 8.0 | 8.0 | 6.9 | 1000 | Easy | 28 | 31 |
| 56 | Dextrose, 68.8 mM | — | 8.0 | 8.0 | 6.9 | 1000 | Easy | 29 | 30 |

The equilibrium solubility of brincidofovir in the tested formulations ranged from 4 to 30 mg/mL with an average solubility of c(BCV)=25 mg/mL within the range of apparent pH=6.3-6.9 (ambient temperature). In some embodiments, the relatively high brincidofovir concentrations observed in equilibrium solubility testing led to a significant shift of the vehicle pH. Filtration of the formulations saturated with brincidofovir through the selected syringe filters did not reveal any issues regarding the ease of filtration, loss of brincidofovir, or introduction of impurities.

Example 2—Brincidofovir Formulation Testing

A formulation vehicle comprising 100 mM phosphate and 69 mM dextrose (vehicle/Formulation #57), was prepared and tested further with respect to the a) equilibrium solubility, and b) filterability.

a) Brincidofovir Solubility Assessment

Two samples of vehicle #57, were saturated with brincidofovir. One sample vehicle was saturated with brincidofovir without further pH adjustment (leading to a formulation pH of 6.9) and the pH of the second sample was re-adjusted to pH=8.0 using a sodium hydroxide solution (1 N). The pH drifted towards lower pH values upon dissolution of brincidofovir which in return changed the brincidofovir solubility until an equilibrium was reached. Consequently, the pH had to be brought up close to the target pH before more brincidofovir was added. The concentration of brincidofovir at equilibrium solubility conditions was not reached for the pH adjusted sample. After supplementing the sample with approximately 300 mg/mL of additional brincidofovir solid, the addition of solid brincidofovir was stopped.

The recovery of brincidofovir (HPLC assay) in both sample solutions/supernatants was determined at equilibrium and after 24 h. At ambient temperature, the equilibrium solubility of brincidofovir in formulation 57 was c(BCV)=25 mg/mL at an apparent pH of pH=6.9 and 26 mg/mL b) Filterability Assessment The filterability of formulation #57 was tested at c(BCV)=20, 10, and 0.5 mg/mL. The testing solution at c(BCV)=20 mg/mL was adjusted to pH=8.0 using a NaOH-solution (1 N) and was applied as a stock solution to prepare the testing solutions at lower concentration by dilution with D5W. The testing solutions were filtered (5 mL filter pass) through a syringe filter (25 mm, 0.2 µm PES membrane). The ease of the filtration was observed and the pH as well as brincidofovir recovery (HPLC assay) were recorded at the pre- and post-filtration stage. No significant change in pH, loss of brincidofovir, or introduction of impurities was observed (Table 4).

TABLE 4

Filterability assessment of brincidofovir in the formulation 57 vehicle

| c(BCV) prepared to | Measured pH | | Observed c(BCV) (mg/mL) | |
|---|---|---|---|---|
| | Pre filtration | Post filtration | Pre filtration | Post filtration |
| 20 mg/mL | 8.0 | 8.0 | 23 | 26 |
| 10 mg/mL | 8.1 | 8.1 | 13 | 12 |
| 0.5 mg/mL | 8.0 | 8.1 | 0.8 | 0.9 |

Example 3—Formulation Studies and Assessments

A compounding process for preparation of brincidofovir formulations was developed and has been specified for the tonicifier (dextrose)-free formulation. For stability studies and testing, the following brincidofovir formulations were prepared on a scale of up to 0.5 L:
  10 mg/mL brincidofovir, 200 mM sodium phosphate, pH=8.0, 69 mM dextrose 15 mg/mL brincidofovir, 200 mM sodium phosphate, pH=8.0, 69 mM dextrose 10 mg/mL brincidofovir, 200 mM sodium phosphate, pH=8.0 (tonicifier-free)

Tonicifier-Containing Formulation (w/Dextrose)

A brincidofovir formulation containing dextrose as tonicifier was applied in stability study I as well as in the infusion vehicle compatibility assessment. The outline of the corresponding formulation preparation is as follows:

1. 500 mM (2.5×) monobasic sodium phosphate solution and 500 mM (2.5×) dibasic sodium phosphate solution were prepared by dissolving the corresponding sodium phosphate species in DI water using a volumetric flask.
2. The 500 mM (2.5×) monobasic and dibasic sodium phosphate solutions were mixed under pH-control to prepare a 500 mM (2.5×) sodium phosphate buffer solution at pH=8.0.
3. A vehicle stock solution of 400 mM (2×) sodium phosphate, 138 mM (2×) dextrose at pH=8.0 was prepared by dissolving solid dextrose in the 500 mM (2.5×) sodium phosphate solution at pH=8.0 and Q. S. with water.
4. Brincidofovir was dissolved in the vehicle stock solution (400 mM (2×) sodium phosphate, 138 mM (2×) dextrose solution, pH=8.0) at 2× of the desired final concentration using a volumetric flask. Under pH control a sodium hydroxide solution was added to adjust the solution to pH=8.0. DI water was used to Q. S. yielding a formulation of the desired brincidofovir concentration containing 200 mM (1×) sodium phosphate, 69 mM (1×) dextrose, pH=8.0.

Tonicifier Free Formulation (w/o Dextrose)

A brincidofovir formulation lacking dextrose was applied in stability study II, as well as in the adsorption assessment, and the majority of experiments associated with material compatibility assessments. The tonicifier-free formulation was prepared as follows:

1. A 400 mM (2×) monobasic sodium phosphate solution and a 400 mM (2×) dibasic sodium phosphate solution were prepared by dissolving the corresponding sodium phosphate species in water (volumetric flaks).
2. The 400 mM (2×) monobasic and dibasic sodium phosphate solutions were mixed under pH-control to prepare a 400 mM (2×) sodium phosphate buffer solution at pH=8.0 (vehicle solution).
3. Brincidofovir was dissolved in the vehicle solution (400 mM (2×) sodium phosphate solution at pH 8.0) at 2× of the final concentration using a 500 mL volumetric flask. A 1 N sodium hydroxide solution was added at a volume of $V_{NaOH}$ [mL]=1.65×$m_{BCV}$ [g]. Q. S. with DI water yielded the formulation at the desired brincidofovir concentration in 200 mM sodium phosphate buffer at pH=8.0.
4. For preparation of lower brincidofovir concentrations the prepared formulation was diluted with the corresponding vehicle to the desired strength.

Stability Study I: Brincidofovir Formulation Containing Tonicifier (Dextrose)

Design and setup: In this study, the chemical and physical stability of formulation 57 was evaluated. Testing of the chemical degradation was performed in an accelerated stability study setup applying heat as an accelerator/stressor. An Arrhenius analysis was carried out providing an API half-life and a degradation rate at lower temperatures. Physical stability was evaluated at the desired storage temperature (2-8° C.); a benchmark/reference condition was likewise included in the study. The setup of the study is specified below:

Testing Solutions:
10 mg/mL brincidofovir, 200 mM sodium phosphate, 69 mM dextrose, pH=8.0,
15 mg/mL brincidofovir, 200 mM sodium phosphate, 69 mM dextrose, pH=8.0,
Vehicle control 1: 200 mM sodium phosphate, 69 mM dextrose, pH=8.0 (only at 75° C.),
Vehicle control 2: 200 mM sodium phosphate, pH=8.0 (only at 75° C.).

Stability Station Temperatures:
Accelerated stability study: 50° C., 60° C., 65° C., 70° C., 75° C.,
Physical degradation and benchmark stability study: 2-8° C., 25° C.

Time Points:
Accelerated stability study: initial, 2, 6, 9, 14 days,
Physical degradation and benchmark stability study: initial, 14 and 28 days,
Vehicle control: initial, 1, 5, 8, and 14 days.

Tests:
Brincidofovir formulation: appearance, pH, c(BCV) recovery (HPLC), purity (HPLC), and liquid particle counting (physical degradation and benchmark stability study),
Vehicle control: appearance and pH.

The stability testing results (accelerated conditions), i.e., the changes of pH and trends of brincidofovir recovery over the course of the stability study are summarized in Table 8 and Table 9 for the formulations at 10 mg/mL and 15 mg/mL respectively. The accelerated stability study with strong biphasic rate trends did not allow for an Arrhenius analysis and calculation of a brincidofovir half-life or extrapolation to degradation rates at typical storage conditions. The test results on the vehicle controls in the accelerated stability study (75° C. station only) are summarized in Table 5.

TABLE 5

Accelerated stability study results of the 10 mg/mL brincidofovir formulation (Study I)

| Sample conditions | | | | | | |
|---|---|---|---|---|---|---|
| Station temp. (° C.) | Time point | Appearance[1] | Measured pH | Observed c(BCV)[2] (mg/mL) | BCV recovery[2,3] (%) | BCV purity (%) |
| 50 | 0 | Clear, Yellow (0) | 8.1 | 10.1 | 100 | 99 |
|  | 2 | Clear, Yellow (0) | 7.8 | 9.0 | 89 | 91 |
|  | 6 | Clear, Yellow (0) | 7.5 | 9.0 | 89 | 96 |
|  | 9 | Clear, Yellow (1) | 7.4 | 8.9 | 88 | 96 |
|  | 14 | Clear, Yellow (1) | 7.4 | 8.8 | 87 | 95 |
| 60 | 0 | Clear, Yellow (0) | 8.1 | 10.1 | 100 | 99 |
|  | 2 | Clear, Yellow (0) | 7.5 | 9.0 | 89 | 98 |
|  | 6 | Clear, Yellow (2) | 7.3 | 9.2 | 91 | 96 |
|  | 9 | Clear, Yellow (2) | 7.4 | 9.2 | 91 | 96 |
|  | 14 | Clear, Yellow (2) | 7.3 | 9.1 | 90 | 96 |

TABLE 5-continued

Accelerated stability study results of the 10 mg/mL brincidofovir formulation (Study I)

| Sample conditions | | | | | | |
|---|---|---|---|---|---|---|
| Station temp. (° C.) | Time point | Appearance[1] | Measured pH | Observed c(BCV)[2] (mg/mL) | BCV recovery[2,3] (%) | BCV purity (%) |
| 65 | 0 | Clear, Yellow (0) | 8.1 | 10.1 | 100 | 99 |
| | 2 | Clear, Yellow (1) | 7.5 | 9.5 | 94 | 99 |
| | 6 | Clear, Yellow (3) | 7.3 | 9.4 | 93 | 97 |
| | 9 | Clear, Yellow (3) | 7.3 | 9.3 | 92 | 96 |
| | 14 | Clear, Yellow (4) | 7.2 | 9.0 | 89 | 95 |
| 70 | 0 | Clear, Yellow (0) | 8.1 | 10.1 | 100 | 99 |
| | 2 | Clear, Yellow (4) | 7.4 | 9.3 | 92 | 97 |
| | 6 | Clear, Yellow (5) | 7.2 | 9.3 | 92 | 96 |
| | 9 | Clear, Yellow (6) | 7.1 | 9.2 | 91 | 95 |
| | 14 | Clear, Yellow (7) | 7.0 | 8.7 | 86 | 93 |
| 75 | 0 | Clear, Yellow (0) | 8.1 | 10.1 | 100 | 99 |
| | 2 | Clear, Yellow (6) | 7.3 | 9.4 | 93 | 98 |
| | 6 | Clear, Yellow (8) | 6.9 | 9.1 | 90 | 93 |
| | 9 | Clear, Yellow (8) | 6.9 | 8.7 | 86 | 90 |
| | 14 | Clear, Yellow (9) | 6.8 | 7.9 | 78 | 84 |

[1]The yellow color of the solution was expressed on a scale of 0 to 10: 0, colorless; 5, mustard; 10, amber.
[2]Average value of three (3) replicates.
[3]BCV recovery = $c(BCV)_{Day\ n}/c(BCV)_{Day\ 0} \times 100\%$.

TABLE 6

Accelerated stability study results of the 15 mg/mL brincidofovir formulation (Study I)

| Sample conditions | | | | | | |
|---|---|---|---|---|---|---|
| Station temp. (° C.) | Time point (day) | Appearance[1] | Measured pH | Observed c(BCV)[2] (mg/mL) | BCV recovery[2,3] (%) | BCV purity (%) |
| 50 | 0 | Clear, Yellow (0) | 8.1 | 15.0 | 100 | 99 |
| | 2 | Clear, Yellow (0) | 7.8 | 13.6 | 90 | 98 |
| | 6 | Clear, Yellow (0) | 7.5 | 13.6 | 90 | 97 |
| | 9 | Clear, Yellow (2) | 7.5 | 13.3 | 88 | 98 |
| | 14 | Clear, Yellow (2) | 7.4 | 13.7 | 91 | 97 |
| 60 | 0 | Clear, Yellow (0) | 8.1 | 15.0 | 100 | 99 |
| | 2 | Clear, Yellow (0) | 7.6 | 13.8 | 92 | 98 |
| | 6 | Clear, Yellow (2) | 7.3 | 13.8 | 92 | 97 |
| | 9 | Clear, Yellow (2) | 7.4 | 13.7 | 91 | 97 |
| | 14 | Clear, Yellow (3) | 7.3 | 13.8 | 92 | 96 |
| 65 | 0 | Clear, Yellow (0) | 8.1 | 15.0 | 100 | 99 |
| | 2 | Clear, Yellow (1) | 7.5 | 14.0 | 93 | 99 |
| | 6 | Clear, Yellow (3) | 7.3 | 14.0 | 93 | 97 |
| | 9 | Clear, Yellow (4) | 7.3 | 13.8 | 92 | 96 |
| | 14 | Clear, Yellow (5) | 7.2 | 13.1 | 87 | 95 |
| 70 | 0 | Clear, Yellow (0) | 8.1 | 15.0 | 100 | 99 |
| | 2 | Clear, Yellow (3) | 7.4 | 13.9 | 93 | 98 |
| | 6 | Clear, Yellow (5) | 7.2 | 13.9 | 92 | 96 |
| | 9 | Clear, Yellow (5) | 7.2 | 13.8 | 91 | 95 |
| | 14 | Clear, Yellow (7) | 7.1 | 13.1 | 87 | 93 |
| 75 | 0 | Clear, Yellow (0) | 8.1 | 15.0 | 100 | 99 |
| | 2 | Clear, Yellow (5) | 7.3 | 14.1 | 94 | 98 |
| | 6 | Clear, Yellow (8) | 6.9 | 13.7 | 90 | 92 |
| | 9 | Clear, Yellow (9) | 6.9 | 12.9 | 86 | 89 |
| | 14 | Clear, Yellow (10) | 6.7 | 11.7 | 78 | 83 |

[1]The yellow color of the solution was expressed on a scale of 0 to 10: 0, colorless; 5, mustard; 10, amber.
[2]Average value of three (3) replicates.
[3]BCV recovery = c(BCV)Day n/c(BCV)Day 0 × 100%. It was defined as 100% at the initial time point.

TABLE 7

Accelerated stability study: Results of vehicle controls (Study I)

| Sample | Sample conditions | | Appearance[1] | Measured pH |
|---|---|---|---|---|
| | Station temp. (° C.) | Time point (day) | | |
| Vehicle control 1 (dextrose-added) | 75 | 0 | Clear, Yellow (0) | 8.1 |
| | | 1 | Clear, Yellow (5) | 7.3 |
| | | 5 | Clear, Yellow (6) | 7.1 |
| | | 8 | Clear, Yellow (7) | 6.9 |
| | | 14 | Clear, Yellow (9) | 6.9 |
| Vehicle control 2 (dextrose-free) | 75 | 0 | Clear, Yellow (0) | 8.1 |
| | | 1 | Clear, Yellow (0) | 8.0 |
| | | 5 | Clear, Yellow (0) | 8.0 |
| | | 8 | Clear, Yellow (0) | 8.0 |
| | | 14 | Clear, Yellow (0) | 8.0 |

[1]The yellow color of the solution was expressed on a scale of 0 to 10: 0, colorless; 5, mustard; 10, amber.

The study showed degradation of brincidofovir of 16% (50° C.) to 22% (75° C.) over the course of two weeks. While some loss in brincidofovir recovery (assay loss) was observed, the purity of brincidofovir remained at 95% and 93% respectively for temperatures up to 70° C. At the 75° C. station, up to 16% impurities were observed at both starting concentrations. Degradation at higher temperatures was accompanied by a strong pH shift towards lower pH values and coloration of the solutions. The pH shifts and the degradation rates were higher for the initial time point, and after 2 days the degradation and pH shifting slowed down significantly (bi-phasic trends not following a first-order decomposition).

Physical Degradation and Benchmark Stability Study

The results of the physical/benchmark stability for both tested formulations are summarized in Table 11 and Table 12, respectively. The purities of the formulations at different temperatures were determined by comparing chromatograms obtained at different temperatures and time points during the study. Degradation between 6% (2-8° C.) and 8% (25° C.) was observed over one month while the purity of brincidofovir stagnated at 99% indicating a brincidofovir mass deficit.

TABLE 8

Physical degradation and benchmark stability study results of the 10 mg/mL brincidofovir formulation (Study I)

| Sample conditions | | | | | | |
|---|---|---|---|---|---|---|
| Station temp. (° C.) | Time point (day) | Appearance | Measured pH | Observed c(BCV)[1] (mg/mL) | BCV recovery[1,3] (%) | BCV purity[2] (%) |
| 2-8 | 0 | Clear, Colorless | 8.1 | 10.1 | 100 | 99 |
| | 14 | Clear, Colorless | 8.0 | 9.6 | 95 | 100 |
| | 28 | Clear, Colorless | 8.1 | 9.5 | 94 | 99 |
| 25 | 0 | Clear, Colorless | 8.1 | 10.1 | 100 | 99 |
| | 14 | Clear, Colorless | 7.9 | 9.3 | 92 | 99 |
| | 28 | Clear, Colorless | 8.0 | 9.3 | 92 | 99 |

[1]Average value of three (3) replicates.
[2]Integration region: 2.00-13.00 min.
[3]BCV recovery = c(BCV)Day n/c(BCV)Day 0 × 100%. It was defined as 100% at the initial time point.

TABLE 9

Physical degradation and benchmark stability study results of the 15 mg/mL brincidofovir formulation (Study I)

| Sample conditions | | | | | | |
|---|---|---|---|---|---|---|
| Station temp. (° C.) | Time point (day) | Appearance | Measured pH | Observed c(BCV)[1] (mg/mL) | BCV recovery[1,3] (%) | BCV purity[2] (%) |
| 2-8 | 0 | Clear, Colorless | 8.1 | 15.0 | 100 | 99 |
| | 14 | Clear, Colorless | 8.0 | 14.3 | 95 | 100 |
| | 28 | Clear, Colorless | 8.1 | 14.6 | 97 | 100 |
| 25 | 0 | Clear, Colorless | 8.1 | 15.0 | 100 | 99 |
| | 14 | Clear, Colorless | 7.9 | 13.8 | 92 | 99 |
| | 28 | Clear, Colorless | 8.0 | 13.9 | 93 | 99 |

[1]Average value of three (3) replicates.
[2]Integration region: 2.00-13.00 min.
[3]$BCV_{recovery} = c(BCV)_{Day n}/c(BCV)_{Day 0} \times 100\%$. It was defined as 100% at the initial time point.

Light obstruction measurement: To prepare samples for liquid particle counting, under best clean conditions the formulation samples from six serum vials (1.0 mL filling) were carefully combined (avoiding foaming) into a particle-free centrifuge tube. The tube was then capped and sonicated for 1 min before the sample was subjected to liquid particle counting. Four sample strokes of 1 mL were analyzed. The drawing rate of the liquid particle counter was 10 mL/min. No significant increase in particulate matter was observed over the course of the study. The test results of the test are summarized in Table 10.

TABLE 10

Liquid particle counting results of the 10 and 15 mg/mL brincidofovir formulations (Study I)

| | | Stability station temperature (° C.) | | | |
|---|---|---|---|---|---|
| | | 2-8 | | 25 | |
| Formulation | Time point (day) | 10 µm particle count | 25 µm particle count | 10 µm particle count | 25 µm particle count |
| 10 mg/mL brincidofovir formulation | 0 | 1 | 0 | 1 | 0 |
| | 14 | 11 | 1 | 7 | 0 |
| | 28 | 4 | 0 | 5 | 0 |
| 15 mg/mL brincidofovir formulation | 0 | 0 | 0 | 0 | 0 |
| | 14 | 7 | 1 | 4 | 0 |
| | 28 | 3 | 1 | 3 | 0 |

Stability Study II: Brincidofovir Formulation without Tonicifier (Dextrose)

Design and Setup: The stability study I, designed to evaluate the chemical and physical degradation properties of the liquid brincidofovir formulation was repeated without the presence of dextrose. A color change of the solution (potential Maillard browning) and a pH-shift could be correlated with the presence of dextrose that consequently might have influenced the degradation routes and impaired the observed rates for brincidofovir degradation. The study setup for this repeated analysis was modified with regard to the tested formulation as well as stability station parameters. The exact parameters are specified below:

Testing Solutions:

15 mg/mL brincidofovir, 200 mM sodium phosphate, pH=8.0,

Vehicle control 1: 200 mM sodium phosphate, pH=8.0.

Stability Station Temperatures:

Accelerated stability study: 50° C., 60° C., 70° C., and 75° C.

Physical degradation and benchmark stability study: 2-8° C. and 25° C.

Time Points:

Accelerated stability study: initial, 3, 6, 10, 14 days,

Physical degradation and benchmark stability study: initial, 14 and 28 days.

Tests:

Brincidofovir formulation: appearance, pH, c(BCV) recovery (HPLC), purity (HPLC), and liquid particle counting (physical degradation and benchmark stability study samples only), Vehicle control: appearance, pH, and liquid particle counting (physical degradation and benchmark stability study samples only).

Results: The stability testing results on brincidofovir recovery and purity of the tested formulation and the vehicle control are summarized in Table 11 and Table 12, respectively.

TABLE 11

Accelerated stability study results of the 15 mg/mL brincidofovir formulation (Study II)

| Sample conditions | | | | | | |
|---|---|---|---|---|---|---|
| Station temp. (° C.) | Time point (day) | Appearance | Measured pH | Observed c(BCV)[a] (mg/mL) | BCV recovery[a,b] (%) | BCV purity (%) |
| 50 | 0 | Clear, Colorless | 8.0 | 15.4 | 100 | 99 |
|  | 3 | Clear, Colorless | 8.0 | 15.0 | 98 | 98 |
|  | 6 | Clear, Colorless | 8.0 | 14.6 | 95 | 98 |
|  | 10 | Clear, Colorless | 8.0 | 14.6 | 95 | 97 |
|  | 14 | Clear, Colorless | 7.9 | 14.2 | 92 | 97 |
| 60 | 0 | Clear, Colorless | 8.0 | 15.4 | 100 | 99 |
|  | 3 | Clear, Colorless | 7.9 | 14.8 | 96 | 98 |
|  | 6 | Clear, Colorless | 8.0 | 14.2 | 92 | 96 |
|  | 10 | Clear, Colorless | 8.0 | 14.3 | 93 | 95 |
|  | 14[c] | — | — | — | — | — |
| 70 | 0 | Clear, Colorless | 8.0 | 15.4 | 100 | 99 |
|  | 3 | Clear, Colorless | 7.9 | 14.6 | 95 | 96 |
|  | 6 | Clear, Colorless | 7.9 | 13.8 | 90 | 94 |
|  | 10 | Clear, Colorless | 7.9 | 14.0 | 91 | 92 |
|  | 14 | Clear, Colorless | 7.9 | 13.2 | 86 | 90 |
| 75 | 0 | Clear, Colorless | 8.0 | 15.4 | 100 | 99 |
|  | 3 | Clear, Colorless | 7.9 | 14.3 | 93 | 95 |
|  | 6 | Clear, Colorless | 7.9 | 13.4 | 87 | 93 |
|  | 10 | Clear, Colorless | 7.9 | 13.3 | 86 | 90 |
|  | 14 | Clear, Colorless | 7.9 | 12.9 | 84 | 88 |

[a]Average value of three (3) replicates.
[b]Integration region: 0.00-13.00 min.
[c]Data of this time point were compromised due to oven malfunction, thus not included in the following graphic representations or calculations

TABLE 12

Accelerated stability study results of the vehicle control (Study II)

| Sample conditions | | | |
|---|---|---|---|
| Station temp. (° C.) | Time point (day) | Appearance | Measured pH |
| n.a.[a] | 0 | Clear, colorless | 8.0 |
| 50 | 3 | Clear, colorless | 8.0 |
|  | 6 | Clear, colorless | 8.1 |
|  | 10 | Clear, colorless | 8.0 |
|  | 14 | Clear, colorless | 8.0 |
| 60 | 3 | Clear, colorless | 8.0 |
|  | 6 | Clear, colorless | 8.0 |
|  | 10 | Clear, colorless | 8.0 |
|  | 14[b] | — | — |
| 70 | 3 | Clear, colorless | 8.0 |
|  | 6 | Clear, colorless | 8.1 |
|  | 10 | Clear, colorless | 8.0 |
|  | 14 | Clear, colorless | 8.1 |
| 75 | 3 | Clear, colorless | 8.0 |
|  | 6 | Clear, colorless | 8.0 |
|  | 10 | Clear, colorless | 8.0 |
|  | 14 | Clear, colorless | 8.0 |

[a]Not applicable.
[b]Data of this time point were compromised due to oven malfunction, thus not included in the following graphic representations.

It is noted that the values for brincidofovir recovery and purity do not align. This is at least partially attributed to the fact that the injection peak area of the chromatographic trace (0.00-2.1 min) was not integrated, which would could overestimate the purity value, since the non-integrated retention time area likely accommodates known degradants. Additionally, a baseline separation between brincidofovir and its deamination product could not be achieved with the existing method, which might affect recovery values (degradation) and purity values.

The obtained recovery data were applied to determine the degradation rate at the different temperatures via an Arrhenius analysis, i.e., by logarithmically plotting the brincidofovir recovery as a function of time, and determining the rate constant through a linear fit. The half-life for the dextrose-free 15 mg/mL brincidofovir formulation was so determined to 729 days and 295 days at stability station temperatures of 5° C. and 25° C. respectively. The Arrhenius analysis is illustrated in FIG. 2.

Physical Degradation and Benchmark Stability Study

The results of the physical/benchmark stability for the studied formulation and the vehicle control are summarized in Table 13 and Table 14, respectively.

TABLE 13

Physical degradation and benchmark stability study results of the 15 mg/mL brincidofovir formulation (Study II)

| Sample | | | | | | |
|---|---|---|---|---|---|---|
| Station temp. (° C.) | Time point (day) | Appearance | Measured pH | Observed c(BCV)[1] (mg/mL) | BCV recovery[1,3] (%) | BCV purity (%) |
| 2-8 | 0 | Clear, Colorless | 8.0 | 15.4 | 100 | 99 |
|  | 14 | Clear, Colorless | 8.0 | 14.9 | 97 | 100 |
|  | 28 | Clear, Colorless | 8.1 | 15.2 | 99 | 99 |
| 25 | 0 | Clear, Colorless | 8.0 | 15.4 | 100 | 99 |
|  | 14 | Clear, Colorless | 8.0 | 14.9 | 97 | 99 |
|  | 28 | Clear, Colorless | 8.0 | 15.2 | 99 | 99 |

[1]Average value of three (3) replicates.
[3]BCV recovery = c(BCV)$_{Daym}$/c(BCV)$_{Day0}$ × 100%. It was defined as 100% at the initial time point.

TABLE 14

Physical degradation and benchmark stability study
results of the vehicle control (Study II)

| Sample conditions | | | |
|---|---|---|---|
| Station temp. (° C.) | time point (day) | Appearance | Measured pH |
| n.a.[1] | 0 | Clear, colorless | 8.0 |
| 2-8 | 14 | Clear, colorless | 8.1 |
|  | 28 | Clear, colorless | 8.1 |
| 25 | 14 | Clear, colorless | 8.1 |
|  | 28 | Clear, colorless | 8.0 |

[1]Not applicable.

For the analyzes of particulate matter, the formulation sample from one serum vial (5.0 mL filling) was sonicated for 1 min before decrimping of the vial. The tonicifier-free sample was subjected to liquid particle counting as described above for the tonicifier containing formulations. The Results of the analysis are summarized in Table 15.

TABLE 15

Liquid particle counting results of the tonicifier-free 15 mg/mL
brincidofovir formulation and vehicle control (Study II)

| | | Stability station temperature (° C.) | | | |
|---|---|---|---|---|---|
| | | 2-8 | | 25 | |
| Solution | Time point (day) | 10 µm particle count | 25 µm particle count | 10 µm particle count | 25 µm particle count |
| 15 mg/mL brincidofovir formulation | 0 | 0 | 0 | 0 | 0 |
|  | 14 | 80 | 2 | 45 | 0 |
|  | 28 | 87 | 0 | 4 | 0 |
| Vehicle control | 0 | 0 | 0 | 0 | 0 |
|  | 14 | 0 | 0 | 0 | 0 |
|  | 28 | 0 | 0 | 0 | 0 |

The degradation of brincidofovir in the tonicifier-free formulation at storage conditions (2-8° C. and 25° C.) is negligible over the course of one month. The nominal degradation of 1% is within the error of brincidofovir quantification; a mass deficit or particulate matter were not observed.

Assessment of Brincidofovir Adsorption to Vials and Stoppers

Design and setup: An adsorption assessment on brincidofovir was performed to test for adsorption of brincidofovir to vials and/or stoppers. For this, different storage conditions that might have an impact (e.g. vial orientation) were assessed. Solutions of brincidofovir were studied at the formulation strength (10 mg/mL) and at a low concentration (0.2 mg/mL).

To test for adsorption, a treatment with an organic solvent (methanol) that is suited to re-solubilize adsorbed material was implemented at the different time points and compared to treatment with water or untreated samples. An observation of higher brincidofovir concentration in the samples containing methanol (after normalization for dilution) would have been indicative of an adsorption effect. Differences of an imposed volume contraction between the applied solvents are not considered. The study was conducted using solutions of 10 mg/mL and 0.2 mg/mL of brincidofovir in 200 mM sodium phosphate (pH=8.0), at temperatures of 2-8° C. and 25° C. Appearance, pH, brincidofovir recovery (HPLC), and purity (HPLC) of the solutions were tested initially and after 1, 2, and 7 days. Some samples were further treated by addition of methanol (1.0 mL) or water (1.0 mL). The results of the study are summarized in Table 16 and Table 17.

TABLE 16

Test results of the 10 mg/mL brincidofovir formulation in adsorption assessment

| Sample conditions | | | | | | | | |
|---|---|---|---|---|---|---|---|---|
| Station temp. (° C.) | Vial orientation | Treatment | Time point (day) | Appearance | Measured pH | Observed c(BCV)[a] (mg/mL) | BCV Recovery[a,b] (%) | BCV purity[a] (%) |
| 2-8 | Upright | No treatment | 0 | Clear, Colorless | 8.0 | 10.5 | 100.00 | 99.80 |
|  |  |  | 1 | Clear, Colorless | 8.0 | 10.5 | 100.36 | 99.55 |
|  |  |  | 2 | Clear, Colorless | 8.0 | 10.5 | 99.57 | 99.67 |
|  |  |  | 7 | Clear, Colorless | 8.0 | 10.6 | 99.93 | 99.61 |
|  |  | Add methanol | 0 | Clear, Colorless | 8.3 | 10.4 | 100.00 | 99.90 |
|  |  |  | 1 | Clear, Colorless | 8.4 | 10.2 | 98.10 | 99.52 |
|  |  |  | 2 | Clear, Colorless | 8.4 | 10.3 | 98.90 | 99.73 |
|  |  |  | 7 | Clear, Colorless | 8.4 | 10.5 | 100.41 | 99.43 |
|  |  | Add water | 0 | Clear, Colorless | 8.1 | 10.5 | 100.00 | 99.32 |
|  |  |  | 1 | Clear, Colorless | 8.1 | 10.3 | 98.56 | 99.72 |
|  |  |  | 2 | Clear, Colorless | 8.0 | 10.6 | 101.14 | 99.47 |
|  |  |  | 7 | Clear, Colorless | 8.1 | 10.6 | 100.68 | 99.61 |
|  | Inverted | No treatment | 0[c] | Clear, Colorless | 8.0 | 10.5 | 100.00 | 99.80 |
|  |  |  | 1 | Clear, Colorless | 8.1 | 10.5 | 100.11 | 99.74 |
|  |  |  | 2 | Clear, Colorless | 8.0 | 10.4 | 99.18 | 99.78 |
|  |  |  | 7 | Clear, Colorless | 8.0 | 10.5 | 99.41 | 99.77 |
|  |  | Add methanol | 0[c] | Clear, Colorless | 8.3 | 10.4 | 100.00 | 99.90 |
|  |  |  | 1 | Clear, Colorless | 8.4 | 10.6 | 102.34 | 99.46 |
|  |  |  | 2 | Clear, Colorless | 8.4 | 10.7 | 103.30 | 99.64 |
|  |  |  | 7 | Clear, Colorless | 8.4 | 10.7 | 102.56 | 99.44 |
|  |  | Add water | 0[c] | Clear, Colorless | 8.1 | 10.5 | 100.00 | 99.32 |
|  |  |  | 1 | Clear, Colorless | 8.1 | 10.4 | 99.50 | 99.46 |
|  |  |  | 2 | Clear, Colorless | 8.0 | 10.4 | 99.53 | 99.47 |
|  |  |  | 7 | Clear, Colorless | 8.0 | 10.6 | 100.21 | 99.54 |

TABLE 16-continued

Test results of the 10 mg/mL brincidofovir formulation in adsorption assessment

| Station temp. (° C.) | Vial orientation | Treatment | Time point (day) | Appearance | Measured pH | Observed c(BCV)$^a$ (mg/mL) | BCV Recovery$^{a,b}$ (%) | BCV purity (%) |
|---|---|---|---|---|---|---|---|---|
| 25 | Upright | No treatment | 0 | Clear, Colorless | 8.0 | 10.5 | 100.00 | 99.80 |
| | | | 1 | Clear, Colorless | 8.1 | 10.5 | 99.78 | 99.47 |
| | | | 2 | Clear, Colorless | 8.0 | 10.4 | 99.02 | 99.66 |
| | | | 7 | Clear, Colorless | 8.0 | 10.4 | 98.72 | 99.73 |
| | | Add methanol | 0 | Clear, Colorless | 8.3 | 10.4 | 100.00 | 99.90 |
| | | | 1 | Clear, Colorless | 8.4 | 10.6 | 101.66 | 99.57 |
| | | | 2 | Clear, Colorless | 8.3 | 10.3 | 98.83 | 99.61 |
| | | | 7 | Clear, Colorless | 8.4 | 10.5 | 100.52 | 99.74 |
| | | Add water | 0 | Clear, Colorless | 8.1 | 10.5 | 100.00 | 99.32 |
| | | | 1 | Clear, Colorless | 8.1 | 10.6 | 101.21 | 99.61 |
| | | | 2 | Clear, Colorless | 8.1 | 10.6 | 101.00 | 99.76 |
| | | | 7 | Clear, Colorless | 8.1 | 10.6 | 100.13 | 99.70 |
| | Inverted | No treatment | 0$^c$ | Clear, Colorless | 8.0 | 10.5 | 100.00 | 99.80 |
| | | | 1 | Clear, Colorless | 8.1 | 10.6 | 101.40 | 99.57 |
| | | | 2 | Clear, Colorless | 8.0 | 10.6 | 101.08 | 99.82 |
| | | | 7 | Clear, Colorless | 8.0 | 10.5 | 99.22 | 99.60 |
| | | Add methanol | 0$^c$ | Clear, Colorless | 8.3 | 10.4 | 100.00 | 99.90 |
| | | | 1 | Clear, Colorless | 8.4 | 10.7 | 102.92 | 99.60 |
| | | | 2 | Clear, Colorless | 8.4 | 10.6 | 101.97 | 99.61 |
| | | | 7 | Clear, Colorless | 8.4 | 10.5 | 100.47 | 99.81 |
| | | Add water | 0$^c$ | Clear, Colorless | 8.1 | 10.5 | 100.00 | 99.32 |
| | | | 1 | Clear, Colorless | 8.0 | 10.5 | 100.55 | 99.47 |
| | | | 2 | Clear, Colorless | 8.0 | 10.5 | 100.56 | 99.63 |
| | | | 7 | Clear, Colorless | 8.0 | 10.5 | 99.92 | 99.68 |

$^1$Average value of the three (3) replicates of samples that received treatment.
$^2$BCV recovery = c(BCV)$_{Day\ n}$/c(BCV)$_{Day\ 0}$ × 100%. It was defined as 100% at the initial time point. BCV recovery was defined as 100.00% on the initial time point for samples with and without treatment.
$^3$Not applicable for samples without treatment.
$^4$The sample for the initial time point was not subjected to any conditions.

TABLE 17

Test results of the 0.2 mg/mL brincidofovir formulation in adsorption assessment

| Station temp. (° C.) | Vial orientation | Treatment | Time point (day) | Appearance | Measured pH | Observed c(BCV)$^a$ (mg/mL) | BCV Recovery$^{a,b}$ (%) | BCV purity (%) |
|---|---|---|---|---|---|---|---|---|
| 2-8 | Upright | No treatment | 0 | Clear, Colorless | 8.0 | 0.19 | 100.00 | 99.37 |
| | | | 1 | Clear, Colorless | 8.1 | 0.19 | 100.23 | 99.37 |
| | | | 2 | Clear, Colorless | 8.1 | 0.19 | 100.01 | 99.45 |
| | | | 7 | Clear, Colorless | 8.1 | 0.20 | 100.26 | 99.52 |
| | | Add methanol | 0 | Clear, Colorless | 8.3 | 0.20 | 100.00 | 99.28 |
| | | | 1 | Clear, Colorless | 8.4 | 0.20 | 100.91 | 99.45 |
| | | | 2 | Clear, Colorless | 8.4 | 0.20 | 100.79 | 99.55 |
| | | | 7 | Clear, Colorless | 8.4 | 0.20 | 101.74 | 99.57 |
| | | Add water | 0 | Clear, Colorless | 8.0 | 0.19 | 100.00 | 99.48 |
| | | | 1 | Clear, Colorless | 8.1 | 0.20 | 100.38 | 99.27 |
| | | | 2 | Clear, Colorless | 8.1 | 0.20 | 100.78 | 99.35 |
| | | | 7 | Clear, Colorless | 8.1 | 0.20 | 100.30 | 99.37 |
| | Inverted | No treatment | 0$^c$ | Clear, Colorless | 8.0 | 0.19 | 100.00 | 99.37 |
| | | | 1 | Clear, Colorless | 8.1 | 0.19 | 99.21 | 99.38 |
| | | | 2 | Clear, Colorless | 8.1 | 0.19 | 99.68 | 99.50 |
| | | | 7 | Clear, Colorless | 8.0 | 0.19 | 99.61 | 99.66 |
| | | Add methanol | 0$^c$ | Clear, Colorless | 8.3 | 0.20 | 100.00 | 99.28 |
| | | | 1 | Clear, Colorless | 8.5 | 0.20 | 100.09 | 99.51 |
| | | | 2 | Clear, Colorless | 8.4 | 0.20 | 100.17 | 99.54 |
| | | | 7 | Clear, Colorless | 8.4 | 0.20 | 100.04 | 99.66 |
| | | Add water | 0$^c$ | Clear, Colorless | 8.0 | 0.19 | 100.00 | 99.48 |
| | | | 1 | Clear, Colorless | 8.1 | 0.19 | 99.81 | 99.30 |
| | | | 2 | Clear, Colorless | 8.0 | 0.19 | 99.67 | 99.42 |
| | | | 7 | Clear, Colorless | 8.1 | 0.19 | 99.27 | 99.62 |
| 25 | Upright | No treatment | 0 | Clear, Colorless | 8.0 | 0.19 | 100.00 | 99.37 |
| | | | 1 | Clear, Colorless | 8.1 | 0.19 | 100.18 | 99.46 |
| | | | 2 | Clear, Colorless | 8.0 | 0.19 | 100.12 | 99.27 |
| | | | 7 | Clear, Colorless | 8.1 | 0.19 | 99.92 | 99.42 |
| | | Add methanol | 0 | Clear, Colorless | 8.3 | 0.20 | 100.00 | 99.28 |
| | | | 1 | Clear, Colorless | 8.4 | 0.20 | 101.00 | 99.54 |

TABLE 17-continued

Test results of the 0.2 mg/mL brincidofovir formulation in adsorption assessment

| Sample conditions | | | | | | | | |
|---|---|---|---|---|---|---|---|---|
| Station temp. (° C.) | Vial orientation | Treatment | Time point (day) | Appearance | Measured pH | Observed c(BCV)[a] (mg/mL) | BCV Recovery[a,b] (%) | BCV purity (%) |
| | | | 2 | Clear, Colorless | 8.4 | 0.20 | 101.25 | 99.45 |
| | | | 7 | Clear, Colorless | 8.4 | 0.20 | 101.87 | 99.53 |
| | | Add water | 0 | Clear, Colorless | 8.0 | 0.19 | 100.00 | 99.48 |
| | | | 1 | Clear, Colorless | 8.1 | 0.20 | 100.60 | 99.54 |
| | | | 2 | Clear, Colorless | 8.1 | 0.20 | 100.22 | 99.31 |
| | | | 7 | Clear, Colorless | 8.1 | 0.20 | 100.45 | 99.44 |
| | Inverted | No treatment | 0[c] | Clear, Colorless | 8.0 | 0.19 | 100.00 | 99.37 |
| | | | 1 | Clear, Colorless | 8.1 | 0.19 | 99.38 | 99.45 |
| | | | 2 | Clear, Colorless | 8.1 | 0.19 | 98.91 | 99.55 |
| | | | 7 | Clear, Colorless | 8.1 | 0.19 | 98.96 | 99.62 |
| | | Add methanol | 0[c] | Clear, Colorless | 8.3 | 0.20 | 100.00 | 99.28 |
| | | | 1 | Clear, Colorless | 8.5 | 0.20 | 100.25 | 99.62 |
| | | | 2 | Clear, Colorless | 8.4 | 0.20 | 99.70 | 99.39 |
| | | | 7 | Clear, Colorless | 8.4 | 0.20 | 99.76 | 99.52 |
| | | Add water | 0[c] | Clear, Colorless | 8.0 | 0.19 | 100.00 | 99.48 |
| | | | 1 | Clear, Colorless | 8.1 | 0.19 | 99.28 | 99.37 |
| | | | 2 | Clear, Colorless | 8.1 | 0.19 | 99.31 | 99.43 |
| | | | 7 | Clear, Colorless | 8.1 | 0.19 | 98.99 | 99.53 |

[a]Average value of the three (3) replicates of samples that received treatment.
[b]BCV recovery = c(BCV)$_{Day\ n}$/c(BCV)$_{Day\ 0}$ × 100%. It was defined as 100% at the initial time point. BCV recovery was defined as 100.00% on the initial time point for samples with and without treatment.
[c]The sample for the initial time point was not subjected to any conditions.

A comparison of differently treated samples did not reveal any evidence for an adsorption phenomenon; no significant differences in the studied parameters, i.e., no significant change in appearance or purity and no significant loss of brincidofovir, were observed. The observed mass deficits were within the range of the sample preparation errors as expressed by the standard deviation of replicate preparations.

Formulation Compatibility Assessments

An array of materials was tested for compatibility with the formulation. This includes testing materials from the manufacturing stage, pre-clinical toxicology as well as clinical tests. The applied compatibility tests evaluate 1) a potential loss of brincidofovir by adsorption or precipitation (appearance, brincidofovir recovery by HPLC) and 2) a shift in pH that could compromise stability. Materials that were tested include the infusion vehicle, filters for sterilization, product vials and stoppers, infusion systems for testing animals (rats) and infusion bags and IV systems for clinical applications.

A brincidofovir formulation comprising 10 mg/mL brincidofovir, 200 mM sodium phosphate, and 69 mM dextrose (pH=8.0) was diluted with the testing infusion vehicle (5% dextrose solution) to yield c(BCV)=0.5 and 1.0 mg/mL solutions. The diluted solutions were stored at ambient conditions, and samples were collected at initially at the beginning of the experiment, and after 2 h, 8 h, and 24 h and evaluated for appearance, pH, and recovery of c(BCV) (via HPLC). No significant changes in appearance, pH, or c(BCV) were observed for the tested solutions over 24 hours at ambient conditions. Detailed results of the study are summarized below (Table 18).

TABLE 18

Results of infusion vehicle compatibility assessment

| c(BCV) in infusion vehicle (mg/mL) | Time point (h) | Appearance | Measured pH | Observed c(BCV)[a] (mg/mL) | BCV Recovery[a,b] (%) |
|---|---|---|---|---|---|
| 0.5 | 0 | Clear, colorless | 8.2 | 0.51 | 100 |
| | 2 | Clear, colorless | 8.3 | 0.51 | 100 |
| | 8 | Clear, colorless | 8.2 | 0.51 | 100 |
| | 24 | Clear, colorless | 8.2 | 0.49 | 99 |
| 1.0 | 0 | Clear, colorless | 8.2 | 1.0 | 100 |
| | 2 | Clear, colorless | 8.2 | 1.0 | 99 |
| | 8 | Clear, colorless | 8.2 | 1.0 | 99 |
| | 24 | Clear, colorless | 8.2 | 1.0 | 100 |

[a]Average value of the three (3) replicates.
[b]BCV recovery = c(BCV)Hour n/c(BCV)Hour 0 × 100%. It was defined as 100% for samples at initial time point.

Sterilization Filter Compatibility

Formulations of the disclosure were evaluated for sterilization filter compatibility. Aliquots of a testing brincidofovir formulation were filtered through the corresponding syringe filters as follows:

A: Filter: 0.2 µm, 25 mm, syringe filter, Supor® membrane (PES), sterile; testing solution: 10 mg/mL brincidofovir, 200 mM sodium phosphate, pH=8.0; testing volume: 10 mL.

B: Filter: 0.2 µm, 25 mm, syringe filter, Posidyne® membrane, sterile; testing solution: 10 mg/mL brincidofovir, 200 mM sodium phosphate, pH=8.0; testing volume: 10 mL.

C: Filter: 0.22 µm, 33 mm, syringe filter, Durapore® PVDF membrane, γ-irradiated; testing solution: 2 mg/mL brincidofovir, 4 mM sodium phosphate, pH-8, approx. 5% dextrose (50× dilution of 10 mg/mL brincidofovir, 200 mM sodium phosphate, pH=8.0 with 5% dextrose solution; testing volume: 50 mL.

The first and last 10% of the filtrate were collected. Samples of the collected filtrates, along with samples of the pre filtration formulation, were assessed for their appearance, pH, and c(BCV).

TABLE 19

Results of sterilization filter compatibility assessment

| Filter membrane | Conditions | Appearance | Measured pH | Observed c(BCV)[a] (mg/mL) | BCV Recovery[a,b] (%) |
|---|---|---|---|---|---|
| PES | Pre filtration | Clear, colorless | 8.1 | 9.9 | 100 |
|  | First 10% filtrate volume | Clear, colorless | 8.0 | 9.8 | 99 |
|  | Last 10% filtrate volume | Clear, colorless | 8.0 | 9.8 | 99 |
| Posidyne | Pre filtration | Clear, colorless | 8.1 | 9.9 | 100 |
|  | First 10% filtrate volume | Clear, colorless | 8.0 | 9.7 | 98 |
|  | Last 10% filtrate volume | Clear, colorless | 8.0 | 9.8 | 99 |
| PVDF | Pre filtration | Clear, colorless | 8.0 | 0.20 | 100 |
|  | First 10% filtrate volume | Clear, colorless | 8.1 | 0.20 | 99 |
|  | Last 10% filtrate volume | Clear, colorless | 8.1 | 0.20 | 100 |

[a]Average value of the three (3) replicates.
[b]BCV recovery = c(BCV)$_{Postfiltration}$/c(BCV)$_{Prefiltration}$ × 100%; defined as 100% for pre filtration samples.

No significant changes in appearance, pH, or c(BCV) were observed when comparing the filtrate solutions with the corresponding pre-filtration samples and no impurity was introduced during filtration.

Drug Product Vial and Stopper Compatibility

Formulations of the disclosure were evaluated for sterilization filter compatibility. The testing formulation (5 mL, 10 mg/mL brincidofovir, 200 mM sodium phosphate, pH=8.0) was dispensed into a set of Afton sterilized, Ready-To-Fill® vials. The vials were stoppered with West NovaPure® stoppers and crimped with Afton Ready-To-Fill® sterilized seals, and stored for 6 hours at ambient conditions in upright and inverted orientations. Samples of the filling solution were collected before filling and after 6 hours of storage under the respective condition. The collected samples were assessed for their appearance, pH, and c(BCV). No significant changes in appearance, pH, or c(BCV) were observed for the tested formulation after 6 hours of contact with the tested vials and stoppers. No additional impurity was introduced following contact.

TABLE 20

Results of drug product vial and stopper compatibility assessment

| Storage condition | Appearance | Measured pH | Observed c(BCV)[a] (mg/mL) | BCV Recovery[a,b] (%) |
|---|---|---|---|---|
| Pre filling | Clear, colorless | 8.0 | 9.5 | 100 |
| Upright, 6 h | Clear, colorless | 8.0 | 9.5 | 100 |
| Inverted, 6 h | Clear, colorless | 8.0 | 9.4 | 99 |

[a]Average value of the three (3) replicates.
[b]BCV recovery = c(BCV)Hour n/c(BCV)Pre filling × 100%. It was defined as 100% for pre filling samples.

Preclinical Material Compatibility Assessment (Rats)
Infusion System Assembly (Rats)

The compatibility of the following brincidofovir formulations with an infusion system assembly for dosing of rats (consisting of a syringe, tether, catheter and syringe pump) was tested
  a.) 0.2 mg/mL brincidofovir, 4 mM sodium phosphate, pH~8.0, approx. 4.90% dextrose;
  b.) 1.5 mg/mL brincidofovir, 30 mM sodium phosphate, pH~8.0, approx. 4.25% dextrose.

Both solutions were prepared via dilution of the developed brincidofovir formulation (10 mg/mL brincidofovir, 200 mM sodium phosphate, pH=8.0) with a 5% dextrose solution. The testing procedure can be summarized as follows:
  1. The appearance, pH, and c(BCV) of the bulk testing solutions (0.2 mg/mL BCV, 4 mM sodium phosphate, pH~8.0, approx. 4.90% dextrose, and 1.5 mg/mL BCV, 30 mM sodium phosphate, pH~8.0, approx. 4.25% dextrose were assessed pre-contact.
  2. Approximately 5 mL of the testing solution was drawn into a syringe which was then connected to the assembled infusion system (Vascular Access Harness (VAH) tether kit, the VAH port for rat jacket, and catheter).
  3. The infusion system was manually filled with the testing solution. Approximately 200 µL of the testing solution were pushed out of the infusion system and collected as an end-of-line sample (to) for the assessments of appearance and c(BCV).
  4. The syringe of the testing infusion system was mounted onto the syringe pump, and a flow rate was set to a flow of 1.2 mL/h (20 µL/min) for a total dispensing volume of 2.4 mL (120 min).
  5. The entire flow-through was collected over the course of the experiment. At the respective time points ($t_{10\ min}$, $t_{105\ min}$), end-of-line samples (approx. 200 µL) were collected for analysis.

6. The pH of the bulk flow-through was measured at the end of the experiment ($t_{120\ min}$), since the volume of samples acquired from previous time points (200 µL) was too small for a standard pH measurement.

The results of the study are summarized in Table 21.

TABLE 21

Results of preclinical infusion system compatibility assessment

| Testing solution c(BCV) (mg/mL) | Conditions | Appearance | Measured pH | Observed c(BCV)[a] (mg/mL) | BCV Recovery[a,b] (%) |
|---|---|---|---|---|---|
| 0.2 (Test #1) | Pre contact (bulk solution) | Clear, colorless | 8.0 | 0.21 | 100 |
| | $t_0$ | Clear, colorless | n.a. | 0.19 | 90 |
| | $t_{10\ min}$ | Clear, colorless | n.a. | 0.16 | 93 |
| | $t_{105\ min}$ | Clear, colorless | n.a. | 0.20 | 94 |
| | $t_{120\ min}$ (bulk solution) | Clear, colorless | 8.0 | n.a. | n.a. |
| 1.5 (Test #2) | Pre contact (bulk solution) | Clear, colorless | 8.2 | 1.5 | 100 |
| | $t_0$ | Clear, colorless | n.a. | 1.5 | 100 |
| | $t_{10\ min}$ | Clear, colorless | n.a. | 1.5 | 100 |
| | $t_{105\ min}$ | Clear, colorless | n.a. | 1.5 | 100 |
| | $t_{120\ min}$ (bulk solution) | Clear, colorless | 8.2 | n.a. | n.a. |

[a]Average value of the three (3) replicates.
[b]BCV recovery = c(BCV)Minute n/c(BCV)Pre contact × 100%, defined as 100% for pre contact samples.
n.a.: Not available or not applicable.

For test #1 (0.2 mg/mL brincidofovir), an initial 10% loss in c(BCV) was observed, which can be assigned to absorption to the testing infusion system. At low concentrations an initial adsorption effect (surface saturation) is frequently observed, in the present case a full recovery of the observed loss is not observed over the time of testing; at t=105 min a brincidofovir loss of 6% was observed. No significant changes in appearance or pH were observed. For test #2, no significant loss in c(BCV) or changes in appearance or pH were observed over the course of the experiment.

Clinical Material Assessment

Infusion Bag Compatibility

A standard mini-infusion bag (100 mL) was subjected to material compatibility testing with the following formulation:

15 mg/mL brincidofovir, 200 mM sodium phosphate, pH=8.0.

The tested formulation strengths after dilution into the infusion bag were approximately:

0.1 mg/mL brincidofovir, 5.3 mM sodium phosphate, pH≈8.0 (in 5% dextrose), 1.0 mg/mL brincidofovir, 13.3 mM sodium phosphate, pH≈8.0 (in 5% dextrose).

The testing clinical infusion bag is specified as follows:

5% dextrose for injection, USP, 100 mL VIAFLEX infusion bag

The developed brincidofovir formulation (15 mg/mL brincidofovir, 200 mM sodium phosphate, pH=8.0) was diluted to c(BCV)=0.1 and c(BCV)=1.0 mg/mL by injection into the infusion bags. The infusion bags were then stored at ambient conditions, and samples were collected from the infusion bags at the time points ($t_0$, $t_{1\ h}$, $t_{8\ h}$, and $t_{24\ h}$) for assessments of appearance, pH, and c(BCV). As a control, the 5% dextrose solution was removed from a separate infusion bag, and external dilutions (standard laboratory glassware) of the testing formulation with the 5% dextrose solution were performed applying identical dilution factors. Samples of the external diluted solution were likewise analyzed. The results are summarized in Table 22.

TABLE 22

Results of clinical infusion bag compatibility assessment

| c(BCV) in testing infusion bag (mg/mL) | Conditions | Appearance | Measured pH | Observed c(BCV)[a] (mg/mL) | BCV Recovery[a,b] (%) |
|---|---|---|---|---|---|
| 0.1 | External dilution | Clear, colorless | 7.9 | 0.098 | 106 |
| | $t_0$ | Clear, colorless | 7.9 | 0.092 | 100 |
| | $t_{1\ h}$ | Clear, colorless | 7.9 | 0.093 | 101 |
| | $t_{8\ h}$ | Clear, colorless | 7.9 | 0.093 | 101 |
| | $t_{24\ h}$ | Clear, colorless | 7.9 | 0.093 | 101 |
| 1.0 | External dilution | Clear, colorless | 8.2 | 0.94 | 108 |
| | $t_0$ | Clear, colorless | 8.2 | 0.87 | 100 |
| | $t_{1\ h}$ | Clear, colorless | 8.2 | 0.87 | 100 |
| | $t_{8\ h}$ | Clear, colorless | 8.2 | 0.87 | 100 |
| | $t_{24\ h}$ | Clear, colorless | 8.1 | 0.86 | 99 |

[a]Average value of the three (3) replicates.
[b]BCV recovery = c(BCV)$_{Hour\ n}$/c(BCV)$_{hour\ 0}$ × 100%. It was defined as 100% for $t_0$ samples.

No significant change in appearance, pH, or c(BCV) was observed for the diluted solutions in the testing infusion bag at either c(BCV). The higher brincidofovir recoveries obtained from the external dilutions most likely resulted from the fact that infusion bags are generally overfilled (105-115 mL with an average of 110 mL, for 100 mL bags—information communicated by Baxter). By applying an identical dilution factor and using the $t_0$ time point (dilution into the infusion bag) for normalization (defined as 100%) the concentrations determined for the external dilution are overestimated. An internal study on a single infusion bag assessed the volume of the infusion solution in a 100 mL infusion bag with ≈109 mL.

Clinical Infusion System Compatibility

Two infusion systems (Baxter Non-DEHP CONTINUO-FLO solution set with 2 INTERLINK injection sites, male Luer-lok adaptor; and Brown Rate Flow® regulator IV set with 15 micron filter, 1 non needle free injection site) were tested for compatibility with the following formulation:

15 mg/mL brincidofovir, 200 mM sodium phosphate, pH=8.0.

The tested formulation strengths after dilution into the infusion bag were approximately:

0.1 mg/mL brincidofovir, 5.3 mM sodium phosphate, pH≈8.0 (in 5% dextrose),
1.0 mg/mL brincidofovir, 13.3 mM sodium phosphate, pH≈8.0 (in 5% dextrose).

The testing procedure can be summarized as follows:

1. The developed brincidofovir formulation (15 mg/mL brincidofovir, 200 mM sodium phosphate, pH 8.0), was injected into infusion bags (reservoir function) mentioned above to yield the testing solutions at c(BCV)= 0.1 or 1.0 mg/mL. A sample was collected from the infusion bag for assessment of c(BCV) ($t_{24\ h,\ bag}$).
2. The infusion bag was incubated ("aged") for 24 h at ambient conditions before another sample ($t_{0,\ bag}$) was collected from the infusion bag for assessment (appearance, pH, c(BCV)).
3. The tested infusion system was attached to the infusion bag and manually filled with solution from the infusion bag. Approximately 1 mL (triplicates) of the testing solution was collected as an end-of-line sample for analysis ($t_{0,\ eol}$).
4. The testing infusion system was shut off, and stored at ambient conditions until the next time point. Approximately 17 mL of the testing solution (volume of the infusion system) was drained before another end-of-line sample (1 mL, triplicates) was collected for analysis ($t_{10\ min,\ eol}$, $t_{3\ h,\ eol}$, and $t_{6\ h,\ eol}$).

TABLE 23

Results of clinical infusion system compatibility assessment

| Testing infusion system | c(BCV) in infusion bag (mg/mL) | Conditions | Appearance | Measured pH | Observed c(BCV)[a] (mg/mL) | BCV Recovery[a,b] (%) |
|---|---|---|---|---|---|---|
| Baxter | 0.1 | $t_{-24\ h,\ bag}$ | n.a. | n.a. | 0.090 | 100 |
| | | $t_{0,\ bag}$ | Clear, colorless | 7.7 | 0.091 | 100 |
| | | $t_{0,\ eol}$ | Clear, colorless | 7.7 | 0.088 | 96 |
| | | $t_{10\ min,\ eol}$ | Clear, colorless | 7.7 | 0.092 | 100 |
| | | $t_{3\ h,\ eol}$ | Clear, colorless | 7.7 | 0.091 | 100 |
| | | $t_{6\ h,\ eol}$ | Clear, colorless | 7.7 | 0.092 | 100 |
| | 1.0 | $t_{-24\ h,\ bag}$ | n.a. | n.a. | 0.85 | 100 |
| | | $t_{0,\ bag}$ | Clear, colorless | 8.1 | 0.86 | 100 |
| | | $t_{0,\ eol}$ | Clear, colorless | 8.1 | 0.85 | 100 |
| | | $t_{10\ min,\ eol}$ | Clear, colorless | 8.1 | 0.86 | 100 |
| | | $t_{3\ h,\ eol}$ | Clear, colorless | 8.1 | 0.86 | 100 |
| | | $t_{6\ h,\ eol}$ | Clear, colorless | 8.1 | 0.86 | 100 |
| B. Braun | 0.1 | $t_{-24\ h,\ bag}$ | n.a. | n.a. | 0.090 | 100 |
| | | $t_{0,\ bag}$ | Clear, colorless | 7.8 | 0.091 | 100 |
| | | $t_{0,\ eol}$ | Clear, colorless | 7.7 | 0.086 | 94 |
| | | $t_{10\ min,\ eol}$ | Clear, colorless | 7.7 | 0.091 | 100 |
| | | $t_{3\ h,\ eol}$ | Clear, colorless | 7.7 | 0.090 | 99 |
| | | $t_{6\ h,\ eol}$ | Clear, colorless | 7.7 | 0.091 | 100 |
| | 1.0 | $t_{-24\ h,\ bag}$ | n.a. | n.a. | 0.86 | 100 |
| | | $t_{0,\ bag}$ | Clear, colorless | 8.1 | 0.86 | 100 |
| | | $t_{0,\ eol}$ | Clear, colorless | 8.1 | 0.86 | 100 |
| | | $t_{10\ min,\ eol}$ | Clear, colorless | 8.1 | 0.86 | 100 |
| | | $t_{3\ h,\ eol}$ | Clear, colorless | 8.1 | 0.86 | 100 |
| | | $t_{6\ h,\ eol}$ | Clear, colorless | 8.1 | 0.86 | 100 |

[a]Average value of the three (3) replicates.
[b]BCV recovery = c(BCV)$_{HourN}$/c(BCV)$_{Hour0}$ × 100%. It was defined as 100% for $t_0$, bag samples.

An initial loss in c(BCV) (up to 6%) was observed for the testing solution with low c(BCV)=0.1 mg/mL in both testing clinical infusion systems. This observation can most likely be explained with an initial saturating adsorption of the tubing material. The brincidofovir concentration recovered to approx. 100% over the course of the experiment (6 h). No significant overall changes in appearance, pH, or c(BCV) were observed for both of the tested infusion systems.

Example 4—Stability and Characteristics of Lyophilized and Reconstituted Formulations Pre-lyophilization formulations were prepared as set forth in Table 24, below and subjected to the lyophilization process.

TABLE 24

Pre-lyophilization Formulations.

| Form. # | Buffer | c(buffer) [mM] | c(BCV) [mg/mL] | Target pH | Bulking agent | c(bulking agent) (w/v) [%] |
|---|---|---|---|---|---|---|
| 1 | Na-Phosphate | 200 | 10.0 | 8.0 | Mannitol | 5 |
| 2 | Na-Phosphate | 200 | 10.0 | 8.0 | Sucrose | 9 |
| 3 | Arginine | 200 | 10.0 | 8.0 | Mannitol | 5 |
| 3a | Arginine | 100 | 10.0 | 8.0 | Mannitol | 5 |
| 3b | Arginine | 50 | 10.0 | 8.0 | Mannitol | 5 |
| 3c | Arginine | 25 | 10.0 | 8.0 | Mannitol | 5 |
| 4 | Arginine | 200 | 10.0 | 8.0 | Sucrose | 9 |
| 5 | Tromethamine (Tris) | 200 | 10.0 | 8.0 | Mannitol | 5 |
| 6 | Tromethamine (Tris) | 200 | 10.0 | 8.0 | Sucrose | 9 |
| 7 | water (pH-adjusted) | — | 10.0 | 8.0 | Mannitol | 5 |
| 8 | water (pH-adjusted) | — | 10.0 | 8.0 | Sucrose | 9 |

The glass transition temperature $T_{g'}$ (amorphous), the eutectic melting point $T_{eu}$ (crystalline), the onset temperature of melting $T_{melt}$, onset, and the freezing temperature $T_{freeze}$ of the formulations 1-8 of Table 27 were determined by differential scanning calorimetry (DSC) analysis. For this, 5 μL of each formulation was dispensed into an aluminum sample pan and hermetically sealed. DSC scans were performed by down and up scanning in the temperature interval of +25° C. to −65° C. to +25° C. with a ramp rate of 5° C./min. The tested formulations displayed a sharp freezing point and a well-defined melting transition. The results of the DSC study are summarized in Table 25.

TABLE 25

Results of the DSC analysis

| Form. # | Buffer | Bulking agent | $T_{g'}/T_{eu}$ [° C.] | $T_{freeze}$ [° C.] | $T_{melt}$ [° C.] | $T_{melt, onset}$ [° C.] |
|---|---|---|---|---|---|---|
| 1 | Na-Phosphate | Mannitol | −45.0 | −20.0 | −0.5 | −3.0 |
| 2 | Na-Phosphate | Sucrose | −32.0 | −18.0 | −0.2 | −3.4 |
| 3 | Arginine | Mannitol | −45.0 | −20.0 | −0.5 | −4.2 |
| 4 | Arginine | Sucrose | −32.0 | −18.0 | −0.2 | −4.2 |
| 5 | Tromethamine | Mannitol | −16.0 | −21.0 | −0.4 | −5.2 |
| 6 | Tromethamine | Sucrose | −43.0 | −20.0 | −0.4 | −5.2 |
| 7 | DI water (pH-adjusted) | Mannitol | −30.5 | −21.2 | −0.01 | −2.2 |
| 8 | DI water (pH-adjusted) | Sucrose | −34.8 | −16.6 | −0.8 | −2.9 |

Lyophilization Cycle

A conservative lyophilization cycle was applied for lyophilization of brincidofovir formulations including parameters informed by the DSC analysis (see Table 28). The cycle consisted of the following steps: freezing, annealing, primary drying and a secondary drying. The set point temperature, ramp rate, step time and load time for each step in an exemplary lyophilization cycle are summarized in Table 26.

TABLE 26

Lyophilization cycle parameters (Cycle # 1)

| Phase | Type | $T_{shelf}$ (Set point) [° C.] | Ramp rate [° C./h] | Step time [min] | Total time [h] |
|---|---|---|---|---|---|
| Loading | Hold | 5 | N/A | 0 | 0 |
| Freeze/Anneal | Hold | 5 | 0 | 60 | 1 |
| Freeze/Anneal | Rate | −50 | 20 | 165 | 3.8 |
| Freeze/Anneal | Hold | −50 | N/A | 180 | 6.8 |
| Freeze/Anneal | Rate | −8 | 20 | 174 | 9.7 |
| Freeze/Anneal | Hold | −8 | N/A | 240 | 13.7 |
| Freeze/Anneal | Rate | −35 | 20 | 81 | 15.0 |
| Freeze/Anneal | Hold | −35 | N/A | 60 | 16.0 |
| Primary Drying | Hold | −35 | N/A | 1200 | 36.0 |
| Secondary drying | Rate | 20 | 2.5 | 1300 | 57.7 |
| Secondary drying | Hold | 20 | N/A | 360 | 63.7 |

Sample vials (5 mL vial size, 1 mL filling volume) were processed under best clean conditions in a biosafety cabinet. For each formulation, nine samples were prepared. For each formulation condition, one sample vial was equipped with a product probe to monitor the product temperature ($T_{product}$) along with the shelf temperature of the lyophilizer ($T_{shelf}$) throughout the lyophilization cycle. The end of the primary drying was determined as the time when $T_{product} \approx T_{shelf}$ is observed. At the end of the lyophilization cycle, the sample vials were back-filled nitrogen ($N_2$), stoppered and removed from the lyophilizer to be inspected and analyzed.

The step time for the primary drying phase was set to 20 h. FIG. 1 displays the product temperature profiles of Formulations 1-8 during this step. In the tested formulations, after activation of the vacuum pump and drop of the product temperature to $T_{(product)} < T_{(shelf)}$ at around 16 hours of total cycle time, temperature jumps were observed in the different formulations within 15 hours. The temperature jump is taken to be indicative of successful sample drying.

The lyophilized products were evaluated based on structure and uniformity of the lyophilization cakes. The observation of a 'melt-back' or 'cake collapses' led to a lowered ranking. Four vials from each formulation were randomly selected for the appearance evaluation. The assessment and ranking are summarized in Table 27.

TABLE 27

Assessment of lyophilized products and reconstitution performance

| | Formulation | | | | Reconstitution | | | | Ranking | |
|---|---|---|---|---|---|---|---|---|---|---|
| # | Buffer | Bulking agent | App. pH | Lyophilized Product Cake appearance | Reconst. time [s] | Foam* | Foam. Dissip. time [min] | Meas. pH | c(BCV) [mg/mL] | Appear. ranking | Reconst. ranking |
| 1 | Na-Phosphate | Mannitol (5%) | 7.9 | White uniform solid. Minor melt-back | 50 | + | 7 | 7.8 | 10.4 | 2 | 4 |
| 2 | Na-Phosphate | Sucrose (9%) | 7.9 | White uniform solid. Minor melt-back. Minor detachment from vial. | 80 | ++ | 45 | 7.8 | 10.5 | 5 | 7 |
| 3 | Arginine | Mannitol (5%) | 8.0 | White uniform solid. Minor melt-back. Minor detachment from bottom (cake collapse). | 60 | − | — | 7.9 | 10.3 | 3 | 1 |
| 4 | Arginine | Sucrose (9%) | 8.0 | Major melt-back. Significant cake collapse. | 45 | ++ | 35 | 7.9 | 9.8 | 7 | 5 |
| 5 | Tris | Mannitol (5%) | 8.0 | Minor-melt back and detachment from bottom. Minor cake collapse. | 90 | − | — | 8.1 | 10.6 | 4 | 2 |
| 6 | Tris | Sucrose (9%) | 8.0 | Extensive melt-back and cake collapse. | 15 | ++ | 45 | 8.0 | 10.4 | 8 | 6 |
| 7 | DI water(pH-adjusted) | Mannitol (5%) | 8.3 | White uniform solid. Minimal melt-back. | 45 | + | 3 | 8.4 | 10.6 | 1 | 3 |
| 8 | DI water(pH-adjusted) | Sucrose (9%) | 8.3 | Strong melt back and cake collapse. Cake detached from vial. | 60 | ++ | 60 | 8.3 | 10.3 | 6 | 4 |

Of the tested formulations, the mannitol based formulations (Formulations 1, 3, 5 and 7) yielded a more compact and uniform lyophilization cake, and the sucrose based formulations (Formulations 2, 4, 6 and 8) revealed partial cake collapses as well as an increased melt-back.

Reconstitution Assessment of Lyophilized Formulations

Lyophilization product vials were weighed before and after lyophilization in order to determine the reconstitution solution volume. The lyophilized products were reconstituted with DI water. After addition of the solvent the vials were gently swirled and the reconstitution appearance as well as the reconstitution time were recorded. The reconstituted product was further analyzed for its pH and brincidofovir recovery (determined via HPLC). For a reconstitution ranking the described parameters were complemented by recording the intensity of foaming as well as the foam dissipation time. The results of the reconstitution assessment for Formulations 1-8 are summarized in Table 30.

Formulation 3 was found to lack foaming upon reconstitution, and Formulation 7 was found to be able to be reconstituted with different buffers or infusion vehicles.

Example 5—Lyophilization Process Development

For the development of a lyophilized drug product of brincidofovir, five different activities have been executed: i) lyophilization feasibility assessment, ii) lyophilization process development, iii) short-term stability studies, iv) preparation of drug product batches for stability testing, and v) material compatibility assessment.

A project overview capturing the purpose, results and the outcome of each activity is summarized in Table 28. The details of the lyophilization cycle parameters for certain lyophilization runs during process development can be found in Table 29.

TABLE 28

Project overview and decision rationale.

| Activity | Cycle # | Purpose | Formula | Results |
|---|---|---|---|---|
| Feasibility assessment | 1 | Lyophilization of starting matrix formulations (feasibility); 1 mL fill volume, 5 mL vials | 1-8 | Tromethamine and sucrose containing formulations did not have sufficient stability. |
| | 2 | Scale of product unit size (5 mL fill, 20 mL vials) | 1, 3, 7 | $_i)$ Scale-up prevented completion of drying during the prim,. drying phase. $_{ii)}$ Less foaming (reconstitution) observed for # 3. |
| | 3 | $_i)$ Cycle parameter adjustment. $_{ii)}$ Obtain products w/ acceptable residual moisture. | 1, 3, 7 | Products obtained w/2% volatiles. A reconstitution analysis was not performed for this lyophilization cycle. |
| Process Development | 4 | | | --- Cycle fail --- |
| | 5 | $_i)$ Investigate the extent of foaming $_{ii)}$ Evaluate the reconstitution process incl. 48 h reconst. stability | 1, 3, 3a, 3b, 3c | $_i)$ Comparable foaming for #3, #3a. $_{ii)}$ No loss of brincidofovir was observed within 48 h after reconstitution (all formulations) |
| Short-term stability (2 weeks) | 6 | Evaluate the stability of the lyophilized products (solid) | 1, 3, 3a | (i) Increased residual moisture for #1 and therefore stronger degradation. (ii) Superior stability of #3a vs. #3. (iii) Loss in brincidofovir recovery observed for #1, #3 pre/post lyophilization (pot. handling errors, high assay variability) |
| DP preparation | 7 | DP preparation for stability testing | 3a | Preparation of 200 vials (5 mL filling, 20 mL vial). A loss in recovery (not degradation) observed pre/post lyophilization, (pot. handling errors, high assay variability) |
| Material compatibility assessment | NA | Evaluate the compatibility of sterile filters, vials, stoppers, infusion bags, IV systems. | 3a | The formulation (3a) was compatible with all tested materials. An initial adsorption/saturation effect was observed for the IV systems at low c(BCV). Samples at c(BCV) = 0.1 mg/mL showed a more significant pH shift. |

TABLE 29

Lyophilization cycle parameters (Cycles #2, #3, #5, #6)

| Step | Type | Cycle #2 | | | | Cycle #3 | | | | Cycle #5 | | | | Cycle #6 | | | |
|---|---|---|---|---|---|---|---|---|---|---|---|---|---|---|---|---|---|
| | | Ramp rate [° C./h] | $T_{shelf}$ [° C.] | Time [min] | Total Time [h] | Ramp rate [° C./h] | $T_{shelf}$ [° C.] | Time [min] | Total Time [h] | Ramp rate [° C./h] | $T_{shelf}$ [° C.] | Time [min] | Total Time [h] | Ramp rate [° C./h] | $T_{shelf}$ [° C.] | Time [min] | Total Time [h] |
| Loading | Hold | N/A | 5 | 0 | 0 | N/A | 5 | 0 | 0 | N/A | 5 | 0 | 0 | N/A | 5 | 0 | 0 |
| Freeze/Anneal | Hold | 0 | 5 | 60 | 1 | 0 | 5 | 60 | 1 | 0 | 5 | 60 | 1 | 0 | 5 | 60 | 1 |
| Freeze/Anneal | Rate | 20 | −50 | 165 | 3.8 | 20 | −50 | 165 | 3.8 | 20 | −50 | 165 | 3.8 | 20 | −50 | 165 | 3.8 |
| Freeze/Anneal | Hold | N/A | −50 | 180 | 6.8 | N/A | −50 | 180 | 6.8 | N/A | −50 | 180 | 6.8 | N/A | −50 | 180 | 6.8 |
| Freeze/Anneal | Rate | 20 | −4 | 174 | 9.7 | 20 | −4 | 174 | 9.7 | 20 | −4 | 174 | 9.7 | 20 | −4 | 174 | 9.7 |
| Freeze/Anneal | Hold | N/A | −4 | 240 | 13.7 | N/A | −4 | 240 | 13.7 | N/A | −4 | 240 | 13.7 | N/A | −4 | 240 | 13.7 |
| Freeze/Anneal | Rate | 20 | −38 | 81 | 15 | 20 | −35 | 81 | 15 | 20 | −35 | 81 | 15 | 20 | −35 | 81 | 15 |
| Freeze/Anneal | Hold | N/A | −38 | 60 | 16 | N/A | −35 | 60 | 16 | N/A | −35 | 180 | 18 | N/A | −35 | 180 | 18 |
| Primary Drying | Hold | N/A | −38 | 1200 | 36 | N/A | −35 | 2160 | 52 | N/A | −35 | 2160 | 54 | N/A | −35 | 2160 | 54 |
| Secondary drying | Rate | 2.5 | 20 | 1300 | 57.7 | 30 | 30 | 130 | 54.2 | 30 | 30 | 130 | 56.2 | 30 | 30 | 390 | 60.5 |
| Secondary drying | Hold | N/A | 20 | 360 | 63.7 | N/A | 30 | 360 | 60.2 | N/A | 30 | 360 | 62.2 | N/A | 30 | 360 | 66.5 | i) Feasibility Assessment: Compounding and Reconstitution

To further evaluate the formulations upon reconstitution following lyophilization according to the different lyophilization cycles, liquid fill solutions were prepared and evaluated as outlined below. For lyophilization cycles #1, #2, and #5, liquid fill solutions were prepared comprising:
  a) Brincidofovir stock solution at c(BCV)=10 mg/mL (pH adjustment to pH=8.0),
  b) 10× buffer stock solutions or DI water (pH adjustment to pH=8.0), and
  c) 12.5% (w/v) mannitol stock solution (pH adjustment to pH=8.0)
  d) DI water.

For cycles #6 and #7, liquid fill solutions were prepared comprising:
  a) brincidofovir (solid),
  b) mannitol (solid),
  c) 10× arginine stock solution (pH adjustment to pH=8.0),
  d) NaOH-solution (1M), and
  e) DI water.

For cycles #1, #2, and #5 the applied reconstitution volumes were determined by gravimetric analysis of the product vials before and after lyophilization for each of the formulations. In case of cycles #1 and #2 the specific measured volumes were applied. For reconstitution of lyophilized products of cycle #5 an average reconstitution volume was applied to all formulations. For the lyophilized product of lyophilization cycle #7, the liquid fill volume was scaled in accordance to the previously determined difference between liquid fill and reconstitution volume.

After each lyophilization cycle the lyophilized products were evaluated for their cake structure, uniformity and defects in appearance. Following reconstitution with DI water, the appearance of the solution during and after reconstitution (e.g. foaming intensity, foam dissipation time), pH, and recovery of brincidofovir were evaluated. The recovery of brincidofovir was determined by HPLC analysis. The fraction of volatiles was determined by thermogravimetric analysis (TGA). The results of the reconstitution assessments are summarized in Table 30.

TABLE 30

Assessment of the drug product and reconstitution process.

| Cycle # | Form. # | Fraction Volatiles [%] | Average Appear. | Average Reconst. Time [s] | Average Foam. dissip. time* [min] | pH | Pre lyo c(BCV) [mg/mL] | Post lyo c(BCV) [mg/mL] | Purity c(BCV) [%] |
|---|---|---|---|---|---|---|---|---|---|
| 1 | 1 | N/A | Minor melt-back | 50 | 7 | 7.8 | N/A | 10.43 | N/A |
|   | 2 | N/A | Minor melt-back | 80 | 45 | 7.8 | N/A | 10.53 | N/A |
|   | 3 | N/A | Minor melt-back | 60 | <1 | 7.9 | N/A | 10.33 | N/A |
|   | 4 | N/A | Cake collapse | 45 | 35 | 7.9 | N/A | 9.83 | N/A |
|   | 5 | N/A | Cake collapse | 90 | <1 | 8.1 | N/A | 10.63 | N/A |
|   | 6 | N/A | Cake collapse | 15 | 45 | 8.0 | N/A | 10.43 | N/A |
|   | 7 | N/A | Porous, uniform | 45 | 3 | 8.4 | N/A | 10.63 | N/A |
|   | 8 | N/A | Cake collapse | 60 | 60 | 8.3 | N/A | 10.33 | N/A |
| 2 | 1 | 0.3 | Little cracks | 100 | 32 | 8.0 | 9.8 | 9.6 | N/A |
|   | 3 | 1.5 | Porous, uniform | 45 | 8 | 8.0 | 9.9 | 9.6 | N/A |
|   | 7 | 3.8 | Minor melt-back | 105 | 30 | 8.4 | 9.5 | 9.5 | N/A |
| 3 | 1 | 0.3 | Little cracks | N/A | N/A | N/A | N/A | N/A | N/A |
|   | 3 | 2.0 | Porous, uniform | N/A | N/A | N/A | N/A | N/A | N/A |
|   | 7 | 0.8 | Minor melt-back | N/A | N/A | N/A | N/A | N/A | N/A |
| 5 | 1 | N/A | Minor cracks | 45 | >30 (minor foaming) | 7.9 | N/A | 10.4 | N/A |
|   | 3 | N/A | Porous, uniform | 45 | <20 | 8.0 | N/A | 10.2 | N/A |
|   | 3a | N/A | Porous, uniform | 130 | <20 | 7.9 | N/A | 10.1 | N/A |
|   | 3b | N/A | Porous, uniform | 95 | >30 (minor foaming) | 7.9 | N/A | 10.0 | N/A |
|   | 3c | N/A | Porous, uniform | 80 | >30 (minor foaming) | 7.9 | N/A | 10.0 | N/A |
|   | 7 | N/A | Minor melt-back | 15 | >30 | 8.2 | N/A | 10.2 | N/A |
| 6 | 1 | 4.2 | Several cracks | 40 | >30 (minor foaming) | 7.9 | 10.3 | 9.8 | N/A |
|   | 3 | 1.0 | Porous, uniform | 30 | <20 | 7.9 | 10.7 | 9.5 | 99.7 |
|   | 3a | 0.3 | Porous, uniform | 91 | >30 (minor foaming) | 7.9 | 10.5 | 9.6 | 99.6 |
| 7 | 3a | 0.5 | Porous, uniform | 83 | <20 | 8.0 | 10.7 | 9.9 | N/A |

*Average value of three vials. For cycle #1-2 the approximate dissipation time was recorded (constant observation). For cycle #5-7 the foaming intensity was evaluated at 10, 20 and 30 min after reconstitution. <20 indicates that the foaming dissipation time was between the 10 and 20 min interval. <30 indicates that the foaming dissipation time was between the 20 and 30 min interval. If foaming still persisted over 30 min, the dissipation time was indicated by >30 min.

ii) Process Development: Stability Studies of Lyophilized Formulations—48 h Study To evaluate the physical and chemical stability of the reconstituted solutions the appearance and pH of each of Formulations 1, 3, 3a, 3b, 3c, and 7, as well as recovery of c(BCV) at the time of reconstitution ($t_0$), after 1 day ($t_{24\ h}$) and after 2 days ($t_{48\ h}$) was assessed at ambient temperature. The recovery of c(BCV) was determined via HPLC.

All tested formulations (Formulations #1, 3, 3a, 3b, 3c, and 7), were clear and colorless in appearance and yielded complete recovery of brincidofovir within 48 h after reconstitution (i.e., no significant loss of brincidofovir, variations in recovery are within the error range). Formulations 3 and 3a were found to display faster dissipation of foam/bubbles than Formulations 3b, and 3c (Table 33).

iii) Short-Term Stability Study: Stability Studies of Lyophilized Formulations—2 Week Study The stability of Formulations 1, 3, and 3a was assessed at 25° C. and 60° C. by evaluating appearance and pH of each formulation, as well as recovery of c(BCV), at the time of reconstitution ($t_0$), after 2 days ($t_{2\ days}$), 7 days ($t_{7\ days}$), 10 days ($t_{10\ days}$), and 14 days ($t_{14\ days}$). In addition, the foaming intensity was evaluated at 10, 20 and 30 minutes after reconstitution.

The recovery of brincidofovir was determined via HPLC. Degradants observed in the HPLC chromatograms were identified as the deamination product, likely Cidofovir, as well as additional degradants No shift or changes in pH were associated with degradation. Of the tested formulations, Formulation 3a showed the least degree of degradation under the applied conditions with a purity of 99.2% after 14 days at 60° C. The results of the experiments are summarized in Table 31, Table 32, and Table 36.

TABLE 31

Stability study results of the formulation 1 (200 mM Phosphate)

| Conditions | | | | | | | | | |
|---|---|---|---|---|---|---|---|---|---|
| Station temp. (° C.) | Day | Average Cake appearance | Average Recon. Appear. | Average Recon. Time [s] | Average Foam. Time [min]* | pH | Observed c(BCV)$^a$ (mg/mL) | BCV Recovery $^b$ [%] | BCV Purity [%] |
| Pre lyo | N/A | N/A | N/A | N/A | 7.9 | 10.3 | 0.4 | N/A | Pre lyo |
| 25 | 0** | Several cracks | Clear, colorless | 40 | >30 (minor foaming) | 7.9 | 9.8 | 100 | N/A |
|  | 2 | Several cracks | Clear, colorless | 41 | >30 (minor foaming) | 8.0 | 9.9 | 101 | N/A |
|  | 7 | Several cracks | Clear, colorless | 33 | >30 (minor foaming) | 8.0 | 10.0 | 102 | N/A |
|  | 10 | N/A | N/A | N/A | N/A | N/A | N/A | N/A | N/A |
|  | 14 | N/A | N/A | N/A | N/A | N/A | N/A | N/A | N/A |
| 60 | 0** | Several cracks | Clear, colorless | 40 | >30 (minor foaming) | 7.9 | 9.8 | 100 | N/A |
|  | 2 | Major collapse | Clear, colorless | 30 | >30 (minor foaming) | 8.0 | 9.8 | 100 | N/A |
|  | 7 | Major collapse | Clear, colorless | 32 | >30 (minor foaming) | 8.0 | 9.6 | 98 | N/A |
|  | 10 | N/A | N/A | N/A | N/A | N/A | N/A | N/A | N/A |
|  | 14 | N/A | N/A | N/A | N/A | N/A | N/A | N/A | N/A |

*Average value of three vials. The foaming intensity was evaluated at 10, 20 and 30 min after reconstitution. <20 indicates that the foaming dissipation time was between the 10 and 20 min interval. <30 indicates that the foaming dissipation time was between the 20 and 30 min interval. If foaming still persisted over 30 min, the dissipation time was indicated by >30 min.
$^a$Average value of the three replicates of samples that received treatment.
$^b$ BCV recovery = c(BCV)$_{Dayn}$/c(BCV)$_{Day0}$ × 100%.
**The sample for $t_0$ at T = 25° C. and $t_0$ at T = 60° C. is identical.
Note:
HPLC sample variability accounts for the assay variability between samples. Vial to vial variability accounts for the variability between drug product vials.

TABLE 32

Stability study results of the formulation 3 (200 mM Arginine)

| Conditions | | | | | | | | | |
|---|---|---|---|---|---|---|---|---|---|
| Station temp. (° C.) | Day | Average Cake appear. | Average Recon. Appear. | Average Recon. Time [s] | Average Foam. Time [min]* | pH | Observed c(BCV)$^a$ [mg/mL] | BCV Recovery$^b$ [%] | BCV Purity [%] |
| Pre lyo |  | N/A | N/A | N/A | N/A | 8.0 | 10.7 | N/A | N/A |
| 25 | 0** | Uniform | Clear, colorless | 30 | 10 | 7.9 | 9.5 | 100 | 99.7 |
|  | 2 | Uniform | Clear, colorless | 24 | 10 | 7.9 | 9.6 | 101 | 99.6 |
|  | 7 | Uniform | Clear, colorless | 24 | <10 | 7.9 | 9.7 | 102 | 99.7 |
|  | 10 | Uniform | Clear, colorless | 18 | <10 | 8.0 | 9.9 | 104 | 99.8 |
|  | 14 | Uniform | Clear, colorless | 16 | <10 | 8.0 | 9.8 | 103 | 99.7 |

TABLE 32-continued

Stability study results of the formulation 3 (200 mM Arginine)

Conditions

| Station temp. (° C.) | Day | Average Cake appear. | Average Recon. Appear. | Average Recon. Time [s] | Average Foam. Time [min]* | pH | Observed c(BCV)$^a$ [mg/mL] | BCV Recovery$^b$ [%] | BCV Purity [%] |
|---|---|---|---|---|---|---|---|---|---|
| 60 | 0** | Uniform | Clear, colorless | 30 | 10 | 7.9 | 9.5 | 100 | 99.7 |
|  | 2 | Uniform | Clear, colorless | 34 | 10 | 7.9 | 9.5 | 100 | 99.6 |
|  | 7 | Uniform | Clear, colorless | 20 | 10 | 7.9 | 9.6 | 101 | 99.0 |
|  | 10 | Uniform | Clear, colorless | 18 | <30 (minor foaming) | 7.9 | 9.7 | 102 | 98.9 |
|  | 14 | Uniform | Yellow tint | 20** | <20 | 7.9 | 9.6 | 101 | 95.9 |

*Average value of three vials. The foaming intensity was evaluated at 10, 20 and 30 min after reconstitution. <20 indicates that the foaming dissipation time was between the 10 and 20 min interval. <30 indicates that the foaming dissipation time was between the 20 and 30 min interval. If foaming still persisted over 30 min, the dissipation time was indicated by >30 min.
$^a$Average value of the three replicates of samples that received treatment.
$^b$BCV recovery = c(BCV)$_{Dayn}$/c(BCV)$_{Day0}$ × 100%.
**The sample for $t_0$ at T = 25° C. and $t_0$ at T = 60° C. is identical.
Note:
HPLC sample variability accounts for the assay variability between samples. Vial to vial variability accounts for the variability between drug product vials.

TABLE 33

Stability study results of the formulation #3a (100 mM Arginine)

Conditions

| Station temp. (° C.) | Day | Average Cake appear | Average Recon. Appear. | Average Recon. Time [s] | Average Foam. Time [min]* | pH | Observed c(BCV)$^a$ (mg/mL) | BCV Recovery$^b$ (%) | BCV Purity (%) |
|---|---|---|---|---|---|---|---|---|---|
| Pre lyo |  | N/A | N/A | N/A | N/A | 7.9 | 10.5 | N/A | N/A |
| 25 | 0** | Uniform | Clear, colorless | 91 | >30 (minor foaming) | 7.9 | 9.6 | 100 | 99.6 |
|  | 2 | Uniform | Clear, colorless | N/A | N/A | N/A | N/A | N/A | N/A |
|  | 7 | Uniform | Clear, colorless | N/A | N/A | N/A | N/A | N/A | N/A |
|  | 10 | Uniform | Clear, colorless | 80 | >30 (minor foaming) | 8.0 | 10.0 | 104 | 99.7 |
|  | 14 | Uniform | Clear, colorless | 65 | >30 (minor foaming) | 8.0 | 9.9 | 103 | 99.7 |
| 60 | 0** | Uniform | Clear, colorless | 91 | >30 (minor foaming) | 7.9 | 9.6 | 100 | 99.6 |
|  | 2 | Uniform | Clear, colorless | N/A | N/A | N/A | N/A | N/A | N/A |
|  | 7 | Uniform | Clear, colorless | N/A | N/A | N/A | N/A | N/A | N/A |
|  | 10 | Uniform | Clear, colorless | 49 | >30 (minor foaming) | 7.9 | 9.8 | 102 | 99.8 |
|  | 14 | Uniform | Clear, colorless | 26 | >30 (minor foaming) | 8.0 | 9.8 | 102 | 99.2 |

$^a$Average value of the three replicates of samples that received treatment.
$^b$BCV recovery = c(BCV)$_{Dayn}$/c(BCV)$_{Day0}$ × 100%.
**The sample for $t_0$ at T = 25° C. and $t_0$ at T = 60° C. is identical.
Note:
HPLC sample variability accounts for the assay variability between samples. Vial to vial variability accounts for the variability between drug product vials iv) Preparation of Drug Product Batches for Stability Testing Preparation of Pre-Lyophilization Formulations: Formulation 3a was compounded according to the following procedure: The pH of a 1M buffer solution of arginine in DI water was adjusted to 8 using Hydrochloric acid (35-37%) under pH-control before Q.S. Then Mannitol was added to the buffer solution followed by BCV. The pH of the resulting solution was adjusted to 8 using sodium hydroxide. DI water was used to Q.S. the solution in separate volumetric flasks. The two solutions were then mixed and sterile filtered to yield the desired Formulation 3a. The procedure yielded Formulation 3a with an observed c(BCV) of 9.9 mg/mL.

Preparation of Lyophilized Formulations: Under best clean conditions approximately 200 vials of liquid Formulation 3a, made according to the procedure outlined above, were vials were stoppered in lyophilization position and subjected to lyophilization according to lyophilization cycle #7. The resulting lyophilized product was tested for appearance, reconstitution appearance, pH, and recovery of brincidofovir. The recovery of brincidofovir was determined via HPLC, and thermogravimetric analysis. The results of the testing of appearance, reconstitution appearance and recovery of brincidofovir in the lyophilized formulation prepared according to the procedure outlined herein are summarized in Table 34.

TABLE 34

Appearance, reconstitution and recovery of formulations batch pre and post Lyophilization.

| Condition | Fraction Volatiles | Appear. | Reconst. time [s] | Foam. dissip. time [min]* | pH | Average c(BCV)[b] [mg/mL] |
|---|---|---|---|---|---|---|
| Pre lyo. | N/A | N/A | N/A | N/A | 8.0 | 10.7 |
| Release | 0.5 | Porous, uniform | 83 | <20 | 8.0 | 9.9 |

*Average value of three vials. The foaming intensity was evaluated at 10, 20 and 30 min after reconstitution. <20 indicates that the foaming dissipation time was between the 10 and 20 min interval. <30 indicates that the foaming dissipation time was between the 20 and 30 min interval. If foaming still persisted over 30 min, the dissipation time was indicated by >30 min.
[a]Scan range = 25° C. to 150° C., ramp rate = 10° C./min.
[b]Average value of the three (3) replicates of samples that received treatment.

v) Compatibility of Lyophilized Formulations

The liquid fill solution for the lyophilized Formulation 3a was tested for compatibility with infusion vehicles as well as a series of materials from the manufacturing and clinical stage. The results of the infusion vehicle compatibility testing are summarized in Table 38. No precipitation, pH shift or significant loss in recovery of brincidofovir were observed at the end of the study.

Infusion Vehicle Compatibility

The Formulation 3a was diluted with the infusion vehicle (5% dextrose) solution to yield c(BCV)=0.5 mg/mL and 1.0 mg/mL solutions. The appearance, pH, and brincidofovir recovery (determined via HPLC) were evaluated at the time of preparing the test solution (to), and after 2 h ($t_{2\,h}$), 8 h ($t_{8\,h}$), and 24 h ($t_{24\,h}$).

TABLE 35

Results of the infusion vehicle compatibility assessment.

| c(BCV) in infusion vehicle (mg/mL) | Time point (h) | Appearance | Measured pH | Observed c(BCV)[a] (mg/mL) | BCV Recovery[a,b] (%) |
|---|---|---|---|---|---|
| 0.5 | $t_0$ | Clear, Colorless | 7.9 | 0.492 | 100 |
|  | $t_{2\,h}$ | Clear, Colorless | 7.9 | 0.493 | 100 |
|  | $t_{8\,h}$ | Clear, Colorless | 7.7 | 0.492 | 100 |
|  | $t_{24\,h}$ | Clear, Colorless | 7.7 | 0.492 | 100 |
| 1.0 | $t_0$ | Clear, Colorless | 7.9 | 0.967 | 100 |
|  | $t_{2\,h}$ | Clear, Colorless | 7.8 | 0.966 | 100 |
|  | $t_{8\,h}$ | Clear, Colorless | 7.8 | 0.969 | 100 |
|  | $t_{24\,h}$ | Clear, Colorless | 7.7 | 0.967 | 100 |

[a]Average value of the three replicates.
[b]BCV recovery = c(BCV)$_{Hour\,n}$/c(BCV)$_{Hour\,0}$ × 100%. The value for BCV recovery at $t_0$ was defined as 100%.

Sterilization Filter Compatibility

The liquid Formulation 3a was tested for compatibility with two syringe filters for aseptic processing. 10 mL of the liquid Formulation 3a, were filtered through one of the filters a (0.2 μm, 25 mm, syringe filter, Posidyne® membrane) orb (0.2 μm, 25 mm, syringe filter, Supor® membrane (PES)), and the first and last 10% filtrate were evaluated for appearance, pH and recovery of brincidofovir.

The results of the evaluation are summarized in Table 36. No precipitation, pH shift or significant loss in brincidofovir recovery were observed. Samples appeared clear and colorless. Degradant peaks were not observed.

TABLE 36

Results of the sterilization filter compatibility assessment of formulation 3a.

| Filter membrane | Conditions | Appearance | Measured pH | Observed c(BCV)[a] (mg/mL) | BCV Recovery[a,b] |
|---|---|---|---|---|---|
| Posidyne® | Pre filtration | Clear, Colorless | 7.9 | 10.25 | 100 |
|  | First 10% filtrate volume | Clear, Colorless | 7.9 | 10.16 | 99 |
|  | Last 10% filtrate volume | Clear, Colorless | 7.9 | 10.12 | 99 |
| PES® | Pre filtration | Clear, Colorless | 7.9 | 10.25 | 100 |
|  | First 10% filtrate volume | Clear, Colorless | 7.9 | 10.21 | 100 |
|  | Last 10% filtrate volume | Clear, Colorless | 7.9 | 10.15 | 99 |

[a]Average value of the three replicates.
[b]BCV recovery = c(BCV)$_{Hour\,n}$/c(BCV)$_{Prefilling}$ × 100%. The value for BCV recovery at $t_0$ was defined as 100%.

Drug Product Vial and Stopper Compatibility

The liquid Formulation 3a was tested for compatibility with vials and stoppers. The vials were filled with 5 mL of the liquid Formulation 3a, stoppered, crimped, and stored for 6 hours at ambient conditions in upright and inverted orientations. The vials used for testing were clear, 20 mL, Class A borosilicate glass serum vials, and the stoppers were 20 mm Novapure® stoppers, with FluroTec® coating.

The results of the study are summarized in Table 37. No precipitation, pH shift or significant loss in brincidofovir recovery was observed throughout the study. No degradant peaks were observed in HPLC.

TABLE 37

Results of the drug product vial and stopper compatibility assessment.

| Conditions | Appearance | Measured pH | Observed c(BCV)[a] (mg/mL) | BCV Recovery[a,b] (%) |
|---|---|---|---|---|
| Pre filling | Clear, Colorless | 7.9 | 10.25 | 100 |
| Upright, 6 h | Clear, Colorless | 7.9 | 10.15 | 99 |
| Inverted, 6 h | Clear, colorless | 7.9 | 10.20 | 100 |

[a]Average value of the three replicates.
[b]BCV recovery = c(BCV)$_{Hour\ n}$/c(BCV)$_{Prefilling}$ × 100%. The value for BCV recovery at $t_0$ was defined as 100%.

Infusion Bag Compatibility

The liquid Formulation 3a was tested for compatibility with a 100 mL infusion bag. Solutions of Formulation 3a, in a 5% dextrose injection vehicle, were prepared at two different formulation strengths (1.0 mg/mL and 0.1 mg/mL brincidofovir), and stored in the infusion bag at ambient conditions. Samples form the infusion bags and from an externally diluted standard were evaluated for appearance, pH and brincidofovir recovery (determined via HPLC) at the beginning of the study ($t_0$), after 8 h ($t_{8\ h}$), and after 24 h ($t_{24\ h}$). The results of the infusion bag compatibility assessment are summarized in Table 38.

TABLE 38

Results of the infusion bag compatibility assessment

| c(BCV) in testing infusion bag | Bag replicate # | Conditions | Appearance | Measured pH | Observed c(BCV)[a] (mg/mL) | BCV Recovery[a,b] (%) |
|---|---|---|---|---|---|---|
| 0.1 | 1 | External dilution | Clear, Colorless | 7.2 | 0.0909 | 101 |
| | | $t_0$ | Clear, Colorless | 7.3 | 0.0896 | 100 |
| | | $t_{1\ h}$ | Clear, Colorless | 7.1 | 0.0893 | 100 |
| | | $t_{8\ h}$ | Clear, Colorless | 7.3 | 0.0909 | 101 |
| | | $t_{24\ h}$ | Clear, Colorless | 7 | 0.0906 | 101 |
| | 2 | $t_0$ | N/A | N/A | 0.0886 | 100 |
| | | $t_{24\ h}$ | Clear, Colorless | 7 | 0.0883 | 100 |
| | 3 | $t_0$ | N/A. | N/A | 0.111 | 100 |
| | | $t_{24\ h}$ | Clear, Colorless | 7 | 0.0891 | 81 |
| 1 | 1 | External dilution | Clear, Colorless | 7.9 | 0.927 | 101 |
| | | $t_0$ | Clear, Colorless | 7.9 | 0.915 | 100 |
| | | $t_{1\ h}$ | Clear, Colorless | 7.7 | 0.908 | 99 |
| | | $t_{8\ h}$ | Clear, Colorless | 7.8 | 0.914 | 100 |
| | | $t_{24\ h}$ | Clear, Colorless | 7.7 | 0.915 | 100 |
| | 2 | $t_0$ | N/A | N/A | 1.108 | 100 |
| | | $t_{24\ h}$ | Clear, Colorless | 7.7 | 1.106 | 100 |
| | 3 | $t_0$ | N/A. | N/A | 0.903 | 100 |
| | | $t_{24\ h}$ | Clear, Colorless | 7.7 | 0.903 | 100 |

[a]Average value of the three replicates.
[b]BCV recovery = c(BCV)$_{Hour\ n}$/c(BCV)$_{Hour\ 0}$ × 100%. The value for BCV recovery at $t_0$ was defined as 100%.

The samples appeared clear and colorless. For both sample concentrations, no significant loss in brincidofovir recovery was observed over 24 h. For one bag replicate at c(BCV)=0.1 mg/mL an apparent loss of brincidofovir (19%) is observed; It was further observed that a dilution of the brincidofovir formulation into the infusion vehicle, yielding a concentration of c(BCV)=0.1 mg/mL caused a significant pH shift to pH=7. No degradation was observed in the experiment.

Infusion System Compatibility

The brincidofovir formulation (10 mg/mL brincidofovir, 100 mM arginine, 5% mannitol, pH=8.0) was tested for compatibility with two infusion systems (Baxter, Non-DEHP CONTINU-FLO; B Braun, Rate Flow® regulator IV set). The liquid formulation was diluted into infusion bags as previously described (tested final concentrations: 1.0 mg/mL and 0.1 mg/mL) and an aliquot was collected from the infusion bag for analysis of brincidofovir recovery after 24 h (t0, bag). The infusion systems were then attached to the infusion bag and manually filled with solution from the infusion bag. Aliquots were collected as an end-of-line sample for analysis (t0, eol). The IV lines were closed between time points with the infusate resting within the infusion system and stored at ambient temperature. At testing time points, approximately 17 mL (approx. volume of the IV system) of infusate solution were drained, which led to a replacement of the solution in the IV system from the bag reservoir. Following this replacement, another end-of-line sample was collected for the assessments (t10 min, eol, t3 h, eol, and t6 h, eol). The samples were evaluated for appearance, pH, and brincidofovir recovery. The results of infusion system compatibility testing are summarized in Table 42.

An initial adsorption/saturation effect was observed for both IV systems at low c(BCV), indicated by a loss in brincidofovir recovery of 7-11%. This loss partially recovered over the following 6 h. The appearance of degradants was not observed over the course of this study. As previously noted, samples at c(BCV)=0.1 mg/mL showed a pH-shift by approximately one pH-unit to pH=7 upon dilution with 5% dextrose solution. The samples appeared clear and colorless over the course of the study.

TABLE 39

Results of the infusion system compatibility assessment.

| Testing infusion system | c(BCV) in infusion bag (mg/mL) | Conditions | Appearance | pH | Observed c(BCV)[a] (mg/mL) | BCV Recovery[a,b] (%) |
|---|---|---|---|---|---|---|
| Baxter | 0.1 | $t_0$, bag | Clear, Colorless | 7 | 0.0883 | 100 |
|  |  | $t_0$, eol | Clear, Colorless | 6.9 | 0.0826 | 93 |
|  |  | $t_{10}$ min, eol | Clear, Colorless | 6.9 | 0.0868 | 98 |
|  |  | $t_3$ h, eol | Clear, Colorless | 7 | 0.0876 | 99 |
|  |  | $t_6$ h, eol | Clear, Colorless | 7 | 0.0863 | 98 |
|  | 1 | $t_0$, bag | Clear, Colorless | 7.7 | 1.106 | 100 |
|  |  | $t_0$, eol | Clear, Colorless | 7.7 | 1.095* | 99 |
|  |  | $t_{10}$ min, eol | Clear, Colorless | 7.7 | 1.121 | 101 |
|  |  | $t_3$ h, eol | Clear, Colorless | 7.7 | 1.136 | 103 |
|  |  | $t_6$ h, eol | Clear, Colorless | 7.7 | 1.107 | 100 |
| B Braun | 0.1 | $t_0$, bag | Clear, Colorless | 7 | 0.0891 | 100 |
|  |  | $t_0$, eol | Clear, Colorless | 6.9 | 0.0796 | 89 |
|  |  | $t_{10}$ min, eol | Clear, Colorless | 6.9 | 0.0854 | 96 |
|  |  | $t_3$ h, eol | Clear, Colorless | 7 | 0.0849 | 95 |
|  |  | $t_6$ h, eol | Clear, Colorless | 6.9 | 0.0844 | 95 |
|  | 1 | $t_0$, bag | Clear, Colorless | 7.7 | 0.903 | 100 |
|  |  | $t_0$, eol | Clear, Colorless | 7.7 | 0.9 | 100 |
|  |  | $t_{10}$ min, eol | Clear, Colorless | 7.6 | 0.908 | 101 |
|  |  | $t_3$ h, eol | Clear, Colorless | 7.7 | 0.909 | 101 |
|  |  | $t_6$ h, eol | Clear, Colorless | 7.7 | 0.909 | 101 |

[a]Average value of the three replicates.
[b]BCV recovery = $c(BCV)_{Hour\ n}/c(BCV)_{Hour\ 0} \times 100\%$. The value for BCV recovery at $t_0$ was defined as 100%.

Example 6—Stability Testing

The bulk liquid formulations and lyophilized formulations of the disclosure were further tested for stability. A liquid formulation comprising arginine, mannitol, and brincidofovir at a concentration of 10 mg/mL was kept in a 10 mL glass vial, stoppered (rubber stopper or 20 mm serum stopper) and sealed (aluminum seals), and kept at about 5° C. or about 25° C. for up to 12 months. The appearance, pH and brincidofovir content of the stored formulation were monitored along with impurities and particulate matter, at various time intervals (i.e., after 2 weeks, after 1 month, after 2 months, after 3 months, after 6 months, after 9 months and after 12 months). Impurities were evaluated via HPLC and are identified herein by their relative retention time. The same experiment was repeated for a solution of the lyophilized powder, comprising 10 mg/mL of brincidofovir. For the lyophilized formulations, a 20 mL glass vial with a 20 mm rubber stopper was used. Furthermore, the appearance of the lyophilized powder (i.e., the lyophilization cake) was recorded.

The results of the stability study of the bulk liquid formulations at 5° C. and 25° C. are summarized in Tables 40A and 40B, respectively. The results of the stability study of the lyophilized formulations at 5° C. and 25° C. are summarized in Tables 41A, 41B, and 42, respectively.

TABLE 40A

Stability of liquid formulation at 5° C. (±3° C.)

| Test | Specifications Acceptance Criteria | Initial | 2 week | 1 month | 2 month | 3 month | 6 month | 9 month | 12 month |
|---|---|---|---|---|---|---|---|---|---|
| Appearance | Clear, colorless; free of visible particulates | Conforms | Conforms | Conforms | Conforms | Conforms | Conforms | Does not conform | Conforms |
| Brincidofovir Content - Average | 90.0 to 110.0% | 100.3 | 100.7 | 100.4 | 100.0 | 101.2 | 101.3 | 99.9 | 99.8 |
| Drug Related Impurities – RRT 0.80 | Report Results | <0.05 | <0.05 | <0.05 | 0.05 | 0.06 | 0.07 | 0.12 | 0.15 |
| Drug Related Impurities – RRT 1.13 | Report Results | <0.05 | <0.05 | <0.05 | <0.05 | <0.05 | <0.05 | <0.05 | <0.05 |
| Drug Related Impurities – RRT 1.19 | Report Results | <0.05 | <0.05 | <0.05 | <0.05 | <0.05 | <0.05 | <0.05 | <0.05 |
| Drug Related Impurities – RRT 1.34 | Report Results | <0.05 | <0.05 | <0.05 | <0.05 | <0.05 | <0.05 | <0.05 | <0.05 |
| Drug Related Impurities – RRT 1.42 | Report Results | <0.05 | <0.05 | <0.05 | <0.05 | <0.05 | <0.05 | <0.05 | <0.05 |
| Drug Related Impurities – Total Impurities | Report Results | <0.05 | <0.05 | <0.05 | 0.05 | 0.06 | 0.07 | 0.12 | 0.15 |

TABLE 40A-continued

Stability of liquid formulation at 5° C. (±3° C.)

| Test | Specifications Acceptance Criteria | Stability Intervals | | | | | | | |
|---|---|---|---|---|---|---|---|---|---|
| | | Initial | 2 week | 1 month | 2 month | 3 month | 6 month | 9 month | 12 month |
| pH - Average | 7.5 to 8.5 | 8.0 | 8.0 | 7.9 | 7.8 | 8.0 | 8.0 | 7.8 | 7.9 |
| Particulate Matter - 10 μm | ≤6000 | 148 | N/T | 274 | N/T | 181 | 135 | N/T | N/T |
| Particulate Matter - 25 μm | ≤600 | 1 | N/T | 1 | N/T | 2 | 2 | N/T | N/T |

TABLE 40B

Stability of liquid formulation at 25° C. (±2° C.) and 60% relative humidity (±5% relative humidity)

| Test | Specifications Acceptance Criteria | Stability Intervals | | | | | | |
|---|---|---|---|---|---|---|---|---|
| | | Initial | 2 week | 1 month | 2 month | 3 month | 6 month | 12 month |
| Appearance | Clear, colorless; free of visible particulates | Conforms | Conforms | Conforms | Conforms | Conforms | Conforms | Conforms |
| Brincidofovir Content - Average | 90.0 to 110.0% | 100.3 | 100.9 | 100.1 | 99.4 | 98.9 | 99.9 | 97.5 |
| Drug Related Impurities – RRT 0.80 | Report Results | <0.05 | 0.10 | 0.21 | 0.37 | 0.54 | 1.0 | 2.0 |
| Drug Related Impurities – RRT 1.13 | Report Results | <0.05 | <0.05 | 0.06 | 0.07 | 0.12 | 0.29 | 0.60 |
| Drug Related Impurities – RRT 1.19 | Report Results | <0.05 | <0.05 | 0.05 | <0.05 | <0.05 | <0.05 | <0.05 |
| Drug Related Impurities – RRT 1.34 | Report Results | <0.05 | <0.05 | <0.05 | <0.05 | 0.05 | <0.05 | <0.05 |
| Drug Related Impurities – RRT 1.42 | Report Results | <0.05 | <0.05 | <0.05 | <0.05 | <0.05 | <0.05 | 0.05 |
| Drug Related Impurities – Total Impurities | Report Results | <0.05 | 0.10 | 0.32 | 0.45 | 0.71 | 1.3 | 2.7 |
| pH - Average | 7.5 to 8.5 | 8.0 | 8.0 | 7.9 | 7.9 | 8.0 | 8.0 | 7.9 |
| Particulate Matter- 10 μm | ≤6000 | 148 | N/T | N/T | N/T | N/T | 325 | N/T |
| Particulate Matter - 25 μm | ≤600 | 1 | N/T | N/T | N/T | N/T | 7 | N/T |

TABLE 41A

Stability of lyophilized formulation at 5° C. (±3° C.)

| Test | Specifications Acceptance Criteria | Stability Intervals | | | | | | | |
|---|---|---|---|---|---|---|---|---|---|
| | | Initial | 2 week | 1 month | 2 month | 3 month | 6 month | 9 month | 12 month |
| Appearance of Lyophilized Cake-Appearance | Report Results | White porous uniform structure with some solid deposits on vial above the cake | White porous uniform structure with some solid deposits above the cake on the vials. The vials had some cake | White uniform cake with some deposited material above | White uniform cake with deposited material above on the wall. One cake at −20° C., both cakes at 5° C., and one cake | White porous uniform structure with some solid deposits above the cake in the vial. | White cake in the bottom of the bottle | White porous uniform structure with some solid deposits above the cake in the vial. | White porous uniform structure with some solid deposits above the cake on the vial. |

TABLE 41A-continued

Stability of lyophilized formulation at 5° C. (±3° C.)

| Test | Acceptance Criteria | Initial | 2 week | 1 month | 2 month | 3 month | 6 month | 9 month | 12 month |
|---|---|---|---|---|---|---|---|---|---|
| | | | particulates on the stoppers of the vials. | | at 40° C., are removable from the bottom of the vial. | | | | |
| Completeness and Clarity of Solution | Meets the requirements of USP <1> | N/T | N/T | N/T | Conforms | Not tested | Conforms | Conforms | Conforms |
| Brincidofovir Content - Average | 90.0 to 110.0% | 100.3 | 100.4 | 98.6 | 98.7 | 98.2 | 100.1 | 98.4 | 98.2 |
| Drug Related Impurities - Synergi imp | Report Results | None Detected | None Detected | None Detected | None Detected | None Detected | None Detected | None Detected | None Detected |
| Drug Related Impurities - XBridge imp | Report Results | None Detected | None Detected | None Detected | None Detected | None Detected | None Detected | None Detected | None Detected |
| Drug Related Impurities – Total Impurities = XBridge + Synergi | Report Results | None Detected | None Detected | None Detected | None Detected | None Detected | None Detected | None Detected | None Detected |
| pH | 7.5 to 8.5 | 7.9 | 7.9 | 7.9 | 7.9 | 7.9 | 7.8 | 7.9 | 7.9 |
| Reconstitution Time - Prep 1 | Report Results | 90 | N/T | N/T | 136 | 129 | 105 | 152 | 160 |
| Reconstitution Time - Prep 2 | Report Results | 95 | N/T | N/T | 160 | 90 | 125 | 148 | 130 |
| Particulate Matter - 10 µm | ≤6000 | 188 | N/T | 52 | N/T | N/T | 84 | N/T | N/T |
| Particulate Matter - 25 µm | ≤600 | 4 | N/T | 0 | N/T | N/T | 3 | N/T | N/T |
| Moisture Average | Report Results | N/T | N/T | N/T | 0.3 | 0.8 | 0.5 | N/T | 0.5 |

TABLE 41B

Stability of lyophilized formulation at 25° C. (±2° C.) and 60% relative humidity (±5% relative humidity)

| Test | Acceptance Criteria | Initial | 2 week | 1 month | 3 month | 6 month | 9 month | 12 month |
|---|---|---|---|---|---|---|---|---|
| Appearance of Lyophilized Cake-Appearance | Report Results | White porous uniform structure with some solid deposits on vial above the cake | White porous uniform structure with some solid deposits above the cake on the vials. The vials had some cake particulates on the stoppers of the vials. | White uniform cake with some deposited material above | White porous uniform structure with some solid deposits above the cake on the vial. | White cake in the bottom of the bottle | White porous uniform structure with some solid deposits above the cake on the vial. | White porous uniform structure with some solid deposits above the cake on the vial. |

TABLE 41B-continued

Stability of lyophilized formulation at 25° C. (±2° C.) and 60% relative humidity (±5% relative humidity)

| Test | Specifications Acceptance Criteria | Stability Intervals | | | | | | |
|---|---|---|---|---|---|---|---|---|
| | | Initial | 2 week | 1 month | 3 month | 6 month | 9 month | 12 month |
| Completeness and Clarity of Solution | Meets the requirements of USP <1> | N/T | N/T | N/T | Not tested | Conforms | Conforms | Conforms |
| Brincidofovir Content - Average | 90.0 to 110.0% | 100.3 | 98.0 | 98.5 | 98.4 | 101.2 | 98.2 | 98.5 |
| Drug Related Impurities - Synergi imp | Report Results | None Detected | None Detected | None Detected | None Detected | None Detected | None Detected | None Detected |
| Drug Related Impurities - XBridge imp | Report Results | None Detected | None Detected | None Detected | None Detected | None Detected | None Detected | None Detected |
| Drug Related Impurities – Total Impurities = XBridge + Synergi | Report Results | None Detected | None Detected | None Detected | None Detected | None Detected | None Detected | None Detected |
| pH | 7.5 to 8.5 | 7.9 | 7.9 | 7.9 | 7.9 | 7.8 | 7.9 | 7.9 |
| Reconstitution Time - Prep 1 | Report Results | 90 | N/T | N/T | 92 | 111 | 147 | 177 |
| Reconstitution Time - Prep 2 | Report Results | 95 | N/T | N/T | 91 | 103 | 135 | 189 |
| Particulate Matter-10 μm | ≤6000 | 188 | N/T | N/T | N/T | 83 | N/T | N/T |
| Particulate Matter-25 μm | ≤600 | 4 | N/T | N/T | N/T | 2 | N/T | N/T |
| Moisture Average | Report Results | N/T | N/T | N/T | 0.6 | 0.5 | 0.6 | 0.6 |

TABLE 42

Stability of lyophilized formulation at 40° C. (±2° C.) and 60% relative humidity (±5% relative humidity)

| Test | Specifications Acceptance Criteria | Stability Intervals | | | | | |
|---|---|---|---|---|---|---|---|
| | | Initial | 2 week | 1 month | 2 month | 3 month | 6 month |
| Appearance of Lyophilized Cake-Appearance | Report Results | White porous uniform structure with some solid deposits on vial above the cake | White porous uniform structure with some solid deposits above the cake on the vials. The vials had some cake particulates on the stoppers of the vials. | White uniform cake with some deposited material above | White uniform cake with some deposited material above on the wall. One cake at −20° C., both cakes at 5° C., and one cake at 40° C. are removable from the bottom of the vial. | White porous uniform structure with some solid deposits above the cake in the vials. | White cake in the bottom of the bottle |

TABLE 42-continued

Stability of lyophilized formulation at 40° C. (±2° C.) and 60% relative humidity (±5% relative humidity)

| | Specifications | | | Stability Intervals | | | |
|---|---|---|---|---|---|---|---|
| Test | Acceptance Criteria | Initial | 2 week | 1 month | 2 month | 3 month | 6 month |
| Completeness and Clarity of Solution | Meets the requirements of USP <1> | Not tested | Not tested per protocol | Not tested per protocol | Conforms | Not tested | Conforms |
| Brincidofovir Content - Average | 90.0 to 110.0% | 100.3 | 97.5 | 99.1 | 98.8 | 98.5 | 99.6 |
| Drug Related Impurities - Synergi imp | Report Results | None detected | None detected | None detected | None detected | None detected | None detected |
| Drug Related Impurities - XBridge imp | Report Results | None detected | None detected | None detected | None detected | None detected | None detected |
| Drug Related Impurities – Total Impurities = XBridge + Synergi | Report Results | None detected | None detected | None detected | None detected | None detected | None detected |
| pH | 7.5 to 8.5 | 7.9 | 7.9 | 7.9 | 7.9 | 7.9 | 7.8 |
| Reconstitution Time - Prep 1 | Report Results | 90 | Not tested per protocol | Not tested per protocol | 135 | 82 | 99 |
| Reconstitution Time - Prep 2 | Report Results | 95 | Not tested per protocol | Not tested per protocol | 126 | 77 | 106 |
| Particulate Matter - 10 μm | ≤6000 | 188 | Not tested per protocol | Not tested per protocol | Not tested per protocol | Not tested per protocol | Not tested per protocol |
| Particulate Matter - 25 μm | ≤600 | 4 | Not tested per protocol | Not tested per protocol | Not tested per protocol | Not tested per protocol | Not tested per protocol |
| Moisture Average | Report Results | | Not tested per protocol | Not tested per protocol | Not tested per protocol | 0.6 | 0.6 |

Example 7—Determination of Hemocompatibility in Rat and Human Whole Blood

Introduction

Each concentration of test item for the rat was mixed separately in a 1:4 ratio with rat whole blood while each concentration of test item for the human was mixed separately in a 1:4 ratio with human whole blood. These samples plus control samples [vehicle control (vehicle+whole blood, 1 for rat and 1 for humans), positive control (1% Saponin+whole blood), untreated whole blood control and negative control (saline+whole blood) were analyzed for hemolysis (supernatant hemoglobin concentration).

The rat and human whole blood samples were incubated in test or control items at 37±1° C. for 20 minutes and then immediately (within 2 minutes) centrifuged at 3500±100 rpm (2740 g) at room temperature for 5-10 minutes. The supernatant was extracted and subjected to a hemoglobin analysis using the cyanmethemoglobin method employed on the Siemens Advia 120 hematology analyzer. If the test item has a potential for causing hemolysis, then hemoglobin released from lysed red blood cells into the plasma supernatant can be quantified via the reaction of heme iron in solution being oxidized from a ferrous to a ferric state in the presence of potassium cyanide. The reaction results in the formation of methemoglobin, which then combines with cyanide to form a stable cyanmethemoglobin. When measured spectrophotometrically at 546 nm the absorbance of cyanmethemoglobin follows Beer's Law and is directly proportional to the concentration of hemoglobin released into solution. In addition, the formulated test item at each concentration assessed was mixed in a 1:4 ratio with saline and then directly analyzed to ensure that the test item formulations did not interfere with the Siemens Advia measurement of hemoglobin.

Materials and Methods

The testing was conducted in 2 phases as shown below:

TABLE 43

Phase 1, Brincidofovir in Rat Blood

| Tube | Rat Blood* | Test Item (BCV)[a] | Vehicle[b] | Positive Control[c] | Saline[d] |
|---|---|---|---|---|---|
| 1[e] | + | +0.2, 0.5 and 1.6 mg/mL | − | − | − |
| 2[f] | − | +0.2, 0.5 and 1.6 mg/mL | − | − | + |
| 3[g] | + | − | + | − | − |
| 4[h] | + | − | − | + | − |
| 5[i] | + | − | − | − | − |
| 6[j] | + | − | − | − | + |

*1.0 mL added to Tubes 1 (separate tube for each concentration) and Tubes 3-6
[a]250 μL added to Tubes 1-2 (separate tube for each concentration)
[b]250 μL added to Tube 3
[c]250 μL added to Tube 4
[d]1.0 mL added to Tube 2; 250 μL added to Tube 6
[e]Test item assay for hemolysis:
Tube 1A contained 0.2 mg/mL
Tube 1B contained 0.5 mg/mL
Tube 1C contained 1.6 mg/mL
[f]Test item interference control:
Tube 2A contained 0.2 mg/mL
Tube 2B contained 0.5 mg/mL
Tube 2C contained 1.6 mg/mL
[g]Vehicle control for hemolysis
[h]Positive control for hemolysis; 1% Saponin was used as a positive control
[i]Untreated whole blood control for hemolysis
[j]Negative control for hemolysis
+ Added to the tube
− Not added to the tube
Note:
Tubes 3-6 for each phase were run once per phase.

TABLE 44

Phase 2, Brincidofovir in Human Blood

| Tube | Human Blood* | Test Item (BCV)[a] | Vehicle[b] | Positive Control[c] | Saline[d] |
|---|---|---|---|---|---|
| 1[e] | + | +0.2, 0.5 and 1.6 mg/mL | − | − | − |
| 2[f] | − | +0.2, 0.5 and 1.6 mg/mL | − | − | + |
| 3[g] | + | − | + | − | − |
| 4[h] | + | − | − | + | − |
| 5[i] | + | − | − | − | − |
| 6[j] | + | − | − | − | + |

*1.0 mL added to Tubes 1 (separate tube for each concentration) and Tubes 3-6
[a]250 μL added to Tubes 1-2 (separate tube for each concentration)
[b]250 μL added to Tube 3
[c]250 μL added to Tube 4
[d]1.0 mL added to Tube 2; 250 μL added to Tube 6
[e]Test item assay for hemolysis:
Tube 1A contained 0.2 mg/mL
Tube 1B contained 0.5 mg/mL
Tube 1C contained 1.6 mg/mL
[f]Test item interference control:
Tube 2A contained 0.2 mg/mL
Tube 2B contained 0.5 mg/mL
Tube 2C contained 1.6 mg/mL
[g]Vehicle control for hemolysis
[h]Positive control for hemolysis; 1% Saponin was used as a positive control
[i]Untreated whole blood control for hemolysis
[j]Negative control for hemolysis
+ Added to the tube
− Not added to the tube
Note:
Tubes 3-6 for each phase were run once per phase.

Control Item (Vehicle)

The control items for dose formulations was 2 sodium phosphate buffer solution (400 mM, pH=8.0); 1.0N sodium hydroxide solution; sterilized water for injection; and 5% dextrose solution.

Test Preparation and Analysis

Brincidofovir injectable liquid stock formulation was prepared to 15 mg/mL brincidofovir, compounded from stock solutions inclusive of three (3) steps: (1) 2× sodium phosphate buffer solution (400 mM, pH=8.0) was prepared; (2) 1.0 N sodium hydroxide solution was purchased; brincidofovir injectable liquid stock formulation (15 mg/mL brincidofovir, 200 mM sodium phosphate, pH=8.0) from solid brincidofovir, 1.0 N sodium hydroxide solution, 2× sodium phosphate buffer solution and WFI (water for injection) was prepared.

The brincidofovir injectable liquid stock formulation is stable for 28 days under refrigerated conditions (2 to 8° C.). Brincidofovir injectable liquid stock formulation was diluted with 5% dextrose to yield the desired dose concentration.

Fresh dose formulations were prepared once on the day of testing. Dose formulations were refrigerated (2 to 8° C.) when not in use.

Saponin was diluted with saline to the appropriate concentration on the day of testing.

Test System

Whole blood (~20 mL) from rats (samples from four animals were pooled for testing) was collected in presence of $K_2$EDTA anticoagulant and inverted to mix.

Human whole blood (~20 mL) was collected for use in this study from one human volunteer in the presence of $K_2$EDTA anticoagulant.

The blood samples were held for no more than 4 hours at room temperature following collection, for use in hemolytic potential testing in this study.

Test Methodology

Each concentration of test item for the rat was mixed separately in a 1:4 ratio with rat whole blood while each concentration of test item for the human was mixed separately in a 1:4 ratio with human whole blood. These samples plus control samples [vehicle control (vehicle+whole blood, 1 for rat and 1 for humans), positive control (1% Saponin+whole blood), untreated whole blood control and negative control (saline+whole blood) were analyzed for hemolysis (supernatant hemoglobin concentration).

The rat and human whole blood samples were incubated in test or control items at 37±1° C. for 20 minutes and then immediately (within 2 minutes) centrifuged at 3500±100 rpm (2740 g) at room temperature for 5-10 minutes. The supernatant was extracted and subjected to a hemoglobin analysis using the cyanmethemoglobin method employed on the Siemens Advia 120 hematology analyzer. Without wishing to be bound by theory, if the test item has a potential for causing hemolysis, then hemoglobin released from lysed red blood cells into the plasma supernatant can be quantified via the reaction of heme iron in solution being oxidized from a ferrous to a ferric state in the presence of potassium cyanide. The reaction results in the formation of methemoglobin, which then combines with cyanide to form a stable cyanmethemoglobin. When measured spectrophotometrically at 546 nm the absorbance of cyanmethemoglobin follows Beer's Law and is directly proportional to the concentration of hemoglobin released into solution.

In addition, the formulated test item at each concentration assessed was mixed in a 1:4 ratio with saline and then directly analyzed to ensure that the test item formulations did not interfere with the Siemens Advia measurement of hemoglobin.

The testing was conducted in 2 phases.

Two independent analytical runs composing 1 batch were performed using whole blood from 4 normal rats and 1 human donor. The R&D Systems whole blood quality control sets were run before and after the batch to verify operation performance of the instrument using established criteria for this control set per the stated manufacturer's ranges for the control material. An independent (Pointe Scientific) set of Low, Mid, and High controls containing hemoglobin in solution was run once to verify the control rank order of the measurement of hemoglobin in solution phase. The negative and positive control, and test samples were run in singlet.

Hemolytic Potential Criteria

Run Criteria:

The 1% Saponin positive control must demonstrate hemoglobin value>(Negative Control+0.5 g/dL) for the assay run to be considered acceptable.

Untreated whole blood must demonstrate hemoglobin values<(Negative Control+0.5 g/dL).

Saline+untreated whole blood (Negative Control) must demonstrate hemoglobin values<0.5 g/dL.

R&D Systems whole blood control set should be within the defined manufacturer's target range.

The Pointe Scientific liquid hemoglobin controls have no established target range for the ADVIA instrument but should demonstrate a rank order in response (based on concentration) of High>Mid>Low.

Sample Analysis Criteria

The test item+saline sample must demonstrate hemoglobin value<(Negative Control+0.5 g/dL) for the assay run to be considered valid.

The vehicle control sample must demonstrate hemoglobin value<(Negative Control+0.5 g/dL) for the assay to be considered valid The (Pointe Scientific) liquid QC control set containing hemolysates prepared from human erythrocytes ranging from Low, Mid, and High concentrations were used to verify the ability of the Advia to measure liquid hemolysates using the Advia cyanmethemoglobin procedure. The Low, Mid, and High liquid controls from Phase 1 returned values of: 7.9, 11.7, and 15.6 g/dL, respectively, as measured on the Siemens Advia. The Low, Mid, and High liquid controls from Phase 2 returned values of: 8.1, 11.9, and 15.6 g/dL, respectively, as measured on the Siemens Advia. The rank order of the control sets meets the protocol criteria.

The (R&D System) whole blood quality controls were used to verify the operational performance of the Siemens Advia 120 hematology instrument. The QC values recorded in the raw data were within the defined manufacturer's acceptable ranges for the Advia instrument.

The amphipathic glycoside Saponin, which complexes with cholesterol to form pores in cell membrane bilayers and cause red blood cell lysis, was utilized for the positive hemolytic control. The 1% Saponin-treated positive controls for rat and human whole blood hemolysis generated a mean hemoglobin concentration of 3.9 and 11.0 g/dL in the supernatant, respectively (Tables 47, 48, 49 and 50). These values met the protocol defined assay acceptability criterion of hemoglobin concentration>(Negative Control+0.5 g/dL).

The vehicle control (5% Dextrose) in rat and human whole blood in Phases 1 and 2 generated a mean hemoglobin concentration of 0.0 g/dL (Tables 47, 48, 49 and 50). The vehicle control from both phases met the protocol defined sample analysis criterion of <(Negative Control+0.5 g/dL).

The plasma and negative controls from both phases exhibited a mean hemoglobin concentration of 0.0 g/dL (Tables 47, 48, 49 and 50). These values met the protocol defined assay acceptability criteria of untreated whole blood hemoglobin concentration<(Negative Control+0.5 g/dL) and saline with untreated whole blood hemoglobin concentration<0.5 g/dL.

Vehicle controls were negative and method controls provided the expected targeted values. All control checks indicate acceptable runs in Phases 1 and 2.

Brincidofovir Hemolytic Potential

Brincidofovir in rat whole blood at 0.2, 0.5 and 1.6 mg/mL exhibited mean hemoglobin concentrations of 0.0, 0.25 and 1.35 g/dL, respectively (Tables 47, 48, 49 and 50) and as summarized:

TABLE 45

Brincidofovir Hemolysis in Rat Whole Blood

| Tube | Contents | Mean HgB Concentration (g/dL) | Estimated % Hemolysis* |
|---|---|---|---|
| 1A | Test Item (0.2 mg/mL) + whole blood | 0.0 | — |
| 1B | Test Item (0.5 mg/mL) + whole blood | 0.25 | 2.4% |
| 1C | Test Item (1.6 mg/mL) + whole hood | 1.35 | 13.0% |

*Calculated as: (HgB plasma)/(normal HgB whole blood × dilution factor) * 100
Based on normal whole blood rat hemoglobin value of 13 g/dL (as per our HCD)

Point scientific controls are system tests to verify the measurement of hemoglobin in solution phase. As set forth herein, brincidofovir demonstrated a hemolytic potential effect in rat whole blood that appears to be concentration dependent. Presumptive evidence of this effect was observed at the 0.5 mg/mL concentration and more distinct evidence of hemolysis was observed at the 1.6 mg/mL concentration.

The estimated % hemolysis for detectable levels of hemoglobin in this study can be calculated using the mean normal hemoglobin concentration for rat whole blood and the appropriate dilution factor. For instance, a rat whole blood normal hemoglobin value of 13 g/dL corrected for dilution by test article, results in a value of 10.4 g/dL (13×0.8). The calculated % hemolysis for hemoglobin values of 0.25 and 1.35 g/dL was 2.4% and 13.0% respectively. Formulations with a hemolysis value of <10% are considered to be non-hemolytic while values>25% are considered to be at risk for hemolysis (Amin and Dannenfelser, 2006). Without wishing to be bound by theory, the 0.2 mg/mL concentration showed no detectable hemoglobin and is thus considered non-hemolytic. Concentrations of 0.5 and 1.6 mg/mL resulted in detectable hemoglobin levels in rat whole blood, but the levels noted were not considered a hemolytic risk.

Results of two (n=2) independent analytical runs from Phase 2 indicated that there was no effect from brincidofovir on hemocompatibility with human whole blood at the concentrations of 0.2 and 0.5 and 1.6 mg/mL and as summarized:

TABLE 46

Brincidofovir Hemolysis in Human Whole Blood

| Tube | Contents | Mean HgB Concentration (g/dL) | Estimated % Hemolysis* |
|---|---|---|---|
| 1A | Test Item (0.2 mg/mL) + whole blood | 0.0 | — |
| 1B | Test Item (0.5 mg/mL) + whole blood | 0.0 | — |
| 1C | Test Item (1.6 mg/mL) + whole blood | 0.0 | — |

*Calculated as: (HgB plasma)/(normal HgB whole blood × dilution factor) * 100
Based on normal whole blood human female hemoglobin value of 14 g/dL (as per Mayo Clinic on-line data)

In addition, brincidofovir was not found to interfere with hemoglobin concentration determinations in both Phases 1 and 2 (Tables 47, 48, 49 and 50). Test item controls met the protocol defined sample analysis criterion which indicates acceptable runs in Phases 1 and 2.

Results of two (n=2) independent analytical runs from Phase 1 indicated without wishing to be bound by theory that brincidofovir demonstrated a hemolytic potential effect in rat whole blood that appears to be concentration dependent. Without wishing to be bound by theory, presumptive evidence of this effect was observed at the 0.5 mg/mL concentration and clear evidence of hemolysis was observed at the 1.6 mg/mL concentration. Formulations with a hemolysis value of <10% are considered to be non-hemolytic while values>25% are considered to be at risk for hemolysis. The 0.2 mg/mL concentration showed no detectable hemoglobin and is considered non-hemolytic. Concentrations of 0.5 and 1.6 mg/mL resulted in detectable hemoglobin levels in rat whole blood, but the levels noted were not considered a hemolytic risk.

Results of two (n=2) independent analytical runs from Phase 2 indicated that there was no effect from brincidofovir on hemocompatibility with human whole blood at the concentrations of 0.2, 0.5 or 1.6 mg/mL.

Without wishing to be bound by theory, not all species react the same to the positive hemolytic reagents which may represent RBC fragility differences between species.

TABLE 47

Summary of Hemolytic Potential Results; Brincidofovir in Rat Blood Phase 1

| Tube | Contents | Mean HgB Concentration (g/dL) | Estimated % Hemolysis* |
|---|---|---|---|
| 1A | Test Item (0.2 mg/mL) + whole blood | 0.0 | — |
| 1B | Test Item (0.5 mg/mL) + whole blood | 0.25 | 2.4% |
| 1C | Test Item (1.6 mg/mL) + whole blood | 1.35 | 13.0% |
| 2A | Test Item (0.2 mg/mL) + saline | 0.0 | — |
| 2B | Test Item (0.5 mg/mL) + saline | 0.0 | — |
| 2C | Test Item (1.6 mg/mL) + saline | 0.0 | — |
| 3 | Test Item Vehicle + whole blood | 0.0 | — |
| 4 | Positive Control (whole blood + 1.0% saponin) | 3.9 | 37.5% |
| 5 | Plasma Control (whole blood) | 0.0 | — |
| 6 | Negative (saline + whole blood) | 0.0 | — |

*Calculated as: (HgB plasma)/(normal HgB whole blood × dilution factor) * 100
Based on normal whole blood rat hemoglobin value of 13 g/dL (as per our HCD)

TABLE 48

Summary of Hemolytic Potential Results; Brincidofovir in Human Blood Phase 2

| Tube | Contents | Mean HgB Concentration (g/dL) | Estimated % Hemolysis* |
|---|---|---|---|
| 1A | Test Item (0.2 mg/mL) + whole blood | 0.0 | — |
| 1B | Test Item (0.5 mg/mL) + whole blood | 0.0 | — |
| 1C | Test Item (1.6 mg/mL) + whole blood | 0.0 | — |
| 2A | Test Item (0.2 mg/mL) + saline | 0.0 | — |
| 2B | Test Item (0.5 mg/mL) + saline | 0.0 | — |
| 2C | Test Item (1.6 mg/mL) + saline | 0.0 | — |
| 3 | Test Item Vehicle + whole blood | 0.0 | — |
| 4 | Positive Control (whole blood + 1.0% saponin) | 11.0 | 98.2% |
| 5 | Plasma Control (whole blood) | 0.0 | — |
| 6 | Negative (saline + whole blood) | 0.0 | — |

*Calculated as: (HgB plasma)/(normal HgB whole blood × dilution factor) * 100
Based on normal whole blood human female hemoglobin value of 14 g/dL (as per Mayo Clinic on-line data)

TABLE 49

Hemolytic Potential Results (Hemoglobin Concentration in g/dL): Brincidofovir in Rat Blood Phase 1

| Test Samples | Tube Number | | | | | | |
|---|---|---|---|---|---|---|---|
| | 1A | 1B | 1C | 2A | 2B | 2C | 3 |
| Run 1 | 0.0 | 0.2 | 1 | 0.0 | 0.0 | 0.0 | 0.0 |
| Run 2 | 0.0 | 0.3 | 1.7 | 0.0 | 0.0 | 0.0 | |
| Mean | 0.0 | 0.25 | 1.35 | 0.0 | 0.0 | 0.0 | 0.0 |
| SD | 0.0 | 0.1 | 0.5 | 0.0 | 0.0 | 0.0 | |

| Controls | Tube Number | | |
|---|---|---|---|
| | 4 | 5 | 6 |
| Run 1 | 3.9 | 0.0 | 0.0 |

TABLE 50

Hemolytic Potential Results (Hemoglobin Concentration in g/dL): Brincidofovir in Human Blood Phase 2

| Test Samples | Tube Number | | | | | | |
|---|---|---|---|---|---|---|---|
| | 1A | 1B | 1C | 2A | 2B | 2C | 3 |
| Run 1 | 0.0 | 0.0 | 0.0 | 0.0 | 0.0 | 0.0 | 0.0 |
| Run 2 | 0.0 | 0.0 | 0.0 | 0.0 | 0.0 | 0.0 | |
| Mean | 0.0 | 0.0 | 0.0 | 0.0 | 0.0 | 0.0 | 0.0 |
| SD | 0.0 | 0.0 | 0.0 | 0.0 | 0.0 | 0.0 | |

| Controls | Tube Number | | |
|---|---|---|---|
| | 4 | 5 | 6 |
| Run 1 | 11.0 | 0.0 | 0.0 |

1A = Test Item assay for hemolysis at 0.2 mg/mL
1B = Test Item assay for hemolysis at 0.5 mg/mL
1C = Test Item assay for hemolysis at 1.6 mg/mL
2A = Test Item interference control at 0.2 mg/mL
2B = Test Item interference control at 0.5 mg/mL
2C = Test Item interference control at 1.6 mg/mL
3 = Vehicle control for hemolysis
4 = Hemolytic positive control; 1% Saponin used as a positive control
5 = Untreated whole blood control for hemolysis
6 = Negative control for hemolysis
SD = standard deviation Example 8—Maximum Tolerated Dose and 7-Day Dose Range-Finding (DRF) Study in Rats The purpose of this 2-phase study was to determine the maximum tolerated dose (MTD) of brincidofovir, when administered via a single 2-hour intravenous infusion to rats and to assess the toxicity, as well as the single and repeat and toxicokinetic profile of brincidofovir when administered via 2-hour intravenous infusion to rats on Days 1, 4 and 7.

The results of this study can allow for a decision regarding the dose levels for subsequent toxicity studies of brincidofovir when administered via intravenous infusion.

The study design incorporated elements of general regulatory guidelines for toxicity studies.

Summary

This study was comprised of two phases; Phase 1 was a maximum tolerated dose (MTD) study and Phase 2 was a repeat dose range-finding (DRF) study.

Parameters evaluated during Phase 1 were: viability and clinical observations.

For Phase 1, Sprague-Dawley CD® rats (2/sex/dosing interval) were dosed with brincidofovir via 2-hour IV infusion once at 2, 4, 10 or 15 mg/kg. The maximum feasible dose (MFD) was limited to 15 mg/kg because of increased hemolytic potential when the concentration of brincidofovir exceeds 1 mg/mL in the dosing solution. The dose volume was 10 mL/kg/hr for all dosing intervals. Each dose administration was followed by a 2-3 day observation period. At the end of the Phase 1 treatment period, all animals were euthanized and discarded without macroscopic examination.

Parameters evaluated during Phase 2 were: viability, clinical observations, body weights, food consumption, hematology (termination of dosing), clinical chemistry (termination of dosing) and macroscopic observations.

For Phase 2, Sprague-Dawley CD® rats (5/sex/group) were dosed with brincidofovir via 2-hour IV infusion with 0 [2× sodium phosphate buffer solution (400 mM, pH 8.0±0.04)], 1 or 15 mg/kg on Days 1, 4 and 7. The dose volume was 10 mL/kg/hr for all groups. At the end of the Phase 2 treatment period, all animals were euthanized and necropsied. Phase 2 satellite animals (3/sex/Group 1 and 6/sex/Group 2-3) were similarly dosed and blood samples collected on Days 1 and 7 for toxicokinetic analysis of brincidofovir and one of its metabolites, cidofovir.

| List of Abbreviations and Definitions of Terms | |
|---|---|
| Abbreviation or Specialist Term | Explanation |
| $AUC_{inf}$ | Area under the plasma concentration-time curve from time 0 extrapolated to infinity |
| $AUC_{inf}$% Extrap | Percentage of the $AUC_{inf}$ that occurred post $T_{last}$ |
| $AUC_{last}$ | Area under the plasma concentration-time curve from time 0 to time of last measurable plasma concentration |
| $AUC_{last/D}$ | Area under the plasma concentration-time curve from time 0 to time of last measurable plasma concentration normalized to dose |
| BLQ | Below the limit of quantitation |
| CL | Apparent total body clearance |
| $C_{max}$ | Maximum concentration observed during a dosing interval |
| Brincidofovir | Hexadecyloxypropyl-cidofovir |
| CMX021 | Brincidofovir metabolite: Cidofovir |
| % CV | Coefficient of variation (percent) |
| DRF | Dose range finding |
| $K_2$EDTA | Anticoagulant |
| LLOQ | Lower limit of quantification |
| M/P ratio: | The ratio of exposure parameters ($C_{max}$ and/or $AUC_{last}$) of metabolite versus parent. The M/P ratio is calculated by first converting the relevant parameters to molar units and then dividing the molar exposure value of the metabolite by the molar exposure value of the parent compound. |
| MTD | Maximum tolerated dose |
| IV | Intravenous dosing |
| TK | Toxicokinetic(s) |
| $t_{1/2}$ | Apparent terminal half-life (aka $t_{1/2elim}$) |
| $T_{last}$ | Time of last measurable concentration |
| $T_{max}$ | Time to maximum plasma concentration |
| $V_z$ | Apparent volume of distribution, terminal phase |

Phase 1

All animals administered a single dose of brincidofovir at 2, 4, 10 or 15 mg/kg via 2-hour IV infusion survived until their scheduled euthanasia.

Administration of brincidofovir at 2, 4, or 15 mg/kg resulted in intermittent clinical signs in some male and female animals. Clinical signs were not observed in animals dosed at 10 mg/kg brincidofovir. The intermittent clinical signs consisted of rapid breath and hunched posture with and without piloerection, partially closed eyes, and decreased activity, or irregular breathing, or decreased activity with or without irregular breathing, piloerection, and bilateral partially closed eyes. The clinical signs were reversible and resolved at the end of infusion or within 45 minutes of after the end of the infusion in the Group 1 and 2 animals that displayed signs. The clinical signs were reversible and resolved within 3 hours and 22 minutes of after the end of the infusion in the Group 4 that displayed signs.

Under the conditions of the study, all doses were well tolerated. Therefore, a maximally tolerated dose level was not determined, and 15 mg/kg was considered the maximum feasible dose (MFD).

Phase 2

All animals administered three total doses of brincidofovir at 1 and 15 mg/kg/day over a 7 day period survived until their scheduled euthanasia.

Administration of brincidofovir at 1 mg/kg/day or 15 mg/kg/day did not result in any brincidofovir-related clinical signs in either male or female animals.

Plasma samples (108) were collected 2 hours following the initiation of dosing on Day 1 and Day 7 (Group 1), or at 1, 2, 8, and 24 hours following the initiation of dosing on Day 1, and prior to administration and at 2, 8, and 24 hours following the initiation of dosing on Day 7 (Groups 2 and 3), and analyzed to determine the concentrations of brincidofovir and the metabolite, cidofovir), by LC/MS/MS.

Peak concentrations for brincidofovir were generally observed at the end of the 2 hour IV infusion, and decreased rapidly. In general, the mean brincidofovir $C_{max}$ and AUC increased approximately proportional to the increase in dose from 1 to 15 mg/kg, however the AUC following 1 mg/kg was based on limited concentration-time data. The brincidofovir $C_{max}$ and $AUC_{last}$ values on Day 7 showed a trend toward lower values on Day 7 when compared to Day 1 [Day 7/Day 1 accumulation ratios (AR) of 0.44 to 0.54]. No sex differences in brincidofovir TK parameters were observed. Overall, the metabolite cidofovir increased less than proportional to the increase in brincidofovir dose. There were no apparent sex differences in cidofovir TK parameters and no change in TK parameters after repeat administration.

Brincidofovir-related hematologic findings were limited to slight decreases in reticulocytes in males and females administered 15 mg/kg brincidofovir (−33% and −30% controls, respectively; statistically significant in males only), associated with increases in mean cell hemoglobin concentration (MCHC) in males (+2.1% controls, statistically significant). Decreases red cell mass (hemoglobin, hematocrit, red blood cells) were negligible (to −4.2% controls) at the end of the 7-day dosing phase There were minimal brincidofovir-related increases in total calcium in males administered 15 mg/kg brincidofovir (+3.8% controls; not statistically significant) and females administered ≥1 mg/kg brincidofovir (+4.9% controls; statistically significant) and minimal increases in urea (BUN) in females administered 15 mg/kg (+29% controls; statistically significant).

Administration of 1 and 15 mg/kg/day brincidofovir via 2-hour IV infusion on Days 1, 4 and 7 are well tolerated.

Route, Duration, and Frequency of Administration

In Phase 1, each animal was administered a single dose of brincidofovir via 2-hour intravenous infusion. At each dose interval, an escalated dose was administered to naïve animals to determine the maximum tolerated dose (MTD). MTD data were used to select doses for Phase 2.

In Phase 2, the selected doses were administered via 2-hour intravenous infusion on Days 1, 4 and 7 to evaluate the toxicity of repeated doses of the brincidofovir and to aid in the selection of doses for subsequent toxicity studies. A seven-day study can be appropriate for selecting doses for subsequent repeat dose GLP toxicity studies.

Number of Animals

The number of animals in this study was considered to be the minimum necessary for statistical, regulatory and scientific reasons.

The number of animals (2/sex/dose interval) in Phase 1 (MTD) was the minimum number that would be required to determine the maximum tolerated dose in male and female rats. Four dose levels of the brincidofovir were expected to be sufficient to determine the maximum tolerated dose. Although there was a 2-3 day observation period, new animals were used at each dose level to eliminate possible additive effects of repeat dosing that could confound determination of a maximum tolerated single dose level.

The number of main study animals (5/sex/group) in Phase 2 (DRF) was the minimum number that would control for the expected variability among animals. The negative control group and the two brincidofovir-treated groups receiving a low and high multiple of the proposed human dose were considered the minimum number of groups necessary to establish a baseline and provide a range of effects and allow for extrapolation of results for additional repeat dose studies.

The number of satellite toxicokinetic study animals (6/sex/treated group) in Phase 2 (DRF) toxicokinetic evaluations was considered the minimum number necessary to provide meaningful data, given the inherent variability in distribution, metabolism and excretion processes. A control group with 3 animals per sex confirmed absence of brincidofovir exposure.

Dose Selection

The starting dose for Phase 1 of this study was 2 mg/kg.

The low and high doses for Phase 2 of this study (1 and 15 mg/kg) were selected based on the study results of Phase 1 of the present study. In some embodiments, the low and high doses were selected by the lack of clinical signs during the post-administration observation period in animals that were administered 15 mg/kg during Phase 1 of the present study.

Experimental Outline

For Phase 1 (MTD), up to four dose levels of brincidofovir were administered as escalating single doses in naïve male and female rats via intravenous infusion (2-hour). Each dose administration was followed by a 2-3 day observation period. Each subsequent dose level was increased and administered to naïve animals based on the response to the preceding doses until the maximum tolerated dose (MTD) was identified, or until the maximum feasible dose (MFD) based on prior evidence of hemolysis of 15 mg/kg was achieved.

TABLE 51

Phase 1 (MTD) Study Consisted of 4 Dosing Intervals

| Dose Interval (Group) | Treatment | Dose (mg/kg)$^a$ | Number of animals Male | Number of animals Female | Concentration (mg/mL) | Volume Dose (mL/kg/hr) |
|---|---|---|---|---|---|---|
| 1 | BCV | 2 | 2 | 2 | 0.1 | 10 |
| 2 | BCV | 4 | 2 | 2 | 0.2 | 10 |
| 3 | BCV | 10 | 2 | 2 | 0.5 | 10 |
| 4 | BCV | 15 | 2 | 2 | 0.75 | 10 |

$^a$Doses represent active ingredient

For Phase 2 (DRF), the test and control articles were administered, via intravenous 2-hour IV infusion to rats on Days 1, 4, and 7.

TABLE 52

Phase 2 Study: 1 Control and 2 Treated Groups

| Group | Treatment | Dose (mg/kg)$^a$ | Main study Male | Main study Female | Satellite study$^b$ Male | Satellite study$^b$ Female | Concentration (mg/mL) | Volume Dose (mL/kg/hr) |
|---|---|---|---|---|---|---|---|---|
| 1 | Control | 0 | 5 | 5 | 3 | 3 | 0 | 10 |
| 2 | BCV | 1 | 5 | 5 | 6 | 6 | 0.05 | 10 |
| 3 | BCV | 15 | 5 | 5 | 6 | 6 | 0.75 | 10 |

$^a$Doses represent active ingredient
$^b$Satellite animals used for toxicokinetic blood sampling only.

A vehicle solution of 2× sodium phosphate buffer solution (400 mM, pH 8.0±0.04) was prepared by mixing the appropriate amounts of monobasic sodium phosphate solution (400 mM) and dibasic sodium phosphate solution (400 mM). The pH of the solution was adjusted with monobasic sodium phosphate solution (400 mM), when necessary. The solution was filtered through a 0.22 µm Millex®-GP filter under a laminar flow hood into a sterile vessel.

The vehicle (control article) was stored refrigerated 2-8° C. Fresh vehicle solution was prepared once prior to each phase, and used within one month of preparation.

A brincidofovir stock of 15 mg/mL was prepared by mixing the appropriate amount of brincidofovir with 2× sodium phosphate buffer solution, sterile water for injection, USP, and 1N sodium hydroxide (NaOH). The solution was filtered through a 0.22 µm Millex®-GP filter under a laminar flow hood into a sterile vessel.

Dose formulations for Phase 1 and 2 were prepared by diluting the appropriate amounts of the brincidofovir stock (15 mg/mL) or of the stock solution vehicle (2× sodium phosphate buffer solution) with the appropriate amounts of 5% dextrose for injection, USP, into a sterile vial under a laminar flow hood and inverting 10 times to mix. During Phase 1 and 2, fresh dose formulations were prepared on each dosing day and were stored refrigerated 2-8° C. and protected from light when not in use.

Method of Administration

Route

Intravenous infusion over 2-hours. Treated at constant doses in 20 mL/kg/2 hours.

Infusion Catheter Implantation Procedure

Catheters for infusion were implanted approximately 1-2 weeks prior to dose administration. All animals, including the spares, were surgically implanted with a catheter.

The surgical site was prepared as per Testing Facility's SOP for aseptic, recovery surgical procedures. Animals received analgesics pre-emptively (flunixin meglumine (USP) 2 mg/kg, subcutaneously).

All animals were anesthetized (isoflurane) and shaved in the inguinal and dorsal regions. A small incision was made and the femoral vein isolated. A small incision in the vessel was performed and a sterile catheter was placed into the vessel. The catheter was inserted via the femoral vein and passed retrograde into the inferior vena cava, just caudal to the kidneys. The catheter was secured with sutures and passed subcutaneously so as to exit at the nape of the neck. A small pocket was made at the exteriorization site in which a loop of catheter remained. The inguinal region was closed by sutures.

The animals were placed in jackets and the implanted catheters were attached to pins with capped septum connectors. The catheters were locked with taurolidine citrate locking solution. Each animal received enrofloxacin 5.0 mg/kg intramuscularly on the day of surgery.

Infusion Catheter Maintenance Procedure

Implanted femoral vein catheters were assessed for patency as per Testing Facility's SOP prior to placing animals on study.

Volume Dose (Rate)

20 mL/kg/2 hours (10 mL/kg/hour).

Individual Dose Concentration

The individual animal concentrations were calculated from the most recently recorded scheduled bodyweight.

Frequency and Duration

During Phase 1, each animal received a single dose administered via intravenous infusion (2-hours), followed by a 2-3 day observation period after each dose interval. Following the single intravenous (2-hour) infusion, the animals had their jackets and dosing sets removed and were not returned to saline maintenance.

During Phase 2, each animal received brincidofovir administrations via intravenous infusion (2-hours) on Days 1, 4 and 7. Animals were maintained on sterile saline at a rate of 0.5 mL/hour between doses. Catheters were tied off after the completion of dose administration on Day 7 (a knot was placed in the catheter and the catheter was receded under the skin) and jackets were removed.

Dose Site

Surgically implanted cannula in the femoral vein/vena cava.

Dosing Procedure

One to two days prior to dose initiation, the lock solution was withdrawn from each animal's implanted catheter (if possible) and the catheter was flushed with saline before connecting to a tether and infusion dosing set. After connecting the animals' catheters, the animals were infused with sterile saline (0.9% NaCl, USP) at a rate of 0.5 mL/hr by a calibrated Medfusion syringe pump until dose administration on Day 1.

A saline flush was infused to deliver the brincidofovir in the infusion lines and to ensure the delivery of a complete dose (an additional ~0.5 to 1 mL volume, at the same rate as the brincidofovir, was administered to flush the catheter line).

Dosing Accuracy

The accountability (confirmation of actual dose administered) for each day of infusion was calculated and reviewed for adjustments daily. Pumps were checked for accuracy prior to dose initiation and following end of dose administration for each phase.

Collection Times and Number of Animals

Blood samples were obtained for the determination of plasma concentrations of brincidofovir during Phase 2.

TABLE 53

Collection Times and Number of Animals

| Interval | Timepoints | Number of Animals |
| --- | --- | --- |
| Day 1 | 2 hours after the initiation of dose administration | 3 animals/sex/Group 1 |
|  | 1, 2, 8 and 24 hours after the initiation of dose administration | 3 animals/sex/Groups 2-3 |
| Day 7 | 2 hours after the initiation of dose administration | 3 animals/sex/Group 1 |
|  | Predose, and 2, 8 and 24 hours after the initiation of dose administration | 3 animals/sex/Groups 2-3 |

On Days 1 and 7, blood samples were obtained for toxicokinetic determinations at the above timepoints.

Collection Procedures

Approximately 0.4 mL of whole blood was obtained via the tail vein from each animal at each time point. Animals were not fasted prior to blood collection. Blood was collected into tubes containing $K_2EDTA$ anticoagulant and placed on wet ice in an upright position, per facility SOP prior to processing. Plasma was separated by centrifugation (10 minutes at approximately 2000 g, at approximately 2-8° C.). Approximately 0.10 mL of plasma was transferred into a single cryotube appropriately labeled with study number, animal number, time point, date of sampling and sample type. Remaining plasma was transferred into a second cryotube and retained as a backup sample. Plasma frozen at approximately −80±10° C. within approximately 2 hours after collection of each blood sample until analysis. Animals were euthanized ($CO_2$ inhalation) after the final blood collection.

All plasma sample tubes were stored frozen (−80±10° C.) and shipped (frozen, on dry ice) to Pyxant Labs, Colorado Springs, Colorado for analysis. Samples were shipped within 1 month of collection.

In general, TK parameters were estimated using mean plasma concentrations of brincidofovir and cidofovir derived from the composite blood sampling design using Phoenix WinNonLin (V 6.3).

Animals were observed in their cages twice daily for mortality and signs of severe toxic or pharmacologic effects.

For dose observations, Phase 1: Signs of poor health or toxic or pharmacologic effects (e.g., abnormalities in general condition, appearance, activity, behavior, respiration, etc.) observed during infusion period were recorded.

Animals were removed from their cages and examined once pretest. Examinations included observations of general condition, skin and fur, eyes, nose, oral cavity, abdomen and external genitalia as well as evaluations of respiration.

Body Weight

Phase 1: Animals were removed from their cages and weighed twice pretest and prior to each dose.

Phase 2: Animals were removed from their cages and weighed twice pretest, prior to each dose and following the last dose administered during the afternoon of Day 7. Terminal, fasted body weights were obtained just prior to necropsy.

Food consumption was measured (weighed) weekly, beginning one week prior to dosing for Phase 2.

Blood obtained via the orbital sinus (retrobulbar venous plexus) as a terminal procedure under light isoflurane anesthesia was used to analyze hematology and clinical chemistry parameters for all animals at termination of dosing. Animals were fasted overnight prior to blood collection. Animals were not allowed to recover from anesthesia after blood collection.

Hematology

Blood samples (approximately 0.25 mL) were collected into tubes containing $K_2EDTA$ anticoagulant and analyzed for the following using a Siemens ADVIA 120 Hematology Analyzer: Hemoglobin concentration (HGB); Hematocrit (HCT); Erythrocyte count (RBC); Platelet count (PLT); Mean corpuscular volume (MCV); Mean corpuscular hemoglobin (MCH); Mean corpuscular hemoglobin concentration (MCHC); Red cell distribution width (RDW); Total leukocyte count (WBC); Reticulocyte count (RETIC); Differential leukocyte count (Manual differential leukocyte counts were performed for verification and absolute values were calculated if necessary); Neutrophils (ANEU); Lymphocytes (ALYM); Eosinophils (AEOS); Basophils (ABASO); Monocytes (AMONO); Large unstained cells (ALUC);

A peripheral blood smear was prepared for each animal at each blood collection interval and was available for confirmation of automated results and/or other evaluations deemed necessary by the Clinical Pathologist.

Clinical Chemistry

Blood samples (approximately 1 mL) were collected into tubes with no anticoagulant, allowed to clot, centrifuged to obtain serum and analyzed for the following using a Siemens ADVIA 1800 Chemistry Analyzer: Aspartate aminotransferase (AST) (Kinetic-Modified Bergmeyer); Alanine aminotransferase (ALT) (Kinetic—Modified Bergmeyer); Alkaline phosphatase (ALKP) (Kinetic—Tietz AMP Buffer); Blood urea nitrogen (BUN) (Enzymatic Roch-Ramek with Urease); Creatinine (CREAT) (Jaffe Picric Acid in Alkaline Medium); Glucose (GLU) (Glucose Hexokinase II Method); Cholesterol (CHOL) (Enzymatic esterase/oxidase Trinder Endpoint); Triglycerides (TRIG) (Fossati Three Step Enzymatic—Trinder Endpoint); Total protein (TP) (Biuret Technique); Albumin (ALB) (Bromocresol Green Method); Total bilirubin (TBILI) (Oxidation with Vandate); Sodium ($NA^+$) (Ion Selective Electrode); Potassium ($K^+$) (Ion Selective Electrode); Chloride ($Cl^-$) (Ion Selective Electrode); Calcium ($Ca^{++}$) (Michaylova & Ilkova, Arsenazo III); Inorganic phosphorus (PHOS) (Phosphomolybdate—UV Method).

Postmortem

Phase 1: All animals were euthanized by exsanguination following carbon dioxide inhalation and discarded without macroscopic examination after the completion of the observation period.

Phase 2: Main DRF study animals were euthanized by exsanguination following isoflurane inhalation and TK satellite animals via carbon dioxide inhalation.

Necropsy was performed on the Phase 2 main study animals on Day 8. Animals were fasted overnight prior to necropsy.

Complete macroscopic examinations were performed on all Phase 2 main study animals. The macroscopic examination included examination of the external surface and all orifices; the external surfaces of the brain and spinal cord; the organs and tissues of the cranial, thoracic, abdominal and pelvic cavities and neck; and the remainder of the carcass for the presence of macroscopic morphologic abnormalities. Animals were discarded after examination; no tissues were collected or preserved.

The following abbreviations were used for hematology: CS: Clotted specimen; LA: Lab accident; NVIM; Not valid due to improbable result; CLSE: Severe platelet clumping noted; CLSL: Slight platelet clumping noted; NCLP: No clumping.

Blood chemistry: TBILI values below the analytical limit (<0.2) are excluded from calculations.

Globulin (GLOB) was calculated as: total protein–albumin

Albumin/globulin ratio (A/G) was calculated as: albumin/globulin

All statistical analyses were carried out separately for males and females using the individual animal as the basic experimental unit.

The following data types were analyzed at each timepoint separately for Phase 2: body weight; body weight change from interval to interval; cumulative body weight change from baseline; food consumption, hematology, and clinical chemistry. The parameters to analyze were identified as continuous, discrete or binary. Brincidofovir treated groups were then compared to the control using the following procedures.

In-Life Study Conduct

Table 54 below summarizes details regarding the study conduct, including but not limited to test animals, study materials, study design, dosing, observations, and results.

TABLE 54

Experimental Design Study Summary (phase 2)

Species and Strain: Male and Female [Crl: CD (SD)BR] (Sprague-Dawley derived)
Vehicle: 200 mM Sodium Phosphate Buffer, pH 8, Variable dilution with 5% Dextrose Study Design

| Group Number | Dose (mg/kg) | Sampling Scheme |
|---|---|---|
| 1 | 0 | Day 1 and Day 7: 3 animals/sex: 2 hours after the initiation of dose vehicle administration |
| 2 | 1 | Day 1: 3 animals/sex/timepoint: 1, 2, 8, and 24 hours after the initiation of dose administration<br>Day 7: 3 animals/sex/timepoint: Predose, 2, 8, and 24 hours after the initiation of dose administration |
| 3 | 15 | Same as Group 2 |

Sampling

A composite blood sampling design was used such that each rat was sampled twice per sampling day. Blood samples were collected according to the scheme shown in Table 54. Blood was collected via tail vein from unanesthetized animals into tubes containing anticoagulant and placed on wet ice in an upright position. Animals were not fasted prior to blood collection. Plasma was separated by centrifugation (for 10 minutes at approximately 2000 g, at approximately 2-8° C.), and transferred into individually labeled cryotubes. All cryotubes containing the collected plasma samples were appropriately labeled as to study number, animal number, time point, date of sampling and sample type. All plasma samples were obtained and frozen at approximately −80° C. (±10° C.) within approximately 2 hours after collection of each blood sample until analysis.

All plasma samples were stored frozen [approximately −80° C. (±10° C.)] and shipped (frozen, on dry ice) to Pyxant Laboratories for analysis.

Bioanalytical Methods

Rat plasma bioanalysis was conducted by Pyxant Laboratories. Plasma samples were analyzed for concentrations of brincidofovir and cidofovir using a method based upon protein precipitation extraction followed by LC-MS/MS analysis; calibration ranges for brincidofovir and cidofovir were 1.00-1500 ng/mL and 5.00-750 ng/mL, respectively, (Pyxant study number 3025) for a 50 μL aliquot of rat plasma. Sample analysis for ISR was not performed as part of this non-GLP study.

Data Analysis
Toxicokinetic Analysis

For the generation of Mean Profiles, all sample concentrations that were below the limit of quantitation (BLQ) were set to 0.

These values are recorded in Table 61 and Table 62, with the original BLQ result in the column labelled [Concentration] and the imputed values for calculation of the mean values in the column labelled [Imputed Concentration].

The treatment of Mean Profile BLQ values for the purposes of NCA, are recorded in Table 63 and Table 64, with the original Mean Profile BLQ result in the column labeled [Mean Concentration] and the imputed values used for NCA analysis in the column labeled [Imputed Mean Concentration]. BLQ values at early time points (prior to $T_{max}$) were set to 0, BLQ at time points after $T_{max}$ were set to missing.

All pharmacokinetic parameter estimates were completed using a Non-Compartmental Model (Model 200-202 for IV infusion administration). The $AUC_{last}$ and $AUC_{inf}$ were calculated using the linear up log down trapezoidal rule.

Statistical Analysis was limited to descriptive statistical analysis including arithmetic mean, standard deviation, % CV of the arithmetic mean.

The coefficient of variation (% CV) for mean plasma concentrations ranged from (9.98 to 173% CV) for brincidofovir and (4.82 to 173% CV) for cidofovir.

Peak concentrations for brincidofovir were generally observed at the end of the 2 hour IV infusion, and decreased rapidly; brincidofovir concentrations were at or near the lower limit of quantification (LLOQ, 1 ng/mL) 8 hours after initiation of the 1 mg/kg dose and 24 hours after the 15 mg/kg dose. Terminal half-life (t½), CL, and Vss were not determinable due to insufficient data points to characterize the elimination phase. In general, mean brincidofovir $C_{max}$ and AUC increased approximately proportional to the increase in dose from 1 to 15 mg/kg, though AUC was determined on few concentration values after 1 mg/kg dosing. The brincidofovir $C_{max}$ and $AUC_{last}$ values on Day 7 showed a trend toward lower values on Day 7 compared to Day 1 (Day 7/Day 1 accumulation ratios (AR) of 0.44 to 0.53). Further, no sex differences in brincidofovir TK parameters were observed.

Overall, exposure to metabolite cidofovir increased less than proportional to the increase in brincidofovir dose, there were no apparent sex differences in TK parameters, and no change in TK parameters after repeat administration.

Bioanalysis was performed on 108 plasma samples collected only during Phase 2 to determine the concentrations of brincidofovir and the cidofovir metabolite, cidofovir. The plasma samples were collected at 2 hours following the initiation of dosing on Day 1 and Day 7 (Group 1), or at 1, 2, 8, and 24 hours following the initiation of dosing on Day 1, and prior to administration and at 2, 8, and 24 hours following the initiation of dosing on Day 7 (Groups 2 and 3) and analyzed by LC/MS/MS.

Toxicokinetic analysis of the plasma concentrations of brincidofovir and cidofovir was conducted for Phase 2 only.

On Days 1 and 7, brincidofovir $C_{max}$ increased in approximate proportion to dose (for female rats), or less than proportionally to dose (for male rats). For a 15-fold increase in dose from 1 mg/kg to 15 mg/kg, $C_{max}$ increased 17.3- to 18.2-fold for females and 9.2- to 18.6-fold for males. On Days 1 and 7, brincidofovir $AUC_{last}$ increased in approximate proportion (for female rats); for a 15-fold increase in dose, the $AUC_{last}$ increased 14.1- to 16.1-fold. Due to insufficient data points in male rats after 1 mg/kg administration, proportionality of $AUC_{last}$ could not be determined.

Between female and male animals, the brincidofovir $C_{max}$ on Days 1 and 7 for a 1 or 15 mg/kg dose were similar (difference within 54%). The brincidofovir $AUC_{last}$ for a 1 mg/kg dose could not be compared due to insufficient data points to calculate AUC in males. The brincidofovir $AUC_{last}$ on Days 1 and 7, for a 15 mg/kg dose, were similar (difference within 16%) between female and male animals.

The brincidofovir $C_{max}$ and $AUC_{last}$ values on Day 7 for female animals following twice-weekly dosing of brincidofovir at 1 mg/kg, and for both female and male animals after 15 mg/kg, showed a trend toward lower $C_{max}$ and $AUC_{last}$ on Day 7 compared to Day 1 (Day 7/Day 1 accumulation ratios (AR) of 0.44 to 0.53).

TABLE 55

Brincidofovir TK Parameters (Phase 2) Following Single and Multiple 2-Hour Intravenous Infusion Administrations of brincidofovir on Days 1, 3 and 7 to Rats

| | Brincidofovir Dose (mg/kg) | | | | | | | |
|---|---|---|---|---|---|---|---|---|
| | 1 | | | | 15 | | | |
| | Male | | Female | | Male | | Female | |
| | Period | | Period | | Period | | Period | |
| TK Parameter | Day 1 | Day 7 | Day 1 | Day 7 | Day 1 | Day 7 | Day 1 | Day 7 |
| $T_{max}$ (h) | 2 | 2 | 2 | 2 | 1 | 2 | 1 | 2 |
| $T_{last}$ (h) | 2 | 2 | 8 | 8 | 24 | 24 | 24 | 24 |
| $C_{max}$ (ng/mL) | 235 | 208 | 191 | 95.4 | 4370 | 1910 | 3470 | 1660 |
| $C_{max}$/Dose [(ng/mL)/(mg/kg)] | 235 | 208 | 191 | 95.4 | 291 | 127 | 231 | 110 |
| $AUC_{last}$ (h*ng/mL) | NR | NR | 459 | 244 | 8780 | 4090 | 7360 | 3420 |
| $AUC_{last}$/Dose [(h*ng/mL)/(mg/kg)] | NR | NR | 459 | 244 | 585 | 273 | 491 | 228 |
| AR: $C_{max}$ Day 7/Day 1 | NA | NR | NA | 0.50 | NA | 0.44 | NA | 0.48 |
| AR: $AUC_{last}$ Day 7/Day 1 | NA | NR | NA | 0.53 | NA | 0.47 | NA | 0.46 |

NA, not applicable;
NR, not reportable due to insufficient data points

As set forth in Tables 55 and 56, on Days 1 and 7, cidofovir $C_{max}$ generally increased less than proportional to dose. For a 15-fold increase in brincidofovir dose from 1 mg/kg to 15 mg/kg, cidofovir $C_{max}$ increased 2.9- to 4.1-fold for female animals and 5.6- to 16.8-fold for males. On Days 1 and 7, cidofovir $AUC_{last}$ increased less than proportionally to dose for female animals; for a 15-fold increase in brincidofovir dose, cidofovir $AUC_{last}$ increased 9.4- to 16.2-fold. Due to insufficient data points in male rats after 1 mg/kg administration, proportionality of $AUC_{last}$ could not be determined.

The cidofovir $C_{max}$ and $AUC_{last}$ on Days 1 and 7, after a 15 mg/kg brincidofovir dose, were similar (difference within 33%) between female and male animals.

The cidofovir $C_{max}$ and $AUC_{last}$ on Day 7 for female animals following twice-weekly dosing of brincidofovir at 1 mg/kg showed a trend toward higher $C_{max}$ and $AUC_{last}$ on Day 7 compared to Day 1 (Day 7/Day 1 AR ranged from 1.6 to 1.9). However, cidofovir $C_{max}$ and $AUC_{last}$ for both female and male animals administered 15 mg/kg (3 doses), were similar (Day 7/Day 1 AR ranged from 1.0 to 1.1).

The metabolite-to-parent (M/P) ratio, calculated on a molar basis, of $AUC_{last}$ on Day 1 for female animals were 0.190 and 0.661 for doses of 1 mg/kg and 15 mg/kg of brincidofovir, respectively. The M/P ratios on Day 7 for female animals were 0.193 and 0.444 for doses of 1 mg/kg and 15 mg/kg of brincidofovir, respectively.

Due to insufficient data points in male rats after 1 mg/kg administration, the M/P ratio for $AUC_{last}$ could not be determined. The M/P ratios on Day 1 and 7 after 15 mg/kg administration of brincidofovir were 0.126 and 0.307, respectively.

TABLE 56

Cidofovir TK Parameters Following Single and Multiple 2-Hour Intravenous Infusion Administrations of brincidofovir on Days 1, 3 and 7 to Rats

| | Brincidofovir Dose (mg/kg) | | | | | | | |
|---|---|---|---|---|---|---|---|---|
| | 1 | | | | 15 | | | |
| | Male | | Female | | Male | | Female | |
| | Period | | Period | | Period | | Period | |
| TK Parameter | Day 1 | Day 7 | Day 1 | Day 7 | Day 1 | Day 7 | Day 1 | Day 7 |
| $T_{max}$ (h) | 8 | 8 | 2 | 2 | 8 | 8 | 8 | 8 |
| $T_{last}$ (h) | 8 | 8 | 8 | 8 | 24 | 24 | 24 | 24 |
| $C_{max}$ (ng/mL) | 1.95 | 5.73 | 9.35 | 15 | 32.8 | 32.8 | 38.6 | 43.6 |

TABLE 56-continued

Cidofovir TK Parameters Following Single and Multiple 2-Hour Intravenous Infusion Administrations of brincidofovir on Days 1, 3 and 7 to Rats

| | Brincidofovir Dose (mg/kg) | | | | | | | |
|---|---|---|---|---|---|---|---|---|
| | 1 | | | | 15 | | | |
| | Male | | Female | | Male | | Female | |
| | Period | | | | Period | | | |
| TK Parameter | Day 1 | Day 7 | Day 1 | Day 7 | Day 1 | Day 7 | Day 1 | Day 7 |
| $C_{max}$/Dose [(ng/mL)/(mg/kg)] | 1.95 | 5.73 | 9.35 | 15 | 2.18 | 2.18 | 2.57 | 2.91 |
| $AUC_{last}$ (h*ng/mL) | NR | NR | 43.4 | 80.1 | 548 | 624 | 705 | 756 |
| $AUC_{last}$/Dose [(h*ng/mL)/(mg/kg)] | NR | NR | 43.4 | 80.1 | 36.5 | 41.6 | 47 | 50.4 |
| AR: $C_{max}$ Day 7/Day 1 | NA | 2.94 | NA | 1.60 | NA | 1.00 | NA | 1.13 |
| AR: $AUC_{last}$ Day 7/Day 1 | NA | NR | NA | 1.85 | NA | 1.14 | NA | 1.07 |
| M/P Ratio: $C_{max}$ (molar equivalents) | 0.017 | 0.056 | 0.099 | 0.316 | 0.035 | 0.015 | 0.022 | 0.053 |
| M/P Ratio: $AUC_{last}$ (molar equivalents) | NR | NR | 0.190 | 0.661 | 0.126 | 0.307 | 0.193 | 0.444 |

For Phase 1 and Phase 2, all animals survived until scheduled termination.

Clinical Observations

Phase 1

Dose 1 (2 mg/kg): Clinical signs in both male animals consisted of rapid breath and hunched posture, with and without piloerection, partially closed eyes, and decreased activity.

Dose 2 (4 mg/kg): Clinical signs in both males and one female animal consisted of irregular breathing.

Dose 3 (10 mg/kg): No clinical signs were observed in either male or female animals.

Dose 4 (15 mg/kg): Clinical signs in both males and one female animal included decreased activity with or without irregular breathing, piloerection, and bilateral partially closed eyes.

All clinical signs were reversible and resolved shortly after the end of the infusion.

Phase 2

Dose administration of brincidofovir at 1 mg/kg/day or 15 mg/kg/day did not result in any brincidofovir-related clinical signs in either male or female animals. There were no effects on body weights (only Phase 2 evaluated) or food consumption related to treatment with brincidofovir.

Clinical Pathology

Brincidofovir-related hematologic findings were limited to slight decreases in reticulocytes in males and females at 15 mg/kg (−33% and −30% controls, respectively; statistically significant in males only), associated with increases in mean cell hemoglobin concentration (MCHC) in males (+2.1% controls, statistically significant). Decreases in red cell mass (hemoglobin, hematocrit, red blood cells) were negligible (to −4.2% controls) at the end of the 7-day dosing phase. The minimal effect of reticulocyte decreases on red cell mass was attributed to the long lifespan of red blood cells in rats (~45-68 days) relative to reticulocytes (2-5 days). Red cell mass decreases would be expected to be more pronounced with continued dosing. Decreases in reticulocytes were indicative of decreased erythropoiesis in hematopoietic tissues. In the absence of decreases in food consumption or body weight or poor clinical condition, they were likely to be due to brincidofovir-related suppression of erythropoiesis, which is not unexpected with this class of drug (nucleotide analog).

There were minimal brincidofovir-related increases in total calcium in males at 15 mg/kg (+3.8% controls; not statistically significant) and females at ≥1 mg/kg (+4.9% controls; statistically significant) and minimal increases in urea (BUN) in females at 15 mg/kg (+29% controls; statistically significant). Both findings can be observed with altered kidney function (decreased urinary excretion). In addition, without wishing to be bound by theory, increases in total calcium may reflect increased mobilization from bone or increased intestinal absorption.

Changes in Animal No. 3048 (slight increases in BUN, creatinine and phosphorus) were not considered to be brincidofovir-related and secondary to decreased glomerular filtration rate due to absence of a left kidney (noted macroscopically).

All other differences from controls, statistically significant or otherwise, were not considered to be brincidofovir-related due to their direction, small magnitude, infrequent occurrence, lack of relation to dose, lack of concordance with related endpoints, and/or because values were comparable to the study control range.

Pathology

Macroscopic findings were few, occurred sporadically, and were not considered to be brincidofovir-related as they occurred at a similar incidence in control animals, lacked a dose relationship, or were considered congenital anomalies (Animal No. 3048). Male Animal No. 3048 did not have a left seminal vesicle or a left kidney; the absence of the left kidney correlated with elevated blood urea nitrogen (BUN), creatinine, and phosphorus in this animal.

For Phase 1, under the conditions of the study, all doses were well tolerated when administered via a single 2-hour IV infusion. Therefore, the maximally tolerated dose of brincidofovir was not determined. However, 15 mg/kg delivered via 2-hour IV infusion of a 0.75 mg/mL solution of brincidofovir represents the maximum feasible dose based on in vitro evidence of hemolysis at brincidofovir concentrations above 0.75 mg/mL.

For Phase 2, peak concentrations for brincidofovir were generally observed at the end of the 2-hour IV infusion, and decreased rapidly.

In general, mean brincidofovir $C_{max}$ and AUC increased approximately proportional to the increase in dose from 1 to 15 mg/kg, though AUC was determined on few concentration values after 1 mg/kg dosing. The brincidofovir $C_{max}$ and $AUC_{last}$ values on Day 7 showed a trend toward lower values on Day 7 compared to Day 1 (Day 7/Day 1 accumulation ratios (AR) of 0.44 to 0.53). Further, no sex differences in brincidofovir TK parameters were observed. Overall, exposure to metabolite cidofovir increased less than proportional to the increase in brincidofovir dose, there were no apparent sex differences in TK parameters, and no change in TK parameters after repeat administration Under the conditions of the study, single dose administration of 1 or 15 mg/kg brincidofovir via 2-hour IV infusion on Days 1, 4 and 7 were well tolerated.

Concentrations of Brincidofovir in Plasma

The concentration-time data for brincidofovir following single and repeat administration of 1 mg/kg and 15 mg/kg are summarized in Table 59 and Table 60.

The concentrations of brincidofovir and cidofovir in all control plasma samples were BLQ for each analyte (<1.0 ng/mL and <5.0 ng/mL, respectively).

Following single IV infusion administration of brincidofovir over a 2 hour period, plasma concentrations of brincidofovir were detected in the first sample (1 hour) at both dose levels (1 mg/kg and 15 mg/kg). Following twice-weekly administration (3 doses on Days 1, 3 and 7), brincidofovir was BLQ in predose samples, but was detected in the first postdose sample (2 hour, end of the infusion) on Day 7. The median time of peak concentration ($T_{max}$) of brincidofovir occurred at 2 hour following single and twice weekly 1 mg/kg dosing, and at 1 hour following single 15 mg/kg dosing and at 2 hours following twice weekly 15 mg/kg dosing. Concentrations of brincidofovir reached BLQ in all males and some females 8 hours following administration of 1 mg/kg and were at or near the LLOQ by 24 hours following administration of 15 mg/kg. The coefficient of variation (% CV) for mean plasma concentrations for brincidofovir ranged from 13.0 to 173% for female animals and from 9.98 to 28.1% for male animals. In general, the highest % CV was observed at later time points when concentrations were at or near the LLOQ.

Toxicokinetics of Brincidofovir in Plasma

Mean plasma brincidofovir concentration-time information used in the input file for Phoeneix WinNonlin analysis are contained in Table 63. TK parameters for brincidofovir following single and twice weekly administration of brincidofovir as an intravenous infusion to rats are summarized in Table 56. Terminal half-life (t½), CL, and $V_{ss}$ were not determinable due to insufficient data points to characterize the elimination phase.

On Days 1 and 7, brincidofovir $C_{max}$ increased in approximate proportion to dose (for female rats), or less than proportionally to dose (for male rats). For a 15-fold increase in dose from 1 mg/kg to 15 mg/kg, $C_{max}$ increased 17.3- to 18.2-fold for females and 9.2- to 18.6-fold for males. On Days 1 and 7, brincidofovir $AUC_{last}$ increased in approximate proportion (for female rats); for a 15-fold increase in dose, the $AUC_{last}$ increased 14.1- to 16.1-fold. Due to insufficient data points in male rats after 1 mg/kg administration, proportionality of $AUC_{last}$ could not be determined.

Between female and male animals, the brincidofovir $C_{max}$ on Days 1 and 7 for a 1 or 15 mg/kg dose were similar (difference within 54%). The brincidofovir $AUC_{last}$ for a 1 mg/kg dose could not be compared due to insufficient data points to calculate AUC in males. The brincidofovir $AUC_{last}$ on Days 1 and 7, for a 15 mg/kg dose, were similar (difference 16%) between female and male animals.

The brincidofovir $C_{max}$ and $AUC_{last}$ values on Day 7 for female animals following twice-weekly dosing of brincidofovir at 1 mg/kg, and for both female and male animals after 15 mg/kg, showed a trend toward lower $C_{max}$ and $AUC_{last}$ on Day 7 compared to Day 1 [Day 7/Day 1 accumulation ratios (AR) of 0.44 to 0.53].

TABLE 57

Brincidofovir TK Parameters Following Single and Multiple 2-Hour Intravenous Infusion Administrations of brincidofovir on Days 1, 3 and 7 to Rats

| | Brincidofovir Dose (mg/kg) | | | | | | | |
|---|---|---|---|---|---|---|---|---|
| | 1 | | | | 15 | | | |
| | Male | | Female | | Male | | Female | |
| | Period | | Period | | Period | | Period | |
| TK Parameter | Day 1 | Day 7 | Day 1 | Day 7 | Day 1 | Day 7 | Day 1 | Day 7 |
| $T_{max}$ (h) | 2 | 2 | 2 | 2 | 1 | 2 | 1 | 2 |
| $T_{last}$ (h) | 2 | 2 | 8 | 8 | 24 | 24 | 24 | 24 |
| $C_{max}$ (ng/mL) | 235 | 208 | 191 | 95.4 | 4370 | 1910 | 3470 | 1660 |
| $C_{max}$/Dose [(ng/mL)/(mg/kg)] | 235 | 208 | 191 | 95.4 | 291 | 127 | 231 | 110 |
| $AUC_{last}$ (h*ng/mL) | NR | NR | 459 | 244 | 8780 | 4090 | 7360 | 3420 |
| $AUC_{last}$/Dose [(h*ng/mL)/(mg/kg)] | NR | NR | 459 | 244 | 585 | 273 | 491 | 228 |
| AR: $C_{max}$ Day 7/Day 1 | NA | NR | NA | 0.50 | NA | 0.44 | NA | 0.48 |
| AR: $AUC_{last}$ Day 7/Day 1 | NA | NR | NA | 0.53 | NA | 0.47 | NA | 0.46 |

Concentrations of Cidofovir in Plasma

The concentration-time data for cidofovir following single and repeat daily administration of 1 mg/kg and 15 mg/kg are summarized in Table 59 through Table 60.

In female animals following single IV infusion administration of brincidofovir, plasma concentrations of cidofovir were detected 2 hours following administration of 1 mg/kg (second time point) or 1 hour following administration of 15 mg/kg (first time point). Following twice-weekly administration of brincidofovir, plasma concentrations of cidofovir were BLQ in predose samples, but were detected in all of the 2 hour samples (first postdose time point) on Day 7. The median $T_{max}$ of cidofovir occurred 2 hours following single and twice-weekly 1 mg/kg brincidofovir dosing, and at 8 hours following single and twice-weekly 15 mg/kg brincidofovir dosing.

In male animals following single IV infusion administration of brincidofovir, detectable plasma concentrations of cidofovir were observed only in a single time point 8 hours following administration of 1 mg/kg. However, cidofovir was detected in the first sample (1 hour) following administration of 15 mg/kg. Following twice-weekly administration of brincidofovir, plasma concentrations of cidofovir were BLQ in the predose samples and in the first postdose sample (2 hours), but were detected in the 8 hour samples on Day 7 following administration of 1 mg/kg, and in the 2 hour samples (first postdose sample) on Day 7 following administration of 15 mg/kg. The median $T_{max}$ of cidofovir occurred at 8 hours following single or twice-weekly 1 mg/kg or 15 mg/kg brincidofovir dosing. In both male and female animals, concentrations of cidofovir reached BLQ by 24 hours following single and twice-weekly administration 1 mg/kg brincidofovir and did not reach BLQ by 24 hours (last time point) following single or twice-weekly administration of 15 mg/kg brincidofovir. The % CV for mean concentrations of cidofovir ranged from 4.82 to 88.4% for female animals and 5.49 to 173% for male animals. In general, the highest % CV was observed at early or later time points when cidofovir concentrations were at or near the LLOQ.

Toxicokinetics of Cidofovir in Plasma

Mean plasma cidofovir concentration-time information used in the input file for Phoenix WinNonlin analysis are contained in Table 64. TK parameters for cidofovir following single and twice weekly administration of brincidofovir as an intravenous infusion to rats are summarized in Table 58.

On Days 1 and 7, cidofovir $C_{max}$ generally increased less than proportional to dose. For a 15-fold increase in brincidofovir dose from 1 mg/kg to 15 mg/kg, cidofovir $C_{max}$ increased 2.9- to 4.1-fold for female animals and 5.7- to 16.8-fold for males. On Days 1 and 7, cidofovir $AUC_{last}$ increased less than proportionally to dose for female animals; for a 15-fold increase in brincidofovir dose, cidofovir $AUC_{last}$ increased 9.4- to 16.2-fold. Due to insufficient data points in male rats after 1 mg/kg administration, proportionality of $AUC_{last}$ could not be determined.

The cidofovir $C_{max}$ and $AUC_{last}$ on Days 1 and 7, after a 15 mg/kg brincidofovir dose, were similar (difference within 33%) between female and male animals.

The cidofovir $C_{max}$ and $AUC_{last}$ on Day 7 for female animals following twice-weekly dosing of brincidofovir at 1 mg/kg showed a trend toward higher $C_{max}$ and $AUC_{last}$ on Day 7 compared to Day 1 (Day 7/Day 1 AR ranged from 1.6 to 1.9). However, cidofovir $C_{max}$ and $AUC_{last}$ for both female and male animals administered 15 mg/kg (3 doses), were similar (Day 7/Day 1 AR ranged from 1.0 to 1.1).

The metabolite-to-parent (M/P) ratio of $AUC_{last}$ on Day 1 for female animals were 0.190 and 0.661 for doses of 1 mg/kg and 15 mg/kg of brincidofovir, respectively. The M/P ratios on Day 7 for female animals were 0.193 and 0.444 for doses of 1 mg/kg and 15 mg/kg of brincidofovir, respectively.

Due to insufficient data points in male rats after 1 mg/kg administration, the M/P ratio for $AUC_{last}$ could not be determined. The M/P ratios on Day 1 and 7 after 15 mg/kg administration of brincidofovir were 0.126 and 0.307, respectively.

TABLE 58 cidofovir TK Parameters Following Single and Multiple 2-Hour Intravenous Infusion Administrations of brincidofovir on Days 1, 3 and 7 to Rats

| | Brincidofovir Dose (mg/kg) | | | | | | | |
|---|---|---|---|---|---|---|---|---|
| | 1 | | | | 15 | | | |
| | Male | | Female | | Male | | Female | |
| | Period | | | | | | | |
| TK Parameter | Day 1 | Day 7 | Day 1 | Day 7 | Day 1 | Day 7 | Day 1 | Day 7 |
| $T_{max}$ (h) | 8 | 8 | 2 | 2 | 8 | 8 | 8 | 8 |
| $T_{last}$ (h) | 8 | 8 | 8 | 8 | 24 | 24 | 24 | 24 |
| $C_{max}$ (ng/mL) | 1.95 | 5.73 | 9.35 | 15 | 32.8 | 32.8 | 38.6 | 43.6 |
| $C_{max}$/Dose [(ng/mL)/(mg/kg)] | 1.95 | 5.73 | 9.35 | 15 | 2.18 | 2.18 | 2.57 | 2.91 |
| $AUC_{last}$ (h*ng/mL) | NR | NR | 43.4 | 80.1 | 548 | 624 | 705 | 756 |
| $AUC_{last}$/Dose [(h*ng/mL)/(mg/kg)] | NR | NR | 43.4 | 80.1 | 36.5 | 41.6 | 47 | 50.4 |
| AR: $C_{max}$ Day 7/Day 1 | NA | 2.94 | NA | 1.60 | NA | 1.00 | NA | 1.13 |
| AR: $AUC_{last}$ Day 7/Day 1 | NA | NR | NA | 1.85 | NA | 1.14 | NA | 1.07 |
| M/P Ratio: $C_{max}$ (molar equivalents) | 0.017 | 0.056 | 0.099 | 0.316 | 0.035 | 0.015 | 0.022 | 0.053 |
| M/P Ratio: $AUC_{last}$ (molar equivalents) | NR | NR | 0.190 | 0.661 | 0.126 | 0.307 | 0.193 | 0.444 |

TABLE 59

Plasma Concentrations of brincidofovir and cidofovir Following Single and Multiple 2-Hour Intravenous Infusion Administrations on Days 1, 3 and 7 at a Nominal brincidofovir Dose of 1 mg/kg to Female and Male Rats

| Dose (mg/kg) | Period | Time (h) | Subject | Male BCV | Male cidofovir | Female BCV | Female cidofovir |
|---|---|---|---|---|---|---|---|
| | | | | Imputed Concentration[a] (ng/mL) | | | |
| 1 | Day 1 | 1 | 2031 | 156 | 0.00 | NS | NS |
| | | | 2033 | 244 | 0.00 | NS | NS |
| | | | 2035 | 280 | 0.00 | NS | NS |
| | | | 2542 | NS | NS | 109 | 0.00 |
| | | | 2544 | NS | NS | 126 | 0.00 |
| | | | 2546 | NS | NS | 177 | 0.00 |
| | | | Mean | 227 | 0.00 | 137 | 0.00 |
| | | | SD | 63.8 | 0.00 | 35.4 | 0.00 |
| | | | % CV | 28.1 | NC | 25.8 | NC |
| | | | N | 3 | 3 | 3 | 3 |
| 1 | Day 1 | 2 | 2032 | 220 | 0.00 | NS | NS |
| | | | 2034 | 283 | 0.00 | NS | NS |
| | | | 2036 | 203 | 0.00 | NS | NS |
| | | | 2543 | NS | NS | 253 | 9.62 |
| | | | 2547 | NS | NS | 164 | 6.22 |
| | | | 2572 | NS | NS | 155 | 12.2 |
| | | | Mean | 235 | 0.00 | 191 | 9.35 |
| | | | SD | 42.1 | 0.00 | 54.2 | 3.00 |
| | | | % CV | 17.9 | NC | 28.4 | 32.1 |
| | | | N | 3 | 3 | 3 | 3 |
| 1 | Day 1 | 8 | 2031 | 0.00 | 5.85 | NS | NS |
| | | | 2033 | 0.00 | 0.00 | NS | NS |
| | | | 2035 | 0.00 | 0.00 | NS | NS |
| | | | 2542 | NS | NS | 2.30 | 7.12 |
| | | | 2544 | NS | NS | 1.45 | 5.60 |
| | | | 2546 | NS | NS | 0.00 | 0.00 |
| | | | Mean | 0.00 | 1.95 | 1.25 | 4.24 |
| | | | SD | 0.00 | 3.38 | 1.16 | 3.75 |
| | | | % CV | NC | 173 | 93.0 | 88.4 |
| | | | N | 3 | 3 | 3 | 3 |
| 1 | Day 1 | 24 | 2032 | 0.00 | 0.00 | NS | NS |
| | | | 2034 | 0.00 | 0.00 | NS | NS |
| | | | 2036 | 0.00 | 0.00 | NS | NS |
| | | | 2543 | NS | NS | 0.00 | 0.00 |
| | | | 2547 | NS | NS | 0.00 | 0.00 |
| | | | 2572 | NS | NS | 0.00 | 0.00 |
| | | | Mean | 0.00 | 0.00 | 0.00 | 0.00 |
| | | | SD | 0.00 | 0.00 | 0.00 | 0.00 |
| | | | % CV | NC | NC | NC | NC |
| | | | N | 3 | 3 | 3 | 3 |
| 1 | Day 7 | 0 | 2031 | 0.00 | 0.00 | NS | NS |
| | | | 2033 | 0.00 | 0.00 | NS | NS |
| | | | 2035 | 0.00 | 0.00 | NS | NS |
| | | | 2542 | NS | NS | 0.00 | 0.00 |
| | | | 2544 | NS | NS | 0.00 | 0.00 |
| | | | 2546 | NS | NS | 0.00 | 0.00 |
| | | | Mean | 0.00 | 0.00 | 0.00 | 0.00 |
| | | | SD | 0.00 | 0.00 | 0.00 | 0.00 |
| | | | % CV | NC | NC | NC | NC |
| | | | N | 3 | 3 | 3 | 3 |
| 1 | Day 7 | 2 | 2032 | 255 | 0.00 | NS | NS |
| | | | 2034 | 189 | 0.00 | NS | NS |
| | | | 2036 | 179 | 0.00 | NS | NS |
| | | | 2543 | NS | NS | 115 | 13.5 |
| | | | 2547 | NS | NS | 82.1 | 13.8 |
| | | | 2572 | NS | NS | 89.2 | 17.6 |
| | | | Mean | 208 | 0.00 | 95.4 | 15.0 |
| | | | SD | 41.3 | 0.00 | 17.3 | 2.29 |
| | | | % CV | 19.9 | NC | 18.1 | 15.3 |
| | | | N | 3 | 3 | 3 | 3 |
| 1 | Day 7 | 8 | 2031 | 0.00 | 5.67 | NS | NS |
| | | | 2033 | 0.00 | 5.45 | NS | NS |
| | | | 2035 | 0.00 | 6.07 | NS | NS |
| | | | 2542 | NS | NS | 6.58 | 9.51 |
| | | | 2544 | NS | NS | 0.00 | 7.84 |
| | | | 2546 | NS | NS | 0.00 | 5.36 |

TABLE 59-continued

Plasma Concentrations of brincidofovir and cidofovir Following Single and Multiple 2-Hour Intravenous Infusion Administrations on Days 1, 3 and 7 at a Nominal brincidofovir Dose of 1 mg/kg to Female and Male Rats

| | | | | Sex | | | |
|---|---|---|---|---|---|---|---|
| | | | | Male | | Female | |
| Dose (mg/kg) | Period | Time (h) | Subject | BCV | cidofovir | BCV | cidofovir |
| | | | | Imputed Concentration[a] (ng/mL) | | | |
| | | | Mean | 0.00 | 5.73 | 2.19 | 7.57 |
| | | | SD | 0.00 | 0.314 | 3.80 | 2.09 |
| | | | % CV | NC | 5.49 | 173 | 27.6 |
| | | | N | 3 | 3 | 3 | 3 |
| 1 | Day 7 | 24 | 2032 | 0.00 | 0.00 | NS | NS |
| | | | 2034 | 0.00 | 0.00 | NS | NS |
| | | | 2036 | 0.00 | 0.00 | NS | NS |
| | | | 2543 | NS | NS | 0.00 | 0.00 |
| | | | 2547 | NS | NS | 0.00 | 0.00 |
| | | | 2572 | NS | NS | 0.00 | 0.00 |
| | | | Mean | 0.00 | 0.00 | 0.00 | 0.00 |
| | | | SD | 0.00 | 0.00 | 0.00 | 0.00 |
| | | | % CV | NC | NC | NC | NC |
| | | | N | 3 | 3 | 3 | 3 |

[a]Imputations of zero were made for samples with bioanalytical result of BLQ.

TABLE 60

Plasma Concentrations of brincidofovir and cidofovir Following Single and Multiple 2-Hour Intravenous Infusion Administrations on Days 1, 3 and 7 at a Nominal brincidofovir Dose of 15 mg/kg to Female and Male Rats

| | | | | Sex | | | |
|---|---|---|---|---|---|---|---|
| | | | | Male | | Female | |
| Dose (mg/kg) | Period | Time (h) | Subject | BCV | cidofovir | BCV | cidofovir |
| | | | | Imputed Concentration[a] | | | |
| 15 | Day 1 | 1 | 3053 | 4020 | 8.97 | NS | NS |
| | | | 3055 | 4030 | 0.00 | NS | NS |
| | | | 3057 | 5060 | 7.08 | NS | NS |
| | | | 3564 | NS | NS | 3030 | 14.5 |
| | | | 3566 | NS | NS | 3930 | 20.5 |
| | | | 3568 | NS | NS | 3450 | 10.3 |
| | | | Mean | 4370 | 5.35 | 3470 | 15.1 |
| | | | SD | 598 | 4.73 | 450 | 5.13 |
| | | | % CV | 13.7 | 88.4 | 13.0 | 33.9 |
| | | | N | 3 | 3 | 3 | 3 |
| 15 | Day 1 | 2 | 3054 | 2510 | 25.9 | NS | NS |
| | | | 3058 | 2990 | 13.1 | NS | NS |
| | | | 3074 | 3010 | 15.1 | NS | NS |
| | | | 3565 | NS | NS | 2460 | 10.9 |
| | | | 3567 | NS | NS | 1860 | 41.2 |
| | | | 3569 | NS | NS | 3380 | 34.1 |
| | | | Mean | 2840 | 18.0 | 2570 | 28.7 |
| | | | SD | 283 | 6.89 | 766 | 15.8 |
| | | | % CV | 9.98 | 38.2 | 29.8 | 55.2 |
| | | | N | 3 | 3 | 3 | 3 |
| 15 | Day 1 | 8 | 3053 | 10.7 | 35.8 | NS | NS |
| | | | 3055 | 8.23 | 29.5 | NS | NS |
| | | | 3057 | 9.85 | 33.0 | NS | NS |
| | | | 3564 | NS | NS | 5.05 | 37.3 |
| | | | 3566 | NS | NS | 7.97 | 37.7 |
| | | | 3568 | NS | NS | 6.57 | 40.7 |
| | | | Mean | 9.59 | 32.8 | 6.53 | 38.6 |
| | | | SD | 1.25 | 3.16 | 1.46 | 1.86 |
| | | | % CV | 13.1 | 9.63 | 22.4 | 4.82 |
| | | | N | 3 | 3 | 3 | 3 |
| 15 | Day 1 | 24 | 3054 | 1.20 | 20.5 | NS | NS |
| | | | 3058 | 1.10 | 14.0 | NS | NS |
| | | | 3074 | 1.36 | 15.5 | NS | NS |
| | | | 3565 | NS | NS | 2.32 | 24.6 |
| | | | 3567 | NS | NS | 1.25 | 23.2 |
| | | | 3569 | NS | NS | 2.48 | 18.6 |
| | | | Mean | 1.22 | 16.7 | 2.02 | 22.1 |

TABLE 60-continued

Plasma Concentrations of brincidofovir and cidofovir Following Single and Multiple 2-Hour Intravenous Infusion Administrations on Days 1, 3 and 7 at a Nominal brincidofovir Dose of 15 mg/kg to Female and Male Rats

| Dose (mg/kg) | Period | Time (h) | Subject | Sex Male BCV | Male cidofovir | Female BCV | Female cidofovir |
|---|---|---|---|---|---|---|---|
| | | | | | Imputed Concentration[a] | | |
| | | | SD | 0.131 | 3.40 | 0.669 | 3.14 |
| | | | % CV | 10.7 | 20.4 | 33.2 | 14.2 |
| | | | N | 3 | 3 | 3 | 3 |
| 15 | Day 7 | 0 | 3053 | 0.00 | 0.00 | NS | NS |
| | | | 3055 | 0.00 | 0.00 | NS | NS |
| | | | 3057 | 0.00 | 0.00 | NS | NS |
| | | | 3564 | NS | NS | 0.00 | 0.00 |
| | | | 3566 | NS | NS | 0.00 | 0.00 |
| | | | 3568 | NS | NS | 0.00 | 0.00 |
| | | | Mean | 0.00 | 0.00 | 0.00 | 0.00 |
| | | | SD | 0.00 | 0.00 | 0.00 | 0.00 |
| | | | % CV | NC | NC | NC | NC |
| | | | N | 3 | 3 | 3 | 3 |
| 15 | Day 7 | 2 | 3054 | 1640 | 38.8 | NS | NS |
| | | | 3058 | 1940 | 15.0 | NS | NS |
| | | | 3074 | 2150 | 18.3 | NS | NS |
| | | | 3565 | NS | NS | 2220 | 20.2 |
| | | | 3567 | NS | NS | 995 | 49.1 |
| | | | 3569 | NS | NS | 1750 | 34.2 |
| | | | Mean | 1910 | 24.0 | 1660 | 34.5 |
| | | | SD | 256 | 12.9 | 618 | 14.5 |
| | | | % CV | 13.4 | 53.7 | 37.3 | 41.9 |
| | | | N | 3 | 3 | 3 | 3 |
| 15 | Day 7 | 8 | 3053 | 9.82 | 38.4 | NS | NS |
| | | | 3055 | 7.60 | 31.1 | NS | NS |
| | | | 3057 | 8.73 | 28.8 | NS | NS |
| | | | 3564 | NS | NS | 5.32 | 36.4 |
| | | | 3566 | NS | NS | 6.27 | 54.2 |
| | | | 3568 | NS | NS | 4.75 | 40.2 |
| | | | Mean | 8.72 | 32.8 | 5.45 | 43.6 |
| | | | SD | 1.11 | 5.01 | 0.768 | 9.37 |
| | | | % CV | 12.7 | 15.3 | 14.1 | 21.5 |
| | | | N | 3 | 3 | 3 | 3 |
| 15 | Day 7 | 24 | 3054 | 1.85 | 27.2 | NS | NS |
| | | | 3058 | 1.32 | 17.9 | NS | NS |
| | | | 3074 | 1.17 | 19.9 | NS | NS |
| | | | 3565 | NS | NS | 2.37 | 30.0 |
| | | | 3567 | NS | NS | 0.00 | 7.10 |
| | | | 3569 | NS | NS | 0.00 | 23.8 |
| | | | Mean | 1.45 | 21.7 | 0.790 | 20.3 |
| | | | SD | 0.357 | 4.90 | 1.37 | 11.8 |
| | | | % CV | 24.7 | 22.6 | 173 | 58.3 |
| | | | N | 3 | 3 | 3 | 3 |

[a]Imputations of zero were made for samples with bioanalytical result of BLQ.

TABLE 61

Measured and Imputed brincidofovir Concentration Data for Mean Generation

| Analyte | Dose (mg/kg) | Time (h) | Subject | Sex | Day 1 C (ng/mL) | Day 1 IC (ng/mL) | Day 7 C (ng/mL) | Day 7 IC (ng/mL) |
|---|---|---|---|---|---|---|---|---|
| BCV | 0 | 2 | 1015 | Male | BLQ | 0.00 | BLQ | 0.00 |
| | 0 | 2 | 1016 | Male | BLQ | 0.00 | BLQ | 0.00 |
| | 0 | 2 | 1017 | Male | BLQ | 0.00 | BLQ | 0.00 |
| | 0 | 2 | 1523 | Female | BLQ | 0.00 | BLQ | 0.00 |
| | 0 | 2 | 1524 | Female | BLQ | 0.00 | BLQ | 0.00 |
| | 0 | 2 | 1525 | Female | BLQ | 0.00 | BLQ | 0.00 |
| | 1 | 0 | 2031 | Male | NS | NS | BLQ | 0.00 |
| | 1 | 0 | 2033 | Male | NS | NS | BLQ | 0.00 |
| | 1 | 0 | 2035 | Male | NS | NS | BLQ | 0.00 |
| | 1 | 0 | 2542 | Female | NS | NS | BLQ | 0.00 |
| | 1 | 0 | 2544 | Female | NS | NS | BLQ | 0.00 |

TABLE 61-continued

Measured and Imputed brincidofovir Concentration Data for Mean Generation

| | | | | | Period | | | |
|---|---|---|---|---|---|---|---|---|
| | | | | | Day 1 | | Day 7 | |
| | Dose | Time | | | | | | |
| Analyte | (mg/kg) | (h) | Subject | Sex | C (ng/mL) | IC (ng/mL) | C (ng/mL) | IC (ng/mL) |
| | 1 | 0 | 2546 | Female | NS | NS | BLQ | 0.00 |
| | 1 | 1 | 2031 | Male | 156 | 156 | NS | NS |
| | 1 | 1 | 2033 | Male | 244 | 244 | NS | NS |
| | 1 | 1 | 2035 | Male | 280 | 280 | NS | NS |
| | 1 | 1 | 2542 | Female | 109 | 109 | NS | NS |
| | 1 | 1 | 2544 | Female | 126 | 126 | NS | NS |
| | 1 | 1 | 2546 | Female | 177 | 177 | NS | NS |
| | 1 | 2 | 2032 | Male | 220 | 220 | 255 | 255 |
| | 1 | 2 | 2034 | Male | 283 | 283 | 189 | 189 |
| | 1 | 2 | 2036 | Male | 203 | 203 | 179 | 179 |
| | 1 | 2 | 2543 | Female | 253 | 253 | 115 | 115 |
| | 1 | 2 | 2547 | Female | 164 | 164 | 82.1 | 82.1 |
| | 1 | 2 | 2572 | Female | 155 | 155 | 89.2 | 89.2 |
| | 1 | 8 | 2031 | Male | BLQ | 0.00 | BLQ | 0.00 |
| | 1 | 8 | 2033 | Male | BLQ | 0.00 | BLQ | 0.00 |
| | 1 | 8 | 2035 | Male | BLQ | 0.00 | BLQ | 0.00 |
| | 1 | 8 | 2542 | Female | 2.30 | 2.30 | 6.58 | 6.58 |
| | 1 | 8 | 2544 | Female | 1.45 | 1.45 | BLQ | 0.00 |
| | 1 | 8 | 2546 | Female | BLQ | 0.00 | BLQ | 0.00 |
| | 1 | 24 | 2032 | Male | BLQ | 0.00 | BLQ | 0.00 |
| | 1 | 24 | 2034 | Male | BLQ | 0.00 | BLQ | 0.00 |
| | 1 | 24 | 2036 | Male | BLQ | 0.00 | BLQ | 0.00 |
| | 1 | 24 | 2543 | Female | BLQ | 0.00 | BLQ | 0.00 |
| | 1 | 24 | 2547 | Female | BLQ | 0.00 | BLQ | 0.00 |
| | 1 | 24 | 2572 | Female | BLQ | 0.00 | BLQ | 0.00 |
| | 15 | 0 | 3053 | Male | NS | NS | BLQ | 0.00 |
| | 15 | 0 | 3055 | Male | NS | NS | BLQ | 0.00 |
| | 15 | 0 | 3057 | Male | NS | NS | BLQ | 0.00 |
| | 15 | 0 | 3564 | Female | NS | NS | BLQ | 0.00 |
| | 15 | 0 | 3566 | Female | NS | NS | BLQ | 0.00 |
| | 15 | 0 | 3568 | Female | NS | NS | BLQ | 0.00 |
| | 15 | 1 | 3053 | Male | 4020 | 4020 | NS | NS |
| | 15 | 1 | 3055 | Male | 4030 | 4030 | NS | NS |
| | 15 | 1 | 3057 | Male | 5060 | 5060 | NS | NS |
| | 15 | 1 | 3564 | Female | 3030 | 3030 | NS | NS |
| | 15 | 1 | 3566 | Female | 3930 | 3930 | NS | NS |
| | 15 | 1 | 3568 | Female | 3450 | 3450 | NS | NS |
| | 15 | 2 | 3054 | Male | 2510 | 2510 | 1640 | 1640 |
| | 15 | 2 | 3058 | Male | 2990 | 2990 | 1940 | 1940 |
| | 15 | 2 | 3074 | Male | 3010 | 3010 | 2150 | 2150 |
| | 15 | 2 | 3565 | Female | 2460 | 2460 | 2220 | 2220 |
| | 15 | 2 | 3567 | Female | 1860 | 1860 | 995 | 995 |
| | 15 | 2 | 3569 | Female | 3380 | 3380 | 1750 | 1750 |
| | 15 | 8 | 3053 | Male | 10.7 | 10.7 | 9.82 | 9.82 |
| | 15 | 8 | 3055 | Male | 8.23 | 8.23 | 7.60 | 7.60 |
| | 15 | 8 | 3057 | Male | 9.85 | 9.85 | 8.73 | 8.73 |
| | 15 | 8 | 3564 | Female | 5.05 | 5.05 | 5.32 | 5.32 |
| | 15 | 8 | 3566 | Female | 7.97 | 7.97 | 6.27 | 6.27 |
| | 15 | 8 | 3568 | Female | 6.57 | 6.57 | 4.75 | 4.75 |
| | 15 | 24 | 3054 | Male | 1.20 | 1.20 | 1.85 | 1.85 |
| | 15 | 24 | 3058 | Male | 1.10 | 1.10 | 1.32 | 1.32 |
| | 15 | 24 | 3074 | Male | 1.36 | 1.36 | 1.17 | 1.17 |
| | 15 | 24 | 3565 | Female | 2.32 | 2.32 | 2.37 | 2.37 |
| | 15 | 24 | 3567 | Female | 1.25 | 1.25 | BLQ | 0.00 |
| | 15 | 24 | 3569 | Female | 2.48 | 2.48 | BLQ | 0.00 |

TABLE 62

Measured and Imputed Cidofovir Concentration Data for Mean Generation

| | | | | | Period | | | |
|---|---|---|---|---|---|---|---|---|
| | | | | | Day 1 | | Day 7 | |
| | Dose_Level | Time | | | | | | |
| Analyte | (mg/kg) | (h) | Subject | Sex | C (ng/mL) | IC (ng/mL) | C (ng/mL) | IC (ng/mL) |
| cidofovir | 0 | 2 | 1015 | Male | BLQ | 0.00 | BLQ | 0.00 |
| | 0 | 2 | 1016 | Male | BLQ | 0.00 | BLQ | 0.00 |
| | 0 | 2 | 1017 | Male | BLQ | 0.00 | BLQ | 0.00 |

TABLE 62-continued

Measured and Imputed Cidofovir Concentration Data for Mean Generation

| Analyte | Dose_Level (mg/kg) | Time (h) | Subject | Sex | Period | | | |
|---|---|---|---|---|---|---|---|---|
| | | | | | Day 1 | | Day 7 | |
| | | | | | C (ng/mL) | IC (ng/mL) | C (ng/mL) | IC (ng/mL) |
| | 0 | 2 | 1523 | Female | BLQ | 0.00 | BLQ | 0.00 |
| | 0 | 2 | 1524 | Female | BLQ | 0.00 | BLQ | 0.00 |
| | 0 | 2 | 1525 | Female | BLQ | 0.00 | BLQ | 0.00 |
| | 1 | 0 | 2031 | Male | NS | NS | BLQ | 0.00 |
| | 1 | 0 | 2033 | Male | NS | NS | BLQ | 0.00 |
| | 1 | 0 | 2035 | Male | NS | NS | BLQ | 0.00 |
| | 1 | 0 | 2542 | Female | NS | NS | BLQ | 0.00 |
| | 1 | 0 | 2544 | Female | NS | NS | BLQ | 0.00 |
| | 1 | 0 | 2546 | Female | NS | NS | BLQ | 0.00 |
| | 1 | 1 | 2031 | Male | BLQ | 0.00 | NS | NS |
| | 1 | 1 | 2033 | Male | BLQ | 0.00 | NS | NS |
| | 1 | 1 | 2035 | Male | BLQ | 0.00 | NS | NS |
| | 1 | 1 | 2542 | Female | BLQ | 0.00 | NS | NS |
| | 1 | 1 | 2544 | Female | BLQ | 0.00 | NS | NS |
| | 1 | 1 | 2546 | Female | BLQ | 0.00 | NS | NS |
| | 1 | 2 | 2032 | Male | BLQ | 0.00 | BLQ | 0.00 |
| | 1 | 2 | 2034 | Male | BLQ | 0.00 | BLQ | 0.00 |
| | 1 | 2 | 2036 | Male | BLQ | 0.00 | BLQ | 0.00 |
| | 1 | 2 | 2543 | Female | 9.62 | 9.62 | 13.5 | 13.5 |
| | 1 | 2 | 2547 | Female | 6.22 | 6.22 | 13.8 | 13.8 |
| | 1 | 2 | 2572 | Female | 12.2 | 12.2 | 17.6 | 17.6 |
| | 1 | 8 | 2031 | Male | 5.85 | 5.85 | 5.67 | 5.67 |
| | 1 | 8 | 2033 | Male | BLQ | 0.00 | 5.45 | 5.45 |
| | 1 | 8 | 2035 | Male | BLQ | 0.00 | 6.07 | 6.07 |
| | 1 | 8 | 2542 | Female | 7.12 | 7.12 | 9.51 | 9.51 |
| | 1 | 8 | 2544 | Female | 5.60 | 5.60 | 7.84 | 7.84 |
| | 1 | 8 | 2546 | Female | BLQ | 0.00 | 5.36 | 5.36 |
| | 1 | 24 | 2032 | Male | BLQ | 0.00 | BLQ | 0.00 |
| | 1 | 24 | 2034 | Male | BLQ | 0.00 | BLQ | 0.00 |
| | 1 | 24 | 2036 | Male | BLQ | 0.00 | BLQ | 0.00 |
| | 1 | 24 | 2543 | Female | BLQ | 0.00 | BLQ | 0.00 |
| | 1 | 24 | 2547 | Female | BLQ | 0.00 | BLQ | 0.00 |
| | 1 | 24 | 2572 | Female | BLQ | 0.00 | BLQ | 0.00 |
| | 15 | 0 | 3053 | Male | NS | NS | BLQ | 0.00 |
| | 15 | 0 | 3055 | Male | NS | NS | BLQ | 0.00 |
| | 15 | 0 | 3057 | Male | NS | NS | BLQ | 0.00 |
| | 15 | 0 | 3564 | Female | NS | NS | BLQ | 0.00 |
| | 15 | 0 | 3566 | Female | NS | NS | BLQ | 0.00 |
| | 15 | 0 | 3568 | Female | NS | NS | BLQ | 0.00 |
| | 15 | 1 | 3053 | Male | 8.97 | 8.97 | NS | NS |
| | 15 | 1 | 3055 | Male | BLQ | 0.00 | NS | NS |
| | 15 | 1 | 3057 | Male | 7.08 | 7.08 | NS | NS |
| | 15 | 1 | 3564 | Female | 14.5 | 14.5 | NS | NS |
| | 15 | 1 | 3566 | Female | 20.5 | 20.5 | NS | NS |
| | 15 | 1 | 3568 | Female | 10.3 | 10.3 | NS | NS |
| | 15 | 2 | 3054 | Male | 25.9 | 25.9 | 38.8 | 38.8 |
| | 15 | 2 | 3058 | Male | 13.1 | 13.1 | 15.0 | 15.0 |
| | 15 | 2 | 3074 | Male | 15.1 | 15.1 | 18.3 | 18.3 |
| | 15 | 2 | 3565 | Female | 10.9 | 10.9 | 20.2 | 20.2 |
| | 15 | 2 | 3567 | Female | 41.2 | 41.2 | 49.1 | 49.1 |
| | 15 | 2 | 3569 | Female | 34.1 | 34.1 | 34.2 | 34.2 |
| | 15 | 8 | 3053 | Male | 35.8 | 35.8 | 38.4 | 38.4 |
| | 15 | 8 | 3055 | Male | 29.5 | 29.5 | 31.1 | 31.1 |
| | 15 | 8 | 3057 | Male | 33.0 | 33.0 | 28.8 | 28.8 |
| | 15 | 8 | 3564 | Female | 37.3 | 37.3 | 36.4 | 36.4 |
| | 15 | 8 | 3566 | Female | 37.7 | 37.7 | 54.2 | 54.2 |
| | 15 | 8 | 3568 | Female | 40.7 | 40.7 | 40.2 | 40.2 |
| | 15 | 24 | 3054 | Male | 20.5 | 20.5 | 27.2 | 27.2 |
| | 15 | 24 | 3058 | Male | 14.0 | 14.0 | 17.9 | 17.9 |
| | 15 | 24 | 3074 | Male | 15.5 | 15.5 | 19.9 | 19.9 |
| | 15 | 24 | 3565 | Female | 24.6 | 24.6 | 30.0 | 30.0 |
| | 15 | 24 | 3567 | Female | 23.2 | 23.2 | 7.10 | 7.10 |
| | 15 | 24 | 3569 | Female | 18.6 | 18.6 | 23.8 | 23.8 |

TABLE 63

Mean and Imputed brincidofovir Concentration Data for NCA

| | | | | Period | | |
|---|---|---|---|---|---|---|
| | | | Day 1 | | Day 7 | |
| Analyte | Dose (mg/kg) | Sex | Time (h) | MC (ng/mL) | IMC (ng/mL) | MC (ng/mL) | IMC (ng/mL) |
|---|---|---|---|---|---|---|---|
| BCV | 1 | Female | 0 | NS | NS | 0.00 | 0.00 |
| | 1 | Female | 1 | 137 | 137 | NS | NS |
| | 1 | Female | 2 | 191 | 191 | 95.4 | 95.4 |
| | 1 | Female | 8 | 1.25 | 1.25 | 2.19 | 2.19 |
| | 1 | Female | 24 | 0.00 | missing | 0.00 | missing |
| | 1 | Male | 0 | NS | NS | 0.00 | 0.00 |
| | 1 | Male | 1 | 227 | 227 | NS | NS |
| | 1 | Male | 2 | 235 | 235 | 208 | 208 |
| | 1 | Male | 8 | 0.00 | missing | 0.00 | missing |
| | 1 | Male | 24 | 0.00 | missing | 0.00 | missing |
| | 15 | Female | 0 | NS | NS | 0.00 | 0.00 |
| | 15 | Female | 1 | 3470 | 3470 | NS | NS |
| | 15 | Female | 2 | 2570 | 2570 | 1660 | 1660 |
| | 15 | Female | 8 | 6.53 | 6.53 | 5.45 | 5.45 |
| | 15 | Female | 24 | 2.02 | 2.02 | 0.790 | 0.790 |
| | 15 | Male | 0 | NS | NS | 0.00 | 0.00 |
| | 15 | Male | 1 | 4370 | 4370 | NS | NS |
| | 15 | Male | 2 | 2840 | 2840 | 1910 | 1910 |
| | 15 | Male | 8 | 9.59 | 9.59 | 8.72 | 8.72 |
| | 15 | Male | 24 | 1.22 | 1.22 | 1.45 | 1.45 |

TABLE 64

Mean and Imputed cidofovir Concentration Data for NCA

| | | | | Period | | |
|---|---|---|---|---|---|---|
| | | | Day 1 | | Day 7 | |
| Analyte | Dose (mg/kg) | Sex | Time (h) | MC (ng/mL) | IMC (ng/mL) | MC (ng/mL) | IMC (ng/mL) |
|---|---|---|---|---|---|---|---|
| cidofovir | 1 | Female | 0 | NS | NS | 0.00 | 0.00 |
| | 1 | Female | 1 | 0.00 | 0.00 | NS | NS |
| | 1 | Female | 2 | 9.35 | 9.35 | 15.0 | 15.0 |
| | 1 | Female | 8 | 4.24 | 4.24 | 7.57 | 7.57 |
| | 1 | Female | 24 | 0.00 | missing | 0.00 | missing |
| | 1 | Male | 0 | NS | NS | 0.00 | 0.00 |
| | 1 | Male | 1 | 0.00 | 0.00 | NS | NS |
| | 1 | Male | 2 | 0.00 | 0.00 | 0.00 | 0.00 |
| | 1 | Male | 8 | 1.95 | 1.95 | 5.73 | 5.73 |
| | 1 | Male | 24 | 0.00 | missing | 0.00 | missing |
| | 15 | Female | 0 | NS | NS | 0.00 | 0.00 |
| | 15 | Female | 1 | 15.1 | 15.1 | NS | NS |
| | 15 | Female | 2 | 28.7 | 28.7 | 34.5 | 34.5 |
| | 15 | Female | 8 | 38.6 | 38.6 | 43.6 | 43.6 |
| | 15 | Female | 24 | 22.1 | 22.1 | 20.3 | 20.3 |
| | 15 | Male | 0 | NS | NS | 0.00 | 0.00 |
| | 15 | Male | 1 | 5.35 | 5.35 | NS | NS |
| | 15 | Male | 2 | 18.0 | 18.0 | 24.0 | 24.0 |
| | 15 | Male | 8 | 32.8 | 32.8 | 32.8 | 32.8 |
| | 15 | Male | 24 | 16.7 | 16.7 | 21.7 | 21.7 |

Example 9—Mass Balance, Pharmacokinetics and Tissue Distribution by Quantitative Whole-Body Autoradiography in Rats Following a Single Oral or Intravenous Dose of [$^{14}$C]Brincidofovir The objectives of this study were to characterize the tissue distribution of total radioactivity in male Sprague Dawley (SD) and Long-Evans (LE) rats following administration of a single intravenous (IV, 2-h infusion) or oral (PO, gavage) dose of [$^{14}$C]brincidofovir. In addition, the rate and extent of excretion (mass balance) and pharmacokinetics (PK) of total radioactivity in male Sprague Dawley rats following a single intravenous (IV, 2-h infusion) dose of [$^{14}$C]brincidofovir was examined. Residual plasma and excreta collected on this study were stored at −70° C. for metabolite profile and identification experiment conducted under a different protocol.

Materials and Methods

The study utilized 4 groups of male SD rats (albino), and 3 groups of male LE rats (pigmented); a total of 39 rats. All animals were obtained from Hilltop Lab Animals, Inc. (Scottsdale, PA). Rats weighed between 214 and 265 g at dosing. Rats in Groups 1, 2, 3, and 4 were administered a single 2-hour (h) IV infusion of [$^{14}$C]brincidofovir at a target dose of 15 mg/kg. Rats in Group 5 were administered a single 2-h IV infusion of [$^{14}$C]brincidofovir at a target dose of 2 mg/kg. Rats in Group 6, and 7 were administered a single oral gavage administration of [$^{14}$C]brincidofovir at a target dose of 15 mg/kg. Three dosing formulations (one for high dose IV, one for low dose IV, and one for PO dose) were prepared at QPS on the day of dosing. The IV formulation for Groups 1, 2, 3, and 4 contained a vehicle of 10 mM sodium phosphate buffer in 5% dextrose solution at pH 8.0(±0.1). The IV formulation for Group 5 contained a vehicle of 16 mM sodium phosphate buffer in 5% dextrose solution at pH 8.0(±0.1), and the PO dosing formulation contained a vehicle of 12.5 mM sodium phosphate buffer at pH 8.0(±0.1). The IV dose formulation for Group 5 and the PO dose formulation for Groups 6 and 7 contained higher concentration of buffer so that the final buffer concentration was approximately 10 mM in all dose formulations.

Test Animals

Sixteen adult male SD rats, and 23 adult male LE rats, which were obtained from Hilltop Lab Animals, Inc. (Scottsdale, PA), were placed on this study. Rats in Groups 1-5 were surgically modified to have indwelling femoral vein cannulas (FVC) for IV infusion. The body weight range, source, vendor, and receipt date of the animals was documented in the raw data. Animals placed on study were assigned a permanent identification number using a permanent marker on the tail, while unused spare animals were returned to stock after successful dose administration of animals placed on study. Randomization was performed by cannula patency and QPS SOP.

Tables 65 and 66 give summaries of the dosing and sample collection protocols.

TABLE 65

In-Life Study Dosing Summary

| Group No. | Study | Strain/Dose route | No. of Animals, Sex | Target Dose Level (mg/kg) | Target Radioactivity Level (µCi/kg) | Target Dose Date (mL/kg/g)[b] | Target Dose Volume (mL/kg) | Target Dose Conc. (mg/mL) |
|---|---|---|---|---|---|---|---|---|
| 1 | MB | SD/IV[a] | 3M | 15 mg/kg | 180 | 10 | 20 | 0.75 mg/mL |
| 2 | PK | SD/IV[a] | 7M | 15 mg/kg | 180 | 10 | 20 | 0.75 mg/mL |
| 3 | QWBA | SD/IV[a] | 3M | 15 mg/kg | 180 | 10 | 20 | 0.75 mg/mL |

TABLE 65-continued

In-Life Study Dosing Summary

| Group No. | Study | Strain/Dose route | No. of Animals, Sex | Target Dose Level (mg/kg) | Target Radioactivity Level (μCi/kg) | Target Dose Date (mL/kg/g)[b] | Target Dose Volume (mL/kg) | Target Dose Conc. (mg/mL) |
|---|---|---|---|---|---|---|---|---|
| 4 | QWBA | LE/IV[a] | 9M | 15 mg/kg | 180 | 10 | 20 | 0.75 mg/mL |
| 5 | QWBA | LE/IV[a] | 4M | 2 mg/kg | 200 | 1.33 | 2.66 | 0.75 mg/mL |
| 6 | QWBA | SD/PO | 3M | 15 mg/kg | 200 | — | 5 | 3 mg/mL |
| 7 | QWBA | LE/PO | 10M | 15 mg/kg | 200 | — | 5 | 3 mg/mL |

[a]Femoral vein-cannulated;
[b]2-h infusion time

TABLE 66

In-Life Sample Collection Summary

| Group Number | Purpose, ROA, Strain | Urine[a] | Feces[a] | Cage Residues | Carcass | Terminal Blood and Plasma |
|---|---|---|---|---|---|---|
| 1 | MB, IV, SD | Pre-dose, 0-8, 8-24, and at 24 h intervals through 168 h post-dose; N = 3 | Pre-dose, 0-24 and at 24 h intervals through 168 h post-dose; N = 3 | Daily Cage Rinse beginning at 24 h, and cage wash and wipes at termination; N = 3 | Frozen following euthanasia and retained for potential analysis | NA |
| 2 | PK, IV, SD | NA | NA | NA | NA | At 0.5, 1, 2 (end of infusion), 4, 8, 24, and 72 h; N = 1/time point |
| 3 | QWBA, IV, SD | NA | NA | NA | At 2 (end of infusion), 24, and 168 h; N = 1/time point | At 2 (end of infusion), 24, and 168 h; N = 1/time point |
| 4 | QWBA, IV, LE | NA | NA | NA | At 1, 2 (end of infusion), 4, 8, 24, 72, 96, 168 h and TBD; N = 1/time point | At 1, 2 (end of infusion), 4, 8, 24, 72, 96, 168 and 840 h; N = 1/time point |
| 5 | QWBA, IV, LE | NA | NA | NA | At 2 (end of infusion), 8, 24, and 72 h | At 2 (end of infusion), 8, 24, and 72 h |
| 6 | QWBA, PO, SD | NA | NA | NA | At 2, 24, and 168 h post-dose; N = 1/time point | At 2, 24, and 168 h post-dose; N = 1/time point |
| 7 | QWBA, PO, LE | NA | NA | NA | At 0.5, 1,2, 4, 8, 24, 72, 96, 168 h and TBD; N = 1/time point | At 0.5, 1, 2, 4, 8, 24, 72, 96, 168 and 840 h; N = 1/time point |

ROA = Route of Administration
NA = Not Applicable
TBD = To be Determined
[a]Samples collected over dry ice Dose Administration Animal body weights, which were used for determining the dosing volume, were measured before dosing on the day of dose administration. Dose assay results, animal body weights, and targeted dosing parameters were entered into the Debra LIMS and target dose volumes for each animal were determined by the Debra LIMS. Animals received a single 2-h IV infusion of [$^{14}$C]brincidofovir at a target oral dose of 15 mg/kg (Groups 1-4) or 2 mg/kg (Group 5), or an oral gavage administration of [$^{14}$C]brincidofovir at a target oral dose of 15 mg/kg (Groups 6 and 7). The actual dose administered to each rat was determined by the Debra LIMS, which used individual animal body weight data and by subtracting the weight of the emptied dose syringe/needle or needle/infusion line after dosing from the weight of the full syringe/needle or needle/infusion line prior to dosing. The mean pre-dose radioactivity concentration (dpm/g dosing solution) was multiplied by the net weight of the administered dosing solution to calculate the amount of radioactivity administered to each animal. Actual doses are presented in Table 67.

TABLE 67

Body Weights and Doses of [$^{14}$C]brincidofovir Administered to Male Sprague Dawley Rats (Groups 1, 2, 3, and 6), and Male Long-Evans Rats (Groups 4, 5, and 7)

| Animal No. | Animal Weight (g) | Amount of Formulation Administered (g) | µCi Administered | µCi/kg | mg Test Article Administered[a,b] | mg/kg Administered[a,b] |
|---|---|---|---|---|---|---|
| \multicolumn{7}{c}{Gp. 1, Mass Balance, Male SD Rat, 2-h IV, 15 mg/kg} |
| 1 | 251.2 | 5.0069 | 50.607 | 201.459 | 3.729 | 14.847 |
| 2 | 250.2 | 5.0375 | 50.916 | 203.501 | 3.752 | 14.997 |
| 3 | 261.9 | 5.2909 | 53.477 | 204.189 | 3.941 | 15.048 |
| MEAN | 254.4 | 5.1120 | 51.667 | 203.050 | 3.807 | 14.964 |
| SD | 6.5 | 0.1560 | 1.575 | 1.420 | 0.116 | 0.104 |
| \multicolumn{7}{c}{Gp. 2, PK, Male SD Rats, 2-h IV, 15 mg/kg} |
| 4c | 251.8 | 1.3636 | 13.782 | 54.736 | 1.016 | 4.034 |
| 5c | 250.0 | 2.4727 | 24.992 | 99.970 | 1.842 | 7.367 |
| 6 | 242.3 | 4.7611 | 48.122 | 198.606 | 3.546 | 14.636 |
| 7 | 249.9 | 5.1748 | 52.304 | 209.298 | 3.855 | 15.424 |
| 8 | 261.6 | 5.2120 | 52.680 | 201.375 | 3.882 | 14.840 |
| 9 | 264.6 | 5.2057 | 52.616 | 198.851 | 3.878 | 14.654 |
| 10 | 254.0 | 5.0652 | 51.196 | 201.558 | 3.773 | 14.854 |
| MEAN | 254.5 | 5.084 | 51.384 | 201.938 | 3.787 | 14.882 |
| SD | 9.0 | 0.190 | 1.918 | 4.338 | 0.142 | 0.320 |
| \multicolumn{7}{c}{Gp. 3, QWBA, Male SD Rat, 2-h IV, 15 mg/kg} |
| 11 | 247.3 | 4.9350 | 49.880 | 201.698 | 3.676 | 14.864 |
| 12 | 256.6 | 5.0999 | 51.547 | 200.883 | 3.799 | 14.804 |
| 13 | 248.4 | 4.8006 | 48.521 | 195.336 | 3.576 | 14.395 |
| MEAN | 250.8 | 4.945 | 49.983 | 199.306 | 3.684 | 14.688 |
| SD | 5.1 | 0.150 | 1.516 | 3.462 | 0.112 | 0.255 |
| \multicolumn{7}{c}{Gp. 4, QWBA, Male LE Rats, 2-h IV 15 mg/kg} |
| 14c | 240.5 | 2.3933 | 24.190 | 100.582 | 1.783 | 7.412 |
| 15 | 232.1 | 4.5816 | 46.308 | 199.517 | 3.413 | 14.703 |
| 16 | 234.9 | 4.6662 | 47.163 | 200.779 | 3.476 | 14.796 |
| 17 | 236.8 | 4.7293 | 47.801 | 201.861 | 3.523 | 14.876 |
| 18 | 214.4 | 4.2683 | 43.141 | 201.219 | 3.179 | 14.829 |
| 19 | 247.3 | 4.9154 | 49.682 | 200.897 | 3.661 | 14.805 |
| 20 | 237.9 | 4.7154 | 47.660 | 200.337 | 3.512 | 14.764 |
| 21 | 242.6 | 4.7892 | 48.406 | 199.531 | 3.567 | 14.705 |
| 22 | 235.0 | 4.5292 | 45.778 | 194.801 | 3.374 | 14.356 |
| MEAN | 235.1 | 4.649 | 46.992 | 199.868[d] | 3.463 | 14.729 |
| SD | 9.7 | 0.195 | 1.969 | 2.198 | 0.145 | 0.162 |
| \multicolumn{7}{c}{Gp. 5, QWBA, Male LE Rat, 2-h IV 2 mg/kg} |
| 23 | 231.9 | 0.6395 | 52.998 | 228.538 | 0.495 | 2.133 |
| 24 | 244.6 | 0.6611 | 54.788 | 223.990 | 0.511 | 2.090 |
| 25 | 231.8 | 0.6303 | 52.235 | 225.347 | 0.487 | 2.103 |
| 26 | 243.5 | 0.7172 | 59.437 | 244.095 | 0.555 | 2.278 |
| MEAN | 238.0 | 0.662 | 54.865 | 230.493 | 0.512 | 2.151 |
| SD | 7.1 | 0.039 | 3.231 | 9.267 | 0.030 | 0.087 |
| \multicolumn{7}{c}{Gp. 6, QWBA, Male SD Rats, PO, 15 mg/kg} |
| 27 | 250.7 | 1.2270 | 51.798 | 206.613 | 3.630 | 14.480 |
| 28 | 231.2 | 1.1460 | 48.379 | 209.250 | 3.390 | 14.665 |
| 29 | 254.8 | 1.3077 | 55.205 | 216.659 | 3.869 | 15.184 |
| MEAN | 245.6 | 1.227 | 51.794 | 210.841 | 3.630 | 14.776 |
| SD | 12.6 | 0.081 | 3.413 | 5.208 | 0.240 | 0.365 |
| \multicolumn{7}{c}{Gp. 7, QWBA, Male LE Rats, PO, 15 mg/kg} |
| 30 | 229.4 | 1.1586 | 48.910 | 213.210 | 3.428 | 14.942 |
| 31 | 236.1 | 1.1913 | 50.291 | 213.007 | 3.525 | 14.928 |
| 32 | 254.6 | 1.2685 | 53.550 | 210.330 | 3.753 | 14.740 |
| 33 | 234.1 | 1.1959 | 50.485 | 215.656 | 3.538 | 15.114 |
| 34 | 223.1 | 1.1223 | 47.378 | 212.362 | 3.320 | 14.883 |
| 35 | 246.6 | 1.1773 | 49.700 | 201.541 | 3.483 | 14.124 |
| 36 | 231.3 | 1.1473 | 48.433 | 209.397 | 3.394 | 14.675 |
| 37 | 257.7 | 1.2626 | 53.301 | 206.833 | 3.735 | 14.495 |
| 38 | 234.7 | 1.2077 | 50.983 | 217.227 | 3.573 | 15.224 |

TABLE 67-continued

Body Weights and Doses of [$^{14}$C]brincidofovir Administered to Male Sprague Dawley Rats (Groups 1, 2, 3, and 6), and Male Long-Evans Rats (Groups 4, 5, and 7)

| Animal No. | Animal Weight (g) | Amount of Formulation Administered (g) | µCi Administered | µCi/kg | mg Test Article Administered[a,b] | mg/kg Administered[a,b] |
|---|---|---|---|---|---|---|
| 39 | 238.5 | 1.2192 | 51.469 | 215.802 | 3.607 | 15.124 |
| MEAN | 238.6 | 1.195 | 50.450 | 211.537 | 3.536 | 14.825 |
| SD | 11.1 | 0.047 | 1.987 | 4.729 | 0.139 | 0.332 |

[a]Specific activity of the oral (PO) formulation was 14.2689 µCi/mg [$^{14}$C]brincidofovir. Dose preparation activity of the PO formulation was 42.2151 µCi/g
[b]Specific activity of the intravenous (IV) infusion formulations were 13.5694 (at 15 mg/kg) and 101.5100 (at 2 mg/kg) µCi/mg [$^{14}$C]brincidofovir. Dose preparation activity of the IV formulations were 10.1074 µCi/g (at 15 mg/kg) and 82.8740 µCi/g (at 2 mg/kg)
[c]Animal terminated during IV infusion for sample collection. These animals were omitted from the mean dose calculations.
[d]The mean for all animals dosed in Group 4, 188.836 µCi/kg was used for dosimetry estimate.
Note:
SD = Standard deviation; MB = Mass Balance; PK = pharmacokinetics; QWBA = Quantitative Whole-Body Autoradiography Sample Collection Urine, feces, blood/plasma, cage residue samples, and carcasses were collected during this study as described below for each group Excreta Collection (Group 1)

Three male albino rats were assigned to Group 1 (IV infusion) for excreta collection.

Urine samples were collected from each animal into pre-labeled urine collection tubes at pre-dose (overnight) and at intervals of 0-8 h, 8-24 h, and at every subsequent 24 h interval until 168 h post-dose. All urine specimens were collected over dry ice. The total weight of each urine collection was documented, and the samples were stored frozen at approximately −70° C. until LSC analysis. Samples were maintained at approximately −70° C. following analysis, and were saved for further analysis, to be conducted under a separate protocol.

Feces samples were collected from each animal into a pre-labeled feces collection tube at pre-dose (overnight) and at 24 h intervals post-dose until 168 h post-dose. Feces specimens were collected over dry ice and the total weight of each feces sample was documented. Feces samples were stored at approximately −70° C. until homogenization and LSC analysis, were maintained at approximately −70° C. following analysis, and were saved for further analysis, to be conducted under a separate protocol.

Cage residue specimens were collected. Cages were rinsed with approximately 30 mL of deionized water following each daily post-dose excreta collection beginning at 24 h post-dose. The interior surfaces of the metabolism cage were sprayed with approximately 90 mL of Windex solution (or equivalent detergent solution) and wiped with gauze pads following the final excreta collection. Cage rinse and cage wash specimens were collected into tared and pre-labeled containers. The total weight of each cage rinse and wash were documented. Cage rinse, cage wash, and cage wipe collections were stored at approximately −20° C. Carcasses of animals in Groups 1 and 2 were retained at approximately −20° C. Carcasses and cage residues were not analyzed because the recovery of radioactivity in excreta was >90%.

Plasma Pharmacokinetic Sample Collection (Group 2)

Blood was collected from each animal in Group 2 (IV infusion) for plasma and blood analysis at the times listed below.

Terminal blood samples were collected by cardiac puncture into pre-labeled blood collection tubes that contained K$_2$EDTA as an anticoagulant. A terminal sample (N=1 per time point) was collected at 0.5, 1, 2, 4, 8, 24, and 72 h after initiation of infusion and the volume was not limited. Triplicate weighed aliquots of blood (~0.100 g) were removed and analyzed for total radioactivity using combustion followed by LSC. Blood aliquots were maintained at approximately 4° C. until analysis. The remaining blood samples were maintained on wet ice (approximately 4° C.) and then centrifuged to obtain plasma within 1 h of the blood collection time. Centrifuge settings were recorded in the study notebook. Duplicate aliquots of plasma (0.050 mL) were analyzed for radioactivity using direct counting by LSC, and residual plasma was stored at approximately −70° C. and was saved for possible future analysis under a separate study protocol. Residual red blood cells and the animal carcasses of Group 2 rats were discarded as radioactive waste.

QWBA (Groups 3-7)

Each animal, at their respective termination time points, was euthanized for QWBA analysis immediately after blood collection. One rat per time point per Group was euthanized as listed below.

Group 3 (IV)—2 (end of infusion), 24, and 168 h

Group 4 (IV)—1, 2 (end of infusion), 4, 8, 24, 72, 96, 168, and 840 h

Group 5 (IV)—2 (end of infusion), 8, 24, and 72 h

Group 6 (PO)—2, 24, and 168 h

Group 7 (PO)—0.5, 1, 2, 4, 8, 24, 72, 96, 168, and 840 h

Each rat was deeply anesthetized via isoflurane anesthesia, a blood sample was collected by cardiocentesis (approximately 2 mL) into tubes that contained K$_2$EDTA as the anticoagulant, and the rat was euthanized by being frozen in a hexane/solid carbon dioxide bath for at least 15 min. The blood samples were maintained on wet ice (approximately 4° C.) and then centrifuged to obtain plasma within 1 h of the blood collection time. Centrifuge settings were recorded in the study notebook. Duplicate aliquots of plasma (0.050 mL) were analyzed for radioactivity using direct counting by LSC, and residual plasma was stored at approximately −70° C. and was saved for possible future analysis under a separate study protocol. Residual red blood cells were discarded as radioactive waste.

Sample Storage Conditions

Carcass and cage residue samples were stored frozen at −20° C. until sample analysis, and residual plasma and excreta were stored frozen at −70° C.

Sample Analysis
LSC Analysis of Blood, Plasma, and Excreta

Feces were homogenized and analyzed for total radioactivity content. Weighed feces specimens for each rat were homogenized in approximately 3 volumes of water (approximately 3× the weight of the feces specimen). The total weight of each homogenate was determined and triplicate weighed aliquots (~0.5 g) were combusted in a Packard Sample Oxidizer, followed by LSC analysis. The actual weights of the individual aliquots and the amount of solvent used in homogenization were recorded. Pre-weighed portions of each feces homogenate were placed into a Combusto-Cone® that contained a Combusto-Pad®, allowed to dry over-night in a fume hood, and were burned completely in the sample oxidizer.

Triplicate weighed aliquots (~0.100 g) of blood aliquots (Group 2 only) were combusted in the Packard Sample Oxidizer, followed by LSC analysis.

The $^{14}CO_2$ liberated in combustion was trapped in a solution of Carbo-Sorb®, Permafluor® (scintillation fluid) was added, and the radioactivity was determined by LSC. Blank cones that contained a known amount of radioactivity (0.100 mL Spec-Chec®) were oxidized and compared to non-combusted standards to determine the percent recovery from the combustion process. These controls were analyzed in triplicate, and quantitative recovery of $^{14}C$ from these control samples was determined on each day of sample combustion. Blank cones (without added radioactivity) were burned to evaluate the radioactivity carryover between samples.

Fecal homogenates were maintained at approximately −70° C. after analysis and were saved for further analysis under a separate study protocol.

Urine (0.300 mL), and plasma (0.050 mL) specimens were thawed, if necessary, then aliquoted in duplicate by volume and analyzed by LSC. Volumes or weights of sample aliquots were documented in the study records. Ultima Gold scintillation fluid (5 mL, PerkinElmer) was added to each urine, and plasma aliquot, aliquot were mixed thoroughly, and then analyzed by LSC for radioactivity.

The radioactivity (counts per minute) in each sample was converted to disintegrations per minute (dpm) by means of an external standardization and a quench curve. Radioactivity content was quantified by a Model 2800TR or Model 2900TR Liquid Scintillation Analyzer (PerkinElmer). All samples were counted for at least 5 minutes or at least 100,000 counts per minute (cpm). LSC results for duplicate samples that differed by more than 10% from the mean value, were re-aliquoted and re-analyzed, if sufficient volume was available. If the LSC results for triplicate samples had a % CV that was >10%, then the sample was re-homogenized and re-analyzed, if sufficient volume was available. These specifications were applied to all sample aliquots that had an average radioactivity greater than 500 dpm, and values that were under 500 dpm were accepted as is. A lower limit of quantification (LLOQ) was applied to the data equal to 2 times the counts per minute (CPM) value of a background sample.

QWBA

The pinna, distal limbs, hair, and tail were removed from each frozen carcass and each frozen carcass was embedded in an aqueous suspension of approximately 2% (w/v) carboxymethylcellulose and frozen into a block. The blocks were stored at approximately −20° C. prior to sectioning. Each blocked carcass was mounted on the object stage of a cryomicrotome (Leica CM3600 Cryomacrocut, Nussloch, Germany and Vibratome 9800, St. Louis, MO) maintained at approximately −20° C. and internal standards (3), which were plasma fortified with [$^{14}C$]-glucose at one concentration (approximately 0.05 µCi/mL), were placed into the frozen blocks, prior to sectioning, and were used for section thickness quality control. A number of whole-body sections (approximately 40 µm thick) were taken in the sagittal plane at various levels of interest using a whole-body cryomicrotome set at −20° C. Sagittal sections (20-50 µm thick) of frozen carcasses were exposed to phosphor imaging plates. Regions of images in tissues were converted to concentrations using standards. All of the major tissues, organs, and biological fluids were represented. The sections were collected on adhesive tape (Scotch 8210, 3M Corp., USA) and dehydrated in the cryomicrotome for at least 48 h prior to removal for mounting and exposure.

Tissue concentration data was determined for the following tissues and/or contents: adipose (brown and white), adrenal gland, bile (in duct), blood (cardiac), bone, bone marrow, brain (cerebrum, cerebellum, medulla), cecum (and contents), large intestine (and contents), epididymis, esophagus, eye (uvea and lens), Harderian gland, heart, kidney (cortex and medulla), liver, lung, lymph node, pancreas, pituitary gland, prostate gland, salivary gland, seminal vesicles, skeletal muscle, skin (pigmented and non-pigmented), small intestine (and contents), stomach (gastric mucosa and contents), spleen, spinal cord, testis, thymus, thyroid, and urinary bladder (and contents).

A set of whole-body sections for each rat was mounted on a cardboard backing, covered with a thin plastic wrap, and exposed along with calibration standards, which were $^{14}C$-glucose mixed with blood at 10 different concentrations (0.0009595 to 7.806 µCi/g), to a $^{14}C$-sensitive phosphor imaging plate (Fuji Biomedical, Stamford, CT). The imaging plate and sections were placed in light-tight exposure cassettes, in a copper-lined lead safe, for a 4-day exposure at room temperature. The imaging plate was scanned using the Typhoon 9410 image acquisition system (GE/Molecular Dynamics, Sunnyvale, CA, USA) and the resultant image stored on a dedicated QPS computer server. Quantification was performed by image densitometry using MCD image analysis software (v. 7.0, Interfocus Imaging Ltd) and a standard curve constructed from the integrated response [i.e., Molecular Dynamics Counts per square millimeter ($MDC/mm^2$)] and the nominal concentrations of the $^{14}C$-calibration standards. The concentrations of radioactivity were expressed as the µg equivalents of [$^{14}C$]brincidofovir per gram sample (µg equiv/g). A lower limit of quantification (LLOQ) was applied to the data (See section 6.7.4).

Tissue concentrations that fell below the LLOQ were identified as being below the quantification limit (BQL). Tissue areas that were not visualized on autoradiographic images were identified as no sample (NS) and reported as BQL. If no tissues were visualized on the autoradiograph(s) for an animal, then no calibration curves were generated and all tissue concentrations for that animal were reported as BQL.

The results are based on original, electronic, digital images that were selected from a complete set of autoradiographs.

Animal Observations

No observable abnormalities were observed in the rats on this study.

Group 1—Mass Balance in Rats after a 2-H Intravenous Infusion

A summary of the individual animal and mean excretion data for total radioactivity in Group 1 male SD rats is presented in Table 68.

TABLE 68

Excretion of Total Radioactivity Following an 2-Hour Intravenous Infusion of [$^{14}$C]brincidofovir to Male Sprague Dawley Rats at a Target Dose of 15 mg/kg (Group 1)

| | | Percent Recovery (% Dose) | | | |
|---|---|---|---|---|---|
| | | Rat Numbers | | | |
| Sample | Time Point | 01 | 02 | 03 | Mean | SD |
| Urine | Pre-dose | 0.0 | 0.0 | 0.0 | 0.0 | 0.0 |
| | 0-8 h | 33.0 | 29.3 | 30.7 | 31.0 | 1.9 |
| | 8-24 h | 10.7 | 11.5 | 16.2 | 12.8 | 3.0 |
| | 24-48 h | 4.3 | 3.6 | 4.5 | 4.1 | 0.5 |
| | 48-72 h | 1.6 | 1.6 | 1.9 | 1.7 | 0.2 |
| | 72-96 h | 0.8 | 0.8 | 0.8 | 0.8 | 0.0 |
| | 96-120 h | 0.4 | 0.3 | 0.5 | 0.4 | 0.1 |
| | 120-144 h | 0.2 | 0.2 | 0.3 | 0.2 | 0.0 |
| | 144-168 h | 0.2 | 0.1 | 0.2 | 0.2 | 0.0 |
| | Subtotal | 51.2 | 47.5 | 55.1 | 51.2 | 3.8 |
| Feces | Pre-dose | 0.0 | 0.0 | 0.0 | 0.0 | 0.0 |
| | 0-24 h | 37.3 | 37.6 | 35.1 | 36.7 | 1.4 |
| | 24-48 h | 3.4 | 4.6 | 3.5 | 3.8 | 0.7 |
| | 48-72 h | 0.9 | 1.0 | 0.8 | 0.9 | 0.1 |
| | 72-96 h | 0.4 | 0.4 | 0.4 | 0.4 | 0.0 |
| | 96-120 h | 0.2 | 0.2 | 0.2 | 0.2 | 0.0 |
| | 120-144 h | 0.1 | 0.1 | 0.1 | 0.1 | 0.0 |
| | 144-168 h | 0.1 | 0.1 | 0.1 | 0.1 | 0.0 |
| | Subtotal | 42.4 | 44.2 | 40.2 | 42.2 | 2.0 |
| | Total | 93.6 | 91.6 | 95.2 | 93.5 | 1.8 |

SD = Standard deviation;

The primary route of elimination of radioactivity after a 2-h IV infusion administration of 15 mg/kg [$^{14}$C]brincidofovir to male rats was in the urine, which accounted for an average of 51.2% of the administered dose over a 168 h period. An average of 42.2% of the administered dose was recovered in feces. The total recovery of radioactivity in urine and feces combined in Group 1 male rats averaged 93.5% of the dose over the 168 h collection period. Most of the urinary excretion (43.8% of the dose or 86% of the radioactivity of the radioactivity excreted in the urine) and fecal excretion (36.7% of the dose or 87% of the radioactivity excreted in the feces) of radioactivity occurred in the first 24 h after dosing.

Group 2—Plasma Pharmacokinetics in Rats after IV Administration of 15 mg/kg

The plasma total radioactivity concentration versus time data, PK parameters, and blood to plasma ratios for Group 2 male SD rats are reported in Table 69.

TABLE 69

Blood and Plasma Concentration and Pharmacokinetic Parameters of Male Sprague Dawley Rats After a Single 2-Hour Intravenous Infusion of 15 mg/kg of [$^{14}$C]brincidofovir (Group 2)

| Time Point (h) | Plasma Concentration (μg/mL) | Blood Concentration (μg equiv/mL) | Blood to Plasma Ratio |
|---|---|---|---|
| 0.5 | 2.557 | 1.666 | 0.65 |
| 1 | 4.609 | 3.017 | 0.65 |
| 2 | 10.297 | 6.393 | 0.62 |
| 4 | 5.363 | 3.845 | 0.72 |
| 8 | 1.961 | 1.584 | 0.81 |
| 24 | 0.234 | 0.294 | 1.26 |
| 72 | 0.045 | 0.057 | 1.27 |
| $t_{1/2}$ (h) | 13.0 | 14.5 | |
| $T_{max}$ (h) | 2 | 2 | |
| $C_{max}$ (μg equiv/mL) | 10.297 | 6.393 | |
| AUC$_{last}$ (μg equiv-h/mL) | 64.448 | 50.836 | |
| AU$_{Call}$ (μg equiv-h/mL) | 64.448 | 50.836 | |
| AUC$_{inf\_obs}$ (μg equiv-h/mL) | 65.292 | 52.028 | |

The $C_{max}$ of [$^{14}$C]brincidofovir total radioactivity in plasma after a 2-h IV infusion administration to male rats at 15 mg/kg was 10.3 μg equiv/mL at a $T_{max}$ of 2 h (i.e., end of infusion), and the concentration decreased to 0.045 μg equiv/mL at 72 h post-dose. The AUC$_{last}$ of [$^{14}$C]brincidofovir in plasma was 64.4 μg equiv·h/mL, and the $t_{1/2}$ was 13.0 h.

Blood to plasma ratios for Group 2 SD rats showed that [$^{14}$C]brincidofovir-derived radioactivity initially partitioned preferentially into plasma versus the cellular portion of blood of rats at 0.5 to 8 h (ranged between 0.62-0.8 l), but then showed more partitioning into the cellular aspects at 24 and 72 h post-dose with a ratios of 1.26 and 1.27, respectively.

Groups 3-7—Comparison of Blood to Plasma Concentration Ratios in Albino and Pigmented Rats after IV and PO Administration of 15 mg/kg (IV and PO) and 2 mg/kg (IV)

The blood to plasma concentration ratios for Group 3 to Group 7 male SD and LE rats are reported in Table 70. A comparison of blood and plasma concentration versus time profiles obtained from Groups 3-7 is presented in FIG. 3.

TABLE 70

Blood to Plasma Ratios in Male Rats After a Single 2-Hour Intravenous Infusion or Oral Gavage Administration of [$^{14}$C]brincidofovir (Groups 3-7)

| | | | Blood:Plasma Ratio | | | | | |
|---|---|---|---|---|---|---|---|---|
| Group/ | Dose | Dose | Time After Dose Initiation (h) | | | | | |
| Strain | Route | (mg/kg) | 0.5 | 1 | 2 | 4 | 8 | 24 | 72 |
| 3/SD | IV | 15 | NS | NS | 0.96 | NS | NS | 1.23 | NS |
| 4/LE | IV | 15 | NS | 1.10 | 1.08 | 0.92 | 1.39 | 1.46 | 3.06 |
| 5/LE | IV | 2 | NS | NS | 0.89 | NS | 1.03 | 1.41 | 1.25 |
| 6/SD | PO | 15 | NS | NS | 0.64 | NS | NS | 0.78 | NS |
| 7/LE | PO | 15 | ND | 1.13 | 0.98 | 0.80 | 0.76 | 0.87 | ND |

ND = not determined, blood and/or plasma BQL
NS = no sample collected at this time point Similar to Group 2, trends for higher blood:plasma ratios at later time-points were observed in other groups of animals administered IV [$^{14}$C]brincidofovir (SD rats, Group 3; LE rats, Groups 4 and 5), though ratios at early (sparse) time-points were approximately unity. Following oral administration of [$^{14}$C]brincidofovir, blood:plasma ratios ranged between 0.64-1.13, and no trends for higher blood:plasma ratios at later time-points (up to 24 h after dosing) were observed.

Group 3 and 4—QWBA Tissue Distribution in Albino and Pigmented Male Rats after IV Administration of 15 mg/kg A summary of tissue distribution of [$^{14}$C]brincidofovir in male albino (Group 3; n=3) and pigmented rats (Group 4; n=9) are presented in Table 71 and Table 72, respectively.

TABLE 71

Concentrations of Radioactivity in Tissues of Male Sprague Dawley (Albino, Group 3) Rats After a Single 2-Hour Intravenous Infusion of [$^{14}$C]brincidofovir at a Target Dose of 15 mg/kg

| Tissue Type | Tissue | Rat# 11 2 h | Rat# 12 24 h | Rat# 13 168 h |
|---|---|---|---|---|
| Vascular/ | Plasma (by LSC) | 7.130 | 0.251 | BQL |
| Lymphatic | Blood (cardiac) | 6.865 | 0.308 | BQL |
| | Bone Marrow | 3.411 | 1.219 | 0.196 |
| | Lymph Node | 4.055 | 1.004 | 0.247 |
| | Spleen | 4.536 | 2.244 | 0.694 |
| | Thymus | 2.373 | 0.556 | 0.105 |
| Excretory/ | Bile (in duct) | NI | 1.469 | 0.058 |
| Metabolic | Kidney Cortex | 106.513 | 32.109 | 0.474 |
| | Kidney Medulla | 33.444 | 4.271 | 0.186 |
| | Liver | 229.371 | 13.907 | 0.453 |
| | Urinary Bladder | 35.978 | 2.264 | 0.132 |
| | Urinary Bladder (contents) | 47.034 | 21.237 | 0.121 |
| Central | Brain (cerebellum) | 0.907 | 0.161 | BQL |
| Nervous | Brain (cerebrum) | 0.803 | 0.107 | BQL |
| System | Brain (medulla) | 0.864 | 0.132 | BQL |
| | Spinal Cord | 0.437 | 0.079 | BQL |
| Endocrine | Adrenal Gland | 4.308 | 1.680 | 0.647 |
| | Pituitary Gland | 2.793 | 1.021 | 0.257 |
| | Thyroid | 2.751 | 0.791 | 0.239 |
| Secretory | Harderian Gland | 2.081 | 1.278 | 0.954 |
| | Pancreas | 1.974 | 0.557 | BQL |
| | Salivary Gland | 2.049 | 0.395 | 0.047 |
| Fatty | Adipose (brown) | 2.088 | 0.473 | 0.391 |
| | Adipose (white) | 0.386 | 0.135 | BQL |
| Dermal | Skin (non-pigmented) | 2.277 | 0.602 | 0.121 |
| Reproductive | Epididymis | 2.391 | 0.566 | 0.234 |
| | Prostate Gland | 2.033 | 0.254 | 0.051 |
| | Seminal Vesicles | 1.809 | 1.636 | 0.817 |
| | Testis | 1.647 | 0.436 | 0.078 |
| Skeletal/ | Bone | 0.449 | 0.095 | BQL |
| Muscular | Heart | 2.540 | 0.408 | 0.057 |
| | Skeletal Muscle | 0.868 | 0.099 | BQL |
| Respiratory | Lung | 5.675 | 1.128 | 0.296 |
| Alimentary | Cecum | 3.658 | 5.981 | 0.099 |
| Canal | Cecum (contents) | 0.085 | 58.016 | 0.196 |
| | Esophagus | 3.567 | 0.572 | 0.043 |
| | Large Intestine | 3.581 | 2.019 | 0.129 |
| | Large Intestine (contents) | BQL | 35.809 | 0.374 |
| | Small Intestine | 43.741 | 6.290 | 1.704 |
| | Small Intestine (contents) | 95.869 | 66.664 | 0.039 |
| | Stomach (gastric mucosa) | 3.777 | 1.333 | 0.062 |
| | Stomach (contents) | 3.827 | 26.408 | 0.051 |
| Ocular | Eye (lens) | BQL | BQL | BQL |
| | Eye (uveal tract) | 2.342 | 0.469 | 0.095 |

BQL = Value is below the LLOQ; NI = Not identified on acceptable sections.
LLOQ = 0.00048400 μCi/g/0.0135694 μCi/μg = 0.036 μg equivalent/g tissue
ULOQ = 20.97300000 μCi/g/0.0135694 μCi/μg = 1545.610 μg equivalent/g tissue

TABLE 72

Concentrations of Radioactivity in Tissues of Male Long-Evans (Pigmented, Group 4) Rats After a Single 2-Hour Intravenous Infusion of [$^{14}$C]brincidofovir at a Target Dose of 15 mg/kg

| Tissue Type | Tissue | Rat #14 1 h | Rat #15 2 h | Rat #16 4 h | Rat #17 8 h | Rat #18 24 h | Rat #19 72 h | Rat #20 96 h | Rat #21 168 h | Rat #22 840 h |
|---|---|---|---|---|---|---|---|---|---|---|
| Vascular/ | Plasma (by LSCa) | 2.754 | 4.918 | 3.080 | 1.207 | 0.154 | 0.017 | BQL | BQL | BQL |
| Lymphatic | Blood (cardiac) | 3.040 | 5.291 | 2.839 | 1.679 | 0.225 | 0.052 | BQL | BQL | BQL |
| | Bone Marrow | 1.464 | 3.348 | 2.550 | 2.045 | 0.898 | 0.552 | 0.280 | 0.232 | 0.043 |
| | Lymph Node | 1.682 | 4.002 | 2.244 | 1.936 | 0.745 | 0.710 | 0.270 | 0.247 | 0.062 |
| | Spleen | 2.081 | 4.314 | 3.249 | 2.728 | 1.870 | 1.675 | 1.106 | 0.892 | 0.273 |
| | Thymus | 1.223 | 2.125 | 1.205 | 1.107 | 0.403 | 0.359 | 0.215 | 0.100 | BQL |
| Excretory/ | Bile (in duct) | 243.705 | 508.358 | 178.597 | BQL | 1.010 | 0.526 | 0.044 | BQL | BQL |
| Metabolic | Kidney Cortex | 36.713 | 97.276 | 76.678 | 56.528 | 19.453 | 4.070 | 1.041 | 0.330 | BQL |
| | Kidney Medulla | 8.092 | 26.987 | 25.330 | 22.989 | 7.117 | 1.478 | 0.648 | 0.138 | BQL |
| | Liver | 126.516 | 229.669 | 118.543 | 53.166 | 13.918 | 3.261 | 1.269 | 0.451 | BQL |
| | Urinary Bladder | 6.053 | 5.004 | 22.781 | 5.643 | 1.885 | 0.336 | 0.100 | BQL | BQL |
| | Urinary Bladder (contents) | 19.057 | 26.805 | 814.445 | 82.440 | 22.258 | 1.911 | 0.357 | 0.104 | BQL |
| Central | Brain (cerebellum) | 0.569 | 1.144 | 0.422 | 0.284 | 0.099 | 0.073 | BQL | BQL | BQL |
| Nervous | Brain (cerebrum) | 0.391 | 0.887 | 0.341 | 0.196 | 0.070 | 0.062 | BQL | BQL | BQL |
| System | Brain (medulla) | 0.498 | 0.858 | 0.376 | 0.199 | 0.085 | 0.059 | BQL | BQL | BQL |
| | Spinal Cord | 0.462 | 0.940 | 0.277 | 0.116 | 0.060 | BQL | BQL | BQL | BQL |
| Endocrine | Adrenal Gland | 2.523 | 4.802 | 3.282 | 3.179 | 1.253 | 1.186 | 0.776 | 0.490 | 0.091 |
| | Pituitary Gland | 2.397 | 6.343 | 4.081 | 1.089 | 0.431 | 0.603 | 0.297 | 0.189 | BQL |
| | Thyroid | 1.486 | 2.454 | 1.884 | 1.532 | 0.567 | 0.376 | 0.197 | 0.459 | BQL |
| Secretory | Harderian Gland | 0.897 | 2.049 | 1.476 | 1.284 | 0.665 | 1.098 | 0.536 | 0.403 | BQL |
| | Pancreas | 0.864 | 1.896 | 1.051 | 0.834 | 0.315 | 0.194 | 0.082 | BQL | BQL |
| | Salivary Gland | 1.335 | 2.508 | 1.153 | 0.821 | 0.314 | 0.190 | 0.134 | 0.056 | BQL |
| Fatty | Adipose (brown) | 0.839 | 1.680 | 1.123 | 0.755 | 0.306 | 0.402 | 0.187 | 0.132 | BQL |
| | Adipose (white) | 0.369 | 0.365 | 0.317 | 0.124 | 0.058 | 0.062 | BQL | BQL | BQL |
| Dermal | Skin (non-pigmented) | 0.979 | 2.556 | 1.925 | 1.273 | 0.312 | 0.443 | 0.269 | 0.226 | BQL |
| | Skin (pigmented) | 1.193 | 2.848 | 2.118 | 1.233 | 0.491 | 0.337 | 0.209 | 0.090 | BQL |
| Reproductive | Epididymis | 0.828 | 1.654 | 1.795 | 0.821 | 0.362 | 0.243 | 0.204 | 0.129 | BQL |
| | Prostate Gland | 0.561 | 0.901 | 0.715 | 0.542 | 0.157 | 0.104 | 0.127 | BQL | BQL |
| | Seminal Vesicles | 0.938 | 1.834 | 2.285 | 1.717 | 1.127 | 1.374 | 1.038 | 0.361 | BQL |
| | Testis | 0.595 | 1.321 | 1.021 | 0.802 | 0.285 | 0.240 | 0.196 | 0.098 | BQL |

TABLE 72-continued

Concentrations of Radioactivity in Tissues of Male Long-Evans (Pigmented, Group 4) Rats After a Single 2-Hour Intravenous Infusion of [$^{14}$C]brincidofovir at a Target Dose of 15 mg/kg

| Tissue Type | Tissue | Concentration (μg equiv/g tissue) | | | | | | | | |
|---|---|---|---|---|---|---|---|---|---|---|
| | | Rat #14 1 h | Rat #15 2 h | Rat #16 4 h | Rat #17 8 h | Rat #18 24 h | Rat #19 72 h | Rat #20 96 h | Rat #21 168 h | Rat #22 840 h |
| Skeletal/ | Bone | 0.130 | 0.257 | 0.183 | 0.190 | BQL | 0.036 | 0.040 | BQL | BQL |
| Muscular | Heart | 1.190 | 2.401 | 0.997 | 0.815 | 0.226 | 0.173 | 0.118 | 0.062 | BQL |
| | Skeletal Muscle | 0.427 | 0.611 | 0.343 | 0.152 | 0.063 | 0.070 | 0.040 | BQL | BQL |
| Respiratory | Lung | 3.063 | 6.350 | 3.690 | 2.233 | 0.585 | 0.886 | 0.362 | 0.178 | BQL |
| Alimentary | Cecum | 1.781 | 3.052 | 2.443 | 6.189 | 7.077 | 0.527 | 0.208 | 0.080 | BQL |
| Canal | Cecum (contents) | 0.099 | 1.065 | 42.166 | 175.858 | 30.022 | 1.987 | 0.159 | 0.123 | BQL |
| | Esophagus | 1.750 | 2.456 | 1.803 | 1.747 | 0.377 | 0.357 | 0.098 | 0.041 | BQL |
| | Large Intestine | 1.455 | 5.497 | 2.338 | 3.071 | 3.064 | 0.993 | 0.545 | 0.278 | BQL |
| | Large Intestine (contents) | BQL | 2.223 | 137.870 | 235.751 | 48.798 | 3.347 | 0.273 | 0.103 | BQL |
| | Small Intestine | 6.622 | 71.029 | 42.479 | 48.384 | 3.184 | 4.569 | 0.911 | 0.339 | BQL |
| | Small Intestine (contents) | 50.503 | 422.957 | 55.541 | 22.421 | 0.962 | 0.615 | 0.120 | BQL | BQL |
| | Stomach (gastric mucosa) | 1.446 | 2.518 | 1.430 | 1.223 | 0.295 | 0.225 | 0.110 | 0.069 | BQL |
| | Stomach (contents) | 1.125 | 6.178 | 0.960 | 10.997 | 0.170 | 0.080 | BQL | BQL | BQL |
| Ocular | Eye (lens) | 0.039 | 0.077 | BQL | BQL | BQL | BQL | BQL | BQL | BQL |
| | Eye (uveal tract) | 0.875 | 1.411 | 1.412 | 0.925 | 0.452 | 0.322 | 0.188 | BQL | BQL |

Group 3—QWBA Tissue Distribution in Albino Male Rats (Sparse Sampling)

[$^{14}$C]Brincidofovir-derived radioactivity was well distributed into most tissues of albino male rats after a 2-h IV infusion at 15 mg/kg (n=1 animal at 2, 24, and 168 h after initiation of dosing), and most tissues had concentrations that were slightly lower than in blood/plasma at the end of the infusion, but were higher than blood/plasma for later time points. Excretory and alimentary canal tissue concentrations were much higher than blood/plasma at all time points. The highest observed concentration of [$^{14}$C]brincidofovir-derived radioactivity in blood was 6.9 μg equiv/g, which was observed at 2 h (end of infusion time and the first collection time point for this sparsely-sampled group). The $C_{max}$ of [$^{14}$C]brincidofovir-derived radioactivity in most tissues (35 of 37 tissues) were found at 2 h post-dose (first sampled time point) when most of the tissues had concentrations that were between 1.0 and 6.0 μg equiv/g.

The tissues with the highest concentrations (>20.0 μg equiv/g) at the respective $T_{max}$ were: liver (229.4 μg equiv/g), kidney cortex (106.5 μg equiv/g), small intestine (43.7 μg equiv/g), urinary bladder (36.0 μg equiv/g), and kidney medulla (33.4 μg equiv/g). The tissues with the lowest concentrations (<1.0 μg equiv/g) at their respective $T_{max}$ were: brain, spinal cord, white adipose, bone, skeletal muscle, and eye lens.

The highest overall concentrations determined by QWBA were observed in the contents of the alimentary canal ($C_{max}$ ranged from 26.4 μg equiv/g in stomach at 24 h to 95.9 μg equiv/g in small intestine at 2 h), and urinary bladder contents (47.0 μg equiv/g at 2 h), which reflected the routes of elimination for the [$^{14}$C]brincidofovir-drug-derived radioactivity after a 2-h IV infusion.

At 168 h post-dose, elimination of drug related material was not complete in most tissues; however those tissues that did contain radioactivity had concentrations that were <1.0 μg equiv/g.

Group 4—QWBA Tissue Distribution in Pigmented Male Rats

[$^{14}$C]Brincidofovir-derived radioactivity was well distributed into most tissues of pigmented male rats after a 2-h IV infusion at 15 mg/kg (n=1 animal at 1, 2, 4, 8, 24, 72, 96, 168 and 840 h) after initiation of dosing, and most tissues had concentrations that were slightly lower than in blood/plasma at early time-points (up to 4 hours after infusion initiation), but were higher than blood/plasma for later time-points. Tissue:plasma (T/P) ratios based on AUC ($AUC_{tissue}$: $AUC_{plasma}$; Table 78) show values>1 for most tissues, indicating higher tissue concentrations relative to plasma. Excretory and alimentary canal tissue concentrations were much higher than blood/plasma at all time points. The highest observed concentration of [$^{14}$C]brincidofovir-derived radioactivity in blood was 5.3 μg equiv/g, which was observed at 2 h (end of infusion and the second collection time point for this intensively-sampled group). The $C_{max}$ of [$^{14}$C]brincidofovir-derived radioactivity in most tissues (33 of 38 tissues) were found at 2 h post-dose when most of the tissues had concentrations that were between 1.0 and 6.0 μg equiv/g.

The tissues with the highest concentrations (>20.0 μg equiv/g) at the respective $T_{max}$ were: liver (229.7 μg equiv/g), kidney cortex (97.3 μg equiv/g), small intestine (71.0 μg equiv/g), kidney medulla (27.0 μg equiv/g), and urinary bladder (22.8 μg equiv/g). The tissues with the lowest concentrations (<0.5 μg equiv/g) at their respective $T_{max}$ were: brain (cerebrum and medulla), spinal cord, white adipose, prostate gland, bone, skeletal muscle, and eye lens.

The highest overall concentrations determined by QWBA were observed in the urinary bladder contents (814.4 μg equiv/g at 4 h), bile (508.4 μg equiv/g at 2 h), and contents of the alimentary canal ($C_{max}$ ranged from 11.0 μg equiv/g in stomach at 8 h to 423.0 μg equiv/g in small intestine at 2 h), which reflected the routes of elimination for the [$^{14}$C] brincidofovir-drug-derived radioactivity after a 2-h IV infusion. Without wishing to be bound by theory, bile may have been the source for the high concentration of radioactivity in the intestinal contents with high concentrations of radioactivity present in early time points. The high concentration in the stomach would support this observation, since it is in close proximity to the entrance of bile into the digestive system, although gastric secretion may also possible, based on the observation that radioactivity was present in the gastric mucosa at 168 h.

Tissue concentrations in most tissues decreased steadily, but at 168 h post-dose, elimination of drug related material was not complete in most tissues. In tissues containing radioactivity the concentrations present were <1.0 µg equiv/g. At 840 h post-dose (last sampled time point) radioactivity was still present in bone marrow, lymph node, spleen, and adrenal gland, but was approaching the LLOQ (0.036 µg equiv/g) in these tissues except spleen (0.270 µg equiv/g).

At sparse time-points examined in SD rats (Group 3), no substantial differences in tissue concentrations were observed relative to LE rats administered the same dose (Group 4). A comparison of tissue distribution of radioactivity between non-pigmented (SD rats Group 3) and pigmented tissues (LE rats Group 4) showed that concentrations in the pigmented tissues (i.e., eye uveal tract and pigmented skin) were similar to those concentrations observed in the non-pigmented tissues, which suggested that there was no specific association of [$^{14}$C]brincidofovir-drug-derived radioactivity with melanin.

Group 5—QWBA Tissue Distribution in Pigmented Male Rats after IV Dosing at 2 mg/kg (Sparse Sampling)

A summary of tissue distribution of [$^{14}$C]brincidofovir in male pigmented rats administered a single 2-h IV infusion at 2 mg/kg (n=1 animal at 2, 8, 24, and 72 h after initiation of dosing) is presented in Table 73.

TABLE 73

Concentrations of Radioactivity in Tissues of Male Long-Evans (Pigmented, Group 5) Rats After a Single 2-Hour Intravenous Infusion of [$^{14}$C] brincidofovir at a Target Dose of 2 mg/kg

| | | Concentration (µg equiv/g tissue) | | | |
| --- | --- | --- | --- | --- | --- |
| Tissue Type | Tissue | Rat# 23 2 h | Rat# 24 8 h | Rat# 25 24 h | Rat# 26 72 h |
| Vascular/ Lymphatic | Plasma (by LSC) | 0.863 | 0.173 | 0.029 | 0.008 |
| | Blood (cardiac) | 0.771 | 0.178 | 0.041 | 0.010 |
| | Bone Marrow | 0.596 | 0.225 | 0.163 | 0.074 |
| | Lymph Node | 0.453 | 0.219 | 0.149 | 0.085 |
| | Spleen | 0.821 | 0.561 | 0.358 | 0.284 |
| | Thymus | 0.331 | 0.136 | 0.078 | 0.050 |
| Excretory/ Metabolic | Bile (in duct) | 32.663 | 3.781 | 0.097 | 0.069 |
| | Kidney Cortex | 11.047 | 8.188 | 3.570 | 0.772 |
| | Kidney Medulla | 3.359 | 1.362 | 0.854 | 0.257 |
| | Liver | 34.158 | 10.631 | 4.037 | 1.393 |
| | Urinary Bladder | 0.474 | 0.519 | 0.253 | 0.117 |
| | Urinary Bladder (contents) | 22.905 | 3.544 | 1.348 | 0.249 |
| Central Nervous System | Brain (cerebellum) | 0.172 | 0.036 | 0.020 | 0.012 |
| | Brain (cerebrum) | 0.150 | 0.030 | 0.016 | 0.006 |
| | Brain (medulla) | 0.101 | 0.027 | 0.019 | 0.006 |
| | Spinal Cord | 0.151 | 0.024 | 0.011 | 0.006 |
| Endocrine | Adrenal Gland | 0.685 | 0.440 | 0.245 | 0.167 |
| | Pituitary Gland | 0.899 | 0.367 | 0.089 | 0.055 |
| | Thyroid | 0.348 | 0.157 | 0.105 | 0.056 |
| Secretory | Harderian Gland | 0.300 | 0.162 | 0.116 | 0.100 |
| | Pancreas | 0.406 | 0.089 | 0.052 | 0.022 |
| | Salivary Gland | 0.494 | 0.111 | 0.071 | 0.030 |
| Fatty | Adipose (brown) | 0.356 | 0.099 | 0.050 | 0.039 |
| | Adipose (white) | 0.120 | 0.015 | 0.033 | 0.005 |
| Dermal | Skin (non-pigmented) | 0.288 | 0.268 | 0.108 | 0.068 |
| | Skin (pigmented) | 0.460 | 0.186 | 0.116 | 0.047 |
| Reproductive | Epididymis | 0.328 | 0.088 | 0.089 | 0.037 |
| | Prostate Gland | 0.166 | 0.039 | 0.035 | 0.015 |
| | Seminal Vesicles | 0.364 | 0.304 | 0.327 | 0.172 |
| | Testis | 0.231 | 0.091 | 0.076 | 0.041 |
| Skeletal/ Muscular | Bone | 0.022 | 0.017 | 0.019 | 0.010 |
| | Heart | 0.373 | 0.109 | 0.040 | 0.025 |
| | Skeletal Muscle | 0.167 | 0.023 | 0.017 | 0.007 |
| Respiratory | Lung | 0.997 | 0.283 | 0.195 | 0.115 |
| Alimentary Canal | Cecum | 0.507 | 0.696 | 0.145 | 0.090 |
| | Cecum (contents) | 0.051 | 30.663 | 3.948 | 0.191 |
| | Esophagus | 0.425 | 0.346 | 0.134 | 0.036 |
| | Large Intestine | 0.545 | 1.028 | 0.504 | 0.128 |
| | Large Intestine (contents) | 0.059 | 48.477 | 4.244 | 0.335 |
| | Small Intestine | 1.710 | 2.462 | 0.704 | 0.076 |
| | Small Intestine (contents) | 63.303 | 1.982 | 0.207 | 0.032 |
| | Stomach (gastric mucosa) | 0.553 | 0.122 | 0.077 | 0.031 |
| | Stomach (contents) | 0.014 | 0.051 | 0.006 | 0.008 |
| Ocular | Eye (lens) | BQL | BQL | BQL | BQL |
| | Eye (uveal tract) | 0.352 | 0.144 | 0.092 | 0.061 |

BQL = Value is below the LLOQ
LLOQ = 0.00048400 µCi/g/0.10151 µCi/µg = 0.005 µg equivalent/g tissue
ULOQ = 20.97300000 µCi/g/0.10151 µCi/µg = 206.610 µg equivalent/g tissue

[$^{14}$C]Brincidofovir-derived radioactivity was well distributed into most tissues of pigmented male rats after a 2-h IV infusion at 2 mg/kg, and most tissues had concentrations that were slightly lower than in blood/plasma at the end of infusion, but were higher than blood/plasma for later time points. Excretory and alimentary canal tissues were much higher than blood/plasma at all time points. The highest observed concentration of [$^{14}$C] brincidofovir-derived radioactivity in blood was 0.771 µg equiv/g, which was observed at 2 h (end of infusion and the first collection time point for this sparsely-sampled group) and was 7-fold lower than observed after a 15 mg/kg dose. The $C_{max}$ of [$^{14}$C]brincidofovir-derived radioactivity in most tissues (35 of 38 tissues) were found at 2 h post-dose (first sampled time point) when most of the tissues had concentrations that were between 0.2 and 0.7 µg equiv/g, which was about 10-fold lower than that observed in rats administered 15 mg/kg. Mean tissue concentration ratios after IV administration of 2 mg/kg (Group 5) compared to 15 mg/kg (Group 4) indicated that the increase in tissue concentrations were approximately dose proportional (i.e., with increase in dose of 7.5, a tissue concentration ratio between 4-15) in the vascular lymphatic, excretory/metabolic, central nervous, endocrine, secretory, fatty, dermal, reproductive, skeletal/muscular, and respiratory (lung) tissues (Table 74). Mean tissue concentration ratios were generally greater in the small intestine, indicating a greater than proportional increase in small intestine concentrations with an increase in dose from 2 to 15 mg/kg.

TABLE 74

[¹⁴C]Brincidofovir Ratio of Individual Tissue Concentration of Group 4 (15 mg/kg) to Group 5 (2 mg/kg)

Concentration (μg equiv/g tissue)

| Tissue Type | Tissue | G5 (2 mg/kg) Rat #23 2 h | G 4 (15 mg/kg) Rat #15 2 h | Ratio 2 h | G 5 (2 mg/kg) Rat #24 8 h Lo | G4 (15 mg/kg) Rat #17 8 h Hi | Ratio 8 h | G5 (2 mg/kg) Rat #25 24 h Lo | G4 (15 mg/kg) Rat #18 24 h Hi | Ratio 24 h | G 5 (2 mg/kg) Rat #26 72 h Lo | G 4 (15 mg/kg) Rat #19 72 h Hi | Ratio 72 h |
|---|---|---|---|---|---|---|---|---|---|---|---|---|---|
| Vascular/Lymphatic | Blood (cardiac) | 0.771 | 5.291 | 7 | 0.178 | 1.679 | 9 | 0.041 | 0.225 | 5 | 0.010 | 0.052 | 5 |
| Vascular/Lymphatic | Bone Marrow | 0.596 | 3.348 | 6 | 0.225 | 2.045 | 9 | 0.163 | 0.898 | 6 | 0.074 | 0.552 | 7 |
| Vascular/Lymphatic | Lymph Node | 0.453 | 4.002 | 9 | 0.219 | 1.936 | 9 | 0.149 | 0.745 | 5 | 0.085 | 0.710 | 8 |
| Vascular/Lymphatic | Spleen | 0.821 | 4.314 | 5 | 0.561 | 2.728 | 5 | 0.358 | 1.870 | 5 | 0.284 | 1.675 | 6 |
| Vascular/Lymphatic | Thymus | 0.331 | 2.125 | 6 | 0.136 | 1.107 | 8 | 0.078 | 0.403 | 5 | 0.050 | 0.359 | 7 |
| Excretory/Metabolic | Kidney Cortex | 11.047 | 97.276 | 9 | 8.188 | 56.528 | 7 | 3.570 | 19.453 | 5 | 0.772 | 4.070 | 5 |
| Excretory/Metabolic | Kidney Medulla | 3.359 | 26.987 | 8 | 1.362 | 22.989 | 17 | 0.854 | 7.117 | 8 | 0.257 | 1.478 | 6 |
| Excretory/Metabolic | Liver | 34.158 | 229.669 | 7 | 10.631 | 53.166 | 5 | 4.037 | 13.918 | 3 | 1.393 | 3.261 | 2 |
| Excretory/Metabolic | Urinary Bladder | 0.474 | 5.004 | 11 | 0.519 | 5.643 | 11 | 0.253 | 1.885 | 7 | 0.117 | 0.336 | 3 |
| Central Nervous System | Brain (cerebellum) | 0.172 | 1.144 | 7 | 0.036 | 0.284 | 8 | 0.020 | 0.099 | 5 | 0.012 | 0.073 | 6 |
| Central Nervous System | Brain (cerebrum) | 0.150 | 0.887 | 6 | 0.030 | 0.196 | 7 | 0.016 | 0.070 | 4 | 0.006 | 0.062 | 10 |
| Central Nervous System | Brain (medulla) | 0.101 | 0.858 | 8 | 0.027 | 0.199 | 7 | 0.019 | 0.085 | 4 | 0.006 | 0.059 | 10 |
| Central Nervous System | Spinal Cord | 0.151 | 0.940 | 6 | 0.024 | 0.116 | 5 | 0.011 | 0.060 | 5 | 0.006 | BQL | NC |
| Endocrine | Adrenal Gland | 0.685 | 4.802 | 7 | 0.440 | 3.179 | 7 | 0.245 | 1.253 | 5 | 0.167 | 1.186 | 7 |
| Endocrine | Pituitary Gland | 0.899 | 6.343 | 7 | 0.367 | 1.089 | 3 | 0.089 | 0.431 | 5 | 0.055 | 0.603 | 11 |
| Endocrine | Thyroid | 0.348 | 2.454 | 7 | 0.157 | 1.532 | 10 | 0.105 | 0.567 | 5 | 0.056 | 0.376 | 7 |
| Secretory | Harderian Gland | 0.300 | 2.049 | 7 | 0.162 | 1.284 | 8 | 0.116 | 0.665 | 6 | 0.100 | 1.098 | 11 |
| Secretory | Pancreas | 0.406 | 1.896 | 5 | 0.089 | 0.834 | 9 | 0.052 | 0.315 | 6 | 0.022 | 0.194 | 9 |
| Secretory | Salivary Gland | 0.494 | 2.508 | 5 | 0.111 | 0.821 | 7 | 0.071 | 0.314 | 4 | 0.030 | 0.190 | 6 |
| Fatty | Adipose (brown) | 0.356 | 1.680 | 5 | 0.099 | 0.755 | 8 | 0.050 | 0.306 | 6 | 0.039 | 0.402 | 10 |
| Fatty | Adipose (white) | 0.120 | 0.365 | 3 | 0.015 | 0.124 | 8 | 0.033 | 0.058 | 2 | 0.005 | 0.062 | 12 |
| Dermal | Skin (non-pigmented) | 0.288 | 2.556 | 9 | 0.268 | 1.273 | 5 | 0.108 | 0.312 | 3 | 0.068 | 0.443 | 7 |
| Dermal | Skin (pigmented) | 0.460 | 2.848 | 6 | 0.186 | 1.233 | 7 | 0.116 | 0.491 | 4 | 0.047 | 0.337 | 7 |
| Reproductive | Epididymis | 0.328 | 1.654 | 5 | 0.088 | 0.821 | 9 | 0.089 | 0.362 | 4 | 0.037 | 0.243 | 7 |
| Reproductive | Prostate Gland | 0.166 | 0.901 | 5 | 0.039 | 0.542 | 14 | 0.035 | 0.157 | 4 | 0.015 | 0.104 | 7 |
| Reproductive | Seminal Vesicles | 0.364 | 1.834 | 5 | 0.304 | 1.717 | 6 | 0.327 | 1.127 | 3 | 0.172 | 1.374 | 8 |
| Reproductive | Testis | 0.231 | 1.321 | 6 | 0.091 | 0.802 | 9 | 0.076 | 0.285 | 4 | 0.041 | 0.240 | 6 |
| Skeletal/Muscular | Bone | 0.022 | 0.257 | 12 | 0.017 | 0.190 | 11 | 0.019 | BQL | NC | 0.010 | 0.036 | NC |
| Skeletal/Muscular | Heart | 0.373 | 2.401 | 6 | 0.109 | 0.815 | 7 | 0.040 | 0.226 | 6 | 0.025 | 0.173 | 7 |
| Skeletal/Muscular | Skeletal Muscle | 0.167 | 0.611 | 4 | 0.023 | 0.152 | 7 | 0.017 | 0.063 | 4 | 0.007 | 0.070 | 10 |
| Respiratory Tract | Lung | 0.997 | 6.350 | 6 | 0.283 | 2.233 | 8 | 0.195 | 0.585 | 3 | 0.115 | 0.886 | 8 |
| Alimentary Canal | Cecum | 0.507 | 3.052 | 6 | 0.696 | 6.189 | 9 | 0.145 | 7.077 | 49 | 0.090 | 0.527 | 6 |
| Alimentary Canal | Esophagus | 0.425 | 2.456 | 6 | 0.346 | 1.747 | 5 | 0.134 | 0.377 | 3 | 0.036 | 0.357 | 10 |
| Alimentary Canal | Large Intestine | 0.545 | 5.497 | 10 | 1.028 | 3.071 | 3 | 0.504 | 3.064 | 6 | 0.128 | 0.993 | 8 |
| Alimentary Canal | Small Intestine | 1.710 | 71.029 | 42 | 2.462 | 48.384 | 20 | 0.704 | 3.184 | 5 | 0.076 | 4.569 | 60 |

TABLE 74-continued

[$^{14}$C]Brincidofovir Ratio of Individual Tissue Concentration of Group 4 (15 mg/kg) to Group 5 (2 mg/kg)

| | | Concentration (µg equiv/g tissue) | | | | | | | | | | | | |
|---|---|---|---|---|---|---|---|---|---|---|---|---|---|---|
| Tissue Type | Tissue | G5 (2 mg/kg) Rat #23 2 h | G 4 (15 mg/kg) Rat #15 2 h | Ratio 2 h | G 5 (2 mg/kg) Rat #24 8 h Lo | G4 (15 mg/kg) Rat #17 8 h Hi | Ratio 8 h | G5 (2 mg/kg) Rat #25 24 h Lo | G4 (15 mg/kg) Rat #18 24 h Hi | Ratio 24 h | G 5 (2 mg/kg) Rat #26 72 h Lo | G 4 (15 mg/kg) Rat #19 72 h Hi | Ratio 72 h |
| Alimentary Canal | Stomach (gastric mucosa) | 0.553 | 2.518 | 5 | 0.122 | 1.223 | 10 | 0.077 | 0.295 | 4 | 0.031 | 0.225 | 7 |
| Ocular | Eye (lens) | BQL | 0.077 | NC | BQL | BQL | NC | BQL | BQL | NC | BQL | BQL | NC |
| Ocular | Eye (uveal tract) | 0.352 | 1.411 | 4 | 0.144 | 0.925 | 6 | 0.092 | 0.452 | 5 | 0.061 | 0.322 | 5 |

NC = Not Calculated
NI = Tissue not collected during sectioning
NS = Not Sampled, tissues that could not be visualized on autoradioluminograph due to BQL radioactivity
BQL = Value is below the LLOQ
LLOQ = 0.00048400 µCi/g / 0.10151 µCi/µg = 0.005 µg equivalent / g tissue
ULOQ = 20.97300000 µCi/g / 0.10151 µCi/µg = 206.610 µg equivalent / g tissue The tissues with the highest concentrations >1.0 µg equiv/g at the respective $T_{max}$ were: liver (34.2 µg equiv/g), kidney cortex (11.0 µg equiv/g), kidney medulla (3.4 µg equiv/g), small intestine (2.5 µg equiv/g), and large intestine (1.0 µg equiv/g). The tissues with the lowest concentrations (<0.20 µg equiv/g) at their respective $T_{max}$ were: brain, spinal cord, white adipose, prostate gland, bone, skeletal muscle, and eye lens.

The highest overall non-tissue concentrations determined by QWBA were observed in the contents of the alimentary canal ($C_{max}$ ranged from 0.051 µg equiv/g in stomach at 8 h to 63.3 µg equiv/g in small intestine at 2 h), bile (32.7 µg equiv/g at 2 h), and urinary bladder contents (22.9 µg equiv/g at 2 h), which reflected the routes of elimination for the [$^{14}$C]brincidofovir-drug-derived radioactivity after a 2-h IV infusion at 2 mg/kg.

Tissue concentrations in most tissues decreased steadily, but at 72 h post-dose (last time point analyzed for this group), drug related material was detected in all tissues, but most tissues, not associated with organs of clearance, had concentrations that were <0.10 µg equiv/g.

Group 6 and 7—QWBA Tissue Distribution in Albino and Pigmented Male Rats after PO Dosing at 15 mg/kg A summary of tissue distribution of [$^{14}$C]brincidofovir in male albino (Group 6; n=3) and pigmented rats (Group 7; n=10) are presented in Table 75 and Table 76, respectively. Pharmacokinetic parameters are given in Table 77.

TABLE 75

Concentrations of Radioactivity in Tissues of Male Sprague Dawley (Albino, Group 6) Rats After a Single Oral Dose of [$^{14}$C]brincidofovir at a Target Dose of 15 mg/kg

| | | Concentration (µg equiv./g) | | |
|---|---|---|---|---|
| Tissue Type | Tissue | Rat# 27 2 h | Rat# 28 24 h | Rat# 29 168 h |
| Vascular/ Lymphatic | Plasma (by LSC) | 0.313 | 0.253 | BQL |
| | Blood (cardiac) | 0.200 | 0.197 | BQL |
| | Bone Marrow | 0.080 | 0.407 | 0.075 |
| | Lymph Node | 0.095 | 0.329 | 0.124 |
| | Spleen | 0.116 | 0.831 | 0.239 |
| | Thymus | 0.045 | 0.142 | BQL |
| Excretory/ Metabolic | Bile (in duct) | 9.639 | 0.465 | 0.045 |
| | Kidney Cortex | 2.752 | 18.379 | 0.588 |
| | Kidney Medulla | 2.189 | 7.926 | 0.274 |
| | Liver | 7.260 | 20.567 | 0.450 |
| | Urinary Bladder | 4.367 | 17.321 | 0.087 |
| | Urinary Bladder (contents) | 9.808 | 39.903 | 0.549 |
| Central Nervous System | Brain (cerebellum) | 0.035 | BQL | BQL |
| | Brain (cerebrum) | BQL | BQL | BQL |
| | Brain (medulla) | BQL | BQL | BQL |
| | Spinal Cord | BQL | BQL | BQL |
| Endocrine | Adrenal Gland | 0.114 | 0.927 | 0.035 |
| | Pituitary Gland | BQL | 0.257 | 0.071 |
| | Thyroid | 0.084 | 0.291 | 0.036 |
| Secretory | Harderian Gland | 0.062 | 0.315 | 0.100 |
| | Pancreas | 0.092 | 0.164 | 0.034 |
| | Salivary Gland | 0.067 | 0.103 | BQL |
| Fatty | Adipose (brown) | 0.053 | 0.212 | BQL |
| | Adipose (white) | BQL | 0.079 | BQL |
| Dermal | Skin (non-pigmented) | 0.088 | 0.189 | 0.063 |
| Reproductive | Epididymis | 0.073 | 0.091 | 0.075 |
| | Prostate Gland | 0.069 | 0.217 | BQL |
| | Seminal Vesicles | 0.048 | 0.333 | 0.097 |
| | Testis | 0.039 | 0.118 | BQL |
| Skeletal/ Muscular | Bone | BQL | 0.047 | BQL |
| | Heart | 0.080 | 0.116 | BQL |
| | Skeletal Muscle | 0.039 | BQL | BQL |
| Respiratory | Lung | 0.184 | 0.296 | 0.078 |
| Alimentary Canal | Cecum | 0.109 | 7.533 | 0.064 |
| | Cecum (contents) | BQL | 28.579 | 0.170 |
| | Esophagus | 0.593 | 0.271 | BQL |
| | Large Intestine | 0.084 | 2.194 | 0.076 |
| | Large Intestine (contents) | BQL | 34.450 | 0.168 |
| | Small Intestine | 236.279 | 84.063 | 2.680 |
| | Small Intestine (contents) | 321.878 | 11.948 | 0.054 |

TABLE 75-continued

Concentrations of Radioactivity in Tissues of Male Sprague Dawley (Albino, Group 6) Rats After a Single Oral Dose of [$^{14}$C]brincidofovir at a Target Dose of 15 mg/kg

| Tissue Type | Tissue | Rat# 27 2 h | Rat# 28 24 h | Rat# 29 168 h |
|---|---|---|---|---|
| | Stomach (gastric mucosa) | 11.183 | 1.075 | 0.041 |
| | Stomach (contents) | 877.490 | 5.664 | BQL |
| Ocular | Eye (lens) | BQL | BQL | BQL |
| | Eye (uveal tract) | 0.145 | 0.290 | BQL |

BQL = Value is below the LLOQ
LLOQ = 0.00048400 μCi/g/0.01427 μCi/μg = 0.034 μg equivalent/g tissue
ULOQ = 20.97300000 μCi/g/0.01427 μCi/μg = 1469.727 μg equivalent/g tissue

TABLE 76

Concentrations of Radioactivity in Tissues of Male Long-Evans (Pigmented, Group 7) Rats After a Single Oral Dose of [$^{14}$C]brincidofovir at a Target Dose of 15 mg/kg

| Tissue Type | Tissue | Rat #30 0.5 h | Rat #31 1 h | Rat #32 2 h | Rat #33 4 h | Rat #34 8 h | Rat #35 24 h | Rat #36 72 h | Rat #37 96 h | Rat #38 168 h | Rat #39 840 h |
|---|---|---|---|---|---|---|---|---|---|---|---|
| Vascular/ | Plasma (by LSC) | 0.040 | 0.248 | 0.446 | 1.216 | 1.499 | 0.184 | 0.017 | BQL | BQL | BQL |
| Lymphatic | Blood (cardiac) | BQL | 0.280 | 0.435 | 0.978 | 1.132 | 0.160 | BQL | 0.035 | BQL | BQL |
| | Bone Marrow | BQL | 0.085 | 0.117 | 0.254 | 0.412 | 0.391 | 0.167 | 0.211 | 0.094 | BQL |
| | Lymph Node | 0.050 | 0.153 | 0.097 | 0.380 | 0.421 | 0.389 | 0.339 | 0.141 | 0.129 | BQL |
| | Spleen | 0.267 | 0.111 | 0.166 | 0.319 | 0.533 | 0.759 | 0.469 | 0.466 | 0.274 | BQL |
| | Thymus | 0.083 | 0.065 | 0.104 | 0.154 | 0.224 | 0.116 | 0.040 | 0.083 | BQL | BQL |
| Excretory/ | Bile (in duct) | 0.572 | 8.660 | 20.537 | 36.265 | 17.878 | 0.614 | 2.425 | 0.317 | 0.140 | BQL |
| Metabolic | Kidney Cortex | 0.146 | 1.452 | 3.976 | 10.662 | 17.789 | 8.640 | 2.368 | 1.696 | 0.342 | 0.051 |
| | Kidney Medulla | 0.096 | 0.602 | 3.593 | 5.104 | 9.070 | 2.724 | 1.023 | 0.653 | 0.201 | BQL |
| | Liver | 0.432 | 7.701 | 12.037 | 36.137 | 34.744 | 18.184 | 2.183 | 2.680 | 0.393 | 0.034 |
| | Urinary Bladder | BQL | 1.146 | 0.214 | 1.588 | 3.728 | 0.659 | 0.177 | 0.256 | 0.076 | BQL |
| | Urinary Bladder (contents) | 0.200 | 11.376 | 7.593 | 17.825 | 110.910 | 11.541 | 0.205 | 1.292 | 0.278 | BQL |
| Central | Brain (cerebellum) | BQL | BQL | BQL | 0.037 | 0.075 | BQL | BQL | BQL | BQL | BQL |
| Nervous | Brain (cerebrum) | BQL | BQL | BQL | 0.035 | 0.066 | BQL | BQL | BQL | BQL | BQL |
| System | Brain (medulla) | BQL | BQL | BQL | 0.049 | 0.043 | BQL | BQL | BQL | BQL | BQL |
| | Spinal Cord | BQL | BQL | BQL | 0.037 | BQL | BQL | BQL | BQL | BQL | BQL |
| Endocrine | Adrenal Gland | BQL | 0.180 | 0.372 | 0.749 | 1.331 | 0.578 | 0.278 | 0.172 | 0.058 | BQL |
| | Pituitary Gland | BQL | 0.045 | 0.085 | 0.330 | 0.266 | 0.151 | 0.076 | 0.073 | 0.042 | BQL |
| | Thyroid | BQL | 0.118 | 0.168 | 0.317 | 0.298 | 0.139 | 0.117 | 0.089 | 0.038 | BQL |
| Secretory | Harderian Gland | BQL | 0.046 | 0.090 | 0.181 | 0.244 | 0.150 | 0.155 | 0.194 | 0.110 | BQL |
| | Pancreas | 0.066 | 0.166 | 0.193 | 0.255 | 0.214 | 0.096 | 0.051 | 0.044 | BQL | BQL |
| | Salivary Gland | BQL | 0.087 | 0.112 | 0.212 | 0.234 | 0.109 | BQL | 0.052 | BQL | BQL |
| Fatty | Adipose (brown) | 0.040 | 0.099 | 0.084 | 0.302 | 0.240 | 0.099 | 0.050 | 0.044 | 0.037 | BQL |
| | Adipose (white) | BQL | BQL | 0.063 | 0.089 | 0.076 | BQL | BQL | BQL | BQL | BQL |
| Dermal | Skin (non-pigmented) | BQL | 0.102 | 0.100 | 0.261 | 0.429 | 0.107 | 0.058 | 0.067 | BQL | BQL |
| | Skin | BQL | 0.086 | 0.156 | 0.416 | 0.429 | 0.157 | 0.069 | 0.077 | BQL | BQL |
| Reproductive | Epididymis | BQL | 0.084 | 0.064 | 0.294 | 0.229 | 0.146 | 0.064 | 0.108 | 0.042 | BQL |
| | Prostate Gland | BQL | 0.077 | 0.120 | 0.148 | 0.128 | 0.100 | BQL | 0.052 | BQL | BQL |
| | Seminal Vesicles | BQL | 1.018 | 0.109 | 0.221 | 0.244 | 0.259 | 0.156 | 0.185 | 0.063 | BQL |
| | Testis | BQL | 0.042 | 0.051 | 0.142 | 0.223 | 0.152 | 0.078 | 0.098 | 0.041 | BQL |
| Skeletal/ | Bone | BQL | BQL | BQL | 0.099 | 0.043 | 0.035 | BQL | BQL | BQL | BQL |
| Muscular | Heart | BQL | 0.083 | 0.182 | 0.247 | 0.358 | 0.121 | 0.061 | 0.077 | 0.045 | BQL |
| | Skeletal Muscle | BQL | 0.046 | 0.060 | 0.074 | 0.098 | BQL | BQL | BQL | BQL | BQL |
| Respiratory | Lung | BQL | 0.226 | 0.386 | 0.768 | 1.025 | 0.178 | 0.136 | 0.105 | 0.065 | BQL |
| Alimentary | Cecum | BQL | 0.127 | 0.289 | 0.931 | 7.561 | 0.688 | 0.189 | 0.327 | 0.137 | BQL |
| Canal | Cecum (contents) | BQL | BQL | 0.050 | 38.957 | 256.303 | 35.629 | 1.035 | 0.698 | 0.071 | BQL |

TABLE 76-continued

Concentrations of Radioactivity in Tissues of Male Long-Evans (Pigmented, Group 7) Rats After a Single Oral Dose of [$^{14}$C]brincidofovir at a Target Dose of 15 mg/kg

| Tissue Type | Tissue | Concentration (µg equiv/g tissue) | | | | | | | | | |
|---|---|---|---|---|---|---|---|---|---|---|---|
| | | Rat #30 0.5 h | Rat #31 1 h | Rat #32 2 h | Rat #33 4 h | Rat #34 8 h | Rat #35 24 h | Rat #36 72 h | Rat #37 96 h | Rat #38 168 h | Rat #39 840 h |
| | Esophagus | BQL | BQL | 0.185 | 4.636 | 0.458 | 0.179 | BQL | 0.071 | BQL | BQL |
| | Large Intestine | BQL | 0.107 | 0.136 | 0.265 | 3.338 | 1.681 | 0.276 | 0.413 | 0.060 | BQL |
| | Large Intestine (contents) | BQL | BQL | BQL | BQL | 378.695 | 69.825 | 1.236 | 1.252 | 0.108 | BQL |
| | Small Intestine | 72.672 | 374.71 | 295.445 | 458.485 | 178.32 | 74.587 | 6.889 | 16.979 | 5.867 | 0.070 |
| | Small Intestine (contents) | 53.944 | 82.546 | 72.107 | 187.589 | 98.195 | 69.109 | 0.215 | 9.654 | BQL | BQL |
| | Stomach (gastric mucosa) | 2.769 | 7.730 | 11.955 | 0.833 | 0.880 | 0.937 | 0.108 | 0.101 | 0.042 | BQL |
| | Stomach (contents) | 670.358 | 1004.619 | 328.988 | 274.917 | 17.792 | 0.056 | BQL | BQL | BQL | BQL |
| Ocular | Eye (lens) | BQL | BQL | BQL | BQL | BQL | BQL | BQL | BQL | BQL | BQL |
| Eye (uveal tract) | | BQL | BQL | 0.193 | 0.227 | 0.601 | 0.178 | BQL | 0.075 | BQL | BQL |

BQL = Value is below the LLOQ
LLOQ = 0.00048400 µCi/µg = 0.034 µg equivalent/g tissue
ULOQ = 20.97300000 µCi/g/0.01427 µCi/µg = 1469.727 µg equivalent/g tissue

TABLE 77

Rat Tissue Pharmacokinetic Parameters After a Single Oral Dose of [$^{14}$C]brincidofovir at a Target Dose of 15 mg/kg

| Organ/Tissue | $C_{max}$ (µg equiv/g) | $t_{1/2}$ (h) | No. of points in $t_{1/2}$ | $r^2$ | $T_{max}$ (h) | $AUC_{all}$ (µg equiv ·h/g) | $AUC_{inf\_obs}$ (µg equiv · h/g) |
|---|---|---|---|---|---|---|---|
| Adipose (brown) | 0.302 | 233.5 | 3 | 0.96 | 4 | 24.3703 | 24.4043 |
| Adipose (white) [a] | 0.089 | 17.6 | 2 | 1.00 | 4 | 1.1215 | 2.4387 |
| Adrenal Gland | 1.331 | 43.2 | 3 | 1.00 | 8 | 74.5860 | 58.7136 |
| Blood (cardiac) [a] | 1.132 | 32.8 | 2 | 1.00 | 8 | 21.9165 | 22.3146 |
| Bone [a] | 0.099 | 53.9 | 2 | 1.00 | 4 | 1.8470 | 3.7274 |
| Bone Marrow a | 0.412 | 96.3 | 3 | 0.75 | 8 | 68.7413 | 50.2191 |
| Brain (cerebellum) | 0.075 | ND | 0 | ND | 8 | 0.8610 | ND |
| Brain (cerebrum) | 0.066 | ND | 0 | ND | 8 | 0.7650 | ND |
| Brain (medulla) | 0.049 | ND | 0 | ND | 4 | 0.5770 | ND |
| Cecum [a] | 7.561 | 69.9 | 4 | 0.71 | 8 | 174.4118 | 142.1970 |
| Epididymis [a] | 0.294 | 89.0 | 4 | 0.72 | 4 | 31.1150 | 22.3936 |
| Esophagus | 4.636 | 37.2 | 3 | 0.88 | 4 | 27.9015 | 29.1559 |
| Eye (lens) | 0 | ND | ND | ND | ND | ND | ND |
| Eye (uveal tract) [a] | 0.601 | 57.7 | 2 | 1.00 | 8 | 16.2765 | 19.8244 |
| Harderian Gland [a] | 0.244 | 151.8 | 3 | 0.64 | 8 | 63.7645 | 50.8931 |
| Heart [a] | 0.358 | 110.8 | 4 | 0.81 | 8 | 31.1603 | 23.2365 |
| Kidney Cortex [a] | 17.789 | 244.8 | 2 | 1.00 | 8 | 804.4980 | 822.5076 |
| Kidney Medulla | 9.070 | 41.2 | 3 | 1.00 | 8 | 342.0130 | 286.4307 |
| Large Intestine [a] | 3.338 | 37.6 | 3 | 0.82 | 8 | 140.3313 | 123.4302 |
| Liver [a] | 36.137 | 190.3 | 2 | 1.00 | 4 | 1426.6340 | 1435.9700 |
| Lung | 1.025 | 93.0 | 3 | 0.99 | 8 | 53.1145 | 39.9962 |
| Lymph Node [a] | 0.421 | 86.4 | 3 | 0.56 | 8 | 85.04325 | 57.7701 |
| Pancreas [b] | 0.255 | 62.1 | 3 | 0.98 | 4 | 10.3720 | 12.7271 |
| Pituitary Gland | 0.330 | 106.2 | 3 | 0.97 | 4 | 30.5073 | 22.8331 |
| Plasma (LSC) | 1.499 | ND | ND | ND | 8 | 22.3885 | ND |
| Prostate Gland | 0.148 | 70.1 | 3 | 0.99 | 4 | 7.6578 | 11.0471 |
| Salivary Gland a | 0.234 | 67.4 | 2 | 1.00 | 8 | 9.1933 | 12.3880 |
| Seminal Vesicles | 1.018 | 64.7 | 3 | 0.86 | 1 | 50.2500 | 34.9600 |
| Skeletal Muscle | 0.098 | ND | 0 | ND | 8 | 1.3265 | ND |
| Skin (non-pigmented) [a] | 0.429 | 93.7 | 3 | 0.72 | 8 | 14.0275 | 20.6749 |
| Skin (pigmented) [a] | 0.429 | 63.4 | 3 | 0.81 | 8 | 17.0405 | 21.3144 |
| Small Intestine | 458.485 | 98.1 | 3 | 0.99 | 4 | 9575.1810 | 9585.0880 |
| Spinal Cord | 0.037 | ND | 0 | ND | 4 | 0.1110 | ND |
| Spleen | 0.759 | 115.4 | 3 | 0.95 | 24 | 172.2208 | 125.7566 |
| Stomach (mucosa) | 11.955 | 66.8 | 3 | 0.97 | 2 | 90.7575 | 80.6917 |
| Testis [a] | 0.223 | 87.2 | 3 | 0.77 | 8 | 30.3920 | 21.7757 |

TABLE 77-continued

Rat Tissue Pharmacokinetic Parameters After a Single Oral Dose of [$^{14}$C]brincidofovir at a Target Dose of 15 mg/kg

| Organ/Tissue | Rat PK | | | | | | |
|---|---|---|---|---|---|---|---|
| | $C_{max}$ (µg equiv/g) | $t_{1/2}$ (h) | No. of points in $t_{1/2}$ | $r^2$ | $T_{max}$ (h) | $AUC_{all}$ (µg equiv ·h/g) | $AUC_{inf\_obs}$ (µg equiv · h/g) |
| Thymus [a] | 0.224 | 96.9 | 3 | 0.23 | 8 | 12.0843 | 20.6983 |
| Thyroid | 0.317 | 59.0 | 3 | 1.00 | 4 | 31.3395 | 21.8086 |
| Urinary Bladder | 3.728 | 49.7 | 4 | 0.87 | 8 | 111.2445 | 91.1627 |

ND = Not determined; unable to determine value from the data.
[a] $t_{1/2}$ values for these tissue/organs are obtained from insufficient data points and/or the resulting $r^2$ values fall outside acceptance criteria (≥0.85), thus, these values should be considered estimates.

Group 6—QWBA Tissue Distribution in Albino Male Rats after Dosing (Sparse Sampling)

[$^{14}$C]Brincidofovir-derived radioactivity was well distributed into most tissues of albino male rats after a single oral dose at 15 mg/kg (n=1 at 2, 24, and 168 h after dosing), and most tissues had concentrations that were slightly lower than in blood/plasma at early time-point (2 hours after dosing), but were higher than blood/plasma for later time points. Excretory and alimentary canal tissue concentrations were much higher than blood/plasma at all time points. The highest observed concentration of [$^{14}$C]brincidofovir-derived radioactivity in blood was 0.200 µg equiv/g, which was observed at 2 h (the first collection time point for this sparsely—sampled group). The $C_{max}$ of [$^{14}$C]brincidofovir-derived radioactivity in most tissues (31 of 37 tissues) were found at 24 h post-dose (second sampled time point) when most of the tissues had concentrations that were between 0.10 and 0.50 µg equiv/g.

The tissues with the highest concentrations (>7.0 µg equiv/g) at the respective $T_{max}$ were: small intestine (236.3 µg equiv/g), liver (20.6 µg equiv/g), kidney cortex (18.4 µg equiv/g), urinary bladder (17.3 µg equiv/g), stomach (11.2 µg equiv/g), kidney medulla (7.9 µg equiv/g), and cecum (7.5 µg equiv/g). The tissues with the lowest concentrations (<0.10 µg equiv/g) at their respective $T_{max}$ were: brain, spinal cord, white adipose, bone, skeletal muscle, and eye lens.

The highest overall concentrations determined by QWBA were observed in the contents of the alimentary canal ($C_{max}$ ranged from 28.6 µg equiv/g in cecum at 24 h to 877.5 µg equiv/g in stomach at 2 h), urinary bladder contents (39.9 µg equiv/g at 24 h), and bile (9.7 µg equiv/g at 2 h), which reflected the route of dose administration and/or the routes of elimination for the [$^{14}$C]brincidofovir-drug-derived radioactivity after a single oral dose at 15 mg/kg.

At 168 h post-dose, elimination of drug related material was not complete, with detectable concentrations (<0.60 µg equiv/g) in approximately half of the tissues. In small intestine, a higher residual concentration (2.7 µg equiv/g) was observed relative to other tissues at 168 h.

Group 7—QWBA Tissue Distribution in Pigmented Male Rats after PO Dosing

[$^{14}$C]Brincidofovir-derived radioactivity was well distributed into most tissues of pigmented male rats after a single oral dose at 15 mg/kg (n=1 animal at 0.5, 1, 2, 4, 8, 24, 72, 96, 168 and 840 h after dosing), and most tissues had concentrations that were slightly lower than in blood/plasma at time points up to 24 hours after dosing, but were higher than blood/plasma for later time points. Excretory and alimentary canal tissue concentrations were much higher than blood/plasma at all time points. Tissue:plasma (T/P) ratios based on AUC (Table 78) show values>1 for most tissues, indicating higher tissue concentration relative to plasma. The highest observed concentration of [$^{14}$C]brincidofovir-derived radioactivity in blood was 1.1 µg equiv/g, which was observed at 8 h. The $C_{max}$ of [$^{14}$C]brincidofovir-derived radioactivity in most tissues (20 of 38 tissues) were found at 8 h post-dose when most of the tissues had concentrations that were between 0.20 and 0.40 µg equiv/g.

TABLE 78

Tissue Distribution of Total Radioactivity in Male Long-Evans Rats Following a Single Two Hour Intravenous Infusion (Group 4) or Oral Dose (Group 7) of [$^{14}$C]brincidofovir at a Target Dose of 15 mg/kg

| Tissue | $C_{max}$ (µg equiv/g) | | | $AUC_{all}$ (µg equiv · h/g) | | | Tissue/Plasma Ratio $AUC_{all}$ Tissue/$AUC_{all}$ Plasma | | Tissue Concentration µg equiv/g (168 h) | |
|---|---|---|---|---|---|---|---|---|---|---|
| | IV (Group 4) | PO (Group 7) | Ratio (PO/IV) | IV (Group 4) | PO (Group 7) | Ratio (PO/IV) | IV (Group 4) | PO (Group 7) | IV (Group 4) | PO (Group 7) |
| Plasma (by LSC) | 4.918 | 1.499 | 0.30 | 36.3690 | 22.3885 | 0.62 | 1.0 | 1.0 | BQL | BQL |
| Blood (cardiac) | 5.291 | 1.132 | 0.21 | 45.3555 | 21.9165 | 0.48 | 1.2 | 1.0 | BQL | BQL |
| Adipose (brown) | 1.68 | 0.302 | 0.18 | 96.6220 | 24.3703 | 0.25 | 2.7 | 1.1 | 0.132 | 0.037 |
| Adipose (white) | 0.369 | 0.089 | 0.24 | 7.1955 | 1.1215 | 0.16 | 0.2 | 0.1 | BQL | BQL |
| Adrenal Gland | 4.802 | 1.331 | 0.28 | 384.2580 | 74.5860 | 0.19 | 10.6 | 3.3 | 0.49 | 0.058 |

TABLE 78-continued

Tissue Distribution of Total Radioactivity in Male Long-Evans Rats Following a Single Two Hour Intravenous Infusion (Group 4) or Oral Dose (Group 7) of [$^{14}$C]brincidofovir at a Target Dose of 15 mg/kg

| | $C_{max}$ (μg equiv/g) | | | $AUC_{all}$ (μg equiv · h/g) | | | Tissue/Plasma Ratio $AUC_{all}$ Tissue/$AUC_{all}$ Plasma | | Tissue Concentration μg equiv/g (168 h) | |
|---|---|---|---|---|---|---|---|---|---|---|
| Tissue | IV (Group 4) | PO (Group 7) | Ratio (PO/IV) | IV (Group 4) | PO (Group 7) | Ratio (PO/IV) | IV (Group 4) | PO (Group 7) | IV (Group 4) | PO (Group 7) |
| Bone | 0.257 | 0.099 | 0.39 | 6.1805 | 1.8470 | 0.30 | 0.2 | 0.1 | BQL | BQL |
| Bone Marrow | 3.348 | 0.412 | 0.12 | 197.3860 | 68.7413 | 0.35 | 5.4 | 3.1 | 0.232 | 0.094 |
| Brain (cerebellum) | 1.144 | 0.075 | 0.07 | 12.1870 | 0.8610 | 0.07 | 0.3 | 0.04 | BQL | BQL |
| Brain (cerebrum) | 0.887 | 0.066 | 0.07 | 9.1765 | 0.7650 | 0.08 | 0.3 | 0.03 | BQL | BQL |
| Brain (medulla) | 0.858 | 0.049 | 0.06 | 9.7470 | 0.5770 | 0.06 | 0.3 | 0.0 | BQL | BQL |
| Cecum | 7.077 | 7.561 | 1.07 | 360.7580 | 174.4118 | 0.48 | 9.9 | 7.8 | 0.08 | 0.137 |
| Epididymis | 1.795 | 0.294 | 0.16 | 95.0160 | 31.1150 | 0.33 | 2.6 | 1.4 | 0.129 | 0.042 |
| Esophagus | 2.456 | 4.636 | 1.89 | 73.1850 | 27.9015 | 0.38 | 2.0 | 1.2 | 0.041 | BQL |
| Eye (lens) | 0.077 | ND | ND | 0.1545 | ND | ND | 0.0042 | ND | BQL | BQL |
| Eye (uveal tract) | 1.412 | 0.601 | 0.43 | 51.5575 | 16.2765 | 0.32 | 1.4 | 0.7 | BQL | BQL |
| Harderian Gland | 2.049 | 0.244 | 0.12 | 257.6905 | 63.7645 | 0.25 | 7.1 | 2.8 | 0.403 | 0.11 |
| Heart | 2.401 | 0.358 | 0.15 | 58.1205 | 31.1603 | 0.54 | 1.6 | 1.4 | 0.062 | 0.045 |
| Kidney Cortex | 97.276 | 17.789 | 0.18 | 1919.6850 | 804.4980 | 0.42 | 52.8 | 35.9 | 0.33 | 0.342 |
| Kidney Medulla | 26.987 | 9.07 | 0.34 | 717.8445 | 342.0130 | 0.48 | 19.7 | 15.3 | 0.138 | 0.201 |
| Large Intestine | 5.497 | 3.338 | 0.61 | 310.7965 | 140.3313 | 0.45 | 8.5 | 6.3 | 0.103 | 0.06 |
| Liver | 229.669 | 36.137 | 0.16 | 2149.7645 | 1426.6340 | 0.66 | 59.1 | 63.7 | 0.451 | 0.393 |
| Lung | 6.35 | 1.025 | 0.16 | 180.1960 | 53.1145 | 0.29 | 5.0 | 2.4 | 0.178 | 0.065 |
| Lymph Node | 4.002 | 0.421 | 0.11 | 208.8530 | 85.04325 | 0.41 | 5.7 | 3.8 | 0.247 | 0.129 |
| Pancreas | 1.896 | 0.255 | 0.13 | 36.2010 | 10.3720 | 0.29 | 1.0 | 0.5 | BQL | BQL |
| Pituitary Gland | 6.343 | 0.33 | 0.05 | 155.1085 | 30.5073 | 0.20 | 4.3 | 1.4 | 0.189 | 0.042 |
| Prostate Gland | 0.901 | 0.148 | 0.30 | 24.3415 | 7.6578 | 0.62 | 0.7 | 0.3 | BQL | BQL |
| Salivary Gland | 2.508 | 0.234 | 0.09 | 60.9180 | 9.1933 | 0.15 | 1.7 | 0.4 | 0.056 | BQL |
| Seminal Vesicles | 2.285 | 1.018 | 0.45 | 297.3580 | 50.2500 | 0.17 | 8.2 | 2.2 | 0.361 | 0.063 |
| Skeletal Muscle | 0.611 | 0.098 | 0.16 | 10.3485 | 1.3265 | 0.13 | 0.3 | 0.1 | BQL | BQL |
| Skin (non-pigmented) | 2.556 | 0.429 | 0.17 | 146.2340 | 14.0275 | 0.10 | 4.0 | 0.6 | 0.226 | BQL |
| Skin (pigmented) | 2.848 | 0.429 | 0.15 | 95.5050 | 17.0405 | 0.18 | 2.6 | 0.8 | 0.09 | BQL |
| Small Intestine | 71.029 | 458.485 | 6.45 | 1160.6505 | 9575.1810 | 8.25 | 31.9 | 427.7 | 0.339 | 5.867 |
| Spinal Cord | 0.94 | 0.037 | 0.04 | 5.7830 | 0.1110 | 0.02 | 0.2 | 0.005 | BQL | BQL |
| Spleen | 4.314 | 0.759 | 0.18 | 642.3590 | 172.2208 | 0.27 | 17.7 | 7.7 | 0.892 | 0.274 |
| Stomach (mucosa) | 2.518 | 11.955 | 4.75 | 70.2310 | 90.7575 | 1.29 | 1.9 | 4.1 | 0.069 | 0.042 |
| Testis | 1.321 | 0.223 | 0.17 | 77.2835 | 30.3920 | 0.39 | 2.1 | 1.4 | 0.098 | 0.041 |
| Thymus | 2.125 | 0.224 | 0.11 | 92.4355 | 12.0843 | 0.13 | 2.5 | 0.5 | 0.1 | BQL |
| Thyroid | 2.454 | 0.317 | 0.13 | 238.0230 | 31.3395 | 0.13 | 6.5 | 1.4 | 0.459 | 0.038 |
| Urinary Bladder | 22.781 | 3.728 | 0.16 | 215.5480 | 111.2445 | 0.52 | 5.9 | 5.0 | BQL | 0.076 |

BQL = Below quantification limit
LLOQ = 0.036 ug equiv/g (Group 4 IV)
LLOQ = 0.034 ug equiv/g (Group 7 PO)
ND = Not determined, insufficient data FIG. 4 and FIG. 5 show plots of the concentration of brincidofovir in various tissue as a function of time and route of administration. FIG. 4 compares the concentration of brincidofovir in the small intestine for oral and IV dosing as a function of time. FIG. 5 compares the concentration of brincidofovir in the kidney cortex for oral and IV dosing as a function of time.

The tissues with the highest concentrations (>2.0 μg equiv/g) at the respective $T_{max}$ were: small intestine (458.5 μg equiv/g), liver (36.1 μg equiv/g), kidney cortex (17.8 μg equiv/g), stomach (12.0 μg equiv/g), kidney medulla (9.1 μg equiv/g), cecum (7.6 μg equiv/g), urinary bladder (3.7 μg equiv/g), and large intestine (3.3 μg equiv/g). The tissues with the lowest concentrations (<0.10 μg equiv/g) at their respective $T_{max}$ were: brain, spinal cord, white adipose, bone, skeletal muscle, and eye lens.

The highest overall concentrations determined by QWBA were observed in the contents of the alimentary canal ($C_{max}$ ranged from 187.6 μg equiv/g in small intestine at 4 h to 1004.6 μg equiv/g in stomach at 1 h), urinary bladder contents (110.9 μg equiv/g at 8 h), and bile (36.3 μg equiv/g at 4 h), which reflected route of dose administration and/or the routes of elimination for the [$^{14}$C]brincidofovir drug-derived radioactivity after a single oral dose.

Tissue concentrations in most tissues decreased steadily, but at 168 h post-dose, drug related material was detected in approximately half of the tissues, with most concentrations <0.40 μg equiv/g, except for small intestine (5.9 μg equiv/g). At 840 h post-dose (last sampled time point) radioactivity was still present in small intestine, kidney cortex, and liver, but concentration were near the LLOQ (0.034 μg equiv/g) in all tissues.

The primary route of elimination of radioactivity after a 2-h IV infusion of [$^{14}$C]brincidofovir at 15 mg/kg in male SD rats was in urine, which accounted for an average of 51.2% of the administered dose over the 168 h collection period. An average of 42.2% of the administered dose was recovered in feces. Most (~86%) of the urinary and fecal excretion of radioactivity occurred in the first 24 h after dosing.

Following a 2-h IV infusion, radioactivity in most tissues (except small intestine) increased in proportion to dose (from 2 to 15 mg/kg) across each time point. In small intestinal tissue, the increase was greater than proportional to dose. Following oral administration radioactivity was readily absorbed. Radioactivity was well distributed with peak concentrations of radioactivity in most tissues (34 of 38) occurring at 4 to 8 h after oral administration, and at the end of the IV infusion (2-h). The qualitative distribution patterns of the radioactivity were similar after IV or oral administration; quantitatively, tissue radioactive exposure, adjusted for the radioactive bioavailability (approximately 50%), generally was greater after IV administration than after oral gavage. Tissues with highest concentrations of radioactivity were associated with excretory organs (i.e., liver, kidney, and intestine). The tissue to plasma ratios were high (>30) for each of these tissues, and in kidney cortex and liver the ratios were similar between the IV and oral routes of administration. Small intestinal tissue to plasma ratio was highest after oral administration (T/P=428) as expected based on the route of administration. However, notable radioactivity was associated with the small intestine (tissue to plasma ratio 32) after IV infusion. High concentration ($C_{max}$) was associated with bile in the duct, which was 14 times greater after IV ($C_{max}$ 508 μg equiv/g) than oral ($C_{max}$=36 μg equiv/g) administration, suggesting a possible source for the high small intestinal tissue concentrations after IV administration. Tissues with lowest concentrations of radioactivity were brain, spinal cord, skeletal muscle, white adipose tissue and bone. Association of radioactivity in the brain and spinal cord was higher after IV administration (~20% of plasma $C_{max}$ concentration and ~5% of plasma $C_{max}$ concentration after oral administration). No evidence of specific association with melanin containing tissues (eye, uvea) was detected.

The predicted exposure in humans following a 100 μCi oral dose was estimated using four different methods (including single tissue and whole body exposure estimates), all of which resulted in a human exposure that was 4% or less of the FDA and ICRP allowed limits.

There were no observed SOP and/or protocol deviations that occurred on the study that had a detrimental effect on the quality or integrity of the study.

IV BCV Single Ascending Dose Study in Healthy Subjects

Brincidofovir was administered to healthy subjects at 10 mg and 25 mg. IV brincidofovir at 10 mg was found to provide similar exposure as orally administered brincidofovir at 100 mg. It was found that both IV brincidofovir doses (10 mg and 25 mg) were generally safe and well-tolerated. No drug related adverse events, no gastrointestinal adverse events, and no graded lab abnormalities (e.g., no hematologic toxicity and no kidney toxicity) were observed.

A single dose of oral BCV at 100 mg and 200 mg resulted in about 5% instance of diarrhea, and a 350 mg dose resulted in about 20% instance of diarrhea.

FIG. 6 shows a plot of the plasma brincidofovir concentration ($AUC_{inf}$ (ng*h/mL)) at different 100 mg oral administration, 10 mg IV administration, and 25 mg IV administration. As shown in FIG. 6, IV administration of 10 mg brincidofovir provided substantially the same plasma concentration as oral administration of 100 mg brincidofovir, while IV administration of 25 mg brincidofovir provided higher plasma concentration than both the IV 10 mg dose and the oral 100 mg dose.

Example 10—Brincidofovir: A 28-Day Intravenous Infusion Toxicity Study in Rats with a 14-Day Recovery Period Summary Sprague-Dawley CD® rats (15/sex/group) were administered 0 (2× Sodium Phosphate Buffer Solution), 1, 4 or 15 mg/kg/dose brincidofovir twice per week via 2-hour intravenous infusion on a total of 9 occasions over 29 days. The dose rate was 10 mL/kg/hr for all dose groups. At the end of the treatment phase, up to 10 animals/sex/group were euthanized and necropsied. The remaining animals (up to 5 animals/sex/group) were held for a 14-day recovery phase in order to determine progression or reversibility of any brincidofovir-related effects. Satellite animals (up to 3/sex/group) were similarly dosed and serial blood samples were collected from each animal on Days 1 and 29 for toxicokinetic analysis of brincidofovir and the brincidofovir metabolite (Cidofovir, CDV). Parameters evaluated during the study were: viability, clinical observations, ophthalmology, body weights, food consumption, clinical pathology (termination of dosing and end of recovery), organ weights, macroscopic observations and microscopic pathology.

Brincidofovir exposure increased with increasing dose on Day 1 and Day 29 with a trend towards a greater than proportional increase in $AUC_{last}$ versus dose. Without wishing to be bound by theory, in general, there was no accumulation of brincidofovir over the course of the 29 day study. Male to female ratios for brincidofovir indicated there were no sex differences in exposures (based on $C_{max}$ and $AUC_{last}$).

On Days 1 and 29, following intravenous administration of brincidofovir, CDV $C_{max}$ and $AUC_{last}$ values increased with increasing brincidofovir dose (from 1 to 15 mg/kg). In general, there was little to no accumulation of CDV over the course of the study and male to female ratio generally indicated there were no sex differences in CDV exposures.

There were no brincidofovir-related mortalities. There were 3 unscheduled deaths on the study, 2 deaths in toxicity animals were determined not to be brincidofovir-related and 1 death in a TK animal for which the cause could not be determined.

There were no brincidofovir-related effects on ophthalmology, body weights, hematology, coagulation, clinical chemistry, or urinalysis.

Administration of brincidofovir resulted in intermittent (generally following infusion) clinical signs in some but not all animals (rapid breathing and hunched posture with and without piloerection, partially closed eyes, decreased activity irregular breathing, and/or flattened posture) in both sexes at ≥4 mg/kg/dose and minimally decreased food consumption at ≥1 mg/kg/dose in males and at 15 mg/kg/dose in females.

At the end of dosing, brincidofovir-related findings were present in the male reproductive tract (testes, epididymides and seminal vesicles) and the intestinal tract (duodenum, jejunum, and/or ileum) at ≥4 mg/kg/dose and skin (sebaceous glands) of males and females at 15 mg/kg/dose. In the male reproductive tract, testicular changes were characterized by decreased testicular weights and slight to marked germ cell depletion at ≥4 mg/kg, with minimal spermatid retention and Sertoli cell vacuolation at 15 mg/kg/dose. In addition, males at 15 mg/kg/dose had minimal luminal cell debris in the epididymides and minimally increased epithelial apoptosis in the seminal vesicles. In the intestinal tract, single cell necrosis was observed in the small intestine (crypts) at ≥4 mg/kg/dose and in the large intestine (glands) at 15 mg/kg/dose in both sexes. Sebaceous gland atrophy in the skin was present in males and females at 15 mg/kg.

TABLE 79

Comparison of toxicity of orally and intravenously administered brincidofovir

| ORAL BRINCIDOFOVIR (Single Dose) | | | IV BRINCIDOFOVIR (Repeat Dose) | | |
|---|---|---|---|---|---|
| DOSE (mg/kg) | Exposure (ng/mL or ng·hr/mL) | Findings | DOSE (mg/kg) | Exposure (ng/mL or ng·hr/mL) | Preliminary Findings |
| 30 | $C_{max}$-426 AUC-5564 | Single cell necrosis of the epithelial cells lining mucosal crypts or glands at the base of small intestinal villi | 1 | $C_{max}$-298 AUC-410 | No GI findings |
| 100 | $C_{max}$-1086 AUC-13552 | Diarrhea, dehydration, ↓ Body weight Gross - distended stomach Enteritis with epithelial loss and inflammation 38% mortality | 4 | $C_{max}$-1200 AUC-2759 | Minimal to slight small intestine necrosis crypt; minimal crypt hyperplasia |
| 300 | $C_{max}$-1186 AUC-20506 | Clinical: diarrhea, dehydration, ↓ Body weight Gross - distended stomach, jejunum, cecum, colon Extensive loss of mucosal epithelial cells with inflammatory infiltrate into lamina propria 100% mortality | 15 | $C_{max}$-4500 AUC-9893 | Slight to minimal small intestine crypt necrosis; minimal crypt hyperplasia Minimal epithelial gland necrosis large intestine |
| 1000 | $C_{max}$-1375 AUC-26449 | Clinical: Diarrhea, dehydration, ↓ body weight Gross - distended stomach, jejunum, cecum, colon GI toxicity similar to 300 mg/kg 100% mortality | | | Note: Infusion of BCV resulted in intermittent clinical signs of rapid breathing, hunched posture- with or without piloerection in some animals during infusion; and fully resolved shortly following infusion. |

Following a 14-day recovery period, all findings completely recovered with the exception of testicular weight decreases and germ cell depletion in males at ≥4 mg/kg/dose; however, without wishing to be bound by theory, germ cell depletion would not be expected to completely recover in 2 weeks. In addition, a few animals at 15 mg/kg/dose (3/5 males; 2/5 females) had bone marrow decreased cellularity and soft and/or small testes and epididymides (males). Without wishing to be bound by theory, germ cell depletion in the testes and decreased sperm in the head region of the epididymides were reflective of maturation depletion secondary to the loss of germ cell populations observed at the end of the dosing period.

Under the conditions of the study, based on the testicular germ cell depletion in males at ≥4 mg/kg/dose and moderate intestinal single cell crypt necrosis in 1 female at 15 mg/kg/dose, the no-observed-adverse-effect level (NOAEL) for brincidofovir was considered to be 1 mg/kg/dose in males and 4 mg/kg/dose for in females.

Introduction

The following abbreviations are used in this study:
M Male(s)
F Female(s)
~ approximately
mg/kg milligrams of test item per kilogram of body weight
mL/kg milliliters of dose formulation per kilogram of body weight
mL/kg/hr milliliters of dose formulation per kilogram of body weight per hour
mg/mL milligrams of test item per milliliter of dose formulation
IV Intravenous
MTD Maximum tolerated dose
DRF Dose range finding The purpose of this study was to assess the toxicity and toxicokinetics of brincidofovir when administered via intravenous (2-hour) infusion to rats 2 times per week for a total of 9 doses over the course of 29 days, and to evaluate the progression or reversibility of brincidofovir effects during a drug-free post-treatment recovery period of 14 days.

The study design incorporates elements of general regulatory guidelines for toxicity studies.

This study was conducted in compliance with the principles of Good Laboratory Practice as set forth in: United States Food and Drug Administration's Good Laboratory Practice Regulations (Part 58 of 21 CFR); and OECD Principles of Good Laboratory Practice (as revised in 1997), ENV/MC/CHEM(98)17

These principles are compatible with Good Laboratory Practice regulations specified by regulatory authorities throughout the European Community, the United States (EPA and FDA), and Japan (MHLW, MAFF and METI), and other countries that are signatories to the OECD Mutual Acceptance of Data Agreement.

This study complied with all appropriate parts of the Animal Welfare Act Regulations: 9 CFR Parts 1 and 2 Final Rules, Federal Register, Volume 54, No. 168, Aug. 31, 1989, pp. 36112-36163 effective Oct. 30, 1989 and 9 CFR Part 3 Animal Welfare Standards; Final Rule, Federal Register, Volume 56, No. 32, Feb. 15, 1991, pp. 6426-6505 effective Mar. 18, 1991.

Pre-clinical studies in two or more species (one rodent, one non-rodent) are recommended by regulatory agencies such as the FDA to support administration in humans. The rat is an animal model commonly utilized in toxicity studies. In addition, a historical data base is available for comparative evaluation.

The test item was administered intravenously up to 2 times per week.

The number of animals in this study was considered to be the minimum necessary for statistical, regulatory and scientific reasons. The purpose of this study was to monitor for toxicity and progression or reversibility of effects of the test item. Historical control data indicate that clinical laboratory data, organ weight data and microscopic examination of tissues vary among individual animals. The number of rats utilized in the conduct of subchronic studies (10 animals/sex/group) is recommended by regulatory guidance documents and was considered the minimum number that would account for the expected variability among animals. To determine progression or reversibility of potential effects of the test item, additional post-treatment (recovery) animals (5 animals/sex/group) were included in the study. Three test item-treated groups receiving low, intermediate and high multiples of the proposed human dose and a negative control group were considered the minimum number of groups necessary to provide a range of effects and allowed for extrapolation of results to humans.

The number of animals selected for toxicokinetic evaluations (3/sex/treated group) was considered the minimum number necessary to provide meaningful data, given the inherent variability in absorption, distribution, metabolism and excretion processes. A control group with 3 animals/sex was necessary to evaluate the absence of the test item.

The doses for this study (0, 1, 4 and 15 mg/kg/dose) were 2, 4, 10 or 15 mg/kg/dose over the course of 2 hours in the maximum tolerated dose (MTD) phase, and a second set of animals were then administered 3 doses of 1 or 15 mg/kg/dose over the course of 2 hours in the dose range finding (DRF) phase over the course of 9 days. The high dose (15 mg/kg) administered on this 2-phase study, was determined to be the maximum feasible dose (MFD) based on hemolysis observed at higher concentrations.

Because the infusion catheter receded or was not usable on the scheduled day of dosing and insufficient time to reposition or repair the line, the following animals were dosed via intravenous injection into the tail vein on Day 29; Animal Nos. 1511 and 1519 were found on Day 28 with receded catheters, and Animal No. 4581 was found on Day 29 with an ulceration near the exteriorization site. These animals were restrained into individual plastic cones for no more than 2.25 hours (15 minutes for dose site preparation activities and 2 hours for dose administration) during this procedure.

TABLE 80

Experimental Outline

| | | | Number of animals | | | | | |
|---|---|---|---|---|---|---|---|---|
| | | Dose | Toxicity study | | Recovery phase | | Satellite study[b] | |
| Group | Treatment | (mg/kg)[a] | Male | Female | Male | Female | Male | Female |
| 1 | Control | 0 | 15 | 15 | 5 | 5 | 3 | 3 |
| 2 | BCV | 1 | 15 | 15 | 5 | 5 | 3 | 3 |
| 3 | BCV | 4 | 15 | 15 | 5 | 5 | 3 | 3 |
| 4 | BCV | 15 | 15 | 15 | 5 | 5 | 3 | 3 |

[a]Doses represent active ingredient.
[b]Toxicokinetic samples were collected on Day 1 and Day 29.

The first day of dosing was defined as Day 1 of the study. Brincidofovir was provided as a white powder and was stored at room temperature. The purity was determined to be 99.8%.

The diluent was a 5% dextrose solution for injection (USP) and was supplied as a clear liquid (96.8% pure). It was stored at room temperature.

2× Sodium Phosphate buffer solution was used as a control. It was prepared from monobasic sodium phosphate (anhydrous), supplied as a white crystalline powder and stored at room temperature (100% pure). The phosphate buffer (control) solution was dissolved in sterile water and pH was adjusted with sodium hydroxide.

Preparation of Dose Formulations

A vehicle solution of 2× sodium phosphate buffer solution (400 mM, pH 8.0±0.04) was prepared by mixing the appropriate amounts of monobasic sodium phosphate solution (400 mM) and dibasic sodium phosphate solution (400 mM). The pH of the solution was adjusted with monobasic sodium phosphate solution (400 mM), when necessary. The solution was filtered through a 0.22 μm Millex®-GP (PES) filter within a laminar flow hood into a sterile vessel.

The vehicle (control item) was stored refrigerated at 2-8° C. Fresh vehicle solution was formulated twice; once prior to Dose 1 and again prior to Dose 4, and each formulation was used within one month of preparation.

A brincidofovir stock of 15 mg/mL was prepared by mixing the appropriate amount of brincidofovir with 2× sodium phosphate buffer solution, sterile water for injection, USP and 1N sodium hydroxide (NaOH). The solution was filtered through a 0.22 μm Millex®-GP filter under a laminar flow hood into a sterile vessel. Brincidofovir stock was prepared once prior to Dose 1 and again prior to Dose 4, and stored refrigerated at 2-8° C.

Dosing formulations were prepared by diluting the appropriate amounts of the brincidofovir stock (15 mg/mL) or stock vehicle (2× sodium phosphate buffer solution) with the appropriate amounts of 5% dextrose for injection, USP, into a sterile vial under a laminar flow hood and inverting 10 times to mix. Fresh dosing formulations were prepared weekly and were stored refrigerated 2-8° C. when not in use.

TABLE 81

Dosing

| Group | Treatment | Dose (mg/kg) | Concentration (mg/mL) | Volume dose (mL/kg/hr) |
|---|---|---|---|---|
| 1 | Control | 0 | 0 | 10 |
| 2 | BCV | 1 | 0.05 | 10 |
| 3 | BCV | 4 | 0.2 | 10 |
| 4 | BCV | 15 | 0.75 | 10 |

Detailed records of brincidofovir usage were maintained. The amount of brincidofovir necessary to prepare the formulations and the amount actually used were determined at each preparation.

Stability

Stability analyses demonstrated that brincidofovir formulations at concentrations bracketing those used in this study (0.05 mg/mL and 2.0 mg/mL) are stable for 24 hours when stored at room temperature, and for 8 days when stored refrigerated at 2 to 8° C. The brincidofovir stock solution of 15.0 mg/mL was stable for 24 hours when stored at room temperature (nominally 20° C.) and for 8, 14 and 28 days when stored at 2 to 8° C.

Confirmation Analysis

Two samples (5 mL each) were taken on the day of preparation from the middle region of each dosing formulation (including control) prepared for each week. One sample was analyzed, in duplicate, for dose confirmation analysis and one sample was retained refrigerated (2 to 8° C.) (Due to initial results outside the study acceptance plan criteria (±10% of nominal), the Group 2 retained samples were re-analyzed for Weeks 1 and 2).

Storage Conditions

All dose formulation samples were stored refrigerated (2 to 8° C.) until analysis or final disposition.

Brincidofovir Administration

Brincidofovir was administered as an intravenous infusion over 2 hours. Animals were treated at constant doses in 20 mL/kg/2 hours.

Infusion Catheter Implantation Procedure

Catheters for infusion were implanted approximately 1-3 weeks prior to dose administration. All animals, including the spares, were surgically implanted with a catheter.

The surgical site was prepared as per Testing Facility's SOP for aseptic, recovery surgical procedures. Animals received analgesics pre-emptively (flunixin meglumine (USP) 2 mg/kg, subcutaneously).

All animals were anesthetized (isoflurane) and shaved in the inguinal and dorsal regions. A small incision was made and the femoral vein isolated. A small incision in the vessel was performed and a sterile catheter was placed into the vessel. The catheter was inserted via the femoral vein and passed retrograde into the inferior vena cava, just caudal to the kidneys. The catheter was secured with sutures and passed subcutaneously so as to exit at the nape of the neck. A small pocket was made at the exteriorization site in which a loop of catheter remained. The inguinal region was closed by sutures.

The animals were placed in jackets and the implanted catheters were attached to pins with capped septum connectors. The catheters were locked with taurolidine citrate locking solution. Each animal received enrofloxacin 5.0 mg/kg intramuscularly on the day of surgery.

Surgical repairs (1 repair per animal limit) to restore catheter patency were performed as necessary, during the pretest period and at the discretion of the Study Director during the on-test period. Analgesics were administered preemptively (flunixin meglumine 2 mg/kg (USP), subcutaneously). Animals undergoing a surgical repair received an appropriate dose of antibiotics (as per the Standard Operating Procedures of the Testing Facility) on the day of surgery.

Catheters were tied off after the completion of dose administration just prior to recovery (a knot was placed in the catheter and the catheter was receded under the skin) and jackets were removed.

Infusion Catheter Maintenance Procedure

Implanted femoral vein catheters were assessed for patency as per Testing Facility's SOP prior to placing animals on study.

Volume Dose (Rate)

20 mL/kg/2 hours (10 mL/kg/hour).

Individual Dose Concentration

The individual animal concentrations were calculated from the most recently recorded scheduled bodyweight.

Frequency and Duration

The test/control item was administered via 2 hours intravenous infusion twice weekly for a total of 9 individual doses over 29 days. Test/control item administration continued through the day prior to terminal necropsy. Recovery animals were held for a 14 day observation period after the last dose.

Dose Site
   Surgically implanted cannula in the femoral vein/vena cava or via peripheral tail vein.
Dosing Procedure
   One to two days prior to dose initiation, the lock solution was withdrawn from each animal's implanted catheter (if possible) and the catheter was flushed with saline before connecting to a tether and infusion dosing set. After connecting the animals' catheters, the animals were infused with sterile saline (0.9% NaCl, USP) at a rate of 0.5 mL/hr by a calibrated Medfusion syringe pump until dose administration on Day 1.
   A saline flush was infused to deliver the test item in the infusion lines and to ensure the delivery of a complete dose (an additional ~0.5 to 1 mL volume, at the same rate as the test item, was administered to flush the catheter line).
   Animals were maintained on saline in between dose administrations. Saline syringes were changed at least every 4 days.
   Animals with an unusable/non-functioning catheter were surgically repaired when possible. If repair was not possible, these animals were dosed via a peripheral tail vein in a restrainer, at the discretion of the Study Director. Animals were placed into individual plastic cones for no more than 2.25 hours (15 minutes for dose site preparation activities and 2 hours for dose administration via tail vein injection).
   On Day 29, Animal Nos. 1511, 1519 and 4581 were administered Dose 9 via peripheral tail vein.
Dosing Accuracy
   The accountability (confirmation of actual dose administered) for each day of infusion was calculated based on the weight of the each syringe predose and postdose, and reviewed for adjustments daily; the data is retained in the study files. Pumps were checked for accuracy prior to dose initiation with saline using the same length of dose at rate as the study, and post dose accountability was used to monitor pump performance throughout the study.
Animals
Strain/Species
   Albino Rats (Outbred) VAF/Plus® CD® (Sprague-Dawley derived) [Crl:CD® (SD)BR]
Number of Animals
   170 Total received (85 males and 85 females); 144 placed on test (72 males and 72 females).
Pretest Period
   The pretest period was approximately 4 weeks. All animals were examined during the pretest period to confirm suitability for study. Pretest procedures were not performed until animals had been allowed to stabilize for 5 days.
Age of the Main Study Animals at Start of Treatment
   Approximately 10 weeks
Weight Range of the Main Study Animals at the Start of Treatment
   Males: 290.6 g to 422.4 g. Females: 203.8 g to 294.7 g
Assignment
   More animals than required for the study were purchased and stabilized. Animals considered unsuitable for the study on the basis of pretest physical examinations and catheter patency were eliminated prior to random selection for group assignment. Animals considered suitable for study were distributed into 4 groups of 18 animals per sex by a computerized random sort program so that body weight means for each group were comparable. Due to pretest ophthalmology findings, several toxicity animals were swapped with satellite animals but remained within the same group. Individual weights of animals placed on test were within ±20% of the mean weight for each sex.

Identification of Animals
   Each rat was implanted with a BMDS IMI-1000 Implantable Radio Frequency Transponder (microchip) programmed with a unique number. This number was cross referenced with an animal number assigned by the Testing Facility; this number plus the study number comprised a unique identification number for each animal. In addition, each cage was provided with a cage card that was color-coded for dose level identification and contained study number and facility-assigned animal number information.
Veterinary Care
   Animals were monitored by the technical staff for any conditions requiring possible veterinary care and treated as necessary. Miscellaneous, non-test item-related veterinarian evaluations for individual animals were reviewed by the study director and are documented in the study file.
   Serial observations performed on the animals from the satellite groups were confined to clinical observations, body weights, ophthalmology and food consumption; these data are not reported.
   Blood samples were obtained for the determination of plasma concentrations of brincidofovir and the brincidofovir metabolite, cidofovir.
   On Days 1 and 29, blood samples were obtained for toxicokinetic determinations at the timepoints shown in the table below:

TABLE 82

Collection times and number of animals

| Intervals | Timepoints | Number of Toxicokinetic Animals |
|---|---|---|
| Day 1 | 2 and 24 hours post initiation of dose administration | 3 animals/sex/group (Group 1) |
| | Predose, 1, 2, 8, 24, and 48 hours post initiation of dose administration | 3 animals/sex/group (Groups 2, 3, 4) |
| Day 29 | 2 and 24 hours post initiation of dose administration | 3 animals/sex/group (Group 1) |
| | Predose, 1, 2, 8, 24, and 48 hours post initiation of dose administration | 3 animals/sex/group (Groups 2, 3, 4) |

Collection Procedures
   Approximately 0.40 mL of whole blood was obtained via the tail vein from each animal at each time point. Animals were not fasted prior to blood collection. Blood was collected into tubes containing $K_2EDTA$ anticoagulant and placed on wet ice in an upright position. Plasma was separated by centrifugation (for 10 minutes at approximately 2000 g, at approximately 2-8° C.). Approximately 0.150 mL of plasma was transferred into a single cryotube appropriately labeled as to study number, animal number, time point, date of sampling and sample type. Remaining plasma was transferred into a second cryotube and retained as a backup sample. Plasma was obtained and frozen at approximately −80±10° C. within approximately 2 hours after collection of each blood sample until analysis. Animals were euthanized ($CO_2$ inhalation) after the final blood collection.
Storage and Disposition of Samples
   All sample tubes were stored frozen (−80±10° C.) and shipped (frozen, on dry ice) to Pyxant Labs, Colorado Springs, Colorado for analysis.
Analysis/Reporting
   Bioanalytical samples were analyzed using a validated liquid chromatographic-triple quadruple mass spectrometric (LC-MS/MS) assay at Pyxant Labs.

Upon receipt of the plasma concentration data, noncompartmental toxicokinetic analysis was performed by Nuventra, Inc. Durham, North Carolina.

Daily Observations

Animals were observed in their cages twice daily for mortality and signs of severe toxic or pharmacologic effects. Animals in extremely poor health or in a possible moribund condition were identified for further monitoring and possible euthanasia.

Dosing Observations

Observations were made immediately and 2 hours after the completion of dosing for any signs of poor health or toxic or pharmacologic effects (e.g., abnormalities in general condition, appearance, activity, behavior, respiration, etc.).

Signs

Animals were removed from their cages and examined once pretest and weekly during the study period. Examinations included observations of general condition, skin and fur, eyes, nose, oral cavity, abdomen and external genitalia as well as evaluations of respiration.

Ophthalmoscopic Examination

All animals were examined pretest. All surviving toxicity animals were examined at end of dosing and end of recovery. Only animals which were within normal limits at the pretest examination were placed on test.

Lids, lacrimal apparatus and conjunctiva were examined visually. The cornea, anterior chamber, lens, iris, vitreous humor, retina and optic disc were examined by indirect ophthalmoscopy.

The pupils of each animal were dilated prior to examination using tropicamide ophthalmic solution.

Body Weight

Animals were removed from their cages and weighed twice pretest, on the day prior to each dose during the treatment period and weekly during the recovery period. Terminal, fasted body weights were obtained just prior to the scheduled necropsy intervals. Animals euthanized for welfare reasons were weighed prior to necropsy.

Food Consumption

Food consumption was measured (weighed) weekly, beginning one week prior to treatment.

Clinical Pathology

Blood obtained via the orbital sinus (retrobulbar venous plexus) under light isoflurane anesthesia was used to analyze hematology, coagulation and clinical chemistry parameters for up to 10 toxicity animals/sex/group at the termination of dosing and up to 5 recovery animals/sex/group at the end of recovery. Animals were fasted overnight prior to each blood collection interval.

Urine obtained via a 16-hour overnight collection period was analyzed for up to 10 toxicity animals/sex/group at the termination of dosing and up to 5 recovery animals/sex/group at the end of recovery. Animals were fasted but not water-deprived during the collection period.

Hematology

Blood samples (approximately 0.25 mL) were collected into tubes containing $K_2EDTA$ anticoagulant and analyzed for the following using a Siemens ADVIA 120 Hematology Analyzer: Hemoglobin concentration (HGB); Hematocrit (HCT); Erythrocyte count (RBC); Platelet count (PLT); Mean corpuscular volume (MCV); Mean corpuscular hemoglobin (MCH); Mean corpuscular hemoglobin concentration (MCHC); Red cell distribution width (RDW); Total leukocyte count (WBC); Reticulocyte count (RETIC); Differential leukocyte count (Manual differential leukocyte counts were performed for verification and absolute values were calculated if necessary); Neutrophils (ANEU); Lymphocytes (ALYM); Eosinophils (AEOS); Basophils (ABASO); Monocytes (AMONO); and Large unstained cells (ALUC).

A peripheral blood smear was prepared for each animal at each blood collection interval and was available for confirmation of automated results and/or other evaluations deemed necessary.

Coagulation

Blood samples (approximately 1.0 mL) were collected into tubes containing sodium citrate anticoagulant and analyzed for the following using a Diagnostica Stago Products STA Compact® mechanical clot detection system: Prothrombin time (PT): and Activated partial thromboplastin time (APTT).

Clinical Chemistry

Blood samples (approximately 1.0 mL) were collected into tubes with no anticoagulant, allowed to clot, centrifuged to obtain serum and analyzed for the following using a Siemens ADVIA 1800 Chemistry Analyzer:

Aspartate aminotransferase (AST) (Kinetic—Modified Bergmeyer); Alanine aminotransferase (ALT) (Kinetic—Modified Bergmeyer); Alkaline phosphatase (ALKP) (Kinetic—Tietz AMP Buffer); Blood urea nitrogen (BUN) (Enzymatic—Roch-Ramek with Urease); Creatinine (CREAT) (Jaffe Picric Acid in Alkaline Medium); Glucose (GLU) (Glucose Hexokinase II Method); Cholesterol (CHOL) (Enzymatic esterase/oxidase—Trinder Endpoint); Triglycerides (TRIG) (Fossati Three Step Enzymatic—Trinder Endpoint); Total protein (TP) (Biuret Technique); Albumin (ALB) (Bromocresol Green Method); Total bilirubin (TBILI) (Oxidation with Vandate); Sodium ($NA^+$) (Ion Selective Electrode) Potassium ($K^+$) (Ion Selective Electrode); Chloride ($Cl^-$) (Ion Selective Electrode); Calcium ($Ca^{++}$) (Michaylova & Ilkova, Arsenazo III); and Inorganic phosphorus (PHOS) (Phosphomolybdate—UV Method)

Urinalysis

Urine was collected into ice-chilled containers overnight (approximately 16 hours) from toxicity study animals housed in metabolism cages.

Urine samples were analyzed for the following using Multistix reagent strips, interpreted using a Siemens Clinitek Advantus: pH; Protein (PRO); Glucose (GLU); Ketones (KET); Bilirubin (BIL); and Occult blood (BLD).

The samples were also analyzed for the following using manual methods:

Appearance (APP); Specific gravity (Sp.G.) (Clinical Refractometer, Atago Uricon-1V); Volume (VOL).

Postmortem

Method of Euthanasia

Animals sacrificed for welfare reasons or at the scheduled sacrifice intervals were euthanized by exsanguination following isoflurane inhalation. Toxicokinetic animals were euthanized via $CO_2$ inhalation.

Scheduled Necropsy

Necropsy was performed on up to 10 toxicity study animals/sex/group after animals had been treated for 29 days and on up to 5 toxicity study animals/sex/group after a 14 day treatment-free recovery period. Animals were fasted overnight prior to necropsy. Necropsy schedules were established to ensure that examination of animals of both sexes from each group were performed at similar times of the day throughout the necropsy periods.

Toxicokinetic animals were euthanized following the final blood collection on Day 29 and discarded without examination.

Macroscopic Examinations

Complete macroscopic examinations were performed on all animals. The macroscopic examination included examination of the external surface and all orifices; the external surfaces of the brain and spinal cord; the organs and tissues of the cranial, thoracic, abdominal and pelvic cavities and neck; and the remainder of the carcass for the presence of macroscopic morphologic abnormalities.

A macroscopic examination was performed for TK Animal No. 4107, which was sacrificed for welfare reasons, tissues were preserved but not examined microscopically.

Organ Weights

Organs indicated below were weighed for all surviving toxicity and recovery study animals at the scheduled sacrifice intervals. Prior to weighing, the organs were carefully dissected and properly trimmed to remove adipose and other contiguous tissues in a uniform manner. Organs were weighed as soon as possible after dissection in order to avoid drying. Paired organs were weighed together.

Tissues Preserved and Examined Histopathologically

The tissues listed below were obtained from all animals and preserved. In addition, slides of the indicated tissues were prepared and examined microscopically. Any abnormalities not noted during macroscopic examinations which were seen during histology processing were recorded.

TABLE 83

Tissues weighed, preserved and examined microscopically

| ORGAN NAME | WEIGHED | PRE-SERVED | EXAMINED MICRO-SCOPICALLY |
|---|---|---|---|
| animal identity | | X | |
| adrenal glands | X | X | X |
| aorta (thoracic) | | X | X |
| bone marrow smear (femur) | | X | |
| bone and marrow (femur with joint) | | X | X |
| bone and marrow (sternum) | | X | X[a] |
| brain (medulla, pons, cerebrum and cerebellum) | X | X | X |
| epididymides | X | X | X |
| esophagus | | X | X |
| eyes | | X | X |
| Harderian gland | | X | X |
| heart | X | X | X |
| infusion site | | X | X |
| kidneys | X | X | X |
| lacrimal glands | | X | X |
| large intestine (cecum, colon, rectum) | | X | X[b] |
| liver | X | X | X |
| lungs (with mainstem bronchi) | | X | X |
| lymph nodes (axillary, mesenteric) | | X | X |
| mammary gland (inguinal) | | X | X[c] |
| nerve (sciatic) | | X | X |
| optic nerve | | X | |
| ovaries | X | X | X |
| pancreas | | X | X |
| pituitary gland | X[d] | X | X |
| prostate gland | X[e] | X | X |
| salivary glands (mandibular) | | X | X |
| seminal vesicles | X[e] | X | X |
| skeletal muscle {rectus femoris} | | X | X |
| skin (dorsal - base of tail) | | X | X |

TABLE 83-continued

Tissues weighed, preserved and examined microscopically

| ORGAN NAME | WEIGHED | PRE-SERVED | EXAMINED MICRO-SCOPICALLY |
|---|---|---|---|
| small intestine (duodenum, ileum, jejunum, Peyer's patches\GALT) | | X | X[c] |
| spinal cord (cervical, thoracic, lumbar) | | X | X |
| spleen | X | X | X |
| stomach | | X | X |
| testes | X | X | X |
| thymus | X | X | X |
| thyroid/parathyroid glands | X[d] | X | X |
| tongue | | X | |
| trachea | | X | X |
| urinary bladder | | X | X |
| uterus (body/horns) with cervix | X | X | X |
| vagina | | X | X |
| Zymbal's gland | | X | |
| tissues with macroscopic findings including tissue masses | | X | X |

[a]Qualitative examination (no differential count).
[b]Rectum was not examined microscopically.
[c]Mammary gland for males and GALT were evaluated only if present in routine sections.
[d]Weighed post-fixation.
[e]Prostate and seminal vesicles were weighed together.

Preservatives

All tissues were preserved in 10% neutral buffered formalin (NBF). The eyes and testes were placed in Modified Davidson's solution initially and then retained in 10% NBF. Lungs were infused with 10% NBF prior to their immersion into a larger volume of the same fixative. Smear preparations of the marrow from the femur were air dried and fixed in absolute methanol.

Processing

After fixation, the tissues and organs from all animals were routinely processed, embedded in paraffin, cut at a microtome setting of 4-7 microns, mounted on glass slides, stained with hematoxylin and eosin and examined by light microscopy. The bones were decalcified in Decalcifier II™.

The data collection system used for collecting the in-life and post-life data divides the study into phases. The start of each phase begins with Day 1/Week 1. The phases presented in this report are:

Pre-Treatment: Begins the day the animals arrive. Phase days/weeks are labeled P1, P2, P3, etc. During this phase, animals are not being dosed and they have not been assigned their permanent identification numbers.

Randomization: Begins the day the animals are sorted into groups and assigned their permanent identification numbers. Phase days/weeks are labeled Ra1, Ra2, Ra3, etc. Animals are not being dosed during this phase.

Treatment: Begins for each animal when it receives its first administration of test/control item as specified in the study plan.

Recovery: Begins the day after each designated animal stops receiving its specified dose and continues until study completion. Phase days/weeks are labeled R1, R2, R3, etc.

The death codes used have the following meanings:

"FD": Found dead; "S1": Scheduled euthanasia 1; "WE": euthanized for welfare reasons; "Z1": Recovery euthanasia 1.

Clinical Observations

Clinical observations are presented for each animal that showed signs, providing detail of the type of sign, day or week of occurrence and information on the duration of the sign applicable. "AM": Morning Observation; "PM": Afternoon Observation; "Unsched": Unscheduled Observation; "Post Dose": Immediately After Completion of Dosing; "2 Hr PD": 2 Hours After Completion of Dosing.

Ophthalmic Examination

Observations are presented for each animal that showed findings. Observations were bilateral unless otherwise indicated.

Food Consumption

Food consumption (g/day) was calculated as:

grams of food consumed÷#days

Food consumption (g/animal/day) was calculated as:

grams of food consumed÷animal days$^a$ $^a$Sum of whole days each animal is alive in the cage for each consumption period. If an animal dies the day of death is not counted as an animal day. For example: 4 animals in a cage for 5 days equals 20 animal days; if one animal died on the $3^{rd}$ day then the animal days equals 1

Hematology

The following abbreviations were used: "ACMO": Automated count invalidated by manual observations; "CS": Clotted specimen; "NSAD": No sample animal died.

Sample comments (SCM1) were described using the following abbreviations: "CLSE": Severe platelet clumping noted; "CLSL": Slight platelet clumping noted; "NCLP": No clumping.

Coagulation

The following abbreviations were used: "CS": Clotted specimen; "NS": No specimen; "NSAD": No sample animal dead; "NVIR": Not valid due to irreproducible result.

Sample comments (SCM1) were described using the following abbreviations: "SLH": Slightly hemolyzed.

Blood Chemistry

BUN values below the analytical limit (<10) are excluded from calculations. TBILI values below the analytical limit (<0.2) are excluded from calculations.

The following abbreviations were used: "NS": No specimen; "NSAD": No sample animal dead; "1+H": Minimal hemolysis.

Globulin (GLOB) was calculated as:

total protein−albumin

Albumin/globulin ratio (A/G) was calculated as:

albumin÷globulin

Urinalysis

Group means are presented for volume, pH, and specific gravity only.

The following other abbreviations were used: "NS": No specimen.

The appearance and color were described using the following abbreviations: "CLOU": Cloudy; "CLR": Clear; "SLCL": Slightly cloudy; "STR": Straw; "YELL": Yellow.

TABLE 84

Qualitative results of Multistix diagnostic reagents are reported according to the following convention:

| | NEG | Negative |
|---|---|---|
| Protein | | |
| | TR | Trace levels detected |
| | 30 | 30 mg/dL |
| | 100 | 100 mg/dL |
| | ≥300 | ≥300 mg/dL |
| Glucose | | |
| | 100 | 100 mg/dL |
| | 250 | 250 mg/dL |
| | 500 | 500 mg/dL |
| | ≥1000 | ≥1000 mg/dL |
| Ketones | | |
| | TR | Trace levels detected |
| | 15 | 15 mg/dL |
| | 40 | 40 mg/dL |
| | ≥80 | ≥80 mg/dL |
| Bilirubin | | |
| | SM | Small amount detected |
| | MOD | Moderate amount detected |
| | LG | Large amount detected |
| Occult Blood | | |
| | TR | Trace levels detected |
| | SM | Small amount detected |
| | MOD | Moderate amount detected |
| | LG | Large amount detected |

Organ Weights

Organ weights were presented as absolute, relative to terminal body weight using the weight recorded on the day of necropsy and relative to brain weight.

Pathology

Unless otherwise specified in a histopathology note, the organ/tissue examined was the required (routine) section.

The following abbreviations were used: "B-": Benign; "Cath": Catheter; "GALT": Gut-associated lymphoid tissue; "Infuse": Infusion; "LS": Longitudinal; "M-": Malignant; "TS": Transverse.

Histopathology findings were graded according to the following scale:

| | |
|---|---|
| Minimal | The change is barely discernible and/or very few/very small foci or areas are affected. |
| Slight | The change is more noticeable but only evident as few/small foci or areas affected. |
| Moderate | The change is obviously present, and of appreciable size and/or number. |
| Marked | The change is abundant in many areas of the section and/or is of prominent size. |
| Severe | The change affects a large proportion of the tissue and/or is of a large size. |

All statistical analyses were carried out separately for males and females using the individual animal as the basic experimental unit.

The following data types were analyzed at each timepoint separately: body weight; body weight change from interval to interval; food consumption; hematology; coagulation; clinical chemistry; urinalysis; and organ weights.

The parameters to analyze were identified as continuous, discrete or binary. Test-item treated groups were then compared to the control using the following procedures.

Study Plan Deviations

The following study plan deviations occurred during the study, but without wishing to be bound by theory, were not considered to have compromised the validity or integrity of the study.

On Day 1, the processed 8 hour post-dose toxicokinetic samples for Groups 2 to 4 were left on dry ice overnight. Samples were found frozen the following morning. However, the required temperature (−80° C. (±10° C.)) was not monitored overnight. Samples were immediately transferred to freezer SL301 at nominal −80° C. (±10° C.).

On Pretest Day 13, Animal No. 1015 did not have surgery performed due to significantly low body weight.

On Day 13, viability checks were not performed on the spare animals. However, animals were within normal limits the day prior to and the day after Day 13.

Surgical repairs for Animal Nos. 1592 (Day 21) and 4078 (Day 10) were not acknowledged by the Study Director until 7 and 2 days after repair, respectively.

On Day 29, low blood volumes were collected for toxicokinetic samples from Animal Nos. 2036 (8 hour post dose timepoint) and 3050 (2 hour post dose timepoint) because the animals were "difficult to bleed" and "slow to bleed", respectively.

The pituitary gland tissue for Animal No. 4074 was collected at the recovery necropsy, but was later found to be missing at the post-fix trimming; a weight was not obtained.

On Day 29, the immediate post-dose observation was not performed on Animal No. 4580.

On Day 1, the 24 hour toxicokinetic samples for Animal Nos. 1016 and 2036 were processed 1 minute over the "within the 2 hours" specified in the study plan.

At the terminal necropsy, the collection site for clinical pathology samples was not documented for Animal No. 1004.

On Day 23, toxicokinetic Animal No. 4107 was transferred to necropsy due to welfare reasons, however, the animal was no documented on the appropriate records but examination was performed.

Spare Animal No. 1015 was euthanized rather than transferred to the in-house colony as per study plan.

There is no documentation present on the surgery records documenting the catheterized animals were individually housed post-surgery.

On Day 19, the dose infusion time was interrupted for 14 minutes for female TK Animal No. 1528 due to changing of vehicle syringes.

Between Days 4 and 12, the saline syringe change was not documented on the Saline and Injection Cap Change Record for the toxicokinetic animals.

On Day 29, toxicokinetic samples were collected from only 2 males, not 3 males/group/time-point in Group 4, due to the euthanasia of the male Animal No. 4107 for welfare reasons on Day 23.

On Days 29, the following sample was collected more than ±3 minutes (the time permitted per SOP) after the indicated time point:

| Animal Number | Day/Interval | Scheduled Time | Actual Time | Deviation in Minutes |
|---|---|---|---|---|
| 2029 | 29-1 hr | 10:59 | 11:04 | 2 |

Various tissues were noted missing at the time of trimming or microscopic examination for various animals and necropsy intervals.

Due to the timing of the validation study, it was anticipated that stability might not have been established before the first day of dosing, therefore the formulation preparation was changed to daily preparations rather than weekly as per original study plan. The Day 1 dose formulation was prepared on the day before dosing thereby deviating from the study plan in place at that time. Once stability was established, formulation preparation was changed back to weekly preparations.

Some dose intervals had inconsistencies in the dose accountability, resulting in deviations from the study plan in that animals received more or less than the intended dose (Table 84A). These may or may not have resulted in out of range dose accountability criteria which are ±10.0%.

TABLE 84A

Samples with inconsistencies in dose accountability.

| Animal Number | Dose No. | Infusion Rate (ml/hr) | Theoretical Volume (ml) | Actual Volume (ml) | Percent Difference (%) | Code |
|---|---|---|---|---|---|---|
| *3566 | Dose 1 | 2.51 | 5.05 | 5.00 | −0.40 | A |
| 4061 | Dose 8 | 4.08 | 8.16 | 9.76 | 19.61 | B |
| 3046 | Dose 5 | 4.04 | 8.08 | 10.25 | 26.86 | B |
| 3551 | Dose 5 | 2.47 | 4.94 | 4.99 | 1.01 | A |
| 2037 | Dose 6 | 3.55 | 7.10 | 8.21 | 15.63 | B |
| 2030 | Dose 6 | 4.04 | 8.08 | 7.21 | −10.77 | B |
| 1511 | Dose 9 | 2.67 | 5.34 | 1.07 | −79.96 | C |
| 1519 | Dose 9 | 2.79 | 5.58 | 6.22 | 11.47 | B |
| 4063 | Dose 9 | 4.00 | 8.00 | 10.96 | 37.00 | B |

*TK animal

A = Catheter found leaking for an indeterminable amount of time

B = No apparent reason

C = Tail vein catheter difficulties; dosing stopped due to welfare reasons

On one occasion for some animals dosing was interrupted or pump settings needed to be adjusted affecting the accountability documentation. However, variations were less than 10% deviation from desired dose. Additionally, Animal No. 1017 (TK) did not receive the last 2 minutes of saline catheter flush.

On the day of terminal necropsy, Animal Nos. 1010, 3047, 3048, 3049, 3057, 2538, 2539 and 2594 were given feed for welfare reasons after being fasted close to 26 hours.

Analytical Chemistry

Analysis of preliminary mixes confirmed that the test item was stable in the vehicle for at least 24 hours at room temperature (nominally 20° C.) and for at least 8 days at 2 to 8° C. (under storage conditions used in this study). Analyses conducted during the treatment period confirmed that with the exception of the Day 1, 1 mg/mL (Group 2) formulation, dose solutions of appropriate concentration were administered. The Day 1, 1 mg/mL dose solution was 86.7% of nominal. Without wishing to be bound by theory, it was concluded that due to interactions at the meniscus, the volume collected for dose formulation analysis may have lowered the analysis results. The volume collected for analysis was increased for subsequent weekly preparations and confirmed to be of appropriate concentration.

TABLE 85

Mean analytical concentrations Day 1

| GROUP | NOMINAL CONCENTRATION (ppm) OR (mg/mL) | ANALYTICAL CONCENTRATION (% of Nominal) |
|---|---|---|
| 2 | 1 | 86.7 |
| 2 Back-up | 1 | 76.9 |
| 2 Repeat Preparation | 1 | 75.5 |
| 3 | 4 | 95.7 |
| 4 | 15 | 100.7 |

TABLE 86

Mean analytical concentrations Week 2

| GROUP | NOMINAL CONCENTRATION (ppm) OR (mg/mL) | ANALYTICAL CONCENTRATION (% of Nominal) |
|---|---|---|
| 2 | 1 | 90.1 |
| 2 Back-up | 1 | 86.8 |
| 3 | 4 | 95.4 |
| 4 | 15 | 102.9 |

TABLE 87

Mean analytical concentrations Week 3

| GROUP | NOMINAL CONCENTRATION (ppm) OR (mg/mL) | ANALYTICAL CONCENTRATION (% of Nominal) |
|---|---|---|
| 2 | 1 | 93.2 |
| 3 | 4 | 94.8 |
| 4 | 15 | 100.2 |

TABLE 88

Mean analytical concentrations Week 4

| GROUP | NOMINAL CONCENTRATION (ppm) OR (mg/mL) | ANALYTICAL CONCENTRATION (% of Nominal) |
|---|---|---|
| 2 | 1 | 92.8 |
| 3 | 4 | 96.9 |
| 4 | 15 | 101.0 |

TABLE 89

Mean analytical concentrations Week 5

| GROUP | NOMINAL CONCENTRATION (ppm) OR (mg/mL) | ANALYTICAL CONCENTRATION (% of Nominal) |
|---|---|---|
| 2 | 1 | 94.9 |
| 3 | 4 | 97.7 |
| 4 | 15 | 101.1 |

Brincidofovir

In the brincidofovir-treated animals on Day 1 peak plasma concentrations of brincidofovir occurred at 1 to 2 hours post start of infusion with mean concentrations ranging from 215 ng/mL to 3670 ng/mL for doses ranging from 1 to 15 mg/kg. Plasma concentrations of brincidofovir remained quantifiable at the 8-hour time point for the 4 and 15 mg/kg dose groups, but only through the 2-hour time point for the 1 mg/kg dose group. Plasma concentrations of brincidofovir increased as the dose increased from 1 to 15 mg/kg on Day 1.

TABLE 90

Summary of combined male and female plasma brincidofovir toxicokinetic parameters by treatment on Day 1 in rats (TK parameter population)

| Treatment | Statistic | $C_{max}$ (ng/mL) | $C_{max}$/Dose (kg*ng/mL/mg) | $T_{max}$ (hr) | $C_{last}$ (ng/mL) | $T_{last}$ (hr) | $AUC_{last}$ (hr*ng/mL) | $AUC_{last}$/Dose ((hr*ng/mL)/(mg/kg)) |
|---|---|---|---|---|---|---|---|---|
| 1 mg/kg | N | 6 | 6 | 6 | 6 | 6 | 6 | 6 |
|  | Mean | 219 | 219 | NC | 209 | NC | 319 | 319 |
|  | SD | 39.8 | 39.8 | NC | 39.5 | NC | 58.4 | 58.4 |
|  | CV % | 18.2 | 18.2 | NC | 18.9 | NC | 18.3 | 18.3 |
|  | Min | 171 | 171 | 1.00 | 157 | 2.00 | 249 | 249 |
|  | Median | 210 | 210 | 1.00 | 206 | 2.00 | 305 | 305 |
|  | Max | 271 | 271 | 2.00 | 271 | 2.00 | 398 | 398 |
| 4 mg/kg | N | 6 | 6 | 6 | 6 | 6 | 6 | 6 |
|  | Mean | 1010 | 252 | NC | 2.20 | NC | 2215 | 554 |
|  | SD | 159 | 39.8 | NC | 0.819 | NC | 717 | 179 |
|  | CV % | 15.8 | 15.8 | NC | 37.2 | NC | 32.3 | 32.3 |
|  | Min | 825 | 206 | 1.00 | 1.26 | 8.00 | 1340 | 335 |
|  | Median | 1000 | 250 | 2.00 | 2.31 | 8.00 | 2317 | 579 |
|  | Max | 1220 | 305 | 2.00 | 3.38 | 8.00 | 3056 | 764 |
| 15 mg/kg | N | 6 | 6 | 6 | 6 | 6 | 6 | 6 |
|  | Mean | 3800 | 254 | NC | 9.68 | NC | 8815 | 588 |
|  | SD | 565 | 37.7 | NC | 3.56 | NC | 1260 | 83.8 |
|  | CV % | 14.9 | 14.9 | NC | 36.7 | NC | 14.3 | 14.3 |
|  | Min | 2950 | 197 | 1.00 | 5.06 | 8.00 | 7368 | 491 |
|  | Median | 3760 | 251 | 1.00 | 10.3 | 8.00 | 8777 | 585 |
|  | Max | 4460 | 297 | 2.00 | 13.6 | 8.00 | 10565 | 704 |

NC = Not calculated; For the 1 mg/kg dose group, $AUC_{last}$ values were calculated using only 2 quantifiable data points.

In the Day 29 brincidofovir-treated animals, peak plasma concentrations of brincidofovir occurred at 1 to 2 hours post start of infusion with mean concentrations ranging 297 ng/mL to 4500 ng/mL for doses ranging from 1 to 15 mg/kg. Plasma concentrations of brincidofovir remained quantifiable at the 8 hour time point for the 4 and 15 mg/kg dose groups and for 1 of 6 animals in the 1 mg/kg dose group. For the 1 mg/kg dose group, plasma concentrations were quantifiable at the 2-hour time point for all animals. For the majority of the animals, there were no quantifiable concentrations at the 24 or 48-hour time points at any dose administered; exclusive of one animal in the 4 mg/kg dose group that showed measurable concentrations out to 48 hours. Plasma concentrations of brincidofovir increased as the dose increased from 1 to 15 mg/kg on Day 29.

TABLE 91

Summary of combined male and female plasma brincidofovir toxicokinetic parameters by treatment on Day 29 in rats (TK parameter population)

| Treatment | Statistic | $C_{max}$ (ng/mL) | $C_{max}$/Dose (kg*ng/mL/mg) | $T_{max}$ (hr) | $C_{last}$ (ng/mL) | $T_{last}$ (hr) | $AUC_{last}$ (hr*ng/mL) | $AUC_{last}$/Dose ((hr*ng/mL)/(mg/kg)) |
|---|---|---|---|---|---|---|---|---|
| 1 mg/kg | N | 6 | 6 | 6 | 6 | 6 | 6 | 6 |
| | Mean | 298 | 298 | NC | 126 | NC | 410 | 410 |
| | SD | 130 | 130 | NC | 88.2 | NC | 190 | 190 |
| | CV % | 43.7 | 43.7 | NC | 69.9 | NC | 46.4 | 46.4 |
| | Min | 52.6 | 52.6 | 1.00 | 1.12 | 2.00 | 73.9 | 73.9 |
| | Median | 324 | 324 | 1.00 | 144 | 2.00 | 434 | 434 |
| | Max | 421 | 421 | 2.00 | 229 | 8.00 | 653 | 653 |
| 4 mg/kg | N | 6 | 6 | 6 | 6 | 6 | 6 | 6 |
| | Mean | 1200 | 301 | NC | 2.06 | NC | 2759 | 690 |
| | SD | 297 | 74.3 | NC | 0.519 | NC | 851 | 213 |
| | CV % | 24.7 | 24.7 | NC | 25.2 | NC | 30.8 | 30.8 |
| | Min | 935 | 234 | 1.00 | 1.38 | 8.00 | 2119 | 530 |
| | Median | 1160 | 290 | 1.00 | 2.14 | 8.00 | 2549 | 637 |
| | Max | 1700 | 425 | 2.00 | 2.67 | 48.00 | 4415 | 1104 |
| 15 mg/kg | N | 5 | 5 | 5 | 5 | 5 | 5 | 5 |
| | Mean | 4500 | 300 | NC | 10.9 | NC | 9893 | 660 |
| | SD | 742 | 49.5 | NC | 4.14 | NC | 1840 | 122 |
| | CV % | 16.5 | 16.5 | NC | 37.9 | NC | 18.6 | 18.6 |
| | Min | 3550 | 237 | 1.00 | 7.75 | 8.00 | 8001 | 533 |
| | Median | 4460 | 297 | 1.00 | 8.90 | 8.00 | 9528 | 635 |
| | Max | 5600 | 373 | 1.00 | 18.0 | 8.00 | 12928 | 862 |

NC = Not calculated; For the 1 mg/kg dose group, $AUC_{last}$ values were calculated using only 2 quantifiable data points.

Brincidofovir Metabolite Cidofovir In the brincidofovir-treated animals on Day 1, individual plasma concentrations of the metabolite CDV were generally not quantifiable with the first sample collected after initiation of dosing (1-hour post-start of the infusion) in the 1 mg/kg (0 of 6 rats) and 4 mg/kg (1 of 6 rats) dose groups. However, individual plasma concentrations of CDV were quantifiable at the 1-hour sample collection time point in 5 of 6 rats in the 15 mg/kg dose group.

On Day 29, individual plasma concentrations of the metabolite CDV were generally not quantifiable with the first sample collected after initiation of dosing (1-hour post-start of the infusion) in the 1 mg/kg (1 of 6 rats) dose group. However, individual plasma concentrations of CDV were quantifiable at the 1-hour sample collection time point in 4 of 6 rats in the 4 mg/kg and 5 of 5 rats in the 15 mg/kg dose group.

Plasma concentrations of CDV generally remained quantifiable at the 24-hour time point for the 4 mg/kg dosed animals, and at the 48-hour time point for the 15 mg/kg dosed animals, but only through the 8-hour time point for the 1 mg/kg dose group. Plasma concentrations of CDV generally increased as the brincidofovir dose increased from 1 to 15 mg/kg.

TABLE 92

Summary of combined male and female plasma CDV toxicokinetic parameters by treatment on Day 1 in rats (TK parameter population)

| Treatment | Statistic | $C_{max}$ (ng/mL) | $T_{max}$ (hr) | $C_{last}$ (ng/mL) | $T_{last}$ (hr) | $T_{lag}$ (hr) | $AUC_{last}$ (hr*ng/mL) |
|---|---|---|---|---|---|---|---|
| 1 mg/kg | N | 6 | 5 | 5 | 5 | 5 | 6 |
| | Mean | 5.64 | NC | 5.66 | NC | NC | 27.3 |
| | SD | 2.96 | NC | 0.486 | NC | NC | 20.2 |
| | CV % | 52.4 | NC | 8.6 | NC | NC | 74.1 |
| | Min | 0 | 2.00 | 5.01 | 2.00 | 1.00 | 0 |
| | Median | 6.06 | 2.00 | 5.87 | 8.00 | 1.00 | 37.8 |
| | Max | 8.60 | 8.00 | 6.18 | 8.00 | 1.00 | 45.2 |
| 4 mg/kg | N | 6 | 6 | 6 | 6 | 6 | 6 |
| | Mean | 18.0 | NC | 7.69 | NC | NC | 280 |
| | SD | 5.85 | NC | 1.12 | NC | NC | 68.7 |
| | CV % | 32.5 | NC | 14.5 | NC | NC | 24.5 |
| | Min | 11.2 | 2.00 | 6.52 | 24.00 | 0 | 204 |
| | Median | 16.7 | 8.00 | 7.54 | 24.00 | 1.00 | 258 |
| | Max | 27.8 | 8.00 | 9.62 | 24.00 | 1.00 | 394 |
| 15 mg/kg | N | 6 | 6 | 6 | 6 | 6 | 6 |
| | Mean | 32.1 | NC | 7.29 | NC | NC | 825 |
| | SD | 7.86 | NC | 1.32 | NC | NC | 122 |
| | CV % | 24.5 | NC | 18.0 | NC | NC | 14.8 |

TABLE 92-continued

Summary of combined male and female plasma CDV toxicokinetic parameters by treatment on Day 1 in rats (TK parameter population)

| Treatment | Statistic | $C_{max}$ (ng/mL) | $T_{max}$ (hr) | $C_{last}$ (ng/mL) | $T_{last}$ (hr) | $T_{lag}$ (hr) | $AUC_{last}$ (hr*ng/mL) |
|---|---|---|---|---|---|---|---|
| | Min | 23.5 | 8.00 | 5.53 | 48.00 | 0 | 699 |
| | Median | 33.0 | 8.00 | 7.42 | 48.00 | 0 | 817 |
| | Max | 39.6 | 8.00 | 9.18 | 48.00 | 1.00 | 973 |

NC = Not calculated; For the 1 mg/kg dose group, $AUC_{last}$ values were calculated using only 2 quantifiable data points.

TABLE 93

Summary of combined male and female plasma CDV toxicokinetic parameters by treatment on Day 29 in rats (TK parameter population)

| Treatment | Statistic | $C_{max}$ (ng/mL) | $T_{max}$ (hr) | $C_{last}$ (ng/mL) | $T_{last}$ (hr) | $T_{lag}$ (hr) | $AUC_{last}$ (hr*ng/mL) |
|---|---|---|---|---|---|---|---|
| 1 mg/kg | N | 6 | 5 | 5 | 5 | 5 | 6 |
| | Mean | 7.81 | NC | 8.31 | NC | NC | 38.6 |
| | SD | 4.18 | NC | 1.90 | NC | NC | 28.9 |
| | CV % | 53.5 | NC | 22.9 | NC | NC | 75.0 |
| | Min | 0 | 2.00 | 5.24 | 2.00 | 0 | 0 |
| | Median | 8.41 | 2.00 | 8.61 | 8.00 | 1.00 | 43.0 |
| | Max | 12.5 | 8.00 | 10.4 | 8.00 | 1.00 | 74.8 |
| 4 mg/kg | N | 6 | 6 | 6 | 6 | 6 | 6 |
| | Mean | 20.4 | NC | 8.76 | NC | NC | 399 |
| | SD | 9.41 | NC | 1.69 | NC | NC | 248 |
| | CV % | 46.2 | NC | 19.3 | NC | NC | 62.3 |
| | Min | 10.6 | 8.00 | 6.47 | 24.00 | 0 | 195 |
| | Median | 20.0 | 8.00 | 8.92 | 24.00 | 0 | 347 |
| | Max | 37.3 | 8.00 | 10.7 | 48.00 | 1.00 | 883 |
| 15 mg/kg | N | 5 | 5 | 5 | 5 | 5 | 5 |
| | Mean | 41.3 | NC | 8.05 | NC | NC | 1068 |
| | SD | 16.0 | NC | 1.04 | NC | NC | 327 |
| | CV % | 38.8 | NC | 13.0 | NC | NC | 30.6 |
| | Min | 23.6 | 2.00 | 6.99 | 48.00 | 0 | 732 |
| | Median | 44.0 | 8.00 | 7.81 | 48.00 | 0 | 1117 |
| | Max | 60.9 | 8.00 | 9.40 | 48.00 | 0 | 1473 |

NC = Not calculated; For the 1 mg/kg dose group, $AUC_{last}$ values were calculated using only 2 quantifiable data points.
N = 5 in for the 15 mg/kg dose group because animal 4107 was euthanized prior to the collection of TK samples on Day 29.

Mortality
Dosing Phase

There were three unscheduled deaths on the study; none of which were considered to be brincidofovir-related. The causes of death in two animals (Tox Animal Nos. 2595 and 1005) were determined not to be brincidofovir-related. The cause of death in the third animal (TK Animal No. 4107) could not be determined.

Animal No. 2595 (toxicity female at 1 mg/kg/dose) was euthanized for welfare reasons on Day 23 because of a swollen cranium which was likely related to accidental trauma. Dark areas on the cranium observed macroscopically correlated microscopically with multifocal hemorrhage. On Day 23, this rat was abnormally cold to touch and displayed decreased activity and abnormal (labored and irregular) breathing.

Animal No. 4107 (toxicokinetics male at 15 mg/kg/dose) was euthanized for welfare reasons on Day 23. On Day 23, this rat was abnormally cold to touch and exhibited decreased activity, partially closed eyelids and dull eyes, and irregular breathing. Enlarged liver and spleen, and correct catheter tip placement were noted at gross necropsy. The cause of death could not be determined from macroscopic data and microscopic evaluations were not conducted to further determine cause of death.

Animal No. 1005 (toxicity male control) was found dead on Day 27. On Day 27, this animal had decreased activity and a red aqueous nasal discharge. Macroscopic and microscopic findings were consistent with bacterial infection that originated at the catheter site and disseminated to multiple other organs.

Recovery Phase

There was no brincidofovir-related mortality.

Clinical Observations
Dosing Phase

Administration of brincidofovir at 4 and 15 mg/kg/dose resulted in intermittent clinical signs in some animals (both sexes). The intermittent clinical signs consisted of rapid breathing and hunched posture with and without piloerection, partially closed eyes, decreased activity, irregular breathing, and/or flattened posture. Manual differential leukocyte counts were performed for verification and absolute values were calculated if necessary, these signs were generally seen following infusion between Days 22 and 29 and were dose-related in incidence.

Recovery Phase

All clinical signs observed during the treatment phase completely recovered by the first day of the recovery period. There were no brincidofovir-related clinical signs during the recovery phase.

Ophthalmology

There were no brincidofovir-related effects on ophthalmology at the end of dosing recovery phases.

Body Weights

There were no brincidofovir-related effects on body weight or body weight change.

Food Consumption
Dosing Phase

There were minimal, statistically significant brincidofovir-related decreases in food consumption in males administered ≥1 mg/kg/dose on Weeks 1, 2, 3 and/or 4 (to −16% concurrent controls on Week 4), and in females administered 15 mg/kg/dose on Weeks 3 and 4 (to −9.8% concurrent controls on Week 3). The decreases in food consumption had no effect on body weight or body weight gain.

Recovery Phase

The brincidofovir-related decreases in food consumption observed during the treatment phase were fully reversible as there were no brincidofovir-related effects on food consumption in any animals during the recovery period.

Clinical Pathology
Hematology: Dosing Phase

There were no test item-related hematology changes.

Without wishing to be bound by theory, all hematologic abnormalities were considered to be related to the infusion procedure and exhibited no distinct dose-related trends. These included minimal to slight decreases in red cell mass (hemoglobin, hematocrit and red blood cells) accompanied by increases in reticulocytes, increases in platelet counts, and increases in neutrophil and/or monocyte counts. These findings were considered to reflect an appropriate hematopoietic and immune response to catheter vein infection, inflammation, and increased blood loss or destruction.

Hematology: Recovery Phase

There were no test item-related hematology findings after a 14-day recovery.

Coagulation: Dosing Phase

There were no test item-related effects on coagulation times.

Without wishing to be bound by theory, all differences from controls, statistically significant or otherwise, were not considered to be test item-related due to their direction, small magnitude, infrequent occurrence, lack of relation to dose, lack of concordance between related analytes, and/or because values were comparable to the study control range.

Coagulation: Recovery Phase

After a 14-day recovery, all values were comparable to controls.

Clinical Chemistry

Dosing Phase

There were no test item-related clinical chemistry changes.

Without wishing to be bound by theory, all abnormalities were considered to be related to the infusion procedure and exhibited no distinct dose-related trends. These included minimal to moderate increases in aspartate aminotransferase (AST), alanine aminotransferase (ALT), alkaline phosphatase (ALKP), blood urea nitrogen (BUN), creatinine, and globulins and decreases in albumin and albumin to globulin ratio. These findings correlated with microscopic evidence of inflammation, necrosis, abscesses, and infarction in the liver, inflammation, abscesses, urothelial hyperplasia, tubular basophilia and eosinophilic tubular globules in the kidneys, and general inflammation in a variety of other tissues.

Recovery Phase

There were no test item-related clinical chemistry findings after a 14-day recovery.

Urinalysis

Dosing Phase

There were no test item-related effects on urinalysis.

All differences from controls, statistically significant or otherwise, were not considered to be test item-related due to their direction, small magnitude, infrequent occurrence, lack of relation to dose, lack of concordance between related analytes, and/or because values were comparable to the study control range.

Recovery Phase

After a 14-day recovery, all values were comparable to controls.

Organ Weights

Brincidofovir-related, minimal to mild, dose-dependent lower testes weights were present in males administered ≥4 mg/kg/dose compared to controls (Table 94). Lower testes weights correlated microscopically with germ cell depletion. The 15 mg/kg/dose males had minimally lower epididymal weights. Without wishing to be bound by theory, however, since there were no correlative microscopic findings, the lower weights were considered incidental and unrelated to the microscopic changes in the testes.

TABLE 94

Brincidofovir-related organ weight changes (% difference relative to controls) in rats dosed twice weekly for a 29 day period

| | Group/sex | | | | | |
|---|---|---|---|---|---|---|
| | 2M | 3M | 4M | 2F | 3F | 4F |
| | Dose (mg/kg/dose) | | | | | |
| | 1 | 4 | 15 | 1 | 4 | 15 |
| Testes | | | | | | |
| Absolute weight (%) | — | $-9^a$ | $-24^a$ | NA | NA | NA |
| vs. body weight (%) | — | $-3$ | $-16^a$ | NA | NA | NA |
| vs. brain weight (%) | — | $-9^a$ | $-22^a$ | NA | NA | NA |

TABLE 94-continued

Brincidofovir-related organ weight changes (% difference relative to controls) in rats dosed twice weekly for a 29 day period

| | Group/sex | | | | | |
|---|---|---|---|---|---|---|
| | 2M | 3M | 4M | 2F | 3F | 4F |
| | Dose (mg/kg/dose) | | | | | |
| | 1 | 4 | 15 | 1 | 4 | 15 |
| Epididymides | | | | | | |
| Absolute weight (%) | — | — | $-14^a$ | NA | NA | NA |
| vs. body weight (%) | — | — | $-6$ | NA | NA | NA |
| vs. brain weight (%) | — | — | $-13^a$ | NA | NA | NA |

$^a$Statistically significant difference between mean values for brincidofovir-treated and control groups.
— = not CMX00-related;
NA = Not applicable All other organ weight differences at the end of dosing, statistically significant or otherwise, had no microscopic correlations and were considered to be incidental due to biologic variability.

At the end of the recovery period, testes weights in males administered ≥4 mg/kg/dose (Table 95) were still lower than controls and differences were of greater magnitude than at the end of dosing. Without wishing to be bound by theory, these changes were, without wishing to be bound by theory, reflective of maturation depletion secondary to the loss of germ cell stages observed microscopically at the end of the dosing period.

TABLE 95

Brincidofovir-related organ weight changes (% difference relative to controls) in rats dosed twice weekly for a 29 day period and following a 14-day recovery period

| | Group/sex | | | | | |
|---|---|---|---|---|---|---|
| | 2M | 3M | 4M | 2F | 3F | 4F |
| | Dose (mg/kg/dose) | | | | | |
| | 1 | 4 | 15 | 1 | 4 | 15 |
| Testes | | | | | | |
| Absolute weight (%) | — | $-21^a$ | $-42^a$ | NA | NA | NA |
| vs. body weight (%) | — | $-26^a$ | $-40^a$ | NA | NA | NA |
| vs. brain weight (%) | — | $-18^a$ | $-41^a$ | NA | NA | NA |

$^a$Statistically significant difference between mean values for brincidofovir-treated and control.
— = not CMX00-related;
NA = Not applicable All other organ weight differences had no microscopic correlations and were considered to be incidental and due to biologic variability.

Pathology: Macroscopic

There were three unscheduled deaths during the dosing phase of the study. Two animals, a control male and a female administered 1 mg/kg/dose, died or was euthanized during the dosing phase from causes unrelated to brincidofovir. A third animal, a toxicokinetics male administered 15 mg/kg/dose, was euthanized during the dosing phase; the cause of death could not be determined. There was no brincidofovir-related mortality during the recovery phase.

A control male (Animal No. 1005) was found dead on Day 27. The cause of death was sepsis. Macroscopic and microscopic findings were consistent with bacterial infection that originated at the catheter site and disseminated to multiple other organs, resulting in masses in many organs that correlated microscopically with inflammation, abscessation, thrombosis, infarction and necrosis. Inflammation was also present in a swollen extremity (left femorotibial joint). Increased cellularity in the bone marrow was considered to be an adaptive reactive response to infection and decreased cellularity and/or necrosis in the thymus, spleen and lymph nodes, adrenal cortical hypertrophy were considered to be related to physiologic stress.

One female administered 1 mg/kg/dose (Animal No. 2595) was euthanized on Day 23 because of a swollen cranium which was likely related to accidental trauma. Dark areas on the cranium were observed macroscopically and correlated microscopically with multifocal hemorrhage.

One toxicokinetics male administered 15 mg/kg/dose (Animal No. 4107) was euthanized on Day 23. Enlarged liver and spleen, and correct catheter tip placement were noted at gross necropsy. The cause of death could not be determined from macroscopic data and microscopic evaluations were not conducted to further determine the cause of death.

Terminal Sacrifice
Brincidofovir-Related Findings

No brincidofovir-related macroscopic findings were observed at the end of the dosing period.

Procedure-Related Findings

Most macroscopic findings were related to inflammation in the infusion vein and were present across all groups including the controls. These findings included scabs or thickening of the catheter exteriorization site and abnormal contents, masses, thickening, and/or edema associated with the infusion vein, abnormal color and masses in the kidneys, irregular surface or masses in the liver and dark or pale areas and masses in the lung. Microscopically, these findings correlated with inflammation and necrosis. Enlargement or abnormal color of lymph nodes and spleen correlated microscopically with reactive lymphoid processes (increased follicle cellularity in lymph nodes and spleen), drainage of blood from sites of inflammation (erythrocytosis/erythrophagocytosis in lymph nodes) or extramedullary hematopoiesis (spleen). All these changes were considered to be systemic reactions associated with inflammation related to the infusion site/procedure.

Without wishing to be bound by theory, all other macroscopic findings occurred sporadically or in control groups and were considered incidental and due to biological variability. Abnormal color (blue) and soft left testis and small left epididymis in one 15 mg/kg/dose male (Animal No. 4063) were considered incidental and spontaneous background findings unrelated to the brincidofovir-related change of testicular germ cell depletion. Sporadic unilateral testicular seminiferous tubular atrophy is not uncommon in rodents.

Recovery Sacrifice
Test Item-Related Findings

At the end of the recovery period, brincidofovir-related macroscopic findings were limited to the testes and epididymides in the 15 mg/kg/dose males.

Two of 5 males had bilaterally soft and/or small testes and epididymides. Without wishing to be bound by theory, these findings correlated with germ cell depletion in the testes and decreased sperm in the head region of the epididymides. These findings were reflective of maturation depletion secondary to the loss of germ cell populations observed microscopically at the end of the dosing period. One male (Animal No. 4071) had a unilaterally (left) soft and/or small testis and epididymis which correlated with tubular atrophy in the testis and decreased sperm throughout the epididymis; these unilateral findings in this male were considered to be incidental spontaneous background changes.

Procedure-Related Findings

Major macroscopic findings related to the infusion procedure included abnormal contents, masses, thickening, and/or edema of the infusion vein, enlarged spleens and an enlarged renal lymph node. These findings correlated microscopically with inflammation and abscess formation of the infusion vein and increased follicular cellularity and plasmacytosis in the lymphoid organs. An enlarged adrenal gland correlated with cortical hypertrophy (related to physiologic stress).

Pathology: Microscopic

Brincidofovir-related microscopic findings were present in the testes, epididymides, and/or seminal vesicles in males at ≥4 mg/kg/dose, in the intestinal tract in males and females at ≥4 mg/kg/dose, and in the sebaceous glands in males and females at 15 mg/kg/dose.

Terminal Sacrifice
Brincidofovir-Related Findings

Male Reproductive Tract (Testes, Epididymides, Seminal Vesicles)

Brincidofovir-related germ cell depletion was present in the testes in males at ≥4 mg/kg/dose (Table 96). These changes were bilateral and minimal to slight at 4 mg/kg/dose and slight to moderate at 15 mg/kg/dose with the severity grading generally reflecting the number of cell types affected by the depletion. At 4 mg/kg/dose, germ cell depletion was characterized by a variable loss of spermatogonia through preleptotene spermatocytes. At 15 mg/kg/dose, the germ cell depletion was characterized by a variable loss of spermatogonia through pachytene spermatocytes, often with some sparing of pachytene spermatocytes in late stage tubules and occasional active degeneration of germ cells in late stage tubules.

Brincidofovir-related findings at 15 mg/kg/dose also included minimal luminal cell debris in the epididymides and minimally increased epithelial apoptosis in the seminal vesicles compared to controls. The latter change was occasionally accompanied by an increase in mitotic figures. Minimally increased epithelial apoptosis was also present in 4 male administered 4 mg/kg/dose.

Unilateral tubular atrophy observed in one 15 mg/kg/dose male (Animal No. 4063) was considered an incidental background finding that occurs sporadically in laboratory rodents.

TABLE 96

Brincidofovir-related findings in the male reproductive tract in rats dosed with Brincidofovir twice weekly for a 29 day period

| | Group/sex | | | | | | | |
|---|---|---|---|---|---|---|---|---|
| | 1M | 2M | 3M | 4M | 1F | 2F | 3F | 4F |
| | Dose (mg/kg/dose) | | | | | | | |
| | 0 | 1 | 4 | 15 | 0 | 1 | 4 | 15 |
| Number of tissues examined | 10 | 10 | 10 | 10 | NA | NA | NA | NA |
| Testes Depletion, Germ Cell | | | | | | | | |
| Minimal | — | — | 6 | — | NA | NA | NA | NA |
| Slight | — | — | 3 | 5 | NA | NA | NA | NA |
| Moderate | — | — | — | 5 | NA | NA | NA | NA |

TABLE 96-continued

Brincidofovir-related findings in the male reproductive tract in rats dosed with Brincidofovir twice weekly for a 29 day period

| | Group/sex | | | | | | | |
|---|---|---|---|---|---|---|---|---|
| | 1M | 2M | 3M | 4M | 1F | 2F | 3F | 4F |
| | Dose (mg/kg/dose) | | | | | | | |
| | 0 | 1 | 4 | 15 | 0 | 1 | 4 | 15 |
| Epididymides Cell Debris, Luminal | | | | | | | | |
| Minimal | — | — | — | 9 | NA | NA | NA | NA |
| Seminal Vesicles Apoptosis, Epithelial | | | | | | | | |
| Minimal | — | — | 4 | 8 | NA | NA | NA | NA |
| Mitotic Figures, Epithelial | | | | | | | | |
| Minimal | — | — | — | 4 | NA | NA | NA | NA |
| Total Animals Represented | 0 | 0 | 10 | 10 | NA | NA | NA | NA |

— = Finding not present.
NA = not applicable

Intestinal Tract

Single cell necrosis of the crypt epithelium (minimal to moderate) was present in the small intestine (duodenum, jejunum, and/or ileum) in males and females at ≥4 mg/kg/dose and was dose-dependent with respect to severity and/or incidence (Table 97). This change was occasionally accompanied by minimal crypt epithelial hyperplasia. Minimal single cell necrosis was also present in the glandular epithelium of the large intestine (cecum and/or colon) in males and females at 15 mg/kg/dose.

TABLE 97

Brincidofovir-related findings in the intestinal tract in rats dosed with brincidofovir twice weekly for a 29 day period

| | Group/sex | | | | | | | |
|---|---|---|---|---|---|---|---|---|
| | 1M | 2M | 3M | 4M | 1F | 2F | 3F | 4F |
| | Dose (mg/kg/dose) | | | | | | | |
| | 0 | 1 | 4 | 15 | 0 | 1 | 4 | 15 |
| Number of tissues examined Small intestine[a] Necrosis, Epithelium, Crypts | 10[c] | 10 | 10 | 10 | 10 | 11[d] | 10 | 10 |
| Minimal | — | — | 8 | 2 | — | — | 9 | 3 |
| Slight | — | — | 1 | 8 | — | — | — | 5 |
| Moderate | — | — | — | — | — | — | — | 1 |
| Hyperplasia, Epithelium, Crypts | | | | | | | | |
| Minimal | — | — | 5 | 2 | — | — | — | 5 |
| Large intestine[b] Necrosis, Epithelium, glands | | | | | | | | |
| Minimal | — | — | — | 9 | — | — | — | 4 |
| Total Animals Represented | 0 | 0 | 9 | 10 | 0 | 0 | 9 | 9 |

[a,b]Incidence of severity grades represent highest grade recorded for duodenum, jejunum and ileum[a] and for cecum and colon.[b]
[c]Duodenum was autolytic in one animal and not readable.
[d]Incidence includes one unscheduled death (Animal No. 2595).
— = Finding not present.

Skin (Sebaceous Gland)

Sebaceous gland atrophy (slight to marked) was present in males and females at 15 mg/kg/dose (Table 98). Marked severity indicated absence of sebaceous glands microscopically with no change in remaining adnexa (hair follicles).

TABLE 98

Brincidofovir-related findings in the skin in rats dosed with brincidofovir twice weekly for a 29 day period

| | Group/sex | | | | | | | |
|---|---|---|---|---|---|---|---|---|
| | 1M | 2M | 3M | 4M | 1F | 2F | 3F | 4F |
| | Dose (mg/kg/dose) | | | | | | | |
| | 0 | 1 | 4 | 15 | 0 | 1 | 4 | 15 |
| Number of tissues examined Atrophy, Sebaceous Glands | 10 | 10 | 10 | 10 | 10 | 11[a] | 10 | 10 |
| Slight | — | — | — | 3 | — | — | — | 5 |
| Moderate | — | — | — | 3 | — | — | — | 3 |
| Marked | — | — | — | 4 | — | — | — | 2 |
| Total Animals Represented | 0 | 0 | 0 | 10 | 0 | 0 | 0 | 10 |

[a]Incidence includes one unscheduled death (Animal No. 2595).
— = Finding not present.

Procedure-Related Findings

Microscopic findings related to the infusion procedure were observed in the vehicle control group and in animals administered brincidofovir. Without wishing to be bound by theory, many findings were those commonly associated with catheterization, including pericatheteral thrombi, suture granulomas, and intimal proliferation in the catheter vein (Weber, 2011) and perivascular eosinophilic inflammatory cell infiltrates in the lung (Morton, 1997). Some animals had chronic-active inflammation, abscess formation and thrombosis with bacterial colonies in the catheter vein and epidermal necrosis and/or inflammatory tracts and abscesses in the skin at the catheter exteriorization site. Chronic-active inflammation, abscess formation, infarction and/or necrosis were occasionally present in other organs, primarily the kidney and liver. Without wishing to be bound by theory, these changes were likely the result of bacterial infection of the catheter vein. Findings indicative of an immune response to infection included overall increased cellularity or increased granulocytes in the bone marrow, increased follicular cellularity and plasmacytosis in lymph nodes and increased follicular cellularity, increased macrophages and/or extramedullary hematopoiesis in the spleen. Other findings in the lymphoid organs, such as decreased cellularity and necrosis, as well as cortical hypertrophy in the adrenal glands and vaginal mucification were considered related to stress.

Additional procedure-related microscopic findings were also observed in the stomach (serosal inflammation), heart (valvular endothelial hypertrophy), and lung (granulomas, emboli, macrophage aggregates, alveolar and vascular inflammation, and/or vascular intimal proliferation). Instances of minimal focal/multifocal myocardial inflammation were also observed and, without wishing to be bound by theory, could have been secondary to the infusion procedures or could have represented common background findings in laboratory rodents.

Miscellaneous Findings

Kidney

Eosinophilic globules were present in the cortical tubular epithelium of the kidney in a male (Animal No. 3048) and a female (Animal No. 3560) dosed at 4 mg/kg/dose. There were no associated inflammatory or degenerative changes. These globules exhibited negative staining with Prussian blue for iron and Martius Scarlet Blue as a general stain for erythrocytes.

All other microscopic findings occurred sporadically or at similar incidence and severity in control and brincidofovir groups and without wishing to be bound by theory were considered incidental and due to biological variability. These included a poorly differentiated carcinoma of the salivary gland in one 4 mg/kg/dose male (Animal No. 3044) and a renal tubular adenoma in a 15 mg/kg/dose male (Animal No. 4068). Without wishing to be bound by theory, these tumors have been reported to occur spontaneously in rats and were considered incidental (Nishikawa 2010, Hardisty 2013) and unrelated to brincidofovir.

Following the 14-day recovery period, microscopic findings remained present in the testes and/or epididymides in males at ≥4 mg/kg/dose, and a new finding noted in the bone marrow in males and females at 15 mg/kg/dose. There was complete recovery of all microscopic findings in the intestinal tract and sebaceous glands observed at the end of dosing. Infusion procedure-related findings were also present at the end of the recovery period.

Male Reproductive Tract (Testes, Epididymides)

At the end of the recovery period, there was continued depletion of the cell populations identified in terminal necropsy animals along with maturation depletion in the testes in males at ≥4 mg/kg/dose (Table 99). At 15 mg/kg/dose, this change was characterized by a depletion of most germ cell populations generally sparing only elongating spermatids often with multifocal tubular atrophy. At 4 mg/kg/dose, there was variable loss of spermatogonia, spermatocytes, and round spermatids in early stage tubules through about stage XIII tubules.

In the males at 15 mg/kg/dose, maturation depletion was accompanied by reduced sperm and luminal cell debris in the head of the epididymides. One 15 mg/kg/dose male (Animal No. 4071) had unilateral tubular atrophy in the testes accompanied by reduced sperm with cribiform change (a finding related to reduced sperm) in the epididymis. Without wishing to be bound by theory, these unilateral findings in this male were considered spontaneous background changes and unrelated to brincidofovir.

TABLE 99

Test item-related findings in the male reproductive tract in rats dosed with brincidofovir twice weekly for a 29 day period and following a 14-day recovery period

| | Group/sex | | | | | | | |
|---|---|---|---|---|---|---|---|---|
| | 1M | 2M | 3M | 4M | 1F | 2F | 3F | 4F |
| | Dose (mg/kg/dose) | | | | | | | |
| | 0 | 1 | 4 | 15 | 0 | 1 | 4 | 15 |
| Number of tissues examined | 5 | 5 | 5 | 5 | NA | NA | NA | NA |
| Testes | | | | | | | | |
| Depletion, Germ Cell | | | | | | | | |
| Minimal | — | — | 1 | — | NA | NA | NA | NA |
| Slight | — | — | 4 | — | NA | NA | NA | NA |
| Moderate | — | — | — | 1 | NA | NA | NA | NA |
| Marked | — | — | — | 4 | NA | NA | NA | NA |
| Epididymides | | | | | | | | |
| Sperm, Reduced, Luminal | | | | | | | | |
| Marked | — | — | — | 4 | NA | NA | NA | NA |
| Severe | — | — | — | 1 | NA | NA | NA | NA |
| Cell Debris, Luminal | | | | | | | | |
| Minimal | — | — | — | 5 | NA | NA | NA | NA |
| Total Animals Represented | 0 | 0 | 5 | 5 | NA | NA | NA | NA |

— = Finding not present.
NA = not applicable

Bone Marrow

At the 15 mg/kg/dose, a few recovery males and females had minimal to slight decreased cellularity (Table 100) in the bone marrow, a finding which was not observed at the end of the dosing period.

TABLE 100

Test item-related findings in the bone marrow in rats dosed with brincidofovir twice weekly for a 29 day period and following a 14-day recovery period

| | Group/sex | | | | | | | |
|---|---|---|---|---|---|---|---|---|
| | 1M | 2M | 3M | 4M | 1F | 2F | 3F | 4F |
| | Dose (mg/kg/dose) | | | | | | | |
| | 0 | 1 | 4 | 15 | 0 | 1 | 4 | 15 |
| Number of tissues examined | 5 | 5 | 5 | 5 | 5 | 4 | 5 | 5 |
| Cellularity, Decreased$^a$ | | | | | | | | |
| Minimal | — | — | — | — | — | — | — | 2 |
| Slight | — | — | — | 3 | — | — | — | — |
| Total Animals Represented | 0 | 0 | 0 | 3 | 0 | 0 | 0 | 2 |

$^a$Incidence of severity grades represent highest grade recorded for sternal or femoral bone marrow.
— = Finding not present.

Procedure-Related Findings

At the end of the recovery period, a range of procedural-related microscopic observations were present similar to those observed at the end of the dosing period and described above These were related to infection of the infusion catheter and without wishing to be bound by theory were not considered to be related to brincidofovir.

All other microscopic findings occurred sporadically or at similar incidence and severity in control and brincidofovir groups and were considered incidental and due to biological variability.

Brincidofovir was administered twice weekly for 29 days via 2-hour intravenous infusion to Sprague-Dawley CD® rats (15/sex/group) at 0 (2× Sodium Phosphate Buffer Solution), 1, 4 or 15 mg/kg/dose. Up to 5 animals/sex/group were held for a 14-day post-dosing recovery.

Administration of brincidofovir resulted in intermittent (generally following infusion) clinical signs in some animals (primarily abnormal breathing and hunched posture) in both sexes at ≥4 mg/kg/dose and minimally decreased food consumption in males and females at ≥1 mg/kg/dose and 15 mg/kg/dose, respectively.

Brincidofovir-related findings were present in the male reproductive tract (testicular germ cell depletion, luminal cell debris in the epididymides and increased epithelial apoptosis in the seminal vesicles) and intestinal tract (single cell necrosis) at ≥4 mg/kg/dose and sebaceous glands (atrophy) at 15 mg/kg/dose. All brincidofovir-related findings completely recovered with the exception of testicular changes in males at ≥4 mg/kg/dose, which would not be expected to fully recover in a 2 week period. In addition, a few animals administered 15 mg/kg/dose had decreased bone marrow cellularity and unilaterally or bilaterally soft and/or small testes and epididymides at the end of recovery.

Under the conditions of the study, based on the testicular germ cell depletion in males at ≥4 mg/kg/dose and moderate intestinal single cell necrosis in 1 female at 15 mg/kg/dose, the no-observed-adverse-effect level (NOAEL) for brincidofovir was considered to be 1 mg/kg/dose in males and 4 mg/kg/dose for in females.

Example 11—IV BCV Ascending Dose Study in Healthy Human Subjects

Summary

Brincidofovir was administered to healthy subjects at 10 mg, 25 mg and 50 mg. IV brincidofovir at 10 mg was found to provide similar exposure as orally administered brincidofovir at 100 mg. It was found that both IV brincidofovir doses (10 mg and 25 mg) were generally safe and well-tolerated. No drug related adverse events, no gastrointestinal adverse events, and no graded lab abnormalities (e.g., no hematologic toxicity and no kidney toxicity) were observed.

This study also evaluated the peripheral blood mononuclear cell (PBMC) PK of CDV-PP following IV and oral suspension BCV administration. BCV is converted intracellularly to active cidofovir diphosphate (CDV-PP).

As background, a single dose of oral BCV at 100 mg and 200 mg resulted in about 5% instance of diarrhea, and a 350 mg dose resulted in about 20% instance of diarrhea.

Materials and Methods

In this double-blind study, subjects were randomized 3:1 to receive IV BCV or placebo in sequential single ascending dose cohorts (Tables 101 and 102, below). Plasma PK samples were collected over 7 days and assayed by HPLC-MS. Plasma BCV PK parameters were determined by non-compartmental analysis and dose proportionality was assessed. Safety assessments were collected over 14 days.

TABLE 101

Study Design

| Cohort | N | Actual Doses | IV Infusion Duration |
|---|---|---|---|
| 1 | 6 active and 2 placebo | BCV 10 mg or placebo | 2 hours |
| 2 | 6 active and 2 placebo | BCV 25 mg or placebo | 2 hours |
| 3 | 9 active and 3 placebo | BCV 50 mg or placebo | 2 hours |
| 4 | 9 active and 3 placebo | BCV 50 mg or placebo | 4 hours |

TABLE 102

Subject Demographics

| Cohort | Male Sex | Age (years) |
|---|---|---|
| 1 | 8/8 (100%) | 26 (18-34) |
| 2 | 8/8 (100%) | 23 (20-37) |
| 3 | 12/12 (100%) | 21 (18-26) |
| 4 | 12/12 (100%) | 26 (18-46) |

Male sex presented as n/N (%)
Age presented as mean (minimum-maximum)

PBMC PK of CDV-PP

Two single dose BCV studies in healthy subjects contributed data for this analysis. The first study was a 2-period crossover bioequivalence study that enrolled 24 subjects who received two formulations of BCV oral suspension 100 mg fasted, one in each period. Data from 12 subjects who had PBMCs collected in Period 1 were included in this analysis; these subjects were 100% female, 31-59 years, and 58-88 kg. The second study, outlined above, enrolled 40 subjects who received IV BCV or placebo. Data from 18 subjects who received BCV 50 mg as either a 2-h or 4-h IV infusion were included in this analysis; these subjects were 100% male, 18-46 years, 64-106 kg. Serial PBMC samples were collected over 14 days and assayed by HPLC-MS-MS. PBMC CDV-PP PK parameters were determined by non-compartmental analysis.

Forty healthy male subjects (18-46 y, 83% White) were enrolled and completed the study. Plasma BCV $C_{max}$ and $AUC_\infty$ increased in proportion to dose (Table 103, below). Adverse events and alanine aminotransferase (ALT) elevations were dose- and infusion duration-related. Gastrointestinal adverse events were mild. All adverse events and ALT elevations were transient and no serious adverse events occurred. No significant differences between placebo and IV BCV in other chemistries or hematologic parameters were observed.

FIG. 6 shows a plot of the plasma brincidofovir concentration ($AUC_{inf}$ (ng*h/mL)) at different 100 mg oral administration, 10 mg IV administration, and 25 mg IV administration. As shown in FIG. 6, IV administration of 10 mg brincidofovir provided substantially the same plasma concentration as oral administration of 100 mg brincidofovir, while IV administration of 25 mg brincidofovir provided higher plasma concentration than both the IV 10 mg dose and the oral 100 mg dose.

A dose-related, reversible ALT increase was observed with IV BCV. In prior studies, oral BCV had reversible dose-related ALT increases in humans and preclinical studies. In the IV BCV SAD study, at therapeutic IV exposures (cohorts 1 and 2), no grade 2 or higher ALT elevations were observed. At supratherapeutic exposures (cohorts 3 and 4), transient grade 2-3 ALT elevations were noted in cohort 4 only. No Grade 2 or higher bilirubin was observed in any cohort.

TABLE 103

Preliminary Summary of Plasma BCV PK Data following IV infusion

| | Cohort 1 BCV 10 mg 2 h Infusion (n = 6) | Cohort 2 BCV 25 mg 2 h Infusion (n = 6) | Cohort 3 BCV 50 mg 2 h Infusion (n = 9) | Cohort 4 BCV 50 mg 4 h Infusion (n = 9) | Pooled Placebo (n = 10) |
|---|---|---|---|---|---|
| PK | | | | | |
| $C_{max}$ (ng/mL) | 613 (25%) [439-799] | 1412 (27%) [973-1900] | 2952 (19%) [2200-3940] | 1586 (14%) [1360-2180] | NA |
| $AUC_\infty$ (ng · h/mL) | 1312 (26%) [875-1710] | 2889 (37%) [1742-4790] | 5948 (19%) [4446-7274] | 6570 (15%) [5347-9048] | NA |

TABLE 103-continued

Preliminary Summary of Plasma BCV PK Data following IV infusion

|  | Cohort 1<br>BCV 10 mg<br>2 h Infusion<br>(n = 6) | Cohort 2<br>BCV 25 mg<br>2 h Infusion<br>(n = 6) | Cohort 3<br>BCV 50 mg<br>2 h Infusion<br>(n = 9) | Cohort 4<br>BCV 50 mg<br>4 h Infusion<br>(n = 9) | Pooled<br>Placebo<br>(n = 10) |
|---|---|---|---|---|---|
| $t_{1/2}$ (h) | 3.42 (27%)<br>[2.70-5.76] | 5.89 (23%)<br>[4.06-8.00] | 6.54 (49%)<br>[3.98-18.09] | 5.10 (13%)<br>[4.23-6.33] | NA |
| CL (L/h) | 7.62 (26%)<br>[5.85-11.4] | 8.65 (37%)<br>[5.22-14.4] | 8.41 (19%)<br>[6.87-11.3] | 7.61 (15%)<br>[5.53-9.35] | NA |
| $V_{SS}$ (L) | 16.4 (24%)<br>[12.0-22.2] | 19.8 (25%)<br>[15.0-30.3] | 19.5 (21%)<br>[13.9-24.9] | 10.8 (19%)<br>[7.67-14.5] | NA |
| Drug-Related AEs |  |  |  |  |  |
| Diarrhea | 0 | 0 | 1 (11%) | 3 (33%) | 0 |
| Nausea | 0 | 0 | 0 | 2 (22%) | 0 |
| Decreased appetite | 0 | 0 | 0 | 1 (11%) |  |
| Headache | 0 | 0 | 2 (22%) | 2 (22%) | 0 |
| Pain, phlebitis at infusion site | 0 | 0 | 1 (11%) | 0 | 0 |
| Elevated liver transaminases[1] | 0 | 0 | 0 | 1 (11%) | 0 |

$C_{max}$ and $AUC_\infty$ presented as geometric mean (% CVb) [minimum-maximum]
$T_{max}$ was 2 hours for Cohorts 1-3 (2-hour infusion) and 2.5 to 4 hours (4-hour infusion)
[1] ALT >2x ULN in 2 BCV 50 mg 4 h infusion and 1 placebo subjects; 1 ALT elevation considered an AE
2. In Cohort 3, 5 drug-related AEs in 4 subjects.
3. In Cohort 4, 9 drug-related AEs in 5 subjects.

TABLE 104

IV BCV PK and Safety: Grade 3 or 4 Drug-Related Adverse Events

|  | Cohort 1<br>BCV 10 mg<br>2 h Infusion<br>(n = 6) | Cohort 2<br>BCV 25 mg<br>2 h Infusion<br>(n = 6) | Cohort 3<br>BCV 50 mg<br>2 h Infusion<br>(n = 9) | Cohort 4<br>BCV 50 mg<br>4 h Infusion<br>(n = 9) | Pooled<br>Placebo<br>(n = 10) |
|---|---|---|---|---|---|
| Grade 3 or 4 Drug-Related AEs |  |  |  |  |  |
| Diarrhea | 0 | 0 | 0 | 0 | 0 |
| Nausea | 0 | 0 | 0 | 0 | 0 |
| Decreased appetite | 0 | 0 | 0 | 0 |  |
| Headache | 0 | 0 | 0 | 0 | 0 |
| Pain, phlebitis at infusion site | 0 | 0 | 0 | 0 | 0 |
| Elevated liver transaminases[1] | 0 | 0 | 0 | 1 (11%) | 0 |

FIG. 9 shows a mean plasma BCV concentration as a function of time for subjects in cohorts 1-4. FIG. 9 also shows mean plasma BCV concentration as a function of time for subjects administered BCV orally.

Table 105 shows a summary of plasma BCV PK data following IV and oral dosing (Single dose administration).

TABLE 105

Summary of Plasma BCV PK Data Following IV and Oral Dosing

| Plasma<br>BCV PK<br>Parameter | 10 mg<br>2 h IV<br>infusion<br>N = 6 | 25 mg<br>2 h IV<br>infusion<br>N = 6 | 50 mg<br>2 h IV<br>infusion<br>N = 9 | 50 mg<br>4 h IV<br>infusion<br>N = 9 | 100 mg<br>Oral<br>Tablet<br>N = 52 | 200 mg<br>Oral<br>Tablet<br>N = 15 | 200 mg<br>Oral<br>Tablet<br>N = 63 | 350 mg<br>Oral<br>Tablet<br>N = 70 |
|---|---|---|---|---|---|---|---|---|
| $C_{max}$<br>(ng/mL) | 613<br>(25%)<br>[439-799] | 1412<br>(27%)<br>[973-1900] | 2952<br>(19%)<br>[2200-3940] | 1586<br>(14%)<br>[1360-2180] | 258<br>(42%)<br>[97.0-586] | 622<br>(33%)<br>[384-1030] | 802<br>(38%)<br>[344-1980] | 1482<br>(34%)<br>[732-3600] |
| $AUC_{inf}$<br>(ng·h/mL) | 1312<br>(26%)<br>[875-1710] | 2889<br>(37%)<br>[1742-4790] | 5948<br>(19%)<br>[4446-7274] | 6570<br>(15%)<br>[5347-9048] | 1380<br>(41%)<br>[555-3070] | 3307<br>(35%)<br>[1741-5190] | 3744<br>(35%)<br>[1605-8227] | 6938<br>(31%)<br>[3293-14132] |

TABLE 105-continued

Summary of Plasma BCV PK Data Following IV and Oral Dosing

| Plasma BCV PK Parameter | 10 mg 2 h IV infusion N = 6 | 25 mg 2 h IV infusion N = 6 | 50 mg 2 h IV infusion N = 9 | 50 mg 4 h IV infusion N = 9 | 100 mg Oral Tablet N = 52 | 200 mg Oral Tablet N = 15 | 200 mg Oral Tablet N = 63 | 350 mg Oral Tablet N = 70 |
|---|---|---|---|---|---|---|---|---|
| t½ (h) | 3.42 (27%) [2.70-5.76] | 5.89 (23%) [4.06-8.00] | 6.54 (49%) [3.98-18.09] | 5.10 (13%) [4.23-6.33] | 7.62 (47%) [3.05-24.1] | 12.0 (27%) [3.93-17.7] | — | — |

Data presented as geometric mean (CVb %) [minimum, maximum]
$AUC_{last}$ presented in place of $AUC_{inf}$ for Study CMX001-108

Table 106 shows a summary of preliminary plasma CDV PK data cohorts 1-4.

TABLE 106

Preliminary Summary of Plasma CDV PK Data following IV infusion

| Plasma CDV PK Parameter | 10 mg Single Dose 2 h IV infusion N = 6 | 25 mg Single Dose 2 h IV infusion N = 6 | 50 mg Single Dose 2 h IV infusion N = 9 | 50 mg Single Dose 4 h IV infusion N = 9 |
|---|---|---|---|---|
| $C_{max}$ (ng/mL) | ND | 5.94 (22%) [4.62-7.83] | 12.7 (19%) [9.44-16.6] | 12.1 (14%) [9.83-15.6] |
| $AUC_{last}$ (ng·h/mL)$^5$ | ND | 189 (81%) [77.6-419] | 652 (38%) [341-1367] | 654 (30%) [477-1151] |
| $T_{max}$ (h) | ND | 9.0 [8.0-10.0] | 10.0 [8.00-12.0] | 10.0 [8.00, 10.00] |

Data presented as geometric mean (CVb %) [minimum-maximum]
ND: not done because majority of CDV concentrations were below the lower limit of quantification
$AUC_{inf}$ and t½ not reported due to high AUC percent extrapolated FIG. 10 shows median plasma CDV concentration as a function of time following IV and Oral BCV Doses.
PBMC PK of CDV-PP Single doses of BCV 50 mg administered as 2- or 4-h IV infusions delivered intracellular CDV-PP exposures comparable to BCV 100 mg oral suspension (Table 107). PBMC CDV-PP exposure was inversely related to infusion duration (Table 107).

FIG. 8 shows the mean (+/−SE) ALT levels observed in the IV BCV SAD trial.

TABLE 107

Summary of PBMC CDV-PP PK following BCV Oral and IV Dosing

| PBMC CDV-PP PK Parameter | BCV 100 mg Oral suspension (n = 12) | BCV 50 mg IV 2 h Infusion (n = 9) | BCV 50 mg IV 4 h Infusion (n = 9) |
|---|---|---|---|
| $C_{max}$ (pg/10$^6$ cells) | 7.68 (41%) | 14.3 (63%) | 8.41 (57%) |
| $AUC_{last}$ (pg·h/10$^6$ cells) | 1107 (50%) | 1409 (36%) | 963 (36%) |

Single doses of BCV 10-50 mg administered as a 2 h IV infusion were well tolerated and not associated with significant clinical or laboratory abnormalities. BCV IV 10 mg and BCV IV 50 mg achieved geometric mean plasma BCV $AUC_\infty$ similar to and 4.5-fold, respectively, values achieved with BCV oral 100 mg tablets ($C_{max}$=251 ng/mL and $AUC_\infty$=1394 ng·h/mL). These data support evaluation of repeat dose administration in healthy subjects and virally-infected patients.

Additionally, IV BCV provided comparable PBMC CDV-PP exposures with lower doses when compared with oral BCV. Without wishing to be bound by theory, in some embodiments this can allow for improvements in BCV tolerability and efficacy.

EQUIVALENTS

While the present disclosure has been described in conjunction with the specific embodiments set forth above, many alternatives, modifications and other variations thereof will be apparent to those of ordinary skill in the art. All such alternatives, modifications and variations are intended to fall within the spirit and scope of the present disclosure.

The invention claimed is:

1. An aqueous pharmaceutical composition, comprising:
brincidofovir at a concentration of about 10 mg/mL;
mannitol at a concentration from about 2.5% (w/v) to about 9% (w/v);
L-arginine at a concentration from about 100 mM to about 200 mM, and water;
wherein the pH of the composition is about 8.0, and wherein the composition shows less than 0.05% drug related impurities when stored at 5 (+3° C.) for 1 month.

2. The pharmaceutical composition of claim 1, wherein the mannitol is present at a concentration of about 2.5% (w/v).

3. The pharmaceutical composition of claim 1, wherein the mannitol is present at a concentration of about 5% (w/v).

4. The pharmaceutical composition of claim 1, wherein the L-arginine is present at a concentration of about 100 mM.

5. The pharmaceutical composition of claim 1, wherein the pH is adjusted using HCl and/or NaOH.

6. The pharmaceutical composition of claim 1, comprising:
brincidofovir at a concentration of about 10.0 mg/mL,
mannitol at a concentration from about 25 mg/mL to about 50 mg/mL;
L-arginine at a concentration of about 17.4 mg/mL; and water;
wherein the pH of the composition is about 8.0.

7. The pharmaceutical composition of claim 1, wherein the composition is free of visible particulates when stored at 5 (±3° C.) for 6 months.

8. The pharmaceutical composition of claim 1, wherein the composition is free of visible particulates when stored at 25 (±2° C.) for 6 months.

9. The pharmaceutical composition of claim 1, wherein the composition is free of visible particulates when stored at 25 (±2° C.) for 12 months.

10. The pharmaceutical composition of claim 1, wherein the composition was not lyophilized prior to storage.

11. The pharmaceutical composition of claim 1, wherein the composition is suitable for intravenous administration.

* * * * *